United States Patent
Chen et al.

(10) Patent No.: US 12,397,993 B2
(45) Date of Patent: Aug. 26, 2025

(54) LOADING OR UNLOADING APPARATUS, SYSTEM, AND METHOD

(71) Applicant: HAI ROBOTICS CO., LTD., Guangdong (CN)

(72) Inventors: Yeguang Chen, Guangdong (CN); Zhe Kong, Guangdong (CN)

(73) Assignee: HAI ROBOTICS CO., LTD., Guangdong (CN)

( * ) Notice: Subject to any disclaimer, the term of this patent is extended or adjusted under 35 U.S.C. 154(b) by 555 days.

(21) Appl. No.: 17/939,647

(22) Filed: Sep. 7, 2022

(65) Prior Publication Data
US 2023/0034430 A1    Feb. 2, 2023

Related U.S. Application Data

(63) Continuation of application No. PCT/CN2021/079173, filed on Mar. 4, 2021.

(30) Foreign Application Priority Data

Mar. 9, 2020 (CN) .......................... 202010157383.9
Mar. 9, 2020 (CN) .......................... 202010157413.6
(Continued)

(51) Int. Cl.
*B65G 1/137* (2006.01)
*B65G 1/06* (2006.01)

(52) U.S. Cl.
CPC ............. *B65G 1/1375* (2013.01); *B65G 1/06* (2013.01)

(58) Field of Classification Search
CPC .......... B65G 1/1375; B65G 1/02; B65G 1/06; B65G 65/00
(Continued)

(56) References Cited

U.S. PATENT DOCUMENTS

| 5,379,229 A | 1/1995 | Parsons et al. |
| 5,895,195 A | 4/1999 | Simmons et al. |

(Continued)

FOREIGN PATENT DOCUMENTS

| CA | 108190341 A | 6/2018 |
| CN | 102627179 A | 8/2012 |

(Continued)

OTHER PUBLICATIONS

International search report of PCT/CN2021/079173 mailed Jun. 9, 2021 with English translation.
(Continued)

*Primary Examiner* — Gene O Crawford
(74) *Attorney, Agent, or Firm* — Frank Gao, Esq.

(57) ABSTRACT

A loading or unloading apparatus configured to convey goods to a transport robot or unload goods on the transport robot. The loading or unloading apparatus includes an upright frame, a plurality of goods loading or unloading assemblies and a second driving structure. The upright frame is extending along a vertical direction. The plurality of goods loading or unloading assemblies are arranged on the upright frame at intervals along the vertical direction and capable of separately conveying, at different heights, the goods to the transport robot or unloading the goods on the transport robot. The second driving structure is configured to drive the upright frame to approach or move away from the transport robot along a loading or unloading direction, such that the plurality of goods loading or unloading assemblies convey the goods to the transport robot or unload the goods on the transport robot.

17 Claims, 26 Drawing Sheets

(30) Foreign Application Priority Data

| | | |
|---|---|---|
| Mar. 9, 2020 | (CN) | 202020280361.7 |
| Mar. 9, 2020 | (CN) | 202020281007.6 |
| Mar. 9, 2020 | (CN) | 202020281070.X |
| Mar. 9, 2020 | (CN) | 202020281542.1 |
| Mar. 9, 2020 | (CN) | 202020281558.2 |
| Mar. 9, 2020 | (CN) | 202020282274.5 |
| Mar. 9, 2020 | (CN) | 202020283790.X |
| Jun. 9, 2020 | (CN) | 202010520140.7 |

(58) Field of Classification Search
USPC ................................ 700/213, 214, 218
See application file for complete search history.

(56) References Cited

U.S. PATENT DOCUMENTS

| | | | |
|---|---|---|---|
| 6,755,322 | B1 | 6/2004 | Herzog et al. |
| 9,008,829 | B2 * | 4/2015 | Worsley .............. B65G 1/10 |
| 9,663,292 | B1 | 5/2017 | Brazeau et al. |
| 11,180,069 | B2 * | 11/2021 | Jarvis et al. ........... B60P 3/007 |
| 2006/0245862 | A1 | 11/2006 | Hansl et al. |
| 2007/0140817 | A1 | 6/2007 | Hansl |
| 2017/0174431 | A1 * | 6/2017 | Borders et al. ...... B65G 1/0421 |
| 2019/0352092 | A1 | 11/2019 | Zheng et al. |
| 2020/0048005 | A1 | 2/2020 | Kraetsch et al. |

FOREIGN PATENT DOCUMENTS

| | | |
|---|---|---|
| CN | 103350850 A | 10/2013 |
| CN | 203544918 U | 4/2014 |
| CN | 105593143 A | 5/2016 |
| CN | 106064386 A | 11/2016 |
| CN | 107000934 A | 8/2017 |
| CN | 206569571 U | 10/2017 |
| CN | 206665475 U | 11/2017 |
| CN | 207158372 U | 3/2018 |
| CN | 107922119 A | 4/2018 |
| CN | 108069180 A | 5/2018 |
| CN | 207536599 U | 6/2018 |
| CN | 207580635 U | 7/2018 |
| CN | 208008400 U | 10/2018 |
| CN | 108861283 A | 11/2018 |
| CN | 208249076 U | 12/2018 |
| CN | 208307644 U | 1/2019 |
| CN | 109592280 A | 4/2019 |
| CN | 208761426 U | 4/2019 |
| CN | 208761427 U | 4/2019 |
| CN | 109748027 A | 5/2019 |
| CN | 109760981 A | 5/2019 |
| CN | 209023571 U | 6/2019 |
| CN | 110239870 A | 9/2019 |
| CN | 209522319 U | 10/2019 |
| CN | 110537189 A | 12/2019 |
| CN | 209871392 U | 12/2019 |
| CN | 210028821 U | 2/2020 |
| CN | 111634597 A | 9/2020 |
| CN | 212244808 U | 12/2020 |
| CN | 212244809 U | 12/2020 |
| CN | 212244811 U | 12/2020 |
| CN | 212638694 U | 3/2021 |
| DE | 102017112658 A1 | 12/2018 |
| EP | 0235488 A1 | 9/1987 |
| JP | 2018163415 A | 10/2018 |
| KR | 101470741 B1 | 12/2014 |
| KR | 20150142729 A | 12/2015 |
| WO | WO2016151504 A1 | 9/2016 |
| WO | WO2017090108 A | 6/2017 |

OTHER PUBLICATIONS

Notice of Allowance of Chinese Application No. 202111027600.3, issued on Feb. 27, 2025.
First Office Action of Chinese Application No. 202111027460.X, dated Apr. 1, 2025,and search report, and its English translation.

\* cited by examiner

LOADING OR UNLOADING APPARATUS, SYSTEM, AND METHOD

CROSS-REFERENCE TO RELATED APPLICATIONS

The present disclosure is a continuation of International Patent Application No. PCT/CN2021/079173 filed on Mar. 4, 2021, which claims priority to Chinese Patent Application No. 202010520140.7, entitled "LOADING OR UNLOADING APPARATUS AND LOADING OR UNLOADING METHOD" and filed with the China National Intellectual Property Administration on Jun. 9, 2020; Chinese Patent Application No. 202010157383.9, entitled "LOADING OR UNLOADING APPARATUS AND LOADING OR UNLOADING METHOD" and filed with the China National Intellectual Property Administration on Mar. 9, 2020; Chinese Patent Application No. 202020281542.1, entitled "LOADING OR UNLOADING APPARATUS AND LOADING OR UNLOADING SYSTEM" and filed with the China National Intellectual Property Administration on Mar. 9, 2020; Chinese Patent Application No. 202020281007.6, entitled "TRANSPORT ROBOT AND TRANSPORT SYSTEM HAVING SAME" and filed with the China National Intellectual Property Administration on Mar. 9, 2020; Chinese Patent Application No. 202010157413.6, entitled "TRANSPORT ROBOT, TRANSPORT SYSTEM, AND TRANSPORT METHOD THEREOF" and filed with the China National Intellectual Property Administration on Mar. 9, 2020; Chinese Patent Application No. 202020280361.7, entitled "TRANSPORT ROBOT AND TRANSPORT SYSTEM HAVING SAME" and filed with the China National Intellectual Property Administration on Mar. 9, 2020; Chinese Patent Application No. 202020281070.X, entitled "TRANSPORT ROBOT AND TRANSPORT SYSTEM HAVING SAME" and filed with the China National Intellectual Property Administration on Mar. 9, 2020; Chinese Patent Application No. 202020282274.5, entitled "LOADING OR UNLOADING APPARATUS AND LOADING OR UNLOADING SYSTEM" and filed with the China National Intellectual Property Administration on Mar. 9, 2020; Chinese Patent Application No. 202020283790.X, entitled "LOADING OR UNLOADING APPARATUS AND LOADING OR UNLOADING SYSTEM" and filed with the China National Intellectual Property Administration on Mar. 9, 2020; and Chinese Patent Application No. 202020281558.2, entitled "TRANSPORT ROBOT AND TRANSPORT SYSTEM HAVING SAME" and filed with the China National Intellectual Property Administration on Mar. 9, 2020, which are incorporated herein by reference in their entireties.

TECHNICAL FIELD

The present disclosure relates to the technical field of warehousing and logistics, and in particular, to a loading or unloading apparatus, system, and method for same.

BACKGROUND

Intelligent warehousing is a step in the logistics process. The application of intelligent warehousing ensures the speed and accuracy of data input in various steps of warehouse management of goods, so as to ensure that enterprises can accurately grasp the real data of the inventory in a timely and accurately manner, and reasonably maintain and control the enterprise inventory. Through scientific coding, batches and shelf life of inventory goods can also be conveniently managed. By using the storage location management function, current locations of all inventory goods can be grasped in time, which is conducive to improving the efficiency of warehouse management.

The transport robot plays an important role in intelligent warehousing, and replaces the manual transport of goods. However, the overall working efficiency of an existing transport robot is low.

SUMMARY

To resolve the foregoing technical problems, embodiments of the present disclosure provide a transport robot, system, and method, and a loading or unloading apparatus, system, and method, which are used for improving the overall working efficiency of the transport robot.

To resolve the foregoing technical problems, the embodiments of the present disclosure provide the following technical solutions:

According to a first aspect, the present disclosure provides a transport robot, including: a vertical frame arranged along a vertical direction; and a storage mechanism including a plurality of storage assemblies configured to store to-be-transported goods and arranged on the vertical frame at equal intervals along the vertical direction.

Optionally, an interval between two adjacent storage assemblies is equal; and when the transport robot is unloading, the plurality of storage assemblies are capable of moving synchronously to perform a synchronous unloading action.

Optionally, the transport robot further includes: a chassis capable of moving on a ground; a lifting mechanism arranged on the vertical frame and capable of ascending or descending relative to the vertical frame along the vertical direction; and a carrying mechanism configured to carry goods, movably arranged on the vertical frame along the vertical direction, connected to the lifting mechanism, and capable of ascending or descending along the vertical direction under driving of the lifting mechanism, so as to deliver goods in the carrying mechanism to corresponding storage assemblies.

Optionally, the transport robot further includes a blocking mechanism capable of switching between a blocking position and an avoidance position, where when the blocking mechanism is at the blocking position, the blocking mechanism is configured to block goods in the plurality of storage assemblies from sliding out; and when the blocking mechanism is at the avoidance position, goods are capable of being moved into or moved out of the plurality of storage assemblies.

Optionally, the transport robot further includes: a lifting mechanism arranged on the vertical frame and capable of ascending or descending relative to the vertical frame along the vertical direction; and a carrying mechanism configured to carry goods, movably arranged on the vertical frame along the vertical direction, connected to the lifting mechanism, and capable of ascending or descending along the vertical direction under driving of the lifting mechanism, so as to deliver, at different heights, goods in the carrying mechanism to corresponding storage assemblies.

Optionally, the transport robot further includes:
a chassis movable on a ground; a lifting mechanism arranged on the vertical frame and capable of ascending or descending relative to the vertical frame along the vertical direction; a carrying mechanism configured to carry goods, movably arranged on the vertical frame along the vertical direction, connected to the lifting mechanism, and capable of ascending or descending along the vertical direction under driving of the lifting mechanism, so as to deliver goods in the carrying mechanism to corresponding storage assemblies; and a controller electrically connected to the chassis, the lifting mechanism, and the carrying mechanism and configured to control the chassis, the lifting mechanism, and the carrying mechanism to individually or jointly perform an action.

According to a second aspect, the present disclosure further provides a transport system, including an auxiliary apparatus and the transport robot according to the first aspect.

According to a third aspect, the present disclosure further provides a transport system, including a control center and the transport robot according to the first aspect.

According to a fourth aspect, the present disclosure further provides a transport system, including a loading or unloading apparatus and the transport robot according to the first aspect.

According to a fifth aspect, the present disclosure further provides a loading or unloading apparatus configured to convey goods to a transport robot or unload goods on the transport robot. The loading or unloading apparatus includes an upright frame, a plurality of goods loading or unloading assemblies and a second driving structure. The upright frame is extending along a vertical direction. The plurality of goods loading or unloading assemblies are arranged on the upright frame at intervals along the vertical direction and capable of separately conveying, at different heights, the goods to the transport robot or unloading the goods on the transport robot. The second driving structure is configured to drive the upright frame to approach or move away from the transport robot along a loading or unloading direction, wherein when the second driving structure drives the upright frame to approach or move away from the transport robot, the plurality of goods loading or unloading assemblies convey the goods to the transport robot or unload the goods on the transport robot.

Optionally, each of the plurality of goods loading or unloading assemblies includes a bracket, a loading or unloading structure, and a first driving structure. A plurality of brackets of the plurality of goods loading or unloading assemblies are arranged on the upright frame at intervals along the vertical direction. The first driving structure and the loading or unloading structure are respectively arranged on corresponding brackets, and the loading or unloading structure is in driving connection with the first driving structure and is configured to convey the goods to the transport robot or unload the goods on the transport robot.

Optionally, the loading or unloading structure includes a chain and a protrusion. The chain is rotatably arranged on the bracket along a loading or unloading direction, and the protrusion is fixedly arranged on the chain. The first driving structure includes a driving motor in driving connection with the chain; and the chain is capable of carrying goods, and when the chain rotates, the protrusion pushes a bottom portion of goods, so that the goods are pushed to the transport robot, or the protrusion pulls a bottom portion of goods, so that the goods are pulled from the transport robot to the chain.

Optionally, each of the plurality of goods loading or unloading assemblies includes a separate driving structure.

Optionally, the loading or unloading apparatus further includes a second driving structure configured to drive the upright frame to approach or move away from the transport robot along a loading or unloading direction, where when the second driving structure drives the upright frame to approach or move away from the transport robot, the plurality of goods loading or unloading assemblies convey the goods to the transport robot or unload the goods on the transport robot.

According to a sixth aspect, the present disclosure further provides a loading or unloading system, including a transport robot and the loading or unloading apparatus according to the fifth aspect, where the loading or unloading apparatus is configured to convey goods to the transport robot or unload goods on the transport robot.

According to a seventh aspect, the present disclosure further provides a loading or unloading method, applied to the loading or unloading apparatus according to the fifth aspect. The loading or unloading method includes: receiving a second loading or unloading instruction; and controlling, according to the second loading or unloading instruction, the second driving structure to drive the upright frame to approach or move away from the transport robot along a loading or unloading direction, and controlling the plurality of goods loading or unloading assemblies to convey the goods to the transport robot or unload the goods on the transport robot.

After adopting the foregoing technical solutions, the present disclosure has at least the following technical effects:

In the transport robot provided in the present disclosure, when unloading, a plurality of storage assemblies of a storage mechanism may move synchronously to perform a synchronous unloading action, so that the synchronous unloading of goods in the plurality of storage assemblies is implemented. The current problem of a low unloading efficiency caused by the layer-by-layer unloading of goods is effectively resolved, goods in the transport robot can be unloaded at one time, the unloading efficiency is improved, the unloading time is reduced, and the overall working efficiency of the transport robot is improved.

DETAILED DESCRIPTION

Embodiment 1

Figure 1:
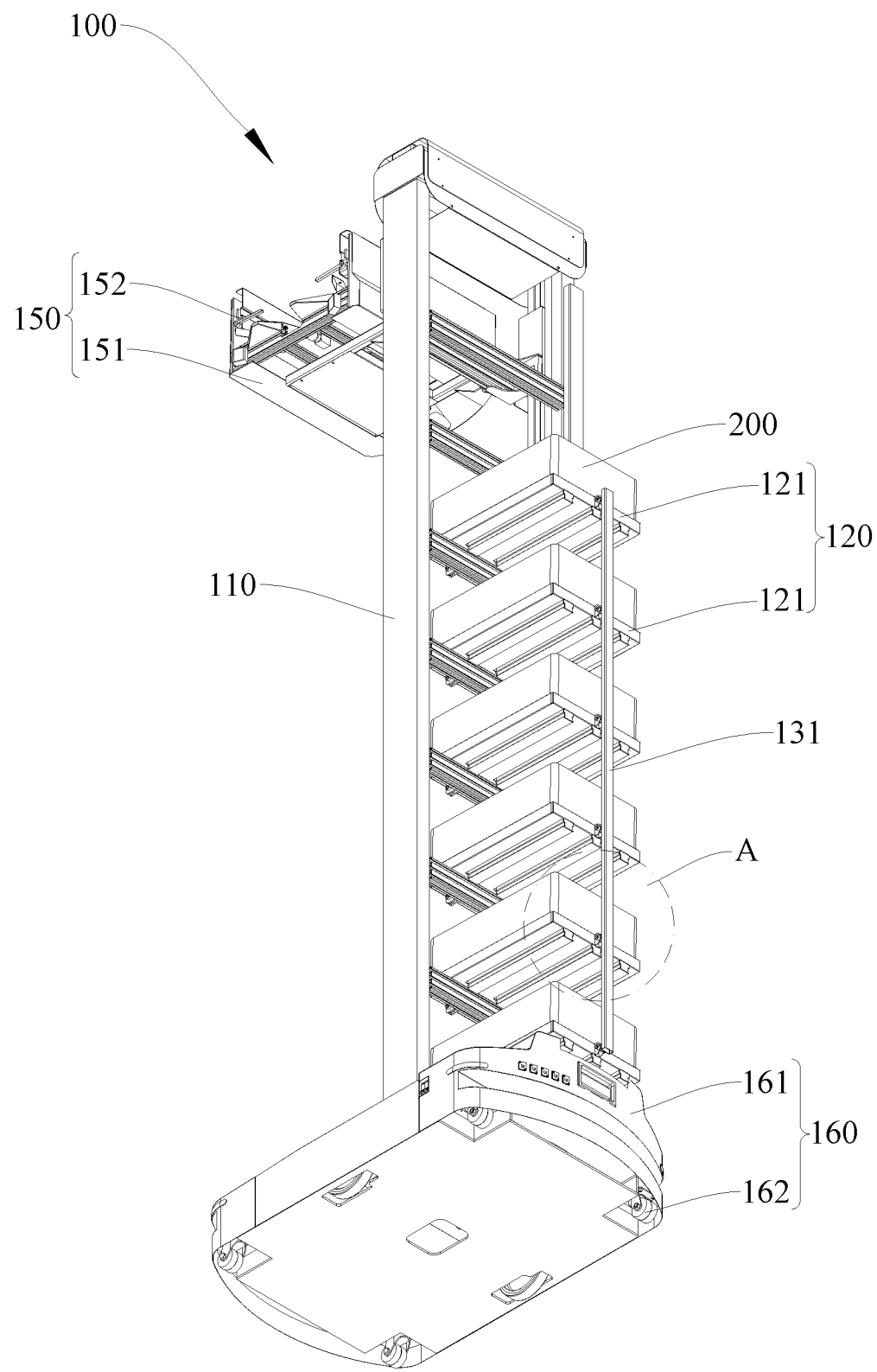
FIG. 1 is a three-dimensional view of a transport robot viewed from an angle according to an embodiment of the present disclosure.
Figure 3:
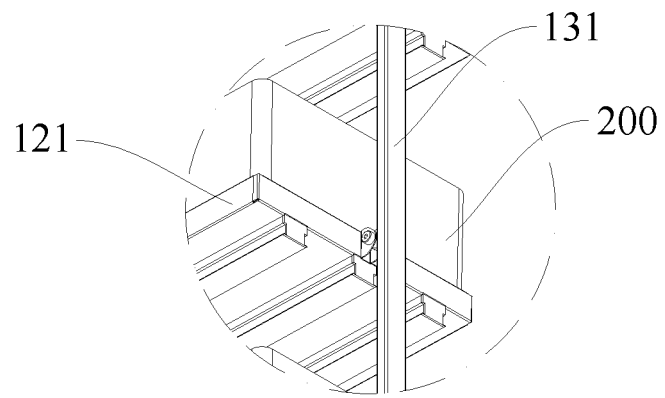
FIG. 3 is a schematic partial view of the transport robot shown in FIG. 1 at A.
Figure 6:
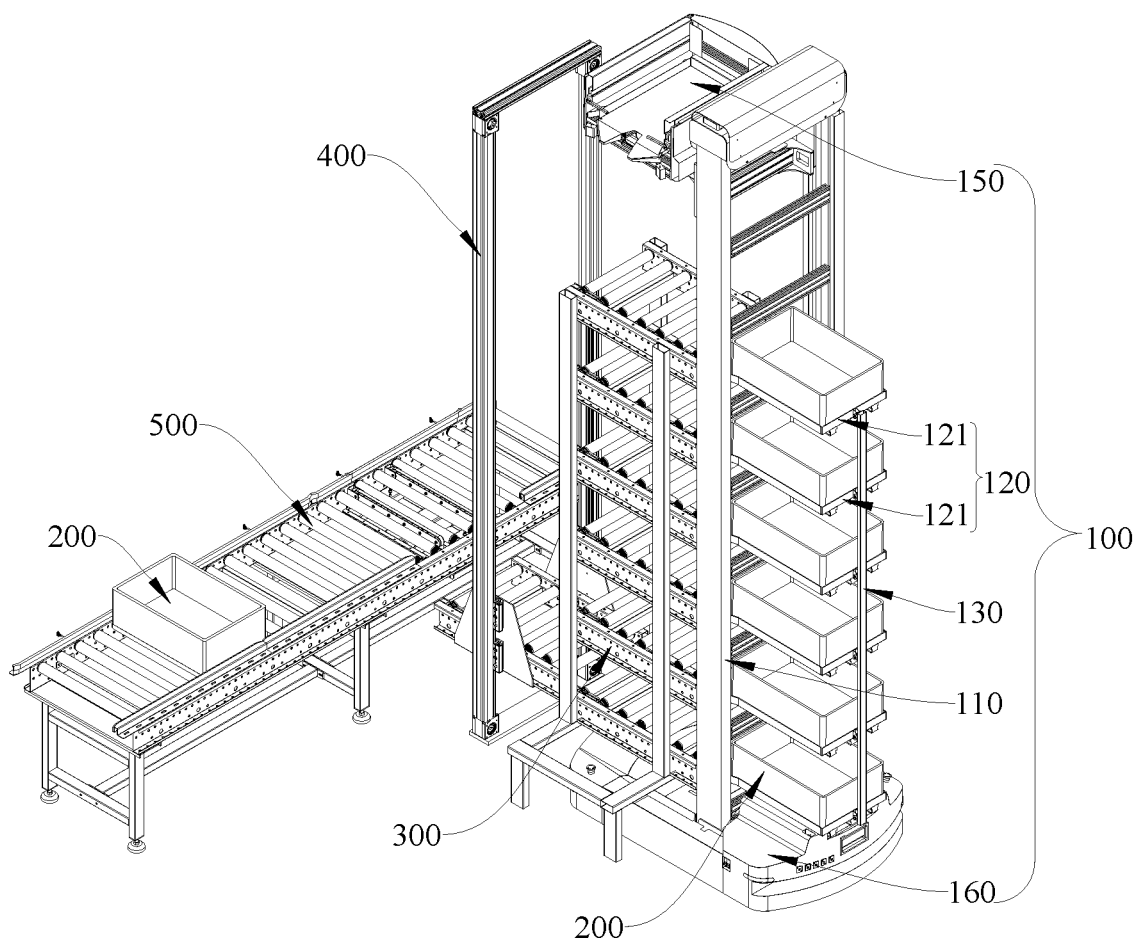
FIG. 6 is a three-dimensional view of a transport system of the transport robot shown in FIG. 1.

Referring to FIG. 1, FIG. 3, and FIG. 6, the present disclosure provides a transport robot 100. The transport robot 100 is applied to a transport system, and can transport goods 200. It can be understood that the goods 200 may be goods with a bracket, and the transport robot 100 transports the goods 200 through the bracket. Certainly, the goods may alternatively be goods placed in a container, and the transport robot 100 transports the goods 200 through the container. The goods 200 described below are goods placed in the container, and the container may be loaded with the goods 200, so as to implement the transport of the goods 200. The transport robot 100 transports the container to an unloading position, and after unloading the goods 200 in the container, the container may be transported back to the transport robot 100, so as to reuse the container and reduce the cost. Alternatively, reference sign 200 refers to a container with goods, and the transport robot 100 transports the container to the unloading position, and unloads the container with goods through an unloading apparatus.

The transport robot 100 plays an important role in intelligent warehousing, transports goods 200, ensures a transport speed of the goods 200, improves the transport efficiency of the goods 200, and reduces the consumption of labor resources. The transport robot 100 of the present disclosure can unload synchronously, so that goods 200 in the transport robot 100 can be unloaded at one time, thereby improving the unloading efficiency, reducing the unloading time, and improving the overall working efficiency of the transport robot 100.

Referring to FIG. 1 and FIG. 3, in an embodiment, the transport robot 100 includes a vertical frame 110 and a storage mechanism 120. The vertical frame 110 is arranged along a vertical direction. The storage mechanism 120 includes a plurality of storage assemblies 121 configured to store to-be-transported goods 200 and movably arranged on the vertical frame 110 at intervals along the vertical direction. An interval between two adjacent storage assemblies 121 is equal. When the transport robot 100 is unloading, the plurality of storage assemblies 121 are capable of moving synchronously to perform a synchronous unloading action.

The vertical frame 110 plays a bearing role, and various components of the transport robot 100 are mounted thereon. When the transport robot 100 transports the goods 200, the vertical frame 110 may drive synchronous movement of the components on the transport robot 100, so as to implement the transport of the goods 200. The storage mechanism 120 is located on the vertical frame 110, is configured to store the goods 200, and is capable of moving synchronously with the vertical frame 110, so as to implement the transport of the goods 200. The transport robot 100 moves to a loading position, and the to-be-transported goods 200 are transported to the storage mechanism 120 for storage. Then, the transport robot 100 moves from the loading position to an unloading position. Correspondingly, the storage mechanism 120 moves to the unloading position along with the vertical frame 110. At this time, the goods 200 in the storage mechanism 120 can be unloaded. The storage mechanism 120 can temporarily store the to-be-transported goods 200, thereby improving the capability of the transport robot 100 to carry the goods 200.

In addition, the storage mechanism 120 includes a plurality of storage assemblies 121 arranged on the vertical frame 110 at intervals, and an interval between two adjacent storage assemblies 121 is equal. Each of the plurality of storage assemblies 121 can carry goods 200 of a container to ensure a storage capacity of the transport robot 100. That is, the plurality of storage assemblies 121 are evenly distributed on the vertical frame 110 along the vertical direction. The to-be-transported goods 200 may be transported to the plurality of storage assemblies 121, and the transport robot 100 drives the goods 200 in the plurality of storage assemblies 121 to be transported to the unloading position.

To further improve the transport efficiency of the transport robot 100, the transport robot 100 of the present disclosure can implement synchronous unloading at the unloading position. Specifically, during unloading, the plurality of storage assemblies 121 may move synchronously, so that the goods 200 are moved out of the plurality of storage assemblies 121, and a synchronous unloading action is performed in real time. In this way, the goods 200 in the plurality of storage assemblies 121 can be unloaded synchronously, which shortens the unloading time and improves the unloading efficiency of the transport robot 100. After the unloading is completed, the transport robot 100 may return to the loading position to continue loading, which improves the working efficiency of the transport robot 100.

In this embodiment described above, when the transport robot 100 is unloading, a plurality of storage assemblies 121 of a storage mechanism 120 may move synchronously to perform a synchronous unloading action, so that the synchronous unloading of goods 200 in the plurality of storage assemblies 121 is implemented, the current problem of a low unloading efficiency caused by the layer-by-layer unloading of goods is effectively resolved, goods 200 in the transport robot 100 can be unloaded at one time, the unloading efficiency is improved, the unloading time is reduced, and the overall working efficiency of the transport robot 100 is improved.

In an embodiment, the transport robot 100 further includes a movable chassis 160 arranged at a bottom portion of the vertical frame 110. The movable chassis 160 can drive the transport robot 100 to move, which greatly improves the adaptability of the transport robot 100 to actual working conditions. Specifically, the chassis 160 includes a chassis frame 161, a travel drive assembly, and a plurality of rotating wheels 162. The vertical frame 110 is arranged on an upper portion of the chassis frame 161, the plurality of rotating wheels 162 are arranged on a bottom portion of the chassis frame 161, the travel drive assembly is arranged on the chassis frame 161, and at least one of the plurality of rotating wheels 162 is in driving connection with the travel drive assembly. Further, at least two of the plurality of rotating wheels 162 are separately in driving connection with the travel drive assembly, and the at least two of the plurality of rotating wheels 162 being separately in driving connection with the travel drive assembly are distributed on two sides of the chassis frame 161 along a traveling direction, thereby achieving a steering function of the chassis 160. The travel drive assembly includes at least two wheel drive motors, and the at least two of the plurality of rotating wheels 162 distributed on the two sides of the chassis frame 161 along the traveling direction are respectively driven by separate wheel drive motors. That the at least two of the plurality of rotating wheels 162 distributed on the two sides of the chassis frame 161 along the traveling direction are respectively driven by separate wheel drive motors can simplify a transmission structure on the chassis 160.

In an embodiment, each of the plurality of rotating wheels 162 includes a driving wheel and a driven wheel. The driving wheel and the driven wheel are mounted on a bottom portion of the chassis 160, may separately rotate relative to the chassis 160, and jointly support the chassis 160. The driving wheel is driven by a wheel drive motor to enable the chassis 160 to move. By configuring the movable chassis 160, the transport robot 100 can transport the goods 200 between the loading position and the unloading position. There are two driving wheels, and the two driving wheels are symmetrically distributed. Correspondingly, there are two wheel drive motors, and the two driving wheels are respectively driven by the two wheel drive motors, so that rotational speeds of the two driving wheels could be different, thereby implementing the steering of the chassis 160. There are four driven wheels, and the four driven wheels are distributed in a rectangular shape. The four driven wheels may be universal wheels or may be of other wheel structures with a steering function. According to actual situations, a quantity of the driven wheel is not limited to four, but may also be six, three, or the like.

In this embodiment, the chassis 160 is also mounted with a guiding apparatus, and the guiding apparatus may be a camera configured to identify a graphic code attached to a ground, so that the chassis 160 travels along a preset path. The graphic code may be a two-dimensional code, a barcode, or some customized identification codes. In some other embodiments, the guiding apparatus may be a laser guiding apparatus configured to guide the chassis 160 to travel along a laser beam, or the guiding apparatus may be a short-wave receiving apparatus configured to receive a preset short-wave signal to guide the chassis 160 to travel along a preset path. It should be noted that, in some other embodiments, the chassis 160 may be omitted, and the vertical frame 110 is directly and fixedly mounted on the ground or another platform, and is only configured to carry the goods 200 between the loading position and the unloading position around the vertical frame.

Referring to FIG. 1 to FIG. 4, in an embodiment, the transport robot 100 further includes at least one linkage mechanism 130, and each of the at least one linkage mechanism 130 is connected to at least two storage assemblies 121 and is configured to drive the at least two storage assemblies 121 to move synchronously relative to the vertical frame 110 to perform a synchronous unloading action. When the at least one linkage mechanism 130 moves, a synchronous movement of the at least two storage assemblies 121 may be implemented. It can be understood that one linkage mechanism 130 may be connected to all storage assemblies 121, and alternatively, among a plurality of linkage mechanisms 130, each of the plurality of linkage mechanisms 130 may be connected to a plurality of storage assemblies 121. Exemplarily, there are two linkage mechanisms 130, where one of the two linkage mechanisms 130 is connected to storage assemblies 121 of first to third layers, and the other one of the two linkage mechanisms 130 is connected to storage assemblies 121 of fourth to sixth layers. Certainly, in another implementation of the transport robot and the transport system having same, there may be more linkage mechanisms 130. The transport robot and the transport system having the same are only described by taking an example in which one linkage mechanism 130 is connected to all storage assemblies 121. A working principle of a plurality of linkage mechanisms 130 is substantially the same as that of the one linkage mechanism 130, and details are not described herein again.

The storage mechanism 120 may be rotatably mounted on the vertical frame 110, and may further be connected to the linkage mechanism 130. When moving, the linkage mechanism 130 drives the plurality of storage assemblies 121 to rotate relative to the vertical frame 110, so that the plurality of storage assemblies 121 can undergo a pitching motion. It can be understood that one end of the linkage mechanism 130 may be mounted on the vertical frame 110 or the chassis 160, as long as the linkage mechanism 130 can drive the plurality of storage assemblies 121 to undergo a pitching motion.

When the linkage mechanism 130 drives the plurality of storage assemblies 121 to move upward, one ends of the plurality of storage assemblies 121 are lifted up, and other ends rotate relative to the vertical frame 110, so as to stay at initial positions. At this time, the plurality of storage assemblies 121 are lifted up, and goods 200 thereon may slide out of the plurality of storage assemblies 121 under an action of gravity thereof, so as to implement the unloading of the goods 200. Because the linkage mechanism 130 simultaneously drives the plurality of storage assemblies 121 to move upward, the plurality of storage assemblies 121 can be simultaneously lifted up, thereby simultaneously performing an unloading operation to implement the unloading. After the unloading is completed, the linkage mechanism 130 drives the plurality of storage assemblies 121 to descend, and the plurality of storage assemblies 121 return to horizontal initial positions.

When the linkage mechanism 130 drives the plurality of storage assemblies 121 to move downward, and after external goods 200 are simultaneously conveyed to the plurality of storage assemblies 121, the goods 200 can slide into the plurality of storage assemblies 121 under the action of gravity to implement synchronous loading. It should be noted that the synchronous loading of the transport robot 100 needs to be implemented in cooperation with an auxiliary apparatus 300 of the transport system, a specific implementation process is described in detail in the following specification, and only the synchronous unloading of the transport robot 100 is described in detail in this embodiment.

After the transport robot 100 loads the goods 200 into the plurality of storage assemblies 121 at the loading position, the transport robot 100 moves from the loading position to the unloading position. At this time, the linkage mechanism 130 drives the plurality of storage assemblies 121 to move upward, so that the plurality of storage assemblies 121 are lifted up. In this way, the goods 200 in the plurality of storage assemblies 121 can slide out of the plurality of storage assemblies 121 under the action of gravity thereof, and be stored in a specified apparatus such as the auxiliary apparatus 300, so as to implement the synchronous unloading of the transport robot 100. After the unloading is completed, the transport robot 100 returns to the loading position to load goods, and in this way, a transport function of the transport robot 100 is achieved.

In an embodiment, the linkage mechanism 130 includes a linkage connector 131 simultaneously connected to at least two storage assemblies 121 and capable of synchronously driving the at least two storage assemblies 121 to synchronously undergo a pitching motion. It can be understood that the pitching motion herein may be a pitching rotational motion, or a curved motion, and certainly, may also be in other forms that can generate the pitching motion. One ends of the at least two storage assemblies 121 are rotatably connected to the vertical frame 110, and the at least two storage assemblies 121 are also connected to the linkage connector 131. The linkage connector 131 can ascend or descend. When ascending or descending, the linkage connector 131 may drive the at least two storage assemblies 121 to ascend or descend, so that the at least two storage assemblies 121 rotate relative to the vertical frame 110, that is, the at least two storage assemblies 121 undergo a pitching motion. It can be understood that, when one of the at least two storage assemblies 121 undergo a pitching motion, the linkage connector 131 is driven to ascend or descend, and the remaining storage assemblies 121 may be driven to move through the linkage connector 131; or the linkage connector 131 ascends or descends, and then the at least two storage assemblies 121 are driven to move.

Figure 2:
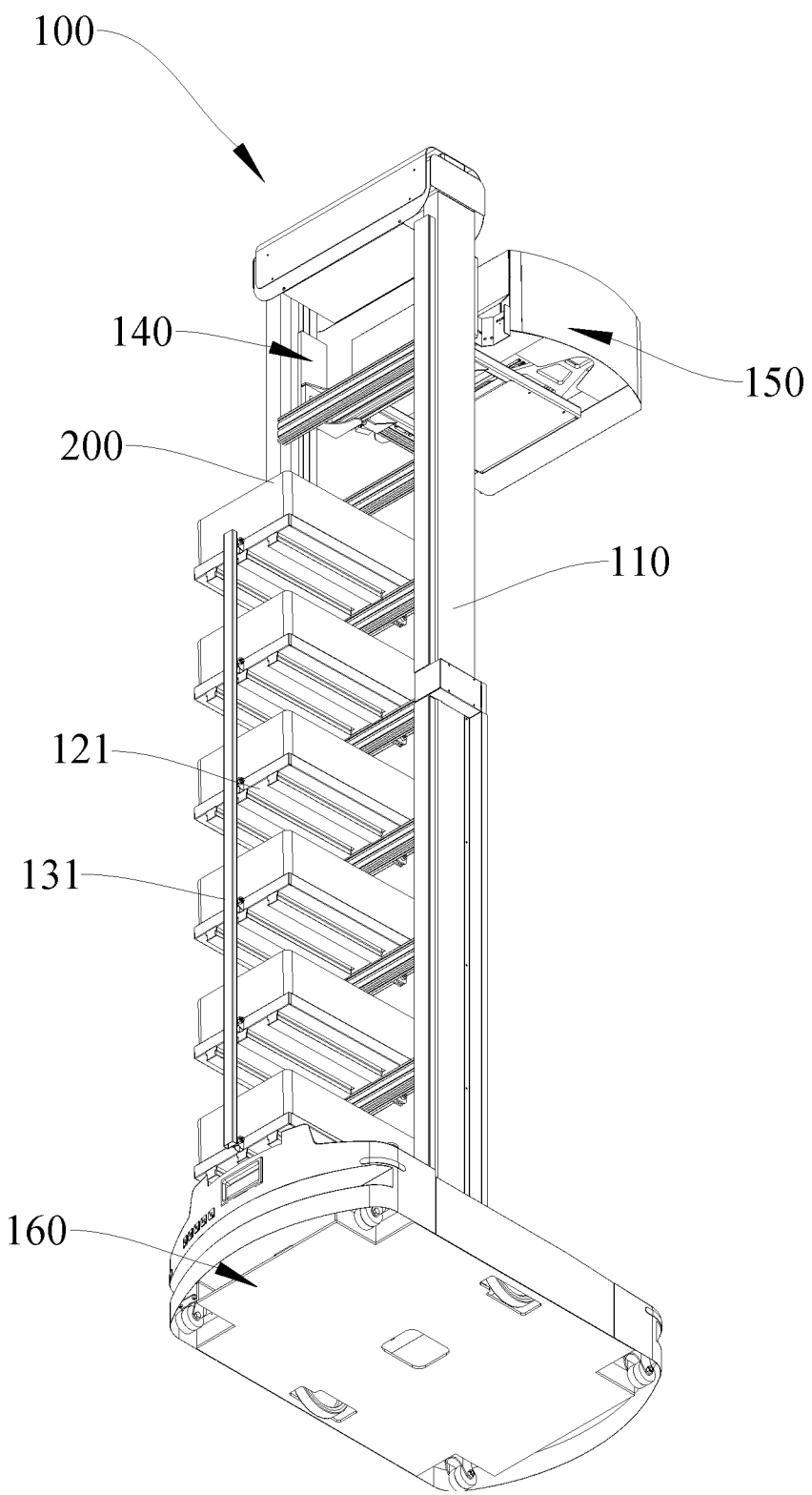
FIG. 2 is a three-dimensional view of the transport robot shown in FIG. 1 viewed from another angle.

As shown in FIG. 1 and FIG. 2, optionally, the linkage connector 131 and the at least two storage assemblies 121 may be rotatably connected or fixedly connected. When the linkage connector 131 and the at least two storage assemblies 121 are rotatably connected, the at least two storage assemblies 121 may have a rotary shaft, and the at least two storage assemblies 121 may be rotatably mounted on the linkage connector 131 through the rotary shaft. Alternatively, the linkage connector 131 may have a rotary shaft, and the linkage connector 131 may be rotatably mounted on the at least two storage assemblies 121 through the rotary shaft. Alternatively, a connection between the linkage connector 131 and the at least two storage assemblies 121 is similar to an olecranon engagement structure. In addition, the rotary shaft may be replaced with a hinge or another component that can implement a rotatable connection.

Optionally, the linkage connector 131 may be a connecting rod connected to the at least two storage assemblies 121. Further optionally, the linkage member may include a plurality of connecting rods, and two adjacent storage assemblies 121 are connected by one of the plurality of connecting rods. In this case, when one of the at least two storage assemblies 121 moves, adjacent connecting rods may drive the remaining storage assemblies 121 to move. It can be understood that a specific structure of the linkage connector 131 is not limited to the connecting rod, but may also be a connecting piece or the like.

It should be noted that, the essential spirit of the present disclosure lies in the linkage between the linkage connector 131 and the at least two storage assemblies 121, and the linkage connector 131 can implement the synchronous movement of the at least two storage assemblies 121, thereby performing a synchronous unloading operation. In this embodiment, the connection of connectors is implemented by connecting rods, and there may be one or more connecting rods. In addition, there are various arrangements of the linkage connector 131, which cannot all be listed herein, and a linkage manner in the present disclosure is not limited to being implemented by the foregoing specific structures.

Referring to FIG. 1 and FIG. 3, in an embodiment, in a same horizontal direction, a distance between the linkage connector 131 and the vertical frame 110 is less than or equal to a length of each of the plurality of storage assemblies 121. It can be understood that a length at a connection position between the linkage connector 131 and the plurality of storage assemblies 121 may be equal to the length of each of the plurality of storage assemblies 121. In this case, the linkage connector 131 and the vertical frame 110 are respectively located at two ends of the plurality of storage assemblies 121. The length at the connection position between the linkage connector 131 and the plurality of storage assemblies 121 may be less than the length of each of the plurality of storage assemblies 121, and the connection position between the linkage connector 131 and the plurality of storage assemblies 121 is located on side surfaces of the plurality of storage assemblies 121. That is, the linkage connector 131 may be located at any position on a peripheral side of each of the plurality of storage assemblies 121. In this way, the linkage connector 131 can drive the plurality of storage assemblies 121 to synchronously ascend or descend when the linkage connector 131 ascends or descends, so as to perform the synchronous unloading operation of the transport robot 100.

In an embodiment, there may be at least one linkage connector 131. In a case that there is one linkage connector 131, the cooperation between the linkage connector with the vertical frame 110 can ensure that the plurality of storage assemblies 121 are fixed and reliable, and simultaneously implement the driving of the movement of the plurality of storage assemblies 121. In a case that there are a plurality of linkage connectors 131, the plurality of linkage connectors 131 can further improve the linkage of the plurality of storage assemblies 121 and ensure that the plurality of storage assemblies 121 move in a consistent manner.

In a case that there is one linkage connector 131, the linkage connector 131 and the vertical frame 110 are respectively arranged at two ends of the plurality of storage assemblies 121. That is, the connection position between the linkage connector 131 and the plurality of storage assemblies 121 and the vertical frame 110 are respectively located at the two ends of the plurality of storage assemblies 121, and a distance between the connection position and the vertical frame 110 is equal to a size of each of the plurality of storage assemblies 121 along a horizontal direction. In this way, the plurality of storage assemblies 121 can be reliably supported by the linkage connector 131 and the vertical frame 110, to prevent the plurality of storage assemblies 121 from falling and dropping, so that the plurality of storage assemblies 121 can reliably store the goods 200.

In a case that there are a plurality of linkage connectors 131, the plurality of linkage connectors 131 are arranged at intervals along the peripheral side of the storage assembly 121. The plurality of linkage connectors 131 are distributed at intervals along the peripheral side of each of the plurality of storage assemblies 121, and may be distributed uniformly, non-uniformly, or symmetrically. The plurality of storage assemblies 121 can be reliably supported by the plurality of linkage connectors 131 and the vertical frame 110, to prevent the plurality of storage assemblies 121 from falling and dropping, so that the plurality of storage assemblies 121 can reliably store the goods 200.

Figure 4:
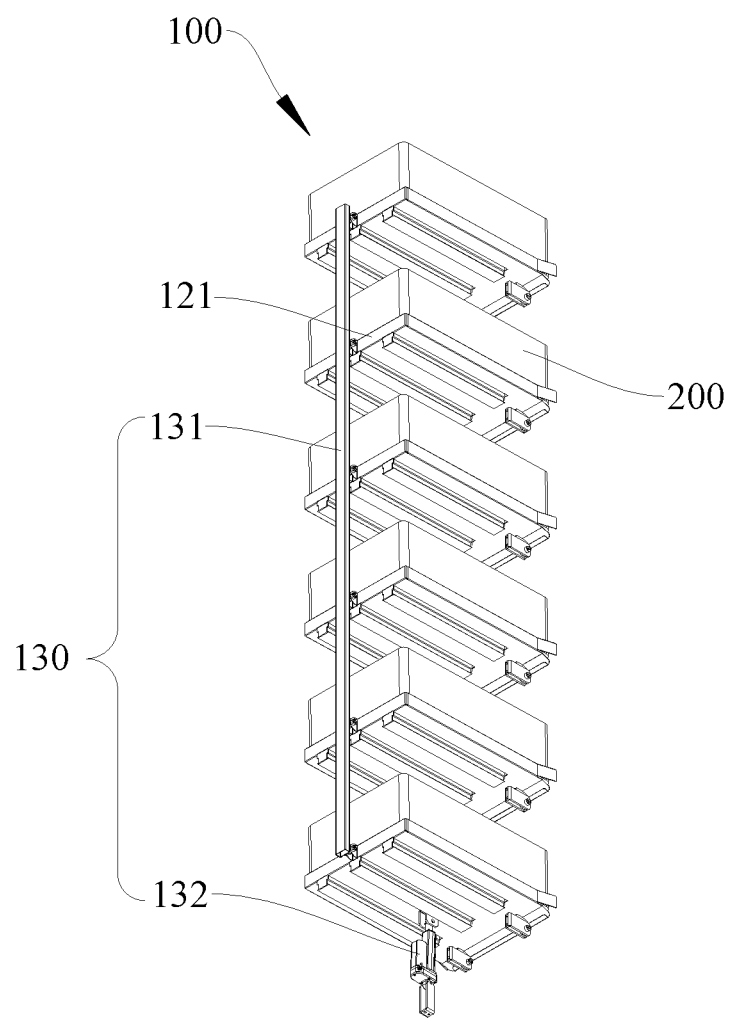
FIG. 4 is a three-dimensional view of the transport robot shown in FIG. 1 with a base, a vertical frame, and a lifting mechanism removed.

Referring to FIG. 1, FIG. 3, and FIG. 4, in an embodiment, the linkage mechanism 130 further includes a linkage driving member 132 configured to cooperate with the linkage connector 131, so as to drive the plurality of storage assemblies 121 to implement synchronous unloading. The linkage driving member 132 is a power source for the movement of the linkage mechanism 130, and implements the driving of the movement of a linkage moving member. In addition, the linkage driving member 132 outputs linear motion, so that the linkage connector 131 can ascend or descend, and the plurality of storage assemblies 121 can undergo a pitching motion. Optionally, the linkage driving member 132 includes, but is not limited to, an air cylinder, a hydraulic cylinder, a linear motor, or an electric push rod, and may also be another linear driving unit capable of outputting the linear motion. Exemplarily, the linkage driving member 132 is a linear motor. Exemplarily, one end of the linkage driving member 132 is arranged on the chassis 160. Certainly, one end of the linkage driving member 132 may also be arranged on the vertical frame 110.

Optionally, the linkage driving member 132 may be connected to the plurality of storage assemblies 121. In an embodiment, an output end of the linkage driving member 132 is connected to one of the plurality of storage assemblies 121. One end of the linkage driving member 132 is mounted on the vertical frame 110, and an other end is connected to the plurality of storage assemblies 121. After outputting the linear motion, the linkage driving member 132 may drive the plurality of storage assemblies 121 connected thereto to move, and then the plurality of storage assemblies 121 may drive the linkage connector 131 to ascend or descend. At this time, the linkage connector 131 may drive the remaining storage assemblies 121 to move synchronously, so that the plurality of storage assemblies 121 rotate relative to the vertical frame 110, the plurality of storage assemblies 121 are lifted up, and the synchronous unloading operation of the plurality of storage assemblies 121 is performed.

Further, the output end of the linkage driving member 132 is connected to a bottom portion or a top portion of one of the plurality of storage assemblies 121. In a case that the linkage driving member 132 is connected to the top portion of the plurality of storage assemblies 121, the linkage driving member 132 may retract to drive the plurality of storage assemblies 121 to move upward, and the linkage driving member 132 may extend to drive the plurality of storage assemblies 121 to move downward. In a case that the linkage driving member 132 is connected to the bottom portion of the plurality of storage assemblies 121, the linkage driving member 132 may extend to drive the plurality of storage assemblies 121 to move upward, and the linkage driving member 132 may retract to drive the plurality of storage assemblies 121 to move downward. Exemplarily, the linkage driving member 132 is connected to the bottom portion of the plurality of storage assemblies 121. Still further, the linkage driving member 132 is located and connected to a bottom portion of a lowermost storage assembly 121, and the output end of the linkage driving member 132 is in abutment with a middle region of the bottom portion of the storage assembly 121. In this way, the linkage driving member 132 does not affect the loading or unloading of goods 200 of a carrying component, so as to avoid interference.

Further optionally, the output end of the linkage driving member 132 is connected to the linkage connector 131. The linkage driving member 132 may directly drive the linkage connector 131 to ascend or descend, and then the linkage connector 131 may drive the plurality of storage assemblies 121 to move synchronously. Further, the linkage driving member 132 may be located at the bottom portion of the lowermost storage assembly 121 and arranged on the chassis 160, and the output end of the linkage driving member 132 is connected to the linkage connector 131. Certainly, the linkage driving member 132 may also be located at the top portion of the plurality of storage assemblies 121.

The linkage mechanism 130 in this embodiment can implement the simultaneous unloading of a plurality of storage assemblies 121, the plurality of storage assemblies 121 are connected by a same linkage connector 131, and an output end of a linkage driving member 132 is connected to a lowermost storage assembly 121. When the linkage driving member 132 extends, the linkage driving member 132 may push the plurality of storage assemblies 121 upward, so that the plurality of storage assemblies 121 rotate relative to the vertical frame 110. When rotating, the plurality of storage assemblies 121 may drive the linkage connector 131 to move synchronously, and then the linkage connector 131 drives the remaining storage assemblies 121 to move synchronously, so as to implement the synchronous driving of all storage assemblies 121 to move upward, thereby performing the synchronous unloading operation.

It is worth noting that there are various rotational driving forms in which the plurality of storage assemblies 121 rotate relative to the vertical frame 110 to undergo a pitching motion. In this embodiment, only the linkage driving member 132 capable of outputting the linear motion is configured to drive the movement of the plurality of storage assemblies 121, and other driving components that can implement the pitching motion of the plurality of storage assemblies 121 should be considered as falling within the protection scope of the present disclosure.

Figure 5:
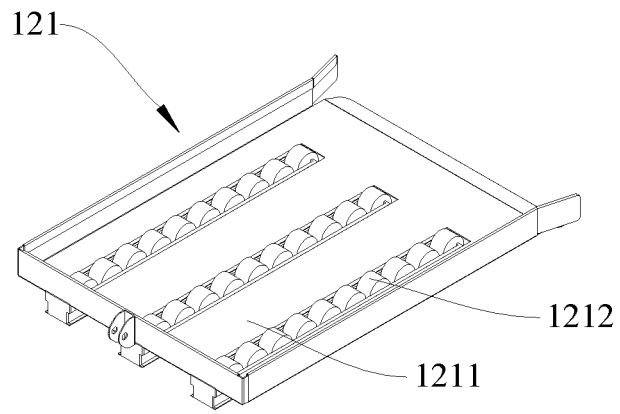
FIG. 5 is a three-dimensional view of a storage assembly shown in FIG. 2.

Referring to FIG. 1, FIG. 3, and FIG. 5, in an embodiment, each of the plurality of storage assemblies 121 includes a carrier body 1211 configured to carry the goods 200 and rotatably connected to the linkage connector 131 and the vertical frame 110 separately. The carrier body 1211 is a main body configured to carry the goods 200, one end of the carrier body 1211 is rotatably connected to the vertical frame 110, and an other end is rotatably connected to the linkage connector 131. The end of the carrier body 1211 connected to the vertical frame 110 is a head end, and the end of the carrier body 1211 connected to the linkage connector 131 is a tail end. When the linkage connector 131 drives the carrier body 1211 to ascend or descend, the tail end of the carrier body 1211 rotates around the head end of the carrier body 1211, so that the carrier body 1211 undergoes a pitching motion. Optionally, an edge of the carrier body 1211 is rotatably connected to the linkage connector 131 and the vertical frame 110 separately, and certainly, a middle region of the carrier body 1211 may also be rotatably connected to the linkage connector 131 and the vertical frame 110 separately.

It can be understood that the rotatable connection between the carrier body 1211 and the vertical frame 110 may be that the carrier body 1211 has a rotary shaft, and the carrier body 1211 is also rotatably mounted on the vertical frame 110 through the rotary shaft, or the vertical frame 110 has a rotary shaft, and the carrier body 1211 may be rotatably mounted on the rotary shaft, or the like. In addition, the foregoing manner of the rotatable connection which is implemented through the rotary shaft may also be replaced by a hinged connection or other forms of rotatable connection.

Optionally, the carrier body 1211 is arranged in a flat plate shape, and a container of the goods 200 may be transferred to the carrier body 1211. Further, the edge of the carrier body 1211 has three sides of flanges, and the three sides of flanges form a loading or unloading port at the vertical frame 110, and the goods 200 are mounted in the carrier body 1211 through the loading or unloading port. In addition, the flanges can limit the displacement of the goods 200 on the carrier body 1211, prevent the goods 200 from falling out of the carrier body 1211, and ensure that the carrier body 1211 can store the goods 200 accurately.

In an embodiment, each of the plurality of storage assemblies 121 further includes a rolling member 1212 arranged on the carrier body 1211 in a rolling manner and configured to be in a rolling contact with the goods 200 in the carrier body 1211. The rolling member 1212 can reduce a frictional force between the goods 200 and the carrier body 1211, so as to facilitate the loading or unloading of the goods 200. When the goods 200 are loaded, a bottom portion of the goods 200 is in contact with the rolling member 1212 under the action of gravity thereof. During the movement of the goods 200 into the carrier body 1211, the goods 200 may drive rollers to rotate, so that the frictional force between the goods 200 and the carrier body 1211 is reduced, and the loading of the goods 200 is facilitated. When the goods 200 are unloaded, the linkage connector 131 drives the carrier body 1211 to move upward. At this time, the tail end of the carrier body 1211 is higher than a top end of the carrier body 1211, and the goods 200 in the carrier body 1211 slide out of the carrier body 1211 under the action of gravity. In addition, during a sliding process of the goods 200 along the carrier body 1211, the bottom portion of the goods 200 drives the rolling member 1212 to roll, so that the goods 200 slide out of the carrier body 1211 more easily, and the unloading of the goods 200 is facilitated.

Optionally, the carrier body 1211 is provided with a rolling groove, the rolling member 1212 may be rotatably mounted in the rolling groove, and a top surface of the rolling member 1212 is slightly higher than a top surface of the carrier body 1211, so as to ensure that the rolling member 1212 can be in contact with the bottom portion of the goods 200. In addition, the bottom portion of the carrier body 1211 also includes a protection cover covering the rolling member 1212 on the bottom portion of the carrier body 1211, so as to avoid interference between a bottom portion of the rolling member 1212 and other components.

Optionally, the rolling member 1212 includes, but is not limited to, rollers, rolling shafts, rolling balls, or other components capable of rolling. In addition, there are a plurality of rolling members 1212, and the plurality of rolling members 1212 may be arranged in one row, or may be arranged in a plurality of rows. Exemplarily, the rolling member 1212 is rollers arranged in three rows.

Referring to FIG. 1 and FIG. 3, in an embodiment, the transport robot 100 further includes a lifting mechanism 140 capable of ascending or descending relative to the vertical frame 110 along the vertical direction and a carrying mechanism 150 configured to carry the goods 200, where the carrying mechanism 150 is movably arranged on the vertical frame 110 along the vertical direction, is connected to the lifting mechanism 140, and is capable of ascending or descending along the vertical direction under driving of the lifting mechanism 140, so as to deliver goods 200 in the carrying mechanism 150 to a corresponding storage mechanism 120.

The carrying mechanism 150 is a terminal configured to perform an action of the transport robot 100. At the loading position, the carrying mechanism 150 may carry the to-be-transported goods 200, and transport the goods 200 into the carrier body 1211. Certainly, in some occasions, in a case that the goods 200 in the plurality of storage assemblies 121 need to be unloaded separately, the carrying mechanism 150 may also take out the goods 200 in the carrier body 1211. Optionally, the carrying mechanism 150 includes, but is not limited to, a mechanical arm, an actionable tow bar, or a plane with a conveying function, and the like. The lifting mechanism 140 is configured to implement the ascending or descending movement of the carrying mechanism 150, and is capable of driving the carrying mechanism 150 to ascend or descend along the vertical direction.

At the loading position, there is a shelving unit with a plurality of layers configured to carry the goods 200. When the transport robot 100 loads goods at the loading position, the lifting mechanism 140 drives the carrying mechanism 150 to ascend or descend, so that the carrying mechanism 150 can pick goods on the shelving unit. Then, a lifting assembly drives the carrying mechanism 150 to ascend or descend, so as to transfer the goods 200 in the carrying mechanism 150 to the plurality of storage assemblies 121. This process is repeated until the plurality of storage assemblies 121 store the goods 200. After the loading is completed, the transport robot 100 moves from the loading position to the unloading position, and the linkage mechanism 130 enables the plurality of storage assemblies 121 to perform a synchronous unloading operation, so as to complete one-time unloading. After the unloading is completed, the transport robot 100 returns to the loading position, so that continuous transport of the goods 200 can be implemented by repeating the process, thereby improving the transport efficiency.

The function of the lifting mechanism 140 is to drive the carrying mechanism 150 to ascend or descend along the vertical direction. In an embodiment, the lifting mechanism 140 includes a lifting power source and a lifting transmission component, and the lifting power source and the lifting transmission component are separately arranged on the vertical frame 110. The lifting transmission component is in driving connection with the lifting power source and the carrying mechanism 150. Specifically, an output end of the lifting power source is in driving connection with an input end of the lifting transmission component, and an output end of the lifting transmission component is in driving connection with the carrying mechanism 150. That the lifting power source and the lifting transmission component are separately arranged on the vertical frame 110, and the driving connection between the lifting power source and the lifting transmission component facilitate the disassembly or assembly of the lifting mechanism 140 on the vertical frame 110. Optionally, a power output from the lifting power source is in a form of rotation and linear motion, or in any other form of motion, and a final output of the lifting transmission component in driving connection with the lifting power source is movement along the vertical direction. Optionally, the lifting power source includes a driving motor in driving connection with the input end of the lifting transmission component. The lifting power source in a form of a motor runs more stably. Further, the driving motor can rotate forwardly or reversely, which facilitates the control of an ascending or descending process of the lifting mechanism 140.

Optionally, the lifting transmission component may be of a telescopic rod structure, a chain transmission structure, a driving transmission structure, or the like, and may also be of another structure capable of enabling the carrying mechanism 150 to ascend or descend. Exemplarily, the lifting transmission component is of a chain transmission structure, including a sprocket and a chain, the chain is connected to the carrying mechanism 150, and the chain is arranged on the vertical frame 110 along the vertical direction. When the output end of the lifting power source drives the sprocket to rotate, the chain ascends or descends along the vertical frame 110, which may further drive the carrying mechanism 150 to ascend or descend.

It should be noted that, the essence of the lifting transmission component is to output the ascending or descending motion to drive the carrying mechanism 150 to ascend or descend, thereby implementing the loading of the goods 200. In this embodiment, the lifting transmission component is implemented by a chain transmission structure. In addition, there are various structures that can implement ascending or descending, which cannot all be listed herein, and the manner of the ascending or descending motion in the present disclosure is not limited to being implemented by the foregoing specific structures.

In an embodiment, the transport robot 100 further includes a rotary mechanism arranged between the carrying mechanism 150 and the lifting mechanism 140 and configured to drive the carrying mechanism 150 to rotate relative to the lifting mechanism 140, so that the carrying mechanism 150 is aligned with a corresponding storage mechanism 120. The rotary mechanism is rotatably connected to the carrying mechanism 150, and the carrying mechanism 150 is rotatable relative to the rotary mechanism. When the carrying mechanism 150 is rotated by the rotary mechanism, a direction of the carrying mechanism 150 may be adjusted, so that the loading or unloading port of the carrying mechanism 150 can be adjusted. The carrying mechanism 150 implements the loading or unloading of the goods 200 through the loading or unloading port. When the transport robot 100 is at the loading position, the rotary mechanism may drive the carrying mechanism 150 to rotate, so that the loading or unloading port of the carrying mechanism 150 faces a shelving unit, and the goods 200 can be loaded into the carrying mechanism 150. When the carrying mechanism 150 transfers the goods 200 to the plurality of storage assemblies 121, the rotary mechanism may drive the carrying mechanism 150 to rotate, so that the loading or unloading port of the carrying mechanism 150 faces the plurality of storage assemblies 121. At this time, the goods 200 in the carrying mechanism 150 can be transferred to the plurality of storage assemblies 121.

Optionally, the rotary mechanism includes a carrying bracket, an autorotation gear arranged on the carrying bracket, and an autorotation motor fixedly mounted on the carrying bracket. An output end of the autorotation motor is connected to the autorotation gear, the carrying mechanism 150 is mounted on the autorotation gear, and the carrying bracket is mounted on the lifting mechanism 140. The autorotation motor may drive the autorotation gear to rotate, which may further drive the carrying mechanism 150 to rotate.

It should be noted that, the essence of the rotary mechanism is to output a rotation motion, so as to drive the carrying mechanism 150 to rotate, thereby implementing the loading or unloading of the goods 200. In this embodiment, the rotary mechanism is implemented by an autorotation motor and an autorotation gear. In addition, there are various structures that can implement rotation, which cannot all be listed herein, and the manner of the rotation motion in the present disclosure is not limited to being implemented by the foregoing specific structures.

Referring to FIG. 1 and FIG. 3, in an embodiment, the carrying mechanism 150 includes a transition member 151 and a pick-or-place member 152 that is telescopically arranged on the transition member 151, and the pick-or-place member 152 is capable of taking out goods 200 and storing the goods in the transition member 151, and is further capable of pushing out goods 200 in the transition member 151. The pick-or-place member 152 is telescopically arranged in the transition member 151. At the loading position, the pick-or-place member 152 extends out of the transition member 151 to take out goods 200 on a shelving unit, and then the pick-or-place member 152 retracts into the transition member 151 to temporarily store the goods 200 in the transition member 151. Subsequently, the lifting mechanism 140 and the rotary mechanism drive the carrying mechanism 150 to move, so that the carrying mechanism 150 moves to a plurality of storage assemblies 121 in which the goods are to be placed. At this time, the pick-or-place member 152 extends out of the transition member 151, moves the goods 200 out of the transition member 151, and transfers the goods to the plurality of storage assemblies 121. After the transfer, the pick-or-place member 152 retracts into the transition member 151. Optionally, the transition member 151 includes, but is not limited to, a transition box, and the pick-or-place member 152 includes, but is not limited to, a structure in which a telescopic motor cooperates with a telescopic rod, a mechanical arm mechanism, and the like.

In an embodiment, the transport robot 100 further includes a controller electrically connected to the chassis 160, the carrying mechanism 150, the lifting mechanism 140, and the rotary mechanism separately, so as to control the synchronous movement of components or control the movement of at least one component, to achieve a function of automatic goods carrying.

Referring to FIG. 1, FIG. 3, FIG. 6, and FIG. 7, the present disclosure further provides a transport system including an auxiliary apparatus 300 and the transport robot 100 in the foregoing embodiments. The auxiliary apparatus 300 includes a support frame 310 and a plurality of transport mechanisms 320 arranged on the support frame 310 at intervals along a vertical direction, and a manner in which the plurality of transport mechanisms 320 are arranged at intervals is the same as a manner in which a plurality of storage assemblies 121 are arranged at intervals. When the transport robot 100 moves to the auxiliary apparatus 300, goods 200 on the plurality of storage assemblies 121 are capable of being simultaneously transferred to corresponding transport mechanisms 320 to implement synchronous unloading; or goods 200 on the plurality of transport mechanisms 320 are capable of being simultaneously transferred to corresponding storage assemblies 121 to implement synchronous loading.

The auxiliary apparatus 300 can implement the synchronous unloading or synchronous loading of the goods 200. The auxiliary apparatus 300 is arranged at an unloading position or a loading position. In a case that the auxiliary apparatus 300 is unloaded, the auxiliary apparatus 300 is at the unloading position; and in a case that the auxiliary apparatus 300 is loaded, the auxiliary apparatus 300 is at the loading position. In the present disclosure, only an example in which the auxiliary apparatus 300 is at the unloading position is used for description. The auxiliary apparatus 300 is located at the unloading position. After the transport robot 100 completes loading at the loading position, the transport robot 100 moves to the unloading position. At this time, the transport robot 100 is docked with the auxiliary apparatus 300, and the auxiliary apparatus 300 may receive and pick the goods 200 in the plurality of storage assemblies 121 in the transport robot 100.

Specifically, the mounting frame 321 functions as a support, which is configured to support a plurality of transport mechanisms 320 configured to transport the goods 200. The auxiliary apparatus 300 includes a same quantity of transport mechanisms 320 as the plurality of storage assemblies 121, and heights at which the plurality of transport mechanisms 320 are located are consistent with heights at which corresponding storage assemblies 121 are located. After the transport robot 100 is docked with the auxiliary apparatus 300, the plurality of storage assemblies 121 and the plurality of transport mechanisms 320 are at same levels and heights. When unloading, the linkage driving member 132 of the linkage mechanism 130 extends to drive one end of a lowermost storage assembly 121 to be lifted up. During a lifting process of the storage assembly 121, the linkage connector 131 may be driven to ascend, and the linkage connector 131 may drive the remaining storage assemblies 121 to be lifted up during the lifting process. In this way, the plurality of storage assemblies 121 can be simultaneously lifted up, the goods 200 in the plurality of storage assemblies 121 slide out of the plurality of storage assemblies 121 under the action of gravity and the action of the rolling member 1212, and move to corresponding transport mechanisms 320, and the transport mechanisms 320 transport the goods 200 thereon away to implement the unloading of the goods 200.

The auxiliary apparatus 300 may also implement the loading of the goods 200. Specifically, transport mechanisms 320 of different layers drive the goods 200 to move toward corresponding storage assemblies 121, and transfer the goods 200 to the corresponding storage assemblies 121. It can be understood that when loading the goods 200, the linkage mechanism 130 may drive ends of the plurality of storage assemblies 121 to descend, and at the same time, the plurality of transport mechanisms 320 simultaneously transfer the goods 200 to the corresponding storage assemblies 121. After the goods 200 are gradually transferred into the carrier body 1211 and come into contact with the rolling member 1212, the goods 200 may slide into the plurality of storage assemblies 121 under the action of gravity thereof and through the cooperation with the rolling member 1212. Certainly, the plurality of storage assemblies 121 may also be stationary, and the goods 200 may also be moved into the plurality of storage assemblies 121 by a pushing force of the plurality of transport mechanisms 320 in cooperation with the rolling member 1212.

Figure 7:
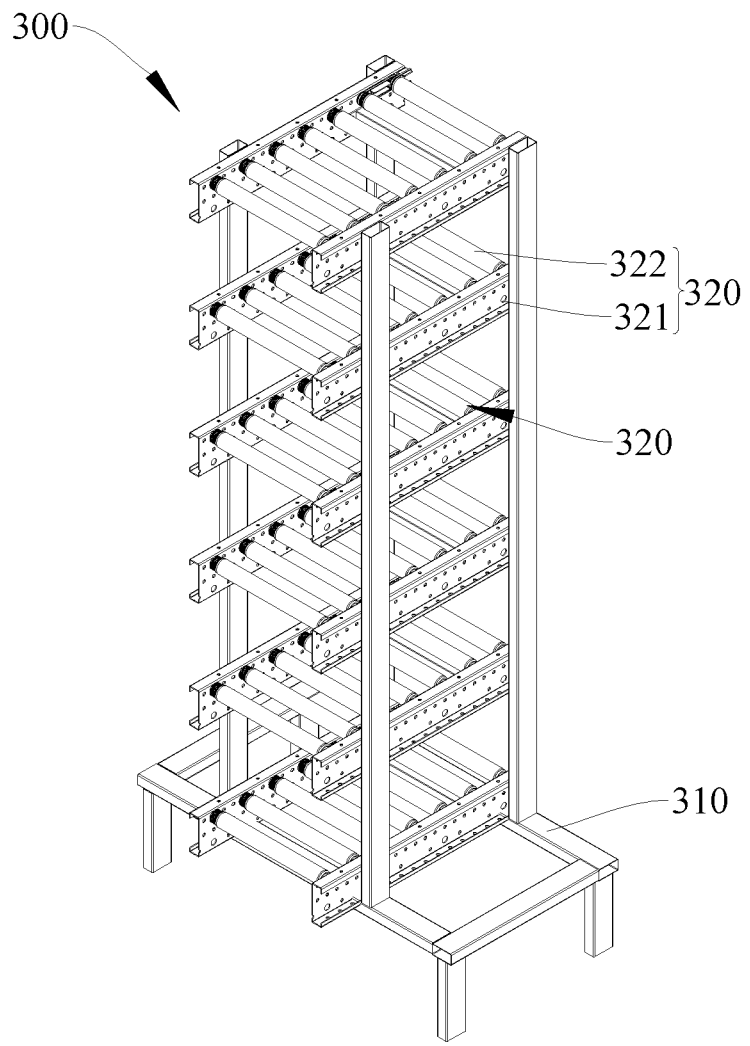
FIG. 7 is a three-dimensional view of an auxiliary apparatus in the transport system shown in FIG. 6.

Referring to FIG. 6 and FIG. 7, in an embodiment, each of the plurality of transport mechanisms 320 includes a mounting frame 321 arranged on the support frame 310 and a transport portion 322 movably arranged on the mounting frame 321, and the transport portion 322 may drive the goods 200 to move. The mounting frame 321 is of a frame structure, which carries the transport portion 322 and is configured to implement the mounting of the transport portion 322. The transport portion 322 is a main component that implements the transport of the goods 200. When the goods 200 are in the transport portion 322, the transport portion 322 may drive the goods 200 to move toward or away from the plurality of storage assemblies 121.

Optionally, the transport portion 322 is of a structure that can implement horizontal transport, such as a conveyor belt structure, an assembly line, a conveyor roller structure, a roller structure, or the like. Exemplarily, the transport portion 322 is of a roller structure, and specifically includes a plurality of rollers, and each of the plurality of rollers includes a built-in rolling motor to drive the each of the plurality of rollers to rotate, thereby implementing the transport of the goods 200. It should be noted that, there are various structures that can implement the horizontal transport of the goods 200, which cannot all be listed herein, and the transport portion 322 in the present disclosure is not limited to being implemented by the foregoing specific structures.

In an embodiment, the auxiliary apparatus 300 further includes a movable base arranged at a bottom portion of the support frame 310. The movable base can drive the auxiliary apparatus 300 to move, which greatly improves the adaptation of the auxiliary apparatus 300 to actual working conditions. In this way, the auxiliary apparatus 300 can easily move to the loading position, the unloading position, or any other position, to work with the transport robot 100. Optionally, a structure of the base is exactly the same as that of the chassis 160 of the transport robot 100, and details are not described herein again.

Figure 8:
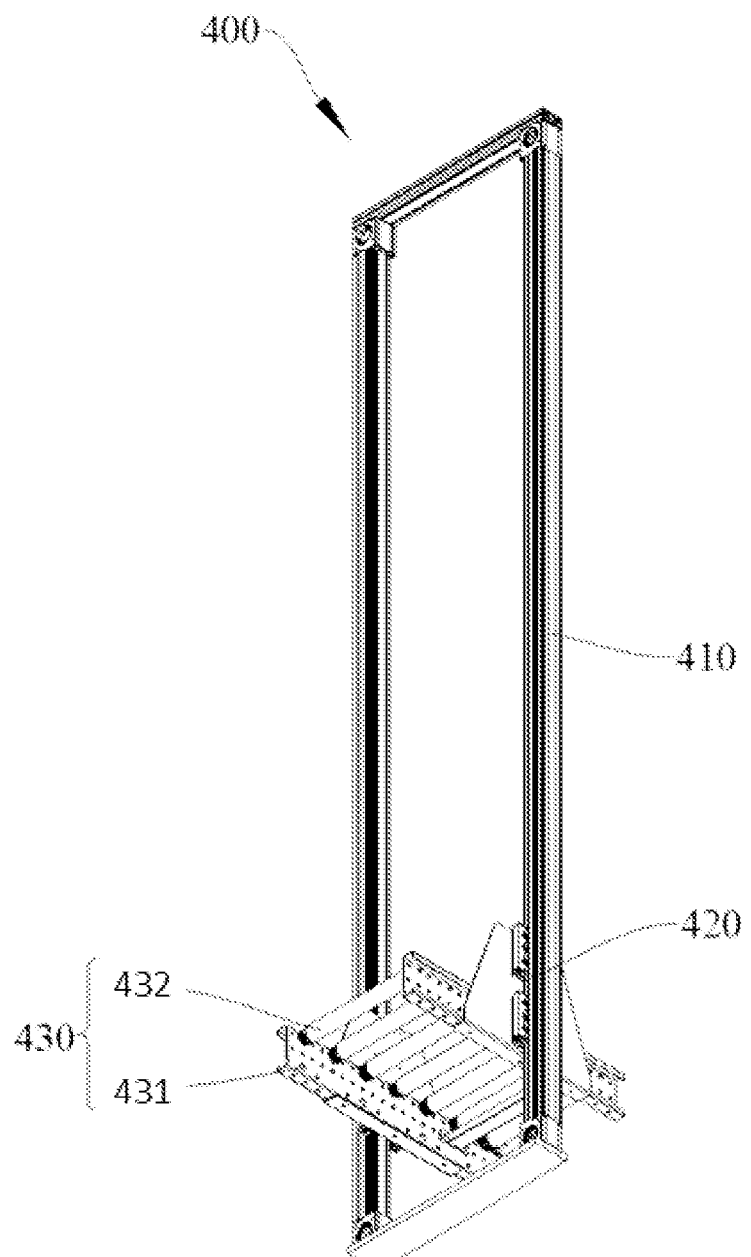
FIG. 8 is a three-dimensional view of a lifting apparatus in the transport system shown in FIG. 6.

Referring to FIG. 1, FIG. 6, and FIG. 8, in an embodiment, the transport system further includes a conveying apparatus 500 and a lifting apparatus 400 that is arranged between the auxiliary apparatus 300 and the conveying apparatus 500, and the lifting apparatus 400 is configured to ascend or descend along the vertical direction, so as to be docked with each of the plurality of transport mechanisms 320 and the conveying apparatus 500. The lifting apparatus 400 is capable of receiving and picking goods 200 of the plurality of transport mechanisms 320 and transferring the goods to the conveying apparatus 500; or the lifting apparatus 400 is capable of receiving and picking goods 200 of the conveying apparatus 500 and transferring the goods to the plurality of transport mechanisms 320.

The lifting apparatus 400 is configured to receive and pick the goods 200 of the plurality of transport mechanisms 320 or transport the goods 200 to the plurality of transport mechanisms 320. Because the plurality of transport mechanisms 320 are arranged at intervals along the vertical direction, to facilitate the goods loading or unloading of the auxiliary apparatus 300, the lifting apparatus 400 needs to move to a transport mechanism 320 at a corresponding position, so as to perform a corresponding operation. The conveying apparatus 500 is configured to convey the goods 200, may transport away goods 200 unloaded by the lifting apparatus 400, and may also transport to-be-loaded goods 200 to the lifting apparatus 400. Optionally, the conveying apparatus 500 may be of a structure that can implement the horizontal transport, such as a conveyor belt structure, an assembly line, a conveying roller structure, or a roller structure, or the like. Exemplarily, the conveying apparatus 500 is of an assembly line structure, and Specifically, when unloading, the lifting apparatus 400 ascends to one side of a transport mechanism 320, after receiving the goods 200 of the transport mechanism 320, the lifting apparatus 400 descends, and transfers the goods 200 to the conveying apparatus 500, and the goods are transported away by the conveying apparatus 500. Subsequently, the lifting apparatus 400 further ascends to another transport mechanism 320, and this process is repeated until all the goods 200 on the plurality of transport mechanisms 320 are transported away. When loading, after the lifting apparatus 400 descends and receives and picks the goods 200 conveyed by the conveying apparatus 500, the lifting apparatus 400 ascends to one side of a transport mechanism 320 and transfers the goods 200 to the transport mechanism 320; and subsequently, the lifting apparatus 400 further descends to the conveying apparatus 500, and this process is repeated until the plurality of transport mechanisms 320 are loaded with the goods 200.

In an embodiment, the lifting apparatus 400 includes a lifting frame 410 along the vertical direction, a moving mechanism 420 arranged on the lifting frame 410, and a transfer mechanism 430 with at least one layer arranged on the moving mechanism 420. The moving mechanism 420 may ascend or descend along the lifting frame 410 and drive the transfer mechanism 430 with at least one layer to move, so as to receive and pick goods from or transfer goods 200 to the plurality of transport mechanisms 320. The lifting frame 410 has a bearing function, and is configured to bear the moving mechanism 420 and the transfer mechanism 430 with at least one layer. Optionally, a bottom portion of the lifting frame 410 may also be provided with rotating wheels, so as to adapt to different applications. The transfer mechanism 430 with at least one layer is configured to carry the goods 200 and implement the transfer of the goods 200 between a high position such as a transport mechanism 320 and a low position such as the conveying apparatus 500. The moving mechanism 420 is arranged on the lifting frame 410 along the vertical direction, and may output movement in the vertical direction, so as to drive the transfer mechanism 430 with at least one layer to ascend or descend.

It can be understood that the moving mechanism 420 is configured to implement the ascending or descending motion of the transfer mechanism 430 with at least one layer along the vertical direction. A specific structure of the moving mechanism 420 may be a telescopic rod structure, a chain transmission structure, a driving transmission structure, or the like, and may also be another structure capable of enabling the carrying mechanism 150 to ascend or descend. Exemplarily, a specific structure of the moving mechanism 420 is the same as a structure of the lifting mechanism 140 of the transport robot 100, and details are not described herein again. Certainly, the specific structure of the moving mechanism 420 may also be different from the structure of the lifting mechanism 140 of the transport robot 100, as long as the moving mechanism 420 can implement the ascending or descending motion.

Exemplarily, there is a transfer mechanism 430 with one layer, and the transfer mechanism 430 with one layer receives and picks goods from one transport mechanism 320 at one time, or transfers goods to one transport mechanism 320 at one time. Certainly, in another implementation of the transport robot and the transport system having the same, in a case that there is a transfer mechanism 430 with at least two layers, the transfer mechanism 430 with at least two layers may remove goods on at least two transport mechanisms 320 at one time, or transfer goods to at least two transport mechanisms 320, so as to improve the efficiency of goods turnover.

In an embodiment, the transfer mechanism 430 with at least one layer includes a transfer base 431 arranged on the moving mechanism 420 and a transfer portion 432 movably arranged on the transfer base 431, and the transfer portion 432 may drive goods 200 to move, and may receive and pick goods from or transfer goods 200 to at least one of the plurality of transport mechanisms 320. The transfer base 431 plays a bearing role and is configured to carry the transfer portion 432, so as to mount the transfer portion 432 on the moving mechanism 420. When the moving mechanism 420 ascends or descends, the transfer base 431 may drive the transfer portion 432 to ascend or descend synchronously, so as to implement the loading or unloading of the goods 200.

Optionally, the transfer portion 432 is of a structure that can implement horizontal transport, such as a conveyor belt structure, an assembly line, a conveyor roller structure, a roller structure, or the like. Exemplarily, the transfer portion 432 is of a rolling shaft structure, and specifically includes a plurality of rolling shafts, and each of the plurality of rolling shafts includes a built-in rolling motor to drive the each of the plurality of rolling shafts to rotate, thereby implementing the transport of the goods 200. It should be noted that, there are various structures that can implement the horizontal transport of the goods 200, which cannot all be listed herein, and the transfer portion 432 in the present disclosure is not limited to being implemented by the foregoing specific structures.

The transfer portion 432 may receive and pick the goods 200 of one transport mechanism 320 at one time, as mentioned above. The transfer portion 432 may also receive and pick the goods 200 of a plurality of transport mechanisms 320 at one time, and the moving mechanism 420 may receive and pick the goods 200 of the plurality of transport mechanisms 320 layer by layer, and then convey the goods to the conveying apparatus 500 together for transport after receiving and picking the goods. Exemplarily, the moving mechanism 420 drives the transfer portion 432 to ascend to a top portion. After receiving and picking goods 200 of one transport mechanism 320, the transfer portion 432 descends one layer to receive and pick goods 200 of one transport mechanism 320. After the transfer portion 432 is full or the goods 200 of the plurality of transport mechanisms 320 are received, the moving mechanism 420 drives the transfer portion 432 to descend to a position of the conveying apparatus 500, and the transfer portion 432 transfers all the goods 200 thereon to the conveying apparatus 500. Certainly, the moving mechanism 420 may move layer by layer from bottom to top, a principle thereof is substantially the same as a principle from top to bottom, and details are not described herein again.

Certainly, the transfer portion 432 may also receive and pick a plurality of goods 200 transferred by the conveying apparatus 500 at one time, and then transfer the goods to the plurality of transport mechanisms 320 layer by layer, a principle thereof is substantially the same as a foregoing principle of goods unloading, and details are not described herein again.

In the transport robot 100 and the transport system in the present disclosure, when unloading, a plurality of storage assemblies 121 of a storage mechanism 120 may move synchronously to perform a synchronous unloading action, so that the synchronous unloading of goods 200 in the plurality of storage assemblies 121 is implemented, goods 200 in the transport robot 100 can be unloaded at one time, the unloading efficiency is improved, the unloading time is reduced, and the overall working efficiency of the transport robot 100 is improved. In addition, after the transport robot 100 is used in cooperation with the auxiliary apparatus 300, the loading or unloading can be simultaneously implemented, thereby improving the working efficiency of the transport system.

Embodiment 2

Referring to FIG. 1, FIG. 3, FIG. 6, FIG. 9, and FIG. 11, the present disclosure provides a transport robot 100. The transport robot 100 is applied to a transport system, and can transport goods 200. It can be understood that the goods 200 may be goods with a bracket, and the transport robot 100 transports the goods 200 through the bracket; and certainly, the goods may alternatively be goods placed in a container, and the transport robot 100 transports the goods 200 through a container. The goods 200 described below are goods placed in the container, and the container may be loaded with the goods 200, so as to implement the transport of the goods 200. The transport robot 100 transports the container to an unloading position, and after unloading the goods 200 in the container, the container may be transported back to the transport robot 100, so as to reuse the container and reduce the cost. Alternatively, the goods 200 is a box with goods, and the transport robot 100 transports the container to the unloading position, and unloads the container with goods through an unloading apparatus.

The transport robot 100 plays an important role in intelligent warehousing, transports goods 200, ensures a transport speed of the goods 200, improves the transport efficiency of the goods 200, and reduces the consumption of labor resources. The transport robot 100 of the present disclosure can unload synchronously, so that goods 200 in the transport robot 100 can be unloaded at one time, thereby improving the unloading efficiency, reducing the unloading time, and improving the overall working efficiency of the transport robot 100.

Referring to FIG. 1 and FIG. 3, in an embodiment, the transport robot 100 includes a vertical frame 110 and a storage mechanism 120. The vertical frame 110 is arranged along a vertical direction. The storage mechanism 120 includes a plurality of storage assemblies 121 configured to store to-be-transported goods 200 and arranged on the vertical frame 110 at equal intervals along the vertical direction.

The vertical frame 110 plays a bearing role, and various components of the transport robot 100 are mounted thereon. When the transport robot 100 transports the goods 200, the vertical frame 110 may drive synchronous movement of the components on the transport robot 100, so as to implement the transport of the goods 200. The storage mechanism 120 is located on the vertical frame 110, is configured to store the goods 200, and is capable of moving synchronously with the vertical frame 110, so as to implement the transport of the goods 200. The transport robot 100 moves to a loading position, and the to-be-transported goods 200 are transported to the storage mechanism 120 for storage. Then, the transport robot 100 moves from the loading position to an unloading position. Correspondingly, the storage mechanism 120 moves to the unloading position along with the vertical frame 110. At this time, the goods 200 in the storage mechanism 120 can be unloaded. The storage mechanism 120 can temporarily store the to-be-transported goods 200, thereby improving the capability of the transport robot 100 to carry the goods 200.

In addition, the storage mechanism 120 includes a plurality of storage assemblies 121 arranged on the vertical frame 110 at intervals. Each of the plurality of storage assemblies 121 can carry goods 200 of a box to ensure a storage capacity of the transport robot 100. Optionally, a distance between two adjacent storage assemblies 121 may be equal or not equal. Exemplarily, the plurality of storage assemblies 121 are evenly distributed on the vertical frame 110 along the vertical direction. The to-be-transported goods 200 may be transported to the plurality of storage assemblies 121, and the transport robot 100 drives the goods 200 in the plurality of storage assemblies 121 to be transported to the unloading position.

Referring to FIG. 1 and FIG. 3, in an embodiment, the transport robot 100 further includes a lifting mechanism 140 capable of ascending or descending relative to the vertical frame 110 along the vertical direction and a carrying mechanism 150 configured to carry the goods 200, where the carrying mechanism 150 is movably arranged on the vertical frame 110 along the vertical direction, is connected to the lifting mechanism 140, and is capable of ascending or descending along the vertical direction under driving of the lifting mechanism 140, so as to deliver goods 200 in the carrying mechanism 150 to a corresponding storage mechanism 120.

The carrying mechanism 150 is a terminal configured to perform an action of the transport robot 100. At the loading position, the carrying mechanism 150 may carry the to-be-transported goods 200, and transport the goods 200 into the plurality of storage assemblies 121. Certainly, in some occasions, in a case that the goods 200 in the plurality of storage assemblies 121 need to be unloaded separately, the carrying mechanism 150 may also take out the goods 200 in the plurality of storage assemblies 121. Optionally, the carrying mechanism 150 includes, but is not limited to, a mechanical arm, an actionable tow bar, or a plane with a conveying function, and the like. The lifting mechanism 140 is configured to implement the ascending or descending movement of the carrying mechanism 150, and is capable of driving the carrying mechanism 150 to ascend or descend along the vertical direction.

At the loading position, there is a shelving unit with a plurality of layers configured to carry goods 200. When loading goods at the loading position of the transport robot 100, the lifting mechanism 140 drives the carrying mechanism 150 to ascend or descend, so that the carrying mechanism 150 can pick goods on the shelving unit. Then, the lifting mechanism 140 drives the carrying mechanism 150 to ascend or descend, so as to transfer the goods 200 in the carrying mechanism 150 to the plurality of storage assemblies 121. This process is repeated until the plurality of storage assemblies 121 store the goods 200. After the loading is completed, the transport robot 100 moves from the loading position to the unloading position, and the plurality of storage assemblies 121 may perform a synchronous unloading operation. After the unloading is completed, the transport robot 100 returns to the loading position, so that continuous transport of the goods 200 can be implemented by repeating the process, thereby improving the transport efficiency.

The function of the lifting mechanism 140 is to drive the carrying mechanism 150 to ascend or descend along the vertical direction. In an embodiment, the lifting mechanism 140 includes a lifting power source and a lifting transmission component, and the lifting power source and the lifting transmission component are separately arranged on the vertical frame 110. The lifting transmission component is in driving connection with the lifting power source and the carrying mechanism 150. Specifically, an output end of the lifting power source is in driving connection with an input end of the lifting transmission component, and an output end of the lifting transmission component is in driving connection with the carrying mechanism 150. That the lifting power source and the lifting transmission component are separately arranged on the vertical frame 110, and the driving connection between the lifting power source and the lifting transmission component facilitate the disassembly or assembly of the lifting mechanism 140 on the vertical frame 110. Optionally, a power output from the lifting power source is in a form of rotation and linear motion, or in any other form of motion, and a final output of the lifting transmission component in driving connection with the lifting power source is movement along the vertical direction. Optionally, the lifting power source includes a driving motor in driving connection with the input end of the lifting transmission component. The lifting power source in a form of a motor runs more stably. Further, the driving motor can rotate forwardly or reversely, which facilitates the control of an ascending or descending process of the lifting mechanism 140.

Optionally, the lifting transmission component may be of a telescopic rod structure, a chain transmission structure, a driving transmission structure, or the like, and may also be of another structure capable of enabling the carrying mechanism 150 to ascend or descend. Exemplarily, the lifting transmission component is of a chain transmission structure, including a sprocket and a chain, the chain is connected to the carrying mechanism 150, and the chain is arranged on the vertical frame 110 along the vertical direction. When the output end of the lifting power source drives the sprocket to rotate, the chain ascends or descends along the vertical frame 110, which may further drive the carrying mechanism 150 to ascend or descend.

It should be noted that, the essence of the lifting transmission component is to output the ascending or descending motion to drive the carrying mechanism 150 to ascend or descend, thereby implementing the loading of the goods 200. In this embodiment, the lifting transmission component is implemented by a chain transmission structure. In addition, there are various structures that can implement ascending or descending, which cannot all be listed herein, and the manner of the ascending or descending motion in the present disclosure is not limited to being implemented by the foregoing specific structures.

In an embodiment, the transport robot 100 further includes a rotary mechanism arranged between the carrying mechanism 150 and the lifting mechanism 140 and configured to drive the carrying mechanism 150 to rotate relative to the lifting mechanism 140, so that the carrying mechanism 150 is aligned with a corresponding storage mechanism 120. The rotary mechanism is rotatably connected to the carrying mechanism 150, and the carrying mechanism 150 is rotatable relative to the rotary mechanism. When the carrying mechanism 150 is rotated by the rotary mechanism, a direction of the carrying mechanism 150 may be adjusted, so that the loading or unloading port of the carrying mechanism 150 can be adjusted. The carrying mechanism 150 implements the loading or unloading of the goods 200 through the loading or unloading port. When the transport robot 100 is at the loading position, the rotary mechanism may drive the carrying mechanism 150 to rotate, so that the loading or unloading port of the carrying mechanism 150 faces a shelving unit, and the goods 200 can be loaded into the carrying mechanism 150. When the carrying mechanism 150 transfers the goods 200 to the plurality of storage assemblies 121, the rotary mechanism may drive the carrying mechanism 150 to rotate, so that the loading or unloading port of the carrying mechanism 150 faces the plurality of storage assemblies 121. At this time, the goods 200 in the carrying mechanism 150 can be transferred to the plurality of storage assemblies 121.

Optionally, the rotary mechanism includes a carrying bracket, an autorotation gear arranged on the carrying bracket, and an autorotation motor fixedly mounted on the carrying bracket. An output end of the autorotation motor is connected to the autorotation gear, the carrying mechanism 150 is mounted on the autorotation gear, and the carrying bracket is mounted on the lifting mechanism 140. The autorotation motor may drive the autorotation gear to rotate, which may further drive the carrying mechanism 150 to rotate.

It should be noted that, the essence of the rotary mechanism is to output a rotation motion, so as to drive the carrying mechanism 150 to rotate, thereby implementing the loading or unloading of the goods 200. In this embodiment, the rotary mechanism is implemented by an autorotation motor and an autorotation gear. In addition, there are various structures that can implement rotation, which cannot all be listed herein, and the manner of the rotation motion in the present disclosure is not limited to being implemented by the foregoing specific structures.

When the transport robot 100 in the foregoing embodiment loads goods, the lifting mechanism 140 drives the carrying mechanism 150 to transfer the goods 200 to a plurality of storage assemblies 121 at corresponding heights in the storage mechanism 120. When unloading, the lifting mechanism 140 drives the carrying mechanism 150 to take out the goods 200 in a plurality of storage assemblies 121 at corresponding heights in the storage mechanism 120. Through the cooperation between the lifting mechanism 140 and the carrying mechanism 150, the automation of loading or unloading of the goods 200 is implemented, a problem of high cost and low efficiency in a current transport method is effectively resolved, the cost of the loading or unloading of the goods is reduced, and the efficiency of the loading or unloading of the goods 200 is greatly improved. In addition, the carrying mechanism 150 moves to different heights under the driving of the lifting mechanism 140, so that the to-be-transported goods 200 can be delivered to a plurality of storage assemblies 121 at different heights in the storage mechanism 120, which has strong versatility and reduces the floor space.

Referring to FIG. 1 and FIG. 3, in an embodiment, the carrying mechanism 150 includes a transition member 151 and a pick-or-place member 152 that is telescopically arranged on the transition member 151, and the pick-or-place member 152 is capable of taking out goods 200 and storing the goods in the transition member 151, and is further capable of pushing out goods 200 in the transition member 151. The pick-or-place member 152 is telescopically arranged in the transition member 151. At the loading position, the pick-or-place member 152 extends out of the transition member 151 to take out goods 200 on a shelving unit, and then the pick-or-place member 152 retracts into the transition member 151 to temporarily store the goods 200 in the transition member 151. Subsequently, the lifting mechanism 140 and the rotary mechanism drive the carrying mechanism 150 to move, so that the carrying mechanism 150 moves to a plurality of storage assemblies 121 in which the goods are to be placed. At this time, the pick-or-place member 152 extends out of the transition member 151, moves the goods 200 out of the transition member 151, and transfers the goods to the plurality of storage assemblies 121. After the transfer, the pick-or-place member 152 retracts into the transition member 151. Optionally, the transition member 151 includes, but is not limited to, a transition box, and the pick-or-place member 152 includes, but is not limited to, a structure in which a telescopic motor cooperates with a telescopic rod, a mechanical arm mechanism, and the like.

In an embodiment, the transport robot 100 further includes a movable chassis 160 arranged at a bottom portion of the vertical frame 110. The movable chassis 160 can drive the transport robot 100 to move, which greatly improves the adaptability of the transport robot 100 to actual working conditions. Specifically, the chassis 160 includes a chassis frame 161, a travel drive assembly, and a plurality of rotating wheels 162, the vertical frame 110 is arranged on an upper portion of the chassis frame 161, the plurality of rotating wheels 162 are arranged on a bottom portion of the chassis frame 161, the travel drive assembly is arranged on the chassis frame 161, and at least one of the plurality of rotating wheels 162 is in driving connection with the travel drive assembly. Further, at least two of the plurality of rotating wheels 162 are separately in driving connection with the travel drive assembly, and the at least two of the plurality of rotating wheels 162 being separately in driving connection with the travel drive assembly are distributed on two sides of the chassis frame 161 along a traveling direction, thereby achieving a steering function of the chassis 160. The travel drive assembly includes at least two wheel drive motors, and the at least two of the plurality of rotating wheels 162 distributed on the two sides of the chassis frame 161 along the traveling direction are respectively driven by separate wheel drive motors. That the at least two of the plurality of rotating wheels 162 distributed on the two sides of the chassis frame 161 along the traveling direction are respectively driven by separate wheel drive motors can simplify a transmission structure on the chassis 160.

In an embodiment, each of the plurality of rotating wheels 162 includes a driving wheel and a driven wheel. The driving wheel and the driven wheel are mounted on a bottom portion of the chassis 160, may separately rotate relative to the chassis 160, and jointly support the chassis 160. The driving wheel is driven by a wheel drive motor to enable the chassis 160 to move. By configuring the movable chassis 160, the transport robot 100 can transport the goods 200 between the loading position and the unloading position. There are two driving wheels, and the two driving wheels are symmetrically distributed. Correspondingly, there are two wheel drive motors, and the two driving wheels are respectively driven by the two wheel drive motors, so that rotational speeds of the two driving wheels are different, thereby implementing the steering of the chassis 160. There are four driven wheels, and the four driven wheels are distributed in a rectangular shape. The four driven wheels may be universal wheels or may be of other wheel structures with a steering function. According to actual situations, a quantity of the driven wheel is not limited to four, but may also be six, three, or the like.

In this embodiment, the chassis 160 is also mounted with a guiding apparatus, and the guiding apparatus is a camera configured to identify a graphic code attached to a ground, so that the chassis 160 travels along a preset path. The graphic code may be a two-dimensional code, a barcode, or some customized identification codes. In some other embodiments, the guiding apparatus is a laser guiding apparatus configured to guide the chassis 160 to travel along a laser beam, or the guiding apparatus is a short-wave receiving apparatus configured to receive a preset short-wave signal to guide the chassis 160 to travel along a preset path. It should be noted that, in some other embodiments, the chassis 160 may be omitted, and the vertical frame 110 is directly and fixedly mounted on the ground or another platform, and is only configured to carry the goods 200 between the loading position and the unloading position around the vertical frame.

In an embodiment, the transport robot 100 further includes a controller electrically connected to the chassis 160, the carrying mechanism 150, the lifting mechanism 140, and the rotary mechanism separately, so as to control the synchronous movement of components or control the movement of at least one component, to achieve a function of automatic goods carrying.

First Embodiment

Referring to FIG. 1 to FIG. 8, in the first embodiment of the present disclosure, when a transport robot 100 is unloading, a plurality of storage assemblies 121 are capable of moving synchronously to perform a synchronous unloading action.

To further improve the transport efficiency of the transport robot 100, the transport robot 100 of the present disclosure can implement synchronous unloading at the unloading position. Specifically, during unloading, a plurality of storage assemblies 121 may move synchronously, so that the goods 200 are moved out of the plurality of storage assemblies 121, and a synchronous unloading action is performed in real time. In this way, the goods 200 in the plurality of storage assemblies 121 can be unloaded synchronously, which shortens the unloading time and improves the unloading efficiency of the transport robot 100. After the unloading is completed, the transport robot 100 may return to the loading position to continue loading, which improves the working efficiency of the transport robot 100.

In this embodiment described above, when the transport robot 100 is unloading, a plurality of storage assemblies 121 of a storage mechanism 120 may move synchronously to perform a synchronous unloading action, so that the synchronous unloading of goods 200 in the plurality of storage assemblies 121 is implemented, the current problem of a low unloading efficiency caused by the layer-by-layer unloading of goods is effectively resolved, goods 200 in the transport robot 100 can be unloaded at one time, the unloading efficiency is improved, the unloading time is reduced, and the overall working efficiency of the transport robot 100 is improved.

Referring to FIG. 1 to FIG. 4, in an embodiment, the transport robot 100 further includes at least one linkage mechanism 130, and each of the at least one linkage mechanism 130 is connected to at least two storage assemblies 121 and is configured to drive the at least two storage assemblies 121 to move synchronously relative to the vertical frame 110 to perform a synchronous unloading action. When the at least one linkage mechanism 130 moves, a synchronous movement of the at least two storage assemblies 121 may be implemented. It can be understood that one linkage mechanism 130 may be connected to all storage assemblies 121, and alternatively, among a plurality of linkage mechanisms 130, each of the plurality of linkage mechanisms 130 may be connected to a plurality of storage assemblies 121. Exemplarily, there are two linkage mechanisms 130, where one of the two linkage mechanisms 130 is connected to storage assemblies 121 of first to third layers, and the other one of the two linkage mechanisms 130 is connected to storage assemblies 121 of fourth to sixth layers. Certainly, in another implementation of the present disclosure, there may be more linkage mechanisms 130. The present disclosure is only described by taking an example in which one linkage mechanism 130 is connected to all storage assemblies 121. A working principle of a plurality of linkage mechanisms 130 is substantially the same as that of the one linkage mechanism 130, and details are not described herein again.

The storage mechanism 120 may be rotatably mounted on the vertical frame 110, and may further be connected to the linkage mechanism 130. When moving, the linkage mechanism 130 drives the plurality of storage assemblies 121 to rotate relative to the vertical frame 110, so that the plurality of storage assemblies 121 can undergo a pitching motion. It can be understood that one end of the linkage mechanism 130 may be mounted on the vertical frame 110 or the chassis 160, as long as the linkage mechanism 130 can drive the plurality of storage assemblies 121 to undergo a pitching motion.

When the linkage mechanism 130 drives the plurality of storage assemblies 121 to move upward, one ends of the plurality of storage assemblies 121 are lifted up, and other ends rotate relative to the vertical frame 110, so as to stay at initial positions. At this time, the plurality of storage assemblies 121 are lifted up, and goods 200 thereon may slide out of the plurality of storage assemblies 121 under an action of gravity thereof, so as to implement the unloading of the goods 200. Because the linkage mechanism 130 simultaneously drives the plurality of storage assemblies 121 to move upward, the plurality of storage assemblies 121 can be simultaneously lifted up, thereby simultaneously performing an unloading operation to implement the unloading. After the unloading is completed, the linkage mechanism 130 drives the plurality of storage assemblies 121 to descend, and the plurality of storage assemblies 121 return to horizontal initial positions.

When the linkage mechanism 130 drives the plurality of storage assemblies 121 to move downward, and after external goods 200 are simultaneously conveyed to the plurality of storage assemblies 121, the goods 200 can slide into the plurality of storage assemblies 121 under the action of gravity to implement synchronous loading. It should be noted that the synchronous loading of the transport robot 100 needs to be implemented in cooperation with an auxiliary apparatus 300 of the transport system, a specific implementation process is described in detail in the following specification, and only the synchronous unloading of the transport robot 100 is described in detail in this embodiment.

After the transport robot 100 loads the goods 200 into the plurality of storage assemblies 121 at the loading position, the transport robot 100 moves from the loading position to the unloading position. At this time, the linkage mechanism 130 drives the plurality of storage assemblies 121 to move upward, so that the plurality of storage assemblies 121 are lifted up. In this way, the goods 200 in the plurality of storage assemblies 121 can slide out of the plurality of storage assemblies 121 under the action of gravity thereof, and be stored in a specified apparatus such as the auxiliary apparatus 300, so as to implement the synchronous unloading of the transport robot 100. After the unloading is completed, the transport robot 100 returns to the loading position to load goods, and in this way, a transport function of the transport robot 100 is achieved.

In an embodiment, the linkage mechanism 130 includes a linkage connector 131 simultaneously connected to at least two storage assemblies 121 and capable of synchronously driving the at least two storage assemblies 121 to synchronously undergo a pitching motion. It can be understood that the pitching motion herein may be a pitching rotational motion, or a curved motion, and certainly, may also be in other forms that can generate the pitching motion. One ends of the at least two storage assemblies 121 are rotatably connected to the vertical frame 110, and the at least two storage assemblies 121 are also connected to the linkage connector 131. The linkage connector 131 can ascend or descend. When ascending or descending, the linkage connector 131 may drive the at least two storage assemblies 121 to ascend or descend, so that the at least two storage assemblies 121 rotate relative to the vertical frame 110, that is, the at least two storage assemblies 121 undergo a pitching motion. It can be understood that, when one of the at least two storage assemblies 121 undergo a pitching motion, the linkage connector 131 is driven to ascend or descend, and the remaining storage assemblies 121 may be driven to move through the linkage connector 131; or the linkage connector 131 ascends or descends, and then the at least two storage assemblies 121 are driven to move.

As shown in FIG. 1 and FIG. 2, optionally, the linkage connector 131 and the at least two storage assemblies 121 may be rotatably connected or fixedly connected. When the linkage connector 131 and the at least two storage assemblies 121 are rotatably connected, the at least two storage assemblies 121 may have a rotary shaft, and the at least two storage assemblies 121 may be rotatably mounted on the linkage connector 131 through the rotary shaft. Alternatively, the linkage connector 131 may have a rotary shaft, and the linkage connector 131 may be rotatably mounted on the at least two storage assemblies 121 through the rotary shaft. Alternatively, a connection between the linkage connector 131 and the at least two storage assemblies 121 is similar to an olecranon engagement structure. In addition, the rotary shaft may be replaced with a hinge or another component that can implement a rotatable connection.

Optionally, the linkage connector 131 may be a connecting rod connected to the at least two storage assemblies 121. Further optionally, the linkage member may include a plurality of connecting rods, and two adjacent linkage members are connected by the plurality of connecting rods. In this case, when one of the at least two storage assemblies 121 moves, adjacent connecting rods may drive the remaining storage assemblies 121 to move. It can be understood that a specific structure of the linkage connector 131 is not limited to the connecting rod, but may also be a connecting piece or the like.

It should be noted that, the essential spirit of the present disclosure lies in the linkage between the linkage connector 131 and the at least two storage assemblies 121, and the linkage connector 131 can implement the synchronous movement of the at least two storage assemblies 121, thereby performing a synchronous unloading operation. In this embodiment, the connection of connectors is implemented by connecting rods, and there may be one or more connecting rods. In addition, there are various arrangements of the linkage connector 131, which cannot all be listed herein, and a linkage manner in the present disclosure is not limited to being implemented by the foregoing specific structures.

Referring to FIG. 1 and FIG. 3, in an embodiment, in a same horizontal direction, a distance between the linkage connector 131 and the vertical frame 110 is less than or equal to a length of each of the plurality of storage assemblies 121. It can be understood that a length at a connection position between the linkage connector 131 and the plurality of storage assemblies 121 may be equal to the length of each of the plurality of storage assemblies 121. In this case, the linkage connector 131 and the vertical frame 110 are respectively located at two ends of the plurality of storage assemblies 121. The length at the connection position between the linkage connector 131 and the plurality of storage assemblies 121 may be less than the length of each of the plurality of storage assemblies 121, and the connection position between the linkage connector 131 and the plurality of storage assemblies 121 is located on side surfaces of the plurality of storage assemblies 121. That is, the linkage connector 131 may be located at any position on a peripheral side of each of the plurality of storage assemblies 121. In this way, the linkage connector 131 can drive the plurality of storage assemblies 121 to synchronously ascend or descend when the linkage connector 131 ascends or descends, so as to perform the synchronous unloading operation of the transport robot 100.

In an embodiment, there may be at least one linkage connector 131. In a case that there is one linkage connector 131, the cooperation between the linkage connector with the vertical frame 110 can ensure that the plurality of storage assemblies 121 are fixed and reliable, and simultaneously implement the driving of the movement of the plurality of storage assemblies 121. In a case that there are a plurality of linkage connectors 131, the plurality of linkage connectors 131 can further improve the linkage of the plurality of storage assemblies 121 and ensure that the plurality of storage assemblies 121 move in a consistent manner.

In a case that there is one linkage connector 131, the linkage connector 131 and the vertical frame 110 are respectively arranged at two ends of the plurality of storage assemblies 121. That is, the connection position between the linkage connector 131 and the plurality of storage assemblies 121 and the vertical frame 110 are respectively located at the two ends of the plurality of storage assemblies 121, and a distance between the connection position and the vertical frame 110 is equal to a size of each of the plurality of storage assemblies 121 along a horizontal direction. In this way, the plurality of storage assemblies 121 can be reliably supported by the linkage connector 131 and the vertical frame 110, to prevent the plurality of storage assemblies 121 from falling and dropping, so that the plurality of storage assemblies 121 can reliably store the goods 200.

In a case that there are a plurality of linkage connectors 131, the plurality of linkage connectors 131 are arranged at intervals along the peripheral side of the storage assembly 121. The plurality of linkage connectors 131 are distributed at intervals along the peripheral side of each of the plurality of storage assemblies 121, and may be distributed uniformly, non-uniformly, or symmetrically. The plurality of storage assemblies 121 can be reliably supported by the plurality of linkage connectors 131 and the vertical frame 110, to prevent the plurality of storage assemblies 121 from falling and dropping, so that the plurality of storage assemblies 121 can reliably store the goods 200.

Referring to FIG. 1, FIG. 3, and FIG. 4, in an embodiment, the linkage mechanism 130 further includes a linkage driving member 132 configured to cooperate with the linkage connector 131, so as to drive the plurality of storage assemblies 121 to implement synchronous unloading. The linkage driving member 132 is a power source for the movement of the linkage mechanism 130, and implements the driving of the movement of a linkage moving member. In addition, the linkage driving member 132 outputs linear motion, so that the linkage connector 131 can ascend or descend, and the plurality of storage assemblies 121 can undergo a pitching motion. Optionally, the linkage driving member 132 includes, but is not limited to, an air cylinder, a hydraulic cylinder, a linear motor, or an electric push rod, and may also be another linear driving unit capable of outputting the linear motion. Exemplarily, the linkage driving member 132 is a linear motor. Exemplarily, one end of the linkage driving member 132 is arranged on the chassis 160. Certainly, one end of the linkage driving member 132 may also be arranged on the vertical frame 110.

Optionally, the linkage driving member 132 may be connected to the plurality of storage assemblies 121. In an embodiment, an output end of the linkage driving member 132 is connected to one of the plurality of storage assemblies 121. One end of the linkage driving member 132 is mounted on the vertical frame 110, and an other end is connected to the plurality of storage assemblies 121. After outputting the linear motion, the linkage driving member 132 may drive a plurality of storage assemblies 121 connected thereto to move, and then the plurality of storage assemblies 121 may drive the linkage connector 131 to ascend or descend. At this time, the linkage connector 131 may drive the remaining storage assemblies 121 to move synchronously, so that the plurality of storage assemblies 121 rotate relative to the vertical frame 110, the plurality of storage assemblies 121 are lifted up, and the synchronous unloading operation of the plurality of storage assemblies 121 is performed.

Further, the output end of the linkage driving member 132 is connected to a bottom portion or a top portion of one of the plurality of storage assemblies 121. In a case that the linkage driving member 132 is connected to the top portion of the plurality of storage assemblies 121, the linkage driving member 132 may retract to drive the plurality of storage assemblies 121 to move upward, and the linkage driving member 132 may extend to drive the plurality of storage assemblies 121 to move downward. In a case that the linkage driving member 132 is connected to the bottom portion of the plurality of storage assemblies 121, the linkage driving member 132 may extend to drive the plurality of storage assemblies 121 to move upward, and the linkage driving member 132 may retract to drive the plurality of storage assemblies 121 to move downward. Exemplarily, the linkage driving member 132 is connected to the bottom portion of the plurality of storage assemblies 121. Still further, the linkage driving member 132 is located and connected to a bottom portion of a lowermost storage assembly 121, and the output end of the linkage driving member 132 is in abutment with a middle region of the bottom portion of the storage assembly 121. In this way, the linkage driving member 132 does not affect the loading or unloading of goods 200 of a carrying component, so as to avoid interference.

Further optionally, the output end of the linkage driving member 132 is connected to the linkage connector 131. The linkage driving member 132 may directly drive the linkage connector 131 to ascend or descend, and then the linkage connector 131 may drive the plurality of storage assemblies 121 to move synchronously. Further, the linkage driving member 132 may be located at the bottom portion of the lowermost storage assembly 121 and arranged on the chassis 160, and the output end of the linkage driving member 132 is connected to the linkage connector 131. Certainly, the linkage driving member 132 may also be located at the top portion of the plurality of storage assemblies 121.

The linkage mechanism 130 in this embodiment can implement the simultaneous unloading of a plurality of storage assemblies 121, the plurality of storage assemblies 121 are connected by a same linkage connector 131, and an output end of a linkage driving member 132 is connected to a lowermost storage assembly 121. When the linkage driving member 132 extends, the linkage driving member 132 may push the plurality of storage assemblies 121 upward, so that the plurality of storage assemblies 121 rotate relative to the vertical frame 110. When rotating, the plurality of storage assemblies 121 may drive the linkage connector 131 to move synchronously, and then the linkage connector 131 drives the remaining storage assemblies 121 to move synchronously, so as to implement the synchronous driving of all storage assemblies 121 to move upward, thereby performing the synchronous unloading operation.

It is worth noting that there are various rotational driving forms in which the plurality of storage assemblies 121 rotate relative to the vertical frame 110 to undergo a pitching motion. In this embodiment, only the linkage driving member 132 capable of outputting the linear motion is configured to drive the movement of the plurality of storage assemblies 121, and other driving components that can implement the pitching motion of the plurality of storage assemblies 121 should be considered as falling within the protection scope of the present disclosure.

Referring to FIG. 1, FIG. 3, and FIG. 5, in an embodiment, each of the plurality of storage assemblies 121 includes a carrier body 1211 configured to carry the goods 200 and rotatably connected to the linkage connector 131 and the vertical frame 110 separately. The carrier body 1211 is a main body configured to carry the goods 200, one end of the carrier body 1211 is rotatably connected to the vertical frame 110, and an other end is rotatably connected to the linkage connector 131. One end of the carrier body 1211 connected to the vertical frame 110 is a head end, and one end of the carrier body 1211 connected to the linkage connector 131 is a tail end. When the linkage connector 131 drives the carrier body 1211 to ascend or descend, the tail end of the carrier body 1211 rotates around the head end of the carrier body 1211, so that the carrier body 1211 undergoes a pitching motion. Optionally, an edge of the carrier body 1211 is rotatably connected to the linkage connector 131 and the vertical frame 110 separately, and certainly, a middle region of the carrier body 1211 may also be rotatably connected to the linkage connector 131 and the vertical frame 110 separately.

It can be understood that the rotatable connection between the carrier body 1211 and the vertical frame 110 may be that the carrier body 1211 has a rotary shaft, and the carrier body 1211 is also rotatably mounted on the vertical frame 110 through the rotary shaft, or the vertical frame 110 has a rotary shaft, and the carrier body 1211 may be rotatably mounted on the rotary shaft, or the like. In addition, the foregoing manner of the rotatable connection which is implemented through the rotary shaft may also be replaced by a hinged connection or other forms of rotatable connection.

Optionally, the carrier body 1211 is arranged in a flat plate shape, and a container of the goods 200 may be transferred to the carrier body 1211. Further, the edge of the carrier body 1211 has three sides of flanges, and the three sides of flanges form a loading or unloading port at the vertical frame 110, and the goods 200 are mounted in the carrier body 1211 through the loading or unloading port. In addition, the flanges can limit the displacement of the goods 200 on the carrier body 1211, prevent the goods 200 from falling out of the carrier body 1211, and ensure that the carrier body 1211 can store the goods 200 accurately. It can be understood that the loading or unloading port herein is the loading or unloading end 1215 in the second embodiment.

In an embodiment, each of the plurality of storage assemblies 121 further includes a rolling member 1212 arranged on the carrier body 1211 in a rolling manner and configured to be in a rolling contact with the goods 200 in the carrier body 1211. The rolling member 1212 can reduce a frictional force between the goods 200 and the carrier body 1211, so as to facilitate the loading or unloading of the goods 200. When the goods 200 are loaded, a bottom portion of the goods 200 is in contact with the rolling member 1212 under the action of gravity thereof. During the movement of the goods 200 into the carrier body 1211, the goods 200 may drive rollers to rotate, so that the frictional force between the goods 200 and the carrier body 1211 is reduced, and the loading of the goods 200 is facilitated. When the goods 200 are unloaded, the linkage connector 131 drives the carrier body 1211 to move upward. At this time, the tail end of the carrier body 1211 is higher than a top end of the carrier body 1211, and the goods 200 in the carrier body 1211 slide out of the carrier body 1211 under the action of gravity. In addition, during a sliding process of the goods 200 along the carrier body 1211, the bottom portion of the goods 200 drives the rolling member 1212 to roll, so that the goods 200 slide out of the carrier body 1211 more easily, and the unloading of the goods 200 is facilitated.

Optionally, the carrier body 1211 is provided with a rolling groove, the rolling member 1212 may be rotatably mounted in the rolling groove, and a top surface of the rolling member 1212 is slightly higher than a top surface of the carrier body 1211, so as to ensure that the rolling member 1212 can be in contact with the bottom portion of the goods 200. In addition, the bottom portion of the carrier body 1211 also includes a protection cover covering the rolling member 1212 on the bottom portion of the carrier body 1211, so as to avoid interference between a bottom portion of the rolling member 1212 and other components.

Optionally, the rolling member 1212 includes, but is not limited to, rollers, rolling shafts, rolling balls, or other components capable of rolling. In addition, there are a plurality of rolling members 1212, and the plurality of rolling members 1212 may be arranged in one row, or may be arranged in a plurality of rows. Exemplarily, the rolling member 1212 is rollers arranged in three rows.

Referring to FIG. 1, FIG. 3, FIG. 6, and FIG. 7, the first embodiment of the present disclosure further provides a transport system including an auxiliary apparatus 300 and the transport robot 100 in the foregoing embodiment. The auxiliary apparatus 300 includes a support frame 310 and a plurality of transport mechanisms 320 arranged on the support frame 310 at intervals along a vertical direction, and a manner in which the plurality of transport mechanisms 320 are arranged at intervals is the same as a manner in which a plurality of storage assemblies 121 are arranged at intervals. When the transport robot 100 moves to the auxiliary apparatus 300, goods 200 on the plurality of storage assemblies 121 are capable of being simultaneously transferred to corresponding transport mechanisms 320 to implement synchronous unloading; or goods 200 on the plurality of transport mechanisms 320 are capable of being simultaneously transferred to corresponding storage assemblies 121 to implement synchronous loading.

The auxiliary apparatus 300 can implement the synchronous unloading or synchronous loading of the goods 200. The auxiliary apparatus 300 is arranged at an unloading position or a loading position. In a case that the auxiliary apparatus 300 is unloaded, the auxiliary apparatus 300 is at the unloading position; and in a case that the auxiliary apparatus 300 is loaded, the auxiliary apparatus 300 is at the loading position. In the present disclosure, only an example in which the auxiliary apparatus 300 is at the unloading position is used for description. The auxiliary apparatus 300 is located at the unloading position. After the transport robot 100 completes loading at the loading position, the transport robot 100 moves to the unloading position. At this time, the transport robot 100 is docked with the auxiliary apparatus 300, and the auxiliary apparatus 300 may receive and pick the goods 200 in the plurality of storage assemblies 121 in the transport robot 100.

Specifically, the mounting frame 321 functions as a support, which is configured to support a plurality of transport mechanisms 320 configured to transport the goods 200. The auxiliary apparatus 300 includes a same quantity of transport mechanisms 320 as the plurality of storage assemblies 121, and heights at which the plurality of transport mechanisms 320 are located are consistent with heights at which corresponding storage assemblies 121 are located. After the transport robot 100 is docked with the auxiliary apparatus 300, the plurality of storage assemblies 121 and the plurality of transport mechanisms 320 are at same levels and heights. When unloading, the linkage driving member 132 of the linkage mechanism 130 extends to drive one end of a lowermost storage assembly 121 to be lifted up. During a lifting process of the storage assembly 121, the linkage connector 131 may be driven to ascend, and the linkage connector 131 may drive the remaining storage assemblies 121 to be lifted up during the lifting process. In this way, the plurality of storage assemblies 121 can be simultaneously lifted up, the goods 200 in the plurality of storage assemblies 121 slide out of the plurality of storage assemblies 121 under the action of gravity and the action of the rolling member 1212, and move to corresponding transport mechanisms 320, and the transport mechanisms 320 transport the goods 200 thereon away to implement the unloading of the goods 200.

The auxiliary apparatus 300 may also implement the loading of the goods 200. Specifically, transport mechanisms 320 of different layers drive the goods 200 to move toward corresponding storage assemblies 121, and transfer the goods 200 to the corresponding storage assemblies 121. It can be understood that when loading the goods 200, the linkage mechanism 130 may drive ends of the plurality of storage assemblies 121 to descend, and at the same time, the plurality of transport mechanisms 320 simultaneously transfer the goods 200 to the corresponding storage assemblies 121. After the goods 200 are gradually transferred into the carrier body 1211 and come into contact with the rolling member 1212, the goods 200 may slide into the plurality of storage assemblies 121 under the action of gravity thereof and through the cooperation with the rolling member 1212. Certainly, the plurality of storage assemblies 121 may also be stationary, and the goods 200 may also be moved into the plurality of storage assemblies 121 by a pushing force of the plurality of transport mechanisms 320 in cooperation with the rolling member 1212.

Referring to FIG. 6 and FIG. 7, in an embodiment, each of the plurality of transport mechanisms 320 includes a mounting frame 321 arranged on the support frame 310 and a transport portion 322 movably arranged on the mounting frame 321, and the transport portion 322 may drive the goods 200 to move. The mounting frame 321 is of a frame structure, which carries the transport portion 322 and is configured to implement the mounting of the transport portion 322. The transport portion 322 is a main component that implements the transport of the goods 200. When the goods 200 are in the transport portion 322, the transport portion 322 may drive the goods 200 to move toward or away from the plurality of storage assemblies 121.

Optionally, the transport portion 322 is of a structure that can implement horizontal transport, such as a conveyor belt structure, an assembly line, a conveyor roller structure, a roller structure, or the like. Exemplarily, the transport portion 322 is of a roller structure, and specifically includes a plurality of rollers, and each of the plurality of rollers includes a built-in rolling motor to drive the each of the plurality of rollers to rotate, thereby implementing the transport of the goods 200. It should be noted that, there are various structures that can implement the horizontal transport of the goods 200, which cannot all be listed herein, and the transport portion 322 in the present disclosure is not limited to being implemented by the foregoing specific structures.

In an embodiment, the auxiliary apparatus 300 further includes a movable base arranged at a bottom portion of the support frame 310. The movable base can drive the auxiliary apparatus 300 to move, which greatly improves the adaptation of the auxiliary apparatus 300 to actual working conditions. In this way, the auxiliary apparatus 300 can easily move to the loading position, the unloading position, or any other position, to work with the transport robot 100. Optionally, a structure of the base is exactly the same as that of the chassis 160 of the transport robot 100, and details are not described herein again.

Referring to FIG. 1, FIG. 6, and FIG. 8, in an embodiment, the transport system further includes a conveying apparatus 500 and a lifting apparatus 400 that is arranged between the auxiliary apparatus 300 and the conveying apparatus 500, and the lifting apparatus 400 is configured to ascend or descend along the vertical direction, so as to be docked with each of the plurality of transport mechanisms 320 and the conveying apparatus 500. The lifting apparatus 400 is capable of receiving and picking goods 200 of the plurality of transport mechanisms 320 and transferring the goods to the conveying apparatus 500; or the lifting apparatus 400 is capable of receiving and picking goods 200 of the conveying apparatus 500 and transferring the goods to the plurality of transport mechanisms 320.

The lifting apparatus 400 is configured to receive and pick the goods 200 of the plurality of transport mechanisms 320 or transport the goods 200 to the plurality of transport mechanisms 320. Because the plurality of transport mechanisms 320 are arranged at intervals along the vertical direction, to facilitate the goods loading or unloading of the auxiliary apparatus 300, the lifting apparatus 400 needs to move to a transport mechanism 320 at a corresponding position, so as to perform a corresponding operation. The conveying apparatus 500 is configured to convey the goods 200, may transport away goods 200 unloaded by the lifting apparatus 400, and may also transport to-be-loaded goods 200 to the lifting apparatus 400. Optionally, the conveying apparatus 500 may be of a structure that can implement the horizontal transport, such as a conveyor belt structure, an assembly line, a conveying roller structure, or a roller structure, or the like. Exemplarily, the conveying apparatus 500 is of an assembly line structure, and specifically, when unloading, the lifting apparatus 400 ascends to one side of a transport mechanism 320, after receiving the goods 200 of the transport mechanism 320, the lifting apparatus 400 descends, and transfers the goods 200 to the conveying apparatus 500, and the goods are transported away by the conveying apparatus 500. Subsequently, the lifting apparatus 400 further ascends to another transport mechanism 320, and this process is repeated until all the goods 200 on the plurality of transport mechanisms 320 are transported away. When loading, after the lifting apparatus 400 descends and receives and picks the goods 200 conveyed by the conveying apparatus 500, the lifting apparatus 400 ascends to one side of a transport mechanism 320 and transfers the goods 200 to the transport mechanism 320; and subsequently, the lifting apparatus 400 further descends to the conveying apparatus 500, and this process is repeated until the plurality of transport mechanisms 320 are loaded with the goods 200.

In an embodiment, the lifting apparatus 400 includes a lifting frame 410 along the vertical direction, a moving mechanism 420 arranged on the lifting frame 410, and a transfer mechanism 430 with at least one layer arranged on the moving mechanism 420. The moving mechanism 420 may ascend or descend along the lifting frame 410 and drive the transfer mechanism 430 with at least one layer to move, so as to receive and pick goods from or transfer goods 200 to the plurality of transport mechanisms 320. The lifting frame 410 has a bearing function, and is configured to bear the moving mechanism 420 and the transfer mechanism 430 with at least one layer. Optionally, a bottom portion of the lifting frame 410 may also be provided with rotating wheels, so as to adapt to different applications. The transfer mechanism 430 with at least one layer is configured to carry the goods 200 and implement the transfer of the goods 200 between a high position such as a transport mechanism 320 and a low position such as the conveying apparatus 500. The moving mechanism 420 is arranged on the lifting frame 410 along the vertical direction, and may output movement in the vertical direction, so as to drive the transfer mechanism 430 with at least one layer to ascend or descend.

It can be understood that the moving mechanism 420 is configured to implement the ascending or descending motion of the transfer mechanism 430 with at least one layer along the vertical direction. A specific structure of the moving mechanism 420 may be a telescopic rod structure, a chain transmission structure, a driving transmission structure, or the like, and may also be another structure capable of enabling the carrying mechanism 150 to ascend or descend. Exemplarily, a specific structure of the moving mechanism 420 is the same as a structure of the lifting mechanism 140 of the transport robot 100, and details are not described herein again. Certainly, the specific structure of the moving mechanism 420 may also be different from the structure of the lifting mechanism 140 of the transport robot 100, as long as the moving mechanism 420 can implement the ascending or descending motion.

Exemplarily, there is a transfer mechanism 430 with one layer, and the transfer mechanism 430 with one layer receives and picks goods from one transport mechanism 320 at one time, or transfers goods to one transport mechanism 320 at one time. Certainly, in another implementation of the present disclosure, in a case that there is a transfer mechanism 430 with at least two layers, the transfer mechanism 430 with at least two layers may remove goods on at least two transport mechanisms 320 at one time, or transfer goods to at least two transport mechanisms 320, so as to improve the efficiency of goods turnover.

In an embodiment, the transfer mechanism 430 with at least one layer includes a transfer base 431 arranged on the moving mechanism 420 and a transfer portion 432 movably arranged on the transfer base 431, and the transfer portion 432 may drive goods 200 to move, and may receive and pick goods from or transfer goods 200 to at least one of the plurality of transport mechanisms 320. The transfer base 431 plays a bearing role and is configured to carry the transfer portion 432, so as to mount the transfer portion 432 on the moving mechanism 420. When the moving mechanism 420 ascends or descends, the transfer base 431 may drive the transfer portion 432 to ascend or descend synchronously, so as to implement the loading or unloading of the goods 200.

Optionally, the transfer portion 432 is of a structure that can implement horizontal transport, such as a conveyor belt structure, an assembly line, a conveyor roller structure, a roller structure, or the like. Exemplarily, the transfer portion 432 is of a rolling shaft structure, and specifically includes a plurality of rolling shafts, and each of the plurality of rolling shafts includes a built-in rolling motor to drive the each of the plurality of rolling shafts to rotate, thereby implementing the transport of the goods 200. It should be noted that, there are various structures that can implement the horizontal transport of the goods 200, which cannot all be listed herein, and the transfer portion 432 in the present disclosure is not limited to being implemented by the foregoing specific structures.

The transfer portion 432 may receive and pick the goods 200 of one transport mechanism 320 at one time, as mentioned above. The transfer portion 432 may also receive and pick the goods 200 of a plurality of transport mechanisms 320 at one time, and the moving mechanism 420 may receive and pick the goods 200 of the plurality of transport mechanisms 320 layer by layer, and then convey the goods to the conveying apparatus 500 together for transport after receiving and picking the goods. Exemplarily, the moving mechanism 420 drives the transfer portion 432 to ascend to a top portion. After receiving and picking goods 200 of one transport mechanism 320, the transfer portion 432 descends one layer to receive and pick goods 200 of one transport mechanism 320. After the transfer portion 432 is full or the goods 200 of the plurality of transport mechanisms 320 are received, the moving mechanism 420 drives the transfer portion 432 to descend to a position of the conveying apparatus 500, and the transfer portion 432 transfers all the goods 200 thereon to the conveying apparatus 500. Certainly, the moving mechanism 420 may move layer by layer from bottom to top, a principle thereof is substantially the same as a principle from top to bottom, and details are not described herein again.

Certainly, the transfer portion 432 may also receive and pick a plurality of goods 200 transferred by the conveying apparatus 500 at one time, and then transfer the goods to the plurality of transport mechanisms 320 layer by layer, a principle thereof is substantially the same as a foregoing principle of goods unloading, and details are not described herein again.

In an embodiment, the transport system further includes a control center, components of the transport system perform a coordinated action under the control of the control center, and the control center of the transport system maintains a communication connection with an external server. The control center may identify information of the to-be-transported goods 200, and the control center may obtain information of a loading position and an unloading position corresponding to each piece of the to-be-transported goods 200. The control center coordinates and controls the components according to the obtained information, so as to efficiently complete the transport of the goods 200.

In the transport robot 100 and the transport system in this embodiment, when unloading, a plurality of storage assemblies 121 of a storage mechanism 120 may move synchronously to perform a synchronous unloading action, so that the synchronous unloading of goods 200 in the plurality of storage assemblies 121 is implemented, goods 200 in the transport robot 100 can be unloaded at one time, the unloading efficiency is improved, the unloading time is reduced, and the overall working efficiency of the transport robot 100 is improved. In addition, after the transport robot 100 is used in cooperation with the auxiliary apparatus 300, the loading or unloading can be simultaneously implemented, thereby improving the working efficiency of the transport system.

Second Embodiment

Figure 9:
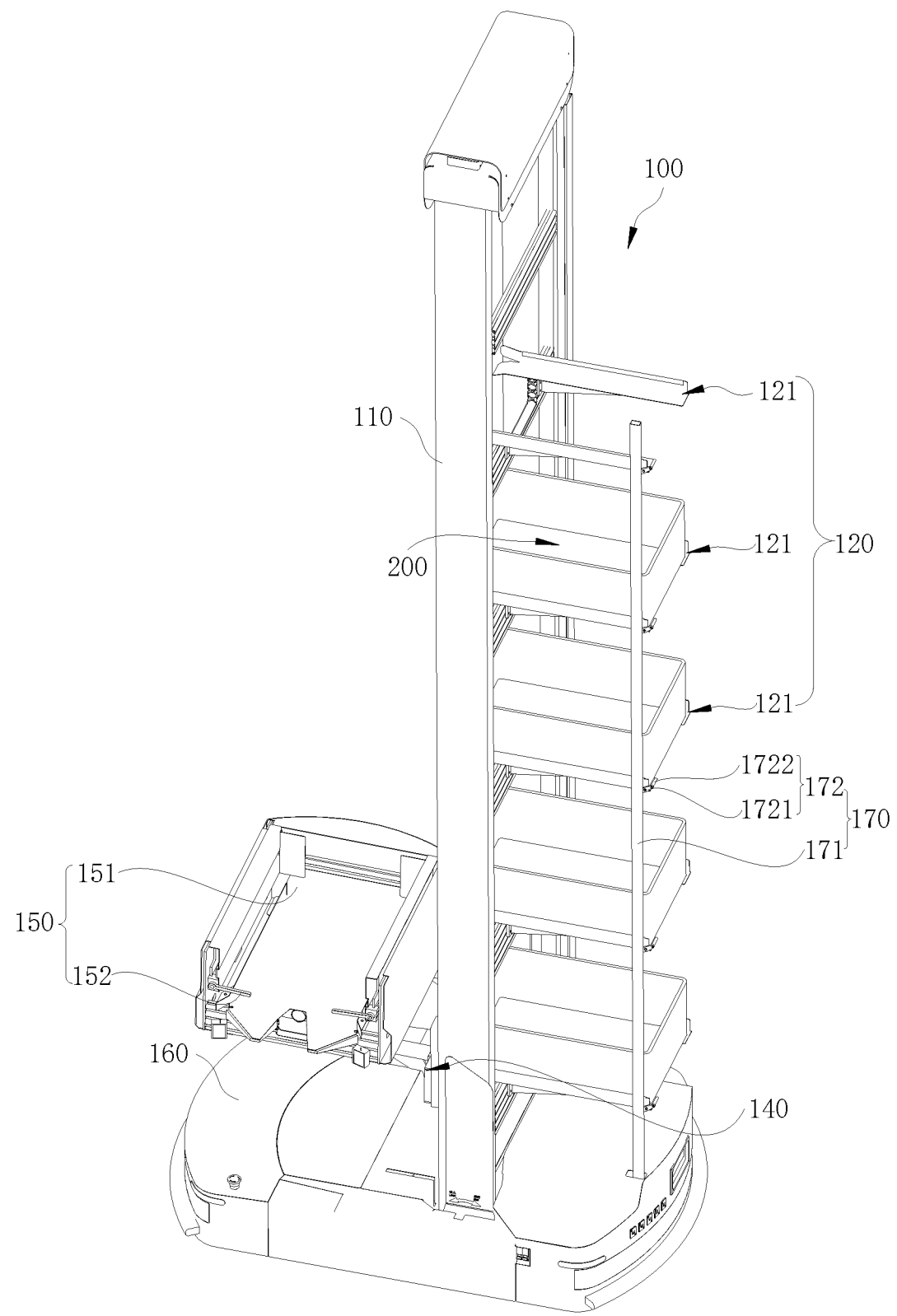
FIG. 9 is a three-dimensional view of a transport robot according to another embodiment of the present disclosure.
Figure 17:
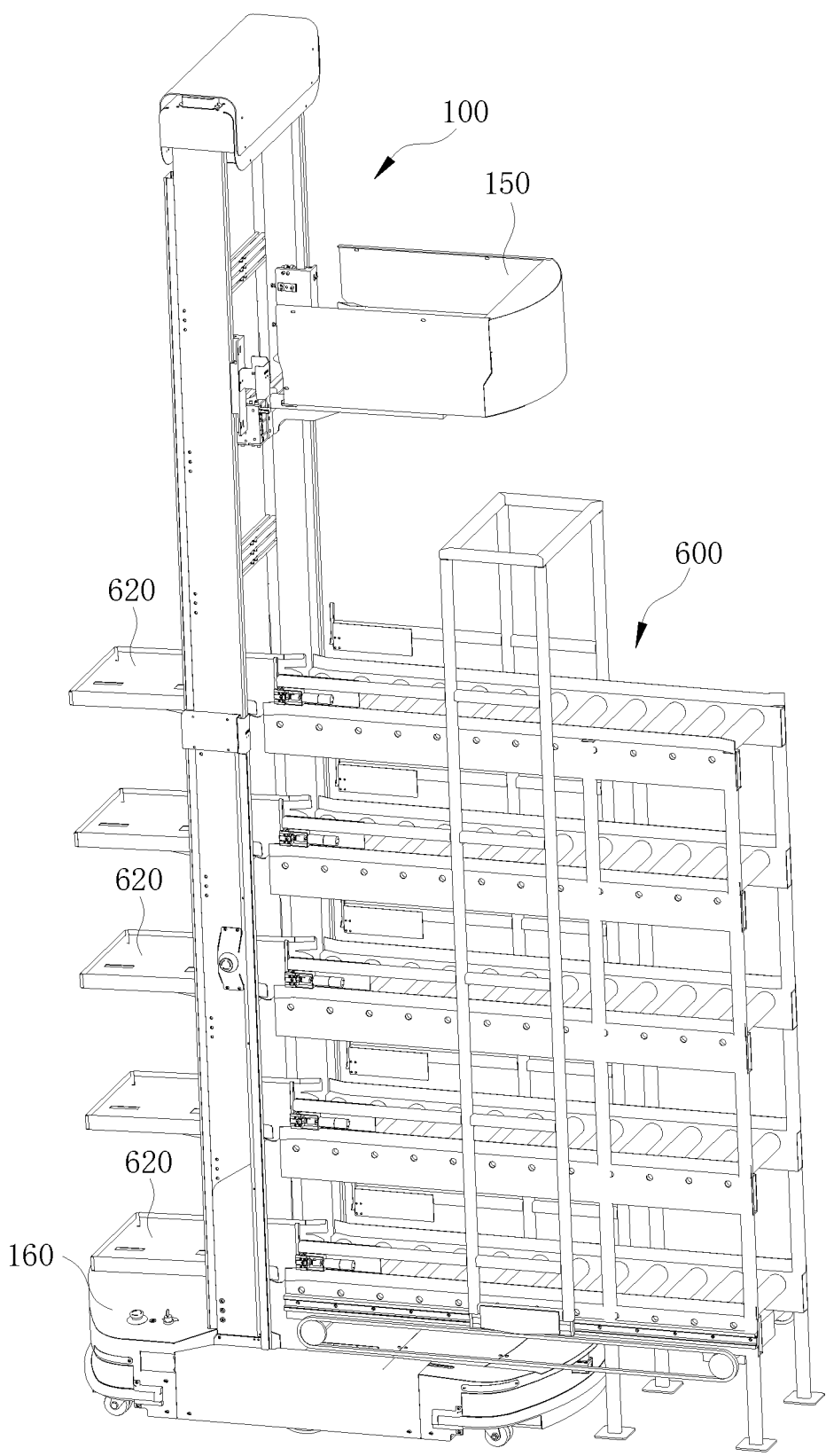
FIG. 17 is a three-dimensional view of a cooperation between the loading or unloading apparatus shown in FIG. 14 and a transport robot.

Referring to FIG. 9 and FIG. 17, in the second embodiment of the present disclosure, the transport robot 100 further includes a blocking mechanism 170 capable of switching between a blocking position and an avoidance position, where when the blocking mechanism 170 is at the blocking position, the blocking mechanism 170 is configured to block goods 200 in the storage assemblies 121 from sliding out, and when the blocking mechanism 170 is at the avoidance position, goods 200 are capable of being moved into or moved out of the plurality of storage assemblies 121.

It can be understood that after the plurality of storage assemblies 121 store the to-be-transported goods 200, during the movement of the transport robot 100 from the loading position to the unloading position, the transport robot 100 travels a specific distance, and the goods 200 stored in the plurality of storage assemblies 121 may be at a risk of falling. Once the goods 200 in the plurality of storage assemblies 121 fall, on the one hand, the goods 200 are damaged, resulting in economic losses; and on the other hand, a manual or intelligent picking apparatus is required to pick the goods 200 and place the goods in the plurality of storage assemblies 121 again for transport, which affects the transport efficiency of the goods 200.

In view of the foregoing description, the transport robot 100 of the present disclosure further includes a blocking mechanism 170, and the goods 200 in the plurality of storage assemblies 121 are blocked by the blocking mechanism 170. In this way, the goods 200 in the plurality of storage assemblies 121 can be prevented from sliding out. Specifically, the blocking mechanism 170 capable of switching between a blocking position and an avoidance position. When the blocking mechanism 170 is at the avoidance position, the goods 200 may be loaded into the plurality of storage assemblies 121 or the goods 200 may be taken out from the plurality of storage assemblies 121. When the blocking mechanism 170 is at the blocking position, the goods 200 in the plurality of storage assemblies 121 are in abutment with the blocking mechanism 170, and the blocking mechanism 170 may restrict the goods 200 in the plurality of storage assemblies 121 from sliding out and prevent the goods 200 from falling.

Specifically, when the transport robot 100 is at the loading position, the blocking mechanism 170 is at the avoidance position, and at this time, the goods 200 may be loaded into the plurality of storage assemblies 121; after the loading is completed, the blocking mechanism 170 moves to the blocking position, and at this time, the blocking mechanism 170 may be in abutment with the goods 200 in the plurality of storage assemblies 121 to restrict the goods 200 from sliding out of the plurality of storage assemblies 121; subsequently, the transport robot 100 may move from the loading position to the unloading position, and the blocking mechanism 170 is always at the blocking position during this process; and when the blocking mechanism 170 is at the unloading position, the blocking mechanism 170 moves from the blocking position to the avoidance position, and at this time, the goods 200 in the plurality of storage assemblies 121 may be taken out. In addition, the transport robot 100 reciprocates in this way. It can be understood that the blocking mechanism 170 may play a blocking role during the movement of the transport robot 100 regardless of whether there are goods in the plurality of storage assemblies 121, or may only play a blocking role during goods transport in a case that there are goods in the plurality of storage assemblies 121.

When the transport robot 100 of the foregoing embodiment transports goods, the blocking mechanism 170 moves to the blocking position and may be in abutment with the goods 200 in the plurality of storage assemblies 121, so as to restrict the goods 200 from sliding out of the plurality of storage assemblies 121. Therefore, a current problem that the goods easily slide out of a storage rack of the transport robot during goods transport is effectively resolved, the goods 200 are prevented from sliding out of the plurality of storage assemblies 121 during a transport process of the transport robot 100, the safety of the goods 200 is ensured, a risk of sliding out is avoided, and the transport efficiency is improved. In addition, when the transport robot 100 loads or unloads goods, the blocking mechanism 170 moves to the avoidance position. At this time, the goods 200 may be loaded into the plurality of storage assemblies 121, and the goods 200 in the plurality of storage assemblies 121 may also be removed, which does not hinder a loading or unloading operation of the transport robot 100, and is convenient for use.

In an embodiment, the blocking mechanism 170 may simultaneously block the goods 200 in the plurality of storage assemblies 121. That is, the blocking mechanism 170 may simultaneously move to the blocking position, so as to block the goods 200 in the plurality of storage assemblies 121, and the blocking mechanism 170 may also simultaneously move to the avoidance position, so that the plurality of storage assemblies 121 can perform a loading or unloading operation. Certainly, in another implementation of the present disclosure, there are a plurality of blocking mechanisms 170, and each of the plurality of blocking mechanisms 170 may simultaneously block the goods 200 in at least two of the plurality of storage assemblies 121. It can be understood that one blocking mechanism 170 may simultaneously act on goods 200 of all storage assemblies 121, or a plurality of blocking mechanisms 170 may act on a plurality of storage assemblies 121. Exemplarily, there are two blocking mechanisms 170, where one of the two blocking mechanisms 170 is configured to block goods 200 of storage assemblies 121 of first to third layers, and the other one of the two blocking mechanisms 170 is configured to block goods 200 of storage assemblies 121 of fourth to sixth layers. Certainly, in another implementation of the present disclosure, there may be more blocking mechanisms 170. In the present disclosure, only an example in which one blocking mechanism 170 blocks the goods 200 of all storage assemblies 121 is used for description. A working principle of a plurality of blocking mechanisms 170 is substantially the same as that of the one blocking mechanism 170, and details are not described herein again.

It is worth noting that an arrangement position of the blocking mechanism 170 is not limited in principle. The blocking mechanism may be movably arranged on the vertical frame 110, may be movably arranged on the chassis 160, and may also be movably arranged on the plurality of storage assemblies 121, as long as it is ensured that the blocking mechanism 170 can move to the avoidance position or the blocking position. In this embodiment, only an example in which the blocking mechanism 170 is movably arranged on the chassis 160 is used for description. A working principle of the blocking mechanism 170 arranged at another position is substantially the same as a working principle of the blocking mechanism 170 movably arranged on the chassis 160, and details are not described herein again. Specifically, when the blocking mechanism 170 moves relative to the chassis 160, the blocking mechanism 170 may move to the blocking position or the avoidance position. After the blocking mechanism 170 can move to the blocking position, the blocking mechanism 170 may block the goods 200 in the plurality of storage assemblies 121; and after the blocking mechanism 170 can move to the avoidance position, the blocking mechanism 170 no longer blocks the plurality of storage assemblies 121, and the goods 200 may freely enter or exit the plurality of storage assemblies 121.

Figure 10:
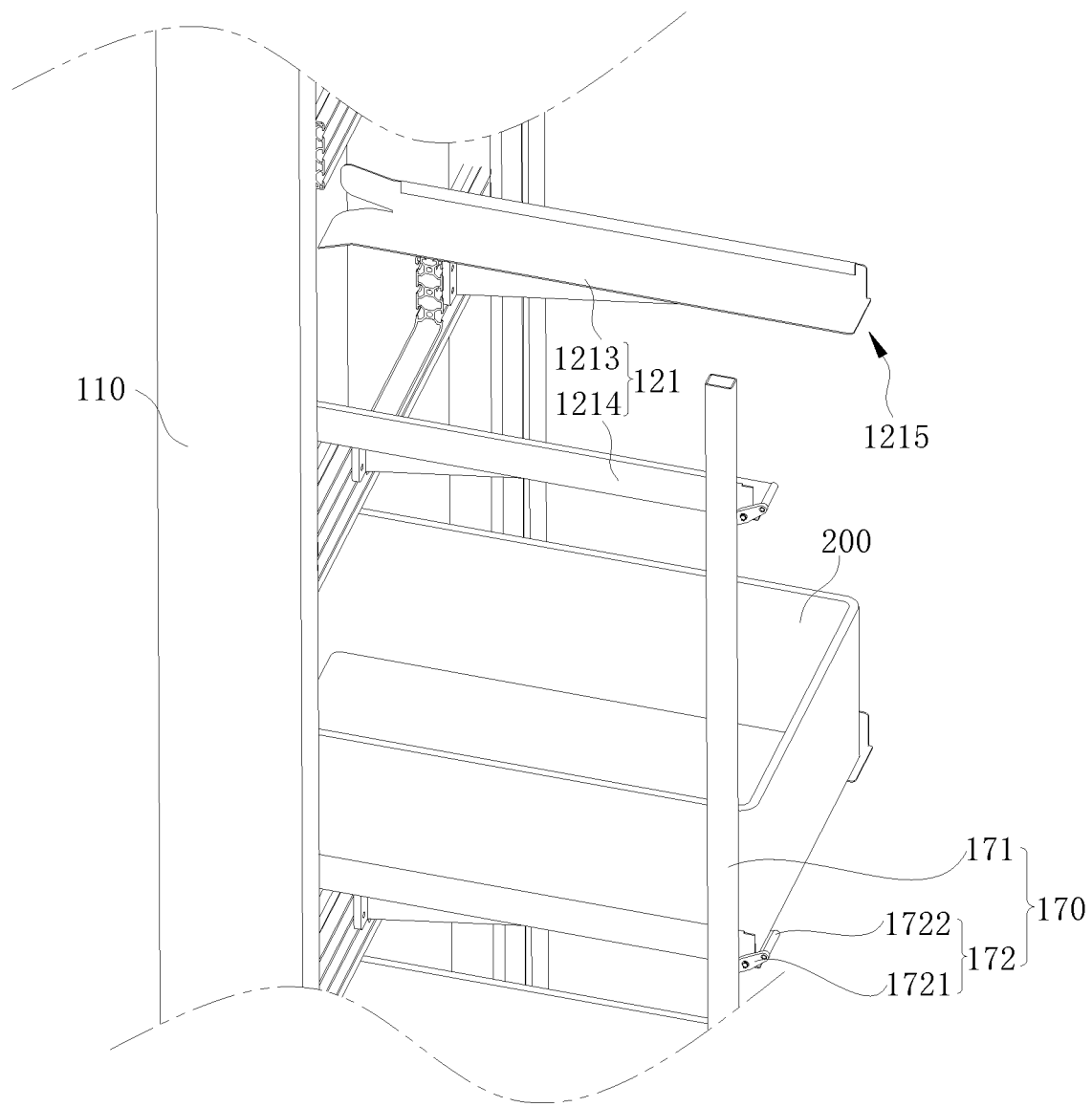
FIG. 10 is a partial enlarged view of the transport robot shown in FIG. 9.

In an embodiment, the plurality of storage assemblies 121 includes a loading or unloading end 1215 that faces away from the vertical frame 110. The goods 200 are loaded or unloaded from the loading or unloading end 1215 of the plurality of storage assemblies 121 to complete the loading or unloading of the goods 200. Exemplarily, as shown in FIG. 10, one ends of the plurality of storage assemblies 121 away from the vertical frame 110 is provided with the loading or unloading end 1215. During loading, the goods 200 are moved from the loading or unloading end 1215 into the plurality of storage assemblies 121, and during unloading, the goods 200 are moved from the loading or unloading end 1215 out of the plurality of storage assemblies 121. Optionally, the loading or unloading end 1215 is an end opening of the plurality of storage assemblies 121, or another entrance or exit through which the goods 200 can enter or exit. Certainly, in another implementation of the present disclosure, the loading or unloading end 1215 may also be arranged at one ends of the plurality of storage assemblies 121 close to the vertical frame 110. In this way, the loading or unloading of the goods 200 in the plurality of storage assemblies 121 can also be implemented.

Optionally, the loading or unloading end 1215 is arranged on a same side as the carrying mechanism 150. When the loading or unloading end 1215 performs a loading or unloading operation, the carrying mechanism 150 needs to avoid the loading or unloading end 1215, so as to avoid interference between the carrying mechanism 1215 and a loading or unloading apparatus 600, and ensure reliable loading or unloading. In this case, the carrying mechanism 150 may ascend to a highest position of the transport robot 100 or a position higher than the loading or unloading apparatus 600, or move to an other side of the transport robot 100. Further optionally, the loading or unloading end 1215 is arranged on an opposite side of the carrying mechanism 150. The goods loading or unloading at the loading or unloading end 1215 is not affected by the carrying mechanism 150, and when the plurality of storage assemblies 121 are loaded or unloaded, the carrying mechanism 150 does not interfere with the loading or unloading apparatus 600.

Referring to FIG. 9 and FIG. 10, in an embodiment, the blocking mechanism 170 may move into or move out of the loading or unloading end 1215. That is, when the blocking mechanism 170 moves into the loading or unloading end 1215, the blocking mechanism 170 is at the blocking position. At this time, an end portion of the goods 200 is in abutment with the blocking mechanism 170, and the blocking mechanism 170 blocks the goods 200 to restrict the goods 200 from sliding out of the loading or unloading end 1215. When the blocking mechanism 170 moves out of the loading or unloading end 1215, the blocking mechanism 170 is at the avoidance position. At this time, the loading or unloading end 1215 is unobstructed, the goods 200 may be loaded into the plurality of storage assemblies 121 through the loading or unloading end 1215, and the goods 200 in the plurality of storage assemblies 121 may also be unloaded through the loading or unloading end 1215.

In an embodiment, when the blocking mechanism 170 is at the blocking position, the blocking mechanism 170 is in abutment with a side wall or a bottom surface of the goods 200. That is, the blocking position of the blocking mechanism 170 may be located on a bottom surface or a side surface of the plurality of storage assemblies 121. When the blocking mechanism 170 moves to the blocking position, the blocking mechanism 170 may be in abutment with the goods 200 in the plurality of storage assemblies 121 at a side surface or a bottom surface. At this time, the movement of the goods 200 in the plurality of storage assemblies 121 is restricted due to an abutting force of the blocking mechanism 170, so that the goods 200 are prevented from sliding out of the plurality of storage assemblies 121. After the blocking mechanism 170 moves to the avoidance position, the blocking mechanism 170 is separated from the side surface or the bottom surface of the goods 200 of the plurality of storage assemblies 121, and the goods 200 may move in the plurality of storage assemblies 121, so as to perform the loading or unloading operation of the plurality of storage assemblies 121.

In an embodiment, the blocking mechanism 170 is arranged on at least one side of the plurality of storage assemblies 121. It can be understood that the blocking mechanism 170 may be arranged on one side of the plurality of storage assemblies 121, as shown in FIG. 9 and FIG. 10, and in this case, the blocking mechanism 170 may block the goods 200 in the plurality of storage assemblies 121 at the blocking position. Certainly, in another implementation of the present disclosure, blocking mechanisms 170 may also be located on two sides of the plurality of storage assemblies 121 respectively. In this way, the goods 200 in the plurality of storage assemblies 121 can be further blocked. Further, two blocking mechanisms 170 may be arranged symmetrically or asymmetrically, as long as the blocking mechanisms can block the goods 200 in the plurality of storage assemblies 121.

Exemplarily, in this embodiment, only an example in which the blocking mechanism 170 can move into or move out of the loading or unloading end 1215 is used for description. In addition, the blocking mechanism 170 is arranged on one side of the plurality of storage assemblies 121, working principles of blocking mechanisms 170 with different layouts mentioned in other embodiments are substantially the same as that of the blocking mechanism 170 in this embodiment, and details are not described herein again. In this case, the blocking position of the blocking mechanism 170 is located at the loading or unloading end 1215. After the blocking mechanism 170 moves to the loading or unloading end 1215, the blocking mechanism 170 is at the loading or unloading end 1215 and faces the goods 200, so as to block the goods 200.

In an embodiment, the blocking mechanism 170 includes a movable blocking connector 171 and a plurality of blocking assemblies 172 separately connected to the blocking connector 171, and at least one of the plurality of blocking assemblies 172 corresponds to a same storage assembly 121. The blocking connector 171 is capable of driving the plurality of blocking assemblies 172 to move into the loading or unloading end 1215, so as to block the goods 200 in the plurality of storage assemblies 121. The blocking connector 171 functions as a connection, and is configured to connect the plurality of blocking assemblies 172. When moving, the blocking connector 171 may synchronously drive the plurality of blocking assemblies 172 to move, so that the plurality of blocking assemblies 172 can move to a loading or unloading end 1215 of a corresponding storage assembly 121 or move out of the loading or unloading end 1215 of the plurality of storage assemblies 121. Optionally, the blocking connector 171 includes, but is not limited to, a connecting rod or a longboard, and the like.

The plurality of blocking assemblies 172 function as a blocking, and is configured to implement blocking of the goods 200. When the blocking connector 171 drives the plurality of blocking assemblies 172 to move to the blocking position, the plurality of blocking assemblies 172 are located at the loading or unloading end 1215. At this time, the end portion of the goods 200 faces the plurality of blocking assemblies 172, and the plurality of blocking assemblies 172 restrict the goods 200 from moving out of the plurality of storage assemblies 121. When the blocking connector 171 drives the plurality of blocking assemblies 172 to move to the avoidance position, the plurality of blocking assemblies 172 are separated from the loading or unloading end 1215. At this time, there is no object to block the end portion of the goods 200, and the plurality of storage assemblies 121 may be loaded or unloaded.

It can be understood that the avoidance position may be located outside the plurality of blocking assemblies 172, or may be located at a bottom portion of the plurality of storage assemblies 121, or at a position flush with the plurality of storage assemblies 121. The avoidance position is located at the bottom portion of the plurality of storage assemblies 121, as long as the plurality of blocking assemblies 172 are at a position that does not affect the moving in or moving out of goods 200 of a next layer.

Optionally, the blocking connector 171 may ascend or descend, and when ascending or descending, the blocking connector 171 may drive the plurality of blocking assemblies 172 to ascend or descend synchronously, so that the plurality of blocking assemblies 172 are located at the loading or unloading end 1215 or move out of the loading or unloading end 1215. In this case, the avoidance position may be located at the bottom portion of the plurality of storage assemblies 121 or the position flush with the plurality of storage assemblies 121. Certainly, the blocking connector 171 may also move horizontally. When moving horizontally, the blocking connector 171 may drive the plurality of blocking assemblies 172 to move horizontally and synchronously, so that the plurality of blocking assemblies 172 are located at the loading or unloading end 1215 or move out of the loading or unloading end 1215. In this case, the avoidance position may be located outside the plurality of blocking assemblies 172. Certainly, the blocking connector 171 may also perform another form of movement, such as one or a combination of rotating motion, swinging motion, moving motion, and the like, as long as the plurality of blocking assemblies 172 can move into or move out of the loading or unloading end 1215. Exemplarily, in the present disclosure, only an example in which the blocking connector 171 ascends or descends and displaces is used for description. In addition, the avoidance position is located at the bottom portion of the plurality of storage assemblies 121 or the position flush with the plurality of storage assemblies 121.

In an embodiment, each of the plurality of blocking assemblies 172 includes a stopping member fixedly arranged on the blocking connector 171, and movement of the blocking connector 171 is capable of driving the stopping member to move into or move out of the loading or unloading end 1215. In this embodiment, the stopping member is fixedly arranged on the blocking connector 171, and the movement of the blocking connector 171 may directly drive the stopping member to move, so that the stopping member moves to the blocking position or the avoidance position. For example, when the blocking connector 171 drives the stopping member to ascend, the stopping member may move to the loading or unloading end 1215, so as to block the goods 200; and when the blocking connector 171 drives the stopping member to descend, the stopping member may move to the avoidance position, so as to no longer block the goods 200. Optionally, the stopping member may be a baffle plate, a stopper, a limit post, or another component capable of blocking.

Referring to FIG. 9 and FIG. 10, in an embodiment, each of the plurality of blocking assemblies 172 includes a swing member 1721 and a blocking member 1722, one end of the swing member 1721 is rotatably connected to the blocking connector 171, an other end of the swing member 1721 is mounted with the blocking member 1722, and a middle portion of the swing member 1721 is rotatably mounted at the loading or unloading end 1215 of the plurality of storage assemblies 121. When ascending or descending, the blocking connector 171 is capable of driving the swing member 1721 to swing, so that the swing member 1721 drives the blocking member 1722 to move into or move out of the loading or unloading end 1215.

That is, the blocking connector 171 implements the switching between the blocking position and the avoidance position through the indirect movement of the plurality of blocking assemblies 172, such as a swinging motion. Specifically, when the blocking connector 171 moves, one end of the swing member 1721 may be driven to move relative to the plurality of storage assemblies 121, and then an other end of the swing member 1721 may drive the blocking member 1722 to move, so that the blocking member 1722 moves to the avoidance position or the blocking position. A head portion of the swing member 1721 is rotatably connected to the blocking connector 171, the middle portion of the swing member 1721 is rotatably connected to the plurality of storage assemblies 121, and a tail portion of the swing member 1721 is connected to the blocking member 1722. The blocking member 1722 may move to the avoidance position or the blocking position.

Exemplarily, when the blocking connector 171 moves upward along the vertical direction, the blocking connector 171 may drive the blocking member 1722 to move to the blocking position through the swing member 1721, and when the blocking connector 171 moves downward along the vertical direction, the blocking connector 171 may drive the blocking member 1722 to move to the avoidance position through the swing member 1721. Optionally, the swing member 1721 is a swing rod, and the blocking member 1722 is a blocking rod.

It should be noted that, the essential spirit of the present disclosure lies in the movement of the blocking connector 171 and the plurality of blocking assemblies 172, so that the plurality of blocking assemblies 172 respectively move to avoidance positions or blocking positions corresponding to the plurality of storage assemblies 121. In the foregoing two embodiment, two forms of each of the plurality of blocking assemblies 172 are separately described; and in addition, there are various arrangements of the plurality of blocking assemblies 172, which cannot all be listed herein, and a linkage manner in the present disclosure is not limited to being implemented by the foregoing specific structures.

In an embodiment, the blocking mechanism 170 further includes a blocking driving member, and an output end of the blocking driving member is connected to the blocking connector 171, so as to drive the plurality of blocking assemblies 172 to move into or move out of the loading or unloading end 1215. The blocking driving member is a power source for the movement of the blocking mechanism 170, and implements the driving of the movement of a blocking moving member. In addition, the blocking driving member outputs linear motion, so that the blocking connector 171 can ascend or descend, and then the blocking connector 171 may drive the plurality of blocking assemblies 172 to move, so that the plurality of blocking assemblies 172 move to the avoidance position or the blocking position. Optionally, the blocking driving member includes, but is not limited to, an air cylinder, a hydraulic cylinder, a linear motor, or an electric push rod, and may also be another linear driving unit capable of outputting the linear motion. Exemplarily, the blocking driving member is a linear motor. Exemplarily, one end of the blocking driving member is arranged on the chassis 160. Certainly, in another implementation of the present disclosure, a rotation motor cooperates with a protrusion member to drive.

In an embodiment, a bottom portion of each of the plurality of storage assemblies 121 is provided with a movement space used for a loading or unloading mechanism 620 of a transport system to move into, so as to load goods into or take goods out of the plurality of storage assemblies 121. Because the plurality of storage assemblies 121 cannot move during loading or unloading, other components such as the carrying mechanism 150 or a matching structure of the loading or unloading apparatus 600 are required to move the goods 200 into the plurality of storage assemblies 121 or take the goods out of the plurality of storage assemblies 121 during loading or unloading. Therefore, a bottom portion of each of the plurality of storage assemblies 121 needs to include a space used for the carrying mechanism 150 and the auxiliary apparatus 300 to extend into, so as to facilitate the goods loading or unloading of the plurality of storage assemblies 121. When loading goods to the plurality of storage assemblies 121, the carrying mechanism 150 or the loading or unloading apparatus 600 may extend into the movement space to place the goods 200 on the plurality of storage assemblies 121, and then exit the movement space; and when unloading goods from the plurality of storage assemblies 121, the carrying mechanism 150 or the loading or unloading apparatus 600 may extend into the movement space to hold the goods 200 in the plurality of storage assemblies 121 and drive the goods 200 to move out of the plurality of storage assemblies 121.

In an embodiment, each of the plurality of storage assemblies 121 include a first side plate 1213 and a second side plate 1214 that are arranged on the vertical frame 110, and the first side plate 1213 and the second side plate 1214 are opposite to each other and surround the movement space. The first side plate 1213 and the second side plate 1214 are arranged at a same height of the vertical frame 110, and are arranged in parallel. In this way, the first side plate 1213 and the second side plate 1214 can be configured to respectively hold bottom portions of two sides of the goods 200, so that the goods 200 is flat, and deflection is avoided. A portion between the first side plate 1213 and the second side plate 1214 is a gap, that is, the foregoing movement space, which allows the carrying mechanism 150 or the loading or unloading apparatus 600 to extend into, so as to perform a loading or unloading operation.

Certainly, in another implementation of the present disclosure, each of the plurality of storage assemblies 121 includes a carrier body configured to carry the goods 200 and being provided with a movement space along an entrance or exit direction of the goods 200, and a size of the movement space along the entrance or exit direction of the goods 200 is less than a size of the carrier body along the entrance or exit direction of the goods 200. That is, the movement space in this case is an opening of the carrier body. The goods 200 are carried by the carrier body, and the movement space of the carrier body may also allow the carrying mechanism 150 or the loading or unloading apparatus 600 to extend into, so as to perform the loading or unloading operation.

Figure 11:
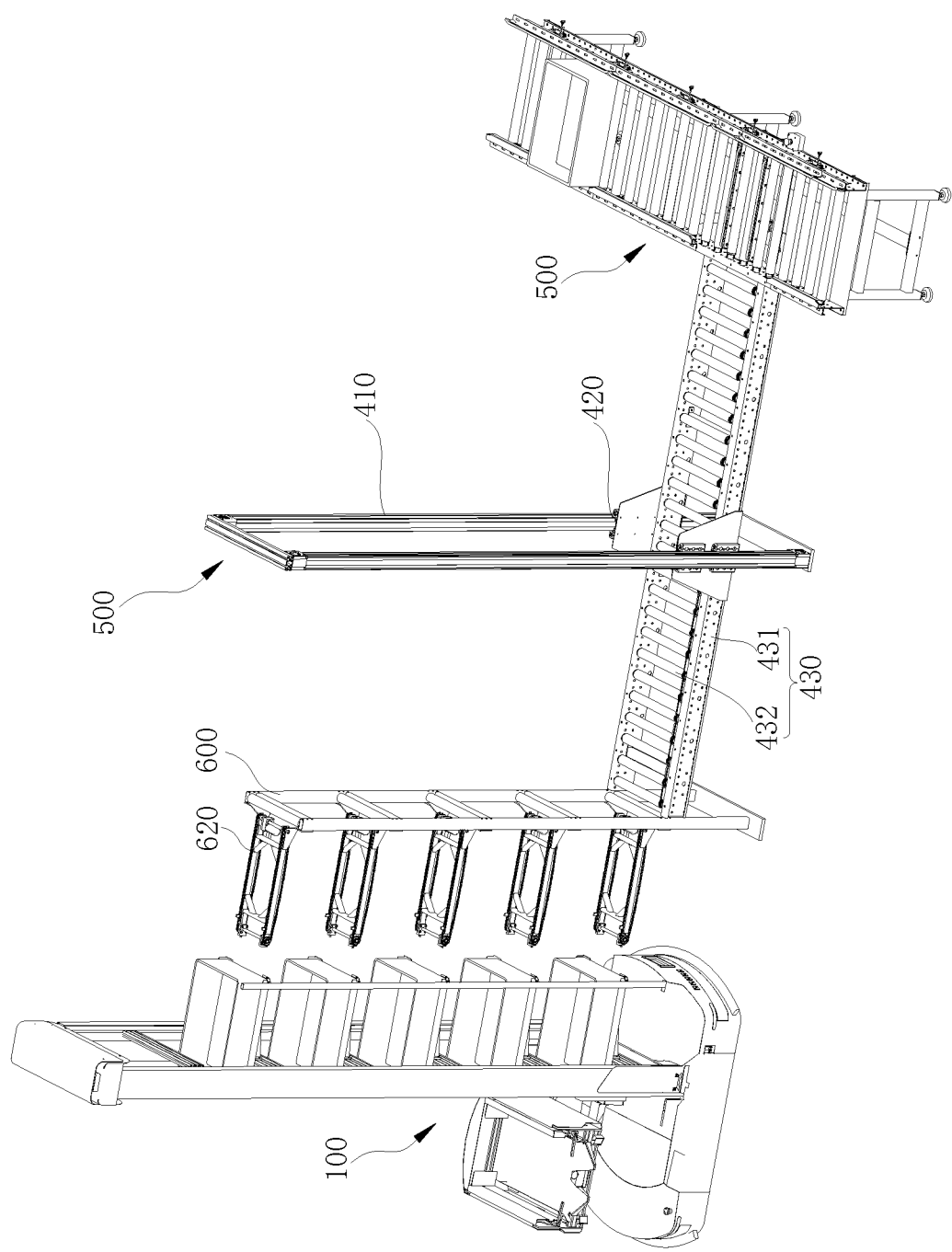
FIG. 11 is a three-dimensional view of the transport robot shown in FIG. 10 applied to a transport system.
Figure 12:
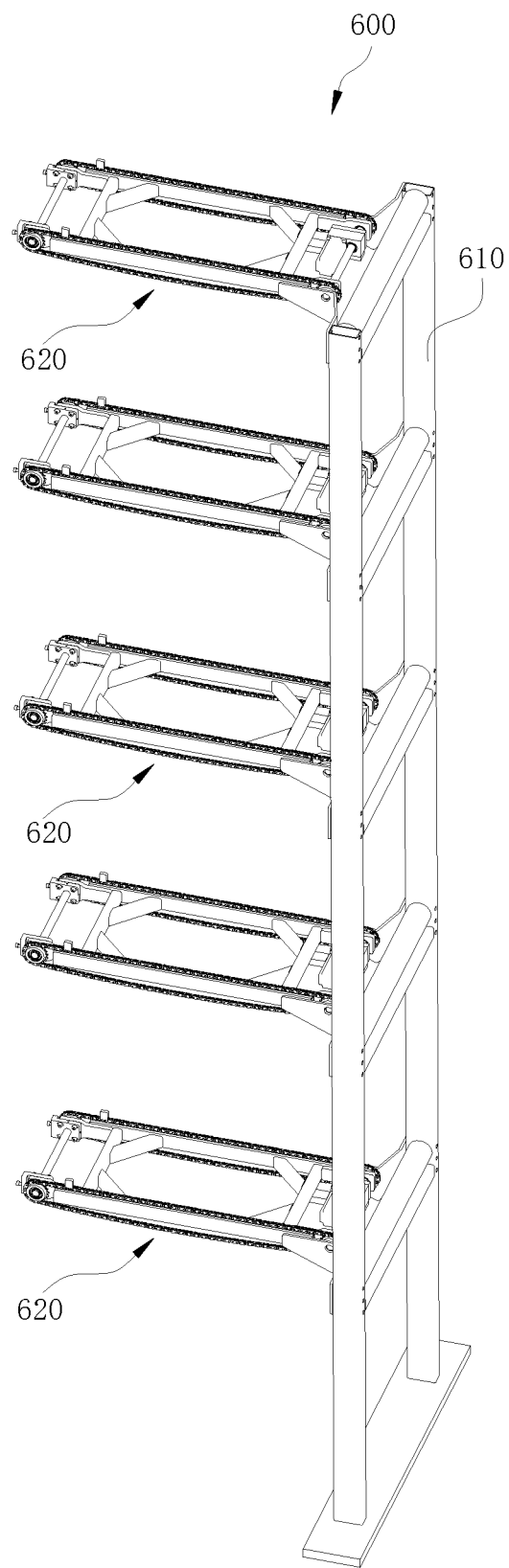
FIG. 12 is a three-dimensional view of a loading or unloading apparatus in an implementation of the transport system shown in FIG. 9.

Referring to FIG. 9 and FIG. 11, the second embodiment of the present disclosure further provides a transport system including a loading or unloading apparatus 600 and the transport robot 100 in the foregoing embodiment. The loading or unloading apparatus 600 is configured to convey the goods 200 to the transport robot 100 or unload the goods 200 on the transport robot 100. The loading or unloading apparatus 600 includes an upright frame 610 extending along a vertical direction and a plurality of loading or unloading mechanisms 620 arranged on the upright frame 610 at intervals along the vertical direction, and a manner in which the plurality of loading or unloading mechanisms 620 are arranged at intervals is the same as a manner in which a plurality of storage assemblies 121 are arranged at intervals. After the transport robot 100 is docked with the loading or unloading apparatus 600, the plurality of loading or unloading mechanisms 620 are capable of respectively conveying, at different heights, the goods 200 to the plurality of storage assemblies 121 or unloading the goods 200 in the plurality of storage assemblies 121.

The loading or unloading apparatus 600 can implement synchronous unloading or synchronous loading of the goods 200. The loading or unloading apparatus 600 is mounted at an unloading position or a loading position. In a case that the loading or unloading apparatus 600 is unloaded, the loading or unloading apparatus 600 is at the unloading position; and in a case that the loading or unloading apparatus 600 is loaded, the loading or unloading apparatus 600 is at the loading position. In the present disclosure, only an example in which the loading or unloading apparatus 600 is at the unloading position is used for description. The loading or unloading apparatus 600 is located at the unloading position. After the transport robot 100 completes loading at the loading position, the transport robot 100 moves to the unloading position. At this time, the transport robot 100 is docked with the loading or unloading apparatus 600, and the loading or unloading apparatus 600 may receive and pick the goods 200 in the plurality of storage assemblies 121 in the transport robot 100. Certainly, the reverse transport of the goods 200 may also be implemented at this position, that is, after the transport robot 100 is docked with the loading or unloading apparatus 600, the loading or unloading apparatus 600 may transfer the goods 200 to the plurality of storage assemblies 121.

Specifically, the upright frame 610 plays a supporting role, and is configured to support the plurality of loading or unloading mechanisms 620 configured to transport the goods 200. The loading or unloading apparatus 600 includes a same quantity of loading or unloading mechanisms 620 as the plurality of storage assemblies 121. The plurality of loading or unloading mechanisms 620 may separately convey, at different heights, the goods 200 to the transport robot 100, or unload the goods 200 on the transport robot 100, which greatly shortens the waiting time of the transport robot 100 during a loading or unloading process. In addition, heights at which the plurality of loading or unloading mechanisms 620 are located are consistent with heights at which corresponding storage assemblies 121 are located. After the transport robot 100 is docked with the loading or unloading apparatus 600, the plurality of storage assemblies 121 and the plurality of loading or unloading mechanisms 620 are at same heights, and the plurality of loading or unloading mechanisms 620 may convey the goods 200 to all storage assemblies 121 on the transport robot 100 at one time, or the plurality of loading or unloading mechanisms 620 may implement one-time removal of goods 200 from all storage assemblies 121 on the transport robot 100. Certainly, in specific working conditions, one or more loading or unloading mechanisms 620 in the loading or unloading apparatus 600 may simultaneously convey the goods 200 to the transport robot 100 or unload the goods 200 on the transport robot 100.

Each of the plurality of loading or unloading mechanisms 620 may act independently to convey the goods 200 to the transport robot 100 or unload the goods 200 on the transport robot 100. Referring to FIG. 10, FIG. 11, FIG. 12, and FIG. 13, in an embodiment, each of the plurality of loading or unloading mechanisms 620 includes a bracket 621, a loading or unloading assembly 622, and a loading or unloading driving member 623, a plurality of brackets 621 are arranged on the upright frame 610 at intervals along the vertical direction, the loading or unloading driving member 623 and the loading or unloading assembly 622 are respectively arranged on corresponding brackets 621, the loading or unloading assembly 622 is connected to the loading or unloading driving member 623, and the loading or unloading assembly 622 is configured to convey the goods 200 to the plurality of storage assemblies 121 or unload the goods 200 in the plurality of storage assemblies 121. The loading or unloading driving member 623 may allow a corresponding loading or unloading assembly 622 to individually convey the goods 200 to the transport robot 100 or unload the goods 200 on the transport robot 100.

Figure 13:
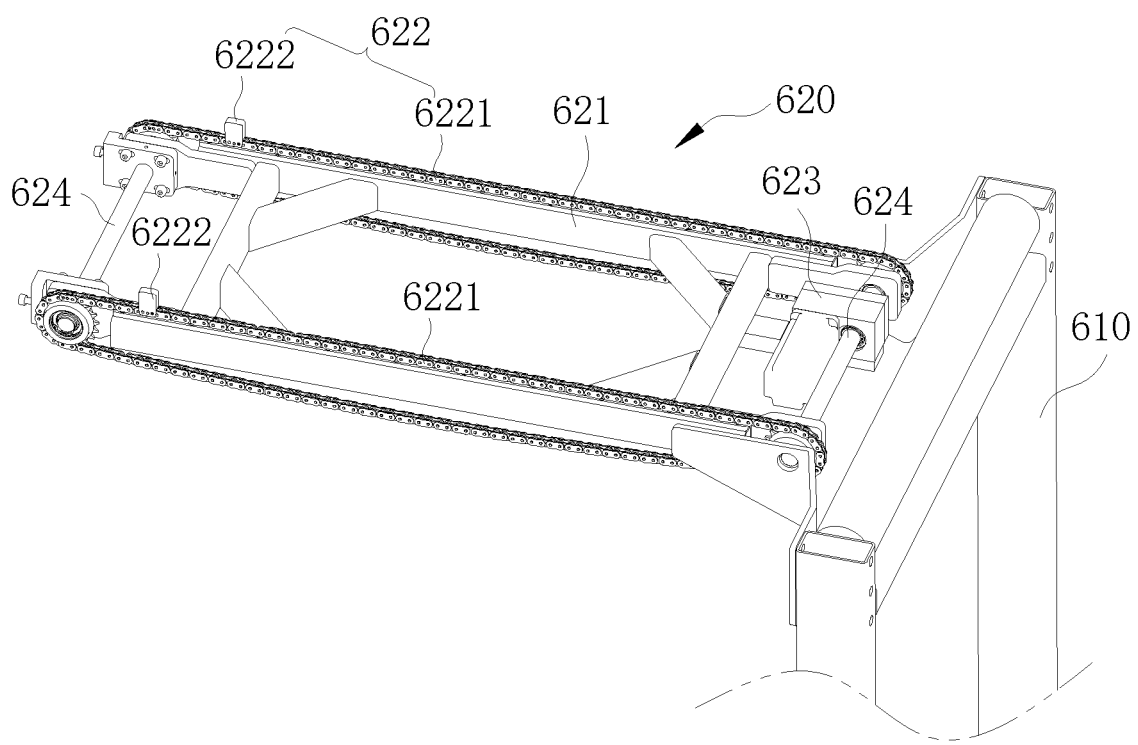
FIG. 13 is a partial schematic view of the loading or unloading apparatus shown in FIG. 12.

Further, as shown in FIG. 10 to FIG. 13, the loading or unloading assembly 622 includes a chain 6221 and a protrusion 6222, the chain 6221 is rotatably arranged on the bracket 621 along a loading or unloading direction, and the protrusion 6222 is fixedly arranged on the chain 6221. The loading or unloading driving member 623 includes a driving motor in driving connection with the chain 6221; and the chain 6221 may carry the goods 200. When the driving motor drives the chain 6221 to rotate, the protrusion 6222 pushes a bottom portion of the goods 200, so as to push the goods 200 to the transport robot 100, or the protrusion 6222 pulls a bottom portion of the goods 200, so as to pull the goods 200 from the transport robot 100 to the chain 6221, or the protrusion 6222 blocks the bottom portion of the goods 200, and the goods 200 are transferred to the chain 6221 when the transport robot 100 moves away from the loading or unloading apparatus 600. Specifically, the chain 6221 is arranged on two sprockets arranged at intervals along the loading or unloading direction, and an output shaft of the driving motor is in driving connection with one of the two sprockets. When rotating, the driving motor drives the chain 6221 to operate, and the protrusion 6222 pushes the bottom portion of the goods 200, so as to push the goods 200 to the transport robot 100, or the protrusion 6222 pulls the bottom portion of the goods 200, so as to pull the goods 200 from the transport robot 100 to the chain 6221. Furthermore, each of the plurality of loading or unloading mechanisms 620 includes two sets of loading or unloading assemblies 622, the two sets of loading or unloading assemblies 622 are arranged on the bracket 621 in parallel and at intervals, and the driving motor is in driving connection with two chains 6221. The two sets of loading or unloading assemblies 622 can increase the stability during the loading or unloading of the goods 200. In an embodiment of the present disclosure, as shown in FIG. 13, each of the plurality of loading or unloading mechanisms 620 further includes a synchronization rod 624, the two chains 6221 are separately in driving connection with the synchronization rod 624, and the driving motor is in driving connection with one of the two chains 6221. Specifically, the synchronization rod 624 connects two sprockets arranged at intervals along a horizontal direction perpendicular to the loading or unloading direction, thereby ensuring that the two chains 6221 rotate synchronously. It can be understood that the chain 6221 in the foregoing embodiment only plays a role of driving and carrying goods. In another embodiment of the present disclosure, a belt, a timing belt, or the like, are used to replace the chain.

In another embodiment, as shown in FIG. 10, FIG. 11, FIG. 14, and FIG. 15, each of the plurality of loading or unloading mechanisms 620 includes a loading or unloading cross arm 625 and a push-pull assembly 626, one ends of a plurality of loading or unloading cross arms 625 are arranged on the upright frame 610 at intervals along the vertical direction, and the push-pull assembly 626 is rotatably arranged at other ends corresponding to the plurality of loading or unloading cross arms 625. When rotating, the push-pull assembly 626 includes a push-pull position and an avoidance position, and when rotating to the push-pull position, push-pull assembly 626 conveys the goods 200 to the transport robot 100 or pulls down the goods 200 on the transport robot 100. When the push-pull assembly 626 rotates to the avoidance position, the push-pull assembly 626 avoids the goods 200. It can be understood that when pushing or pulling the goods 200, the push-pull assembly 626 may push or pull a top portion, a middle portion, or a bottom portion of the goods 200. In an embodiment of the present disclosure, two loading or unloading assemblies 620 are arranged at intervals in a same horizontal direction of the upright frame 610, and two push-pull assemblies 626 in the same horizontal direction separately rotate to the push-pull position or the avoidance position. The two push-pull assemblies 626 in the same horizontal direction respectively drive two sides of the goods 200 along the loading or unloading direction. The two push-pull assemblies 626 push or pull the two sides of the goods 200 synchronously, which can effectively ensure the stability of a push-pull process of the goods 200. Further, the two push-pull assemblies 626 in the same horizontal direction push/pull two sides of the middle portion of the goods 200 synchronously along the loading or unloading direction. It can be understood that the two push-pull assemblies 626 in the same horizontal direction rotate to the push-pull position or the avoidance position synchronously, or rotate to the push-pull position or the avoidance position successively. In another embodiment of the present disclosure, only one loading or unloading mechanism 620 is arranged in a same height direction of the upright frame 610, and the one loading or unloading mechanism 620 pushes or pulls the top portion or the bottom portion of the goods 200 when pushing or pulling the goods 200.

Figure 14:
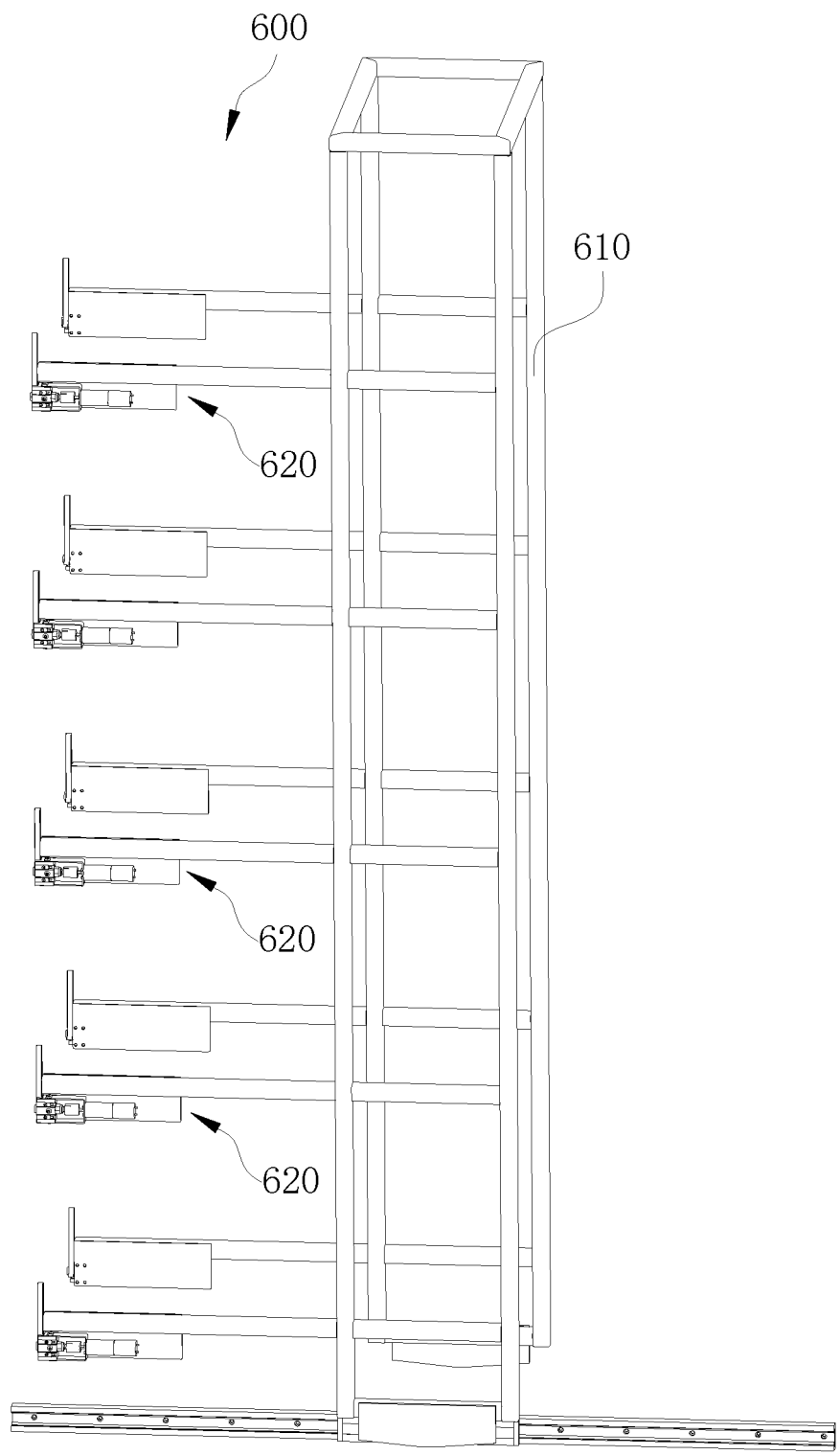
FIG. 14 is a three-dimensional view of a loading or unloading apparatus in another implementation of the transport system shown in FIG. 11.
Figure 15:
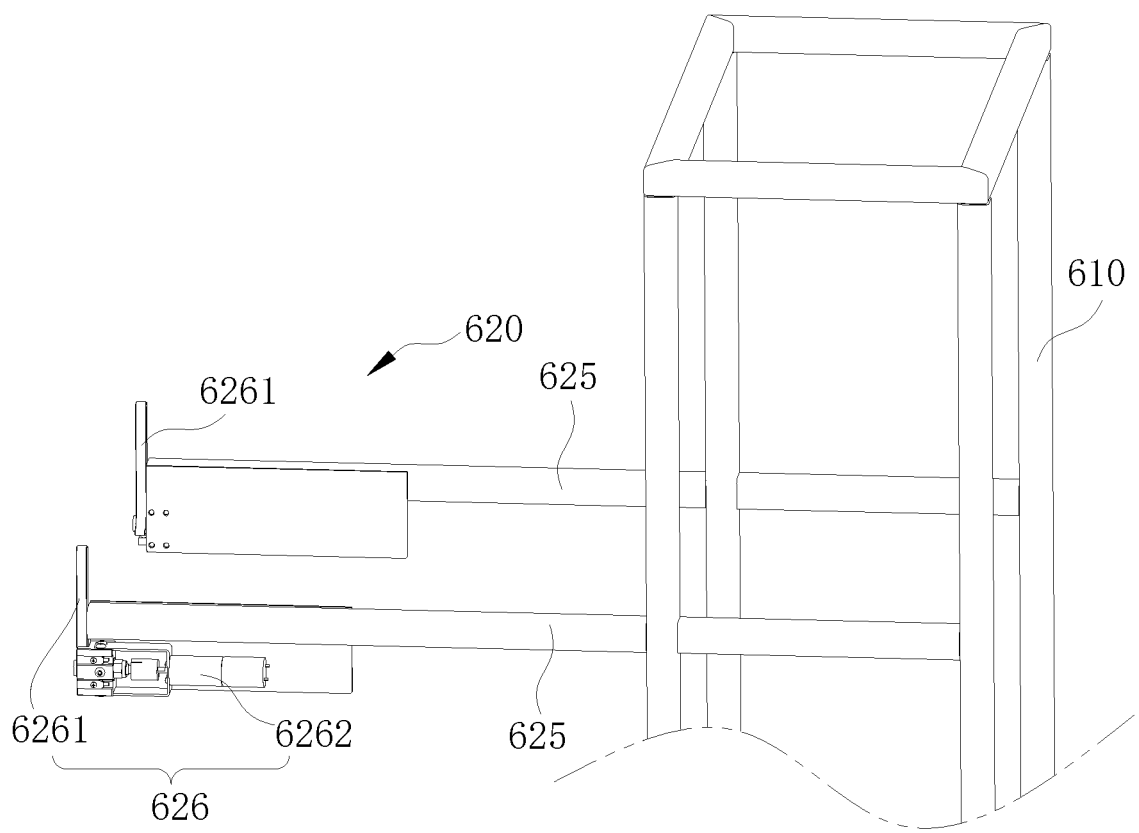
FIG. 15 is a partial schematic view of the loading or unloading apparatus shown in FIG. 14.

In an implementation, as shown in FIG. 14 and FIG. 15, the push-pull assembly 626 includes a push-pull rod 6261 and a push-pull motor 6262, the push-pull motor 6262 is arranged at one ends of the plurality of loading or unloading cross arms 625 away from the upright frame 610, the push-pull rod 6261 is arranged on an output shaft of the push-pull motor 6262, and the push-pull motor 6262 is configured to drive the push-pull rod 6261 to rotate to the push-pull position or the avoidance position. Two push-pull rods 6261 may separately be rotated to the push-pull position under the driving of the push-pull motor 6262, so as to pull the goods 200 out of the transport robot 100 or push the goods 200 to the transport robot 100. It can be understood that the function of the push-pull motor 6262 is to drive the push-pull rod 6261 to rotate, and the push-pull rod 6261 is directly arranged on the output shaft of the push-pull motor 6262, or the push-pull rod 6261 is connected to the output shaft of the push-pull motor 6262 through a transmission mechanism, as long as the push-pull motor 6262 can drive the push-pull rod 6261 to rotate to the push-pull position or the avoidance position.

Figure 16:
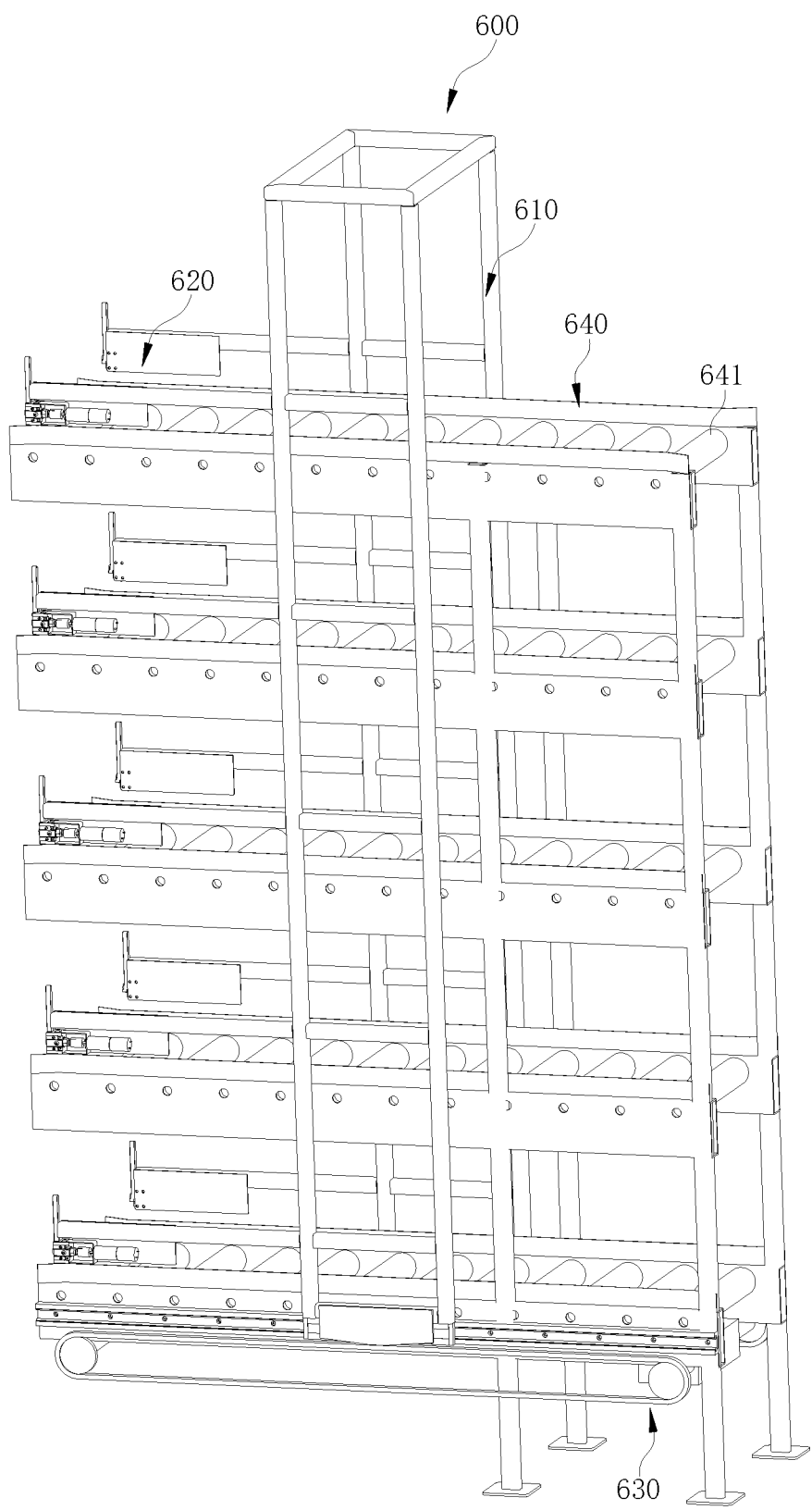
FIG. 16 is a three-dimensional view of a loading or unloading apparatus provided in still another implementation of the present disclosure.

In an embodiment, all loading or unloading mechanisms 620 in the loading or unloading apparatus 600 act synchronously to convey, at different heights, the goods 200 to the transport robot 100 or unload the goods 200 on the transport robot 100, or some of the plurality of loading or unloading mechanisms 620 in the loading or unloading apparatus 600 act independently to convey, at specified heights, the goods 200 to the transport robot 100 or unload the goods 200 on the transport robot 100. As shown in FIG. 16 and FIG. 17, in an implementation, the loading or unloading apparatus 600 further includes an adjustment drive mechanism 630 configured to drive the upright frame 610 to approach or move away from the transport robot 100 along the loading or unloading direction, and when the adjustment drive mechanism 630 drives the upright frame 610 to approach or move away from the transport robot 100, the plurality of loading or unloading mechanisms 620 convey the goods 200 to the transport robot 100 or unload the goods 200 on the transport robot 100. The loading or unloading apparatus 600 provided in this embodiment can remove all the goods 200 or specified goods 200 on the transport robot 100 at one time, or simultaneously convey a plurality of goods 200 to the transport robot 100. In an implementation, the adjustment drive mechanism 630 adopts a driving structure in the form of a motor and a belt.

In an embodiment of the present disclosure, the loading or unloading apparatus 600 further includes a temporary storage shelving unit 640, the upright frame 610 is movably arranged on the temporary storage shelving unit 640 along a horizontal direction, and the adjustment drive mechanism 630 is configured to drive the upright frame 610 to move relative to the temporary storage shelving unit 640 along the horizontal direction. The temporary storage shelving unit 640 includes a shelving unit with a plurality of layers along the vertical direction, and the plurality of loading or unloading mechanisms 620 are configured to pull goods 200 at different heights on the transport robot 100 to corresponding layers of the shelving unit on the temporary storage shelving unit 640, or the plurality of loading or unloading mechanisms 620 are configured to push goods 200 on the plurality of layers of the shelving unit to the transport robot 100. The temporary storage shelving unit 640 can temporarily store the goods 200 unloaded from the transport robot 100 by the loading or unloading apparatus 600, or temporarily store the to-be-transported goods 200 which are transported to the transport robot 100. In an implementation, the temporary storage shelving unit 640 includes a temporary storage roller 641 with a plurality of layers arranged along the vertical direction, and each layer of the temporary storage roller 641 is capable of individually transporting the goods 200 along the loading or unloading direction. Optionally, each layer of the temporary storage roller 641 can simultaneously carry a plurality of goods 200.

In an embodiment, the loading or unloading apparatus 600 further includes a movable base arranged at a bottom portion of the upright frame 610. The loading or unloading apparatus 600 further includes a movable base arranged at the bottom portion of the upright frame 610. The movable base can drive the loading or unloading apparatus 600 to move, which greatly improves the adaptability of the loading or unloading apparatus 600 to actual working conditions. In this way, the loading or unloading apparatus 600 can easily move to the loading position, the unloading position, or any other position, to work with the transport robot 100. Optionally, a structure of the base is exactly the same as that of the chassis 160 of the transport robot 100, and details are not described herein again.

Referring to FIG. 9 and FIG. 11, in an embodiment, the transport system further includes a conveying apparatus 500 and a lifting apparatus 400 that is arranged between the loading or unloading apparatus 600 and the conveying apparatus 500, and the lifting apparatus 400 is configured to ascend or descend along the vertical direction, so as to be docked with each of the plurality of loading or unloading mechanisms 620 and the conveying apparatus 500. The lifting apparatus 400 is capable of receiving and picking the goods 200 of the plurality of loading or unloading mechanisms 620 and transferring the goods to the conveying apparatus 500; or the lifting apparatus 400 is capable of receiving and picking goods 200 of the conveying apparatus 500 and transferring the goods to the plurality of loading or unloading mechanisms 620.

The lifting apparatus 400 is configured to receive and pick the goods 200 of the plurality of loading or unloading mechanisms 620 or transport the goods 200 to the plurality of loading or unloading mechanisms 620. Because the plurality of loading or unloading mechanisms 620 are arranged at intervals along the vertical direction, to facilitate the goods loading or unloading of the loading or unloading apparatus 600, the lifting apparatus 400 needs to move to a loading or unloading mechanism 620 at a corresponding position, so as to perform a corresponding operation. The conveying apparatus 500 is configured to convey the goods 200, may transport away goods 200 unloaded by the lifting apparatus 400, and may also transport to-be-loaded goods 200 to the lifting apparatus 400. Optionally, the conveying apparatus 500 may be of a structure that can implement the horizontal transport, such as a conveyor belt structure, an assembly line, a conveying roller structure, or a roller structure, or the like. Exemplarily, the conveying apparatus 500 is of an assembly line structure, and specifically, when unloading, the lifting apparatus 400 ascends to one side of a loading or unloading mechanism 620, after receiving the goods 200 of the loading or unloading mechanism 620, the lifting apparatus 400 descends, and transfers the goods 200 to the conveying apparatus 500, and the goods are transported away by the conveying apparatus 500. Subsequently, the lifting apparatus 400 further ascends to another loading or unloading mechanism 620, and this process is repeated until all the goods 200 on the plurality of loading or unloading mechanisms 620 are transported away. When loading, after the lifting apparatus 400 descends and receives and picks the goods 200 conveyed by the conveying apparatus 500, the lifting apparatus 400 ascends to one side of a loading or unloading mechanism 620 and transfers the goods 200 to the loading or unloading mechanism 620; and subsequently, the lifting apparatus 400 further descends to the conveying apparatus 500, and this process is repeated until the plurality of loading or unloading mechanisms 620 are loaded with the goods 200.

In an embodiment, the lifting apparatus 400 includes a lifting frame 410 along the vertical direction, a moving mechanism 420 arranged on the lifting frame 410, and a transfer mechanism 430 with at least one layer arranged on the moving mechanism 420, and the moving mechanism 420 may ascend or descend along the lifting frame 410 and drive the transfer mechanism 430 with at least one layer to move, so as to receive and pick or transfer the goods 200 to the plurality of loading or unloading mechanisms 620. The lifting frame 410 has a bearing function, and is configured to bear the moving mechanism 420 and the transfer mechanism 430 with at least one layer. Optionally, a bottom portion of the lifting frame 410 may also be provided with rotating wheels, so as to adapt to different applications. The transfer mechanism 430 with at least one layer is configured to carry the goods 200 and implement the transfer of the goods 200 between a high position such as a loading or unloading mechanism 620 and a low position such as the conveying apparatus 500. The moving mechanism 420 is arranged on the lifting frame 410 along the vertical direction, and may output movement in the vertical direction, so as to drive the transfer mechanism 430 with at least one layer to ascend or descend.

It can be understood that the moving mechanism 420 is configured to implement the ascending or descending motion of the transfer mechanism 430 with at least one layer along the vertical direction. A specific structure of the moving mechanism 420 may be a telescopic rod structure, a chain transmission structure, a driving transmission structure, or the like, and may also be another structure capable of enabling the carrying mechanism 150 to ascend or descend. Exemplarily, a specific structure of the moving mechanism 420 is the same as a structure of the lifting mechanism 140 of the transport robot 100, and details are not described herein again. Certainly, the specific structure of the moving mechanism 420 may also be different from the structure of the lifting mechanism 140 of the transport robot 100, as long as the moving mechanism 420 can implement the ascending or descending motion.

Exemplarily, there is a transfer mechanism 430 with one layer, and the transfer mechanism 430 with one layer receives and picks goods 200 from one loading or unloading mechanism 620 at one time, or transfers goods 200 to one loading or unloading mechanism 620 at one time. Certainly, in another implementation of the present disclosure, in a case that there is a transfer mechanism 430 with at least two layers, the transfer mechanism 430 with at least two layers may remove goods 200 of at least two loading or unloading mechanisms 620 at one time, or transfer goods 200 to at least two loading or unloading mechanisms 620, so as to improve the efficiency of turnover of the goods 200.

In an embodiment, the transfer mechanism 430 with at least one layer includes a transfer base 431 arranged on the moving mechanism 420 and a transfer portion 432 movably arranged on the transfer base 431, and the transfer portion 432 may drive the goods 200 to move, and may receive and pick or transfer the goods 200 to at least one of the plurality of loading or unloading mechanisms 620. The transfer base 431 plays a bearing role and is configured to carry the transfer portion 432, so as to mount the transfer portion 432 on the moving mechanism 420. When the moving mechanism 420 ascends or descends, the transfer base 431 may drive the transfer portion 432 to ascend or descend synchronously, so as to implement the loading or unloading of the goods 200.

Optionally, the transfer portion 432 is of a structure that can implement horizontal transport, such as a conveyor belt structure, an assembly line, a conveyor roller structure, a roller structure, or the like. Exemplarily, the transfer portion 432 is of a rolling shaft structure, and specifically includes a plurality of rolling shafts, and each of the plurality of rolling shafts includes a built-in rolling motor to drive the each of the plurality of rolling shafts to rotate, thereby implementing the transport of the goods 200. It should be noted that, there are various structures that can implement the horizontal transport of the goods 200, which cannot all be listed herein, and the transfer portion 432 in the present disclosure is not limited to being implemented by the foregoing specific structures.

The transfer portion 432 may receive and pick the goods 200 of one loading or unloading mechanism 620 at one time, as mentioned above. The transfer portion 432 may also receive and pick the goods 200 of a plurality of loading or unloading mechanisms 620 at one time, and the moving mechanism 420 may receive and pick the goods 200 of the plurality of loading or unloading mechanisms 620 layer by layer, and then convey the goods to the conveying apparatus 500 together for transport after receiving and picking the goods. Exemplarily, the moving mechanism 420 drives the transfer portion 432 to ascend to a top portion. After receiving and picking goods 200 of one loading or unloading mechanism 620, the transfer portion 432 descends one layer to receive and pick goods 200 of one loading or unloading mechanism 620. After the transfer portion 432 is full or the goods 200 of the plurality of loading or unloading mechanisms 620 are received, the moving mechanism 420 drives the transfer portion 432 to descend to a position of the conveying apparatus 500, and the transfer portion 432 transfers all the goods 200 thereon to the conveying apparatus 500. Certainly, the moving mechanism 420 may move layer by layer from bottom to top, a principle thereof is substantially the same as a principle from top to bottom, and details are not described herein again.

Certainly, the transfer portion 432 may also receive and pick a plurality of goods 200 transferred by the conveying apparatus 500 at one time, and then transfer the goods to the plurality of loading or unloading mechanisms 620 layer by layer, a principle thereof is substantially the same as the foregoing principle of goods unloading, and details are not described herein again.

In an embodiment, the transport system further includes a control center, components of the transport system perform a coordinated action under the control of the control center, and the control center of the transport system maintains a communication connection with an external server. The control center may identify information of the to-be-transported goods 200, and the control center may obtain information of a loading position and an unloading position corresponding to each piece of the to-be-transported goods 200. The control center coordinates and controls the components according to the obtained information, so as to efficiently complete the transport of the goods 200.

In the transport robot 100 and the transport system in this embodiment, when transporting goods, a blocking mechanism 170 moves to a blocking position and may be in abutment with goods 200 in a plurality of storage assemblies 121, so as to restrict the goods 200 from sliding out of the plurality of storage assemblies 121. Therefore, the goods 200 are prevented from sliding out of the plurality of storage assemblies 121 during a transport process of the transport robot 100, the safety of the goods 200 is ensured, a risk of sliding out is avoided, and the transport efficiency is improved. In addition, when the transport robot 100 loads or unloads goods, the blocking mechanism 170 moves to an avoidance position. At this time, goods 200 may be loaded into the plurality of storage assemblies 121, and the goods 200 in the plurality of storage assemblies 121 may also be removed, which does not hinder a loading or unloading operation of the transport robot 100, and is convenient for use.

Based on the transport robot 100 of the foregoing two embodiments, the present disclosure further provides a transport method of the transport robot 100, which is applicable to the transport robot 100 in the foregoing two embodiments. The transport method includes the following operations:
  a controller receives a first loading or unloading instruction;
  the controller controls the transport robot 100 to move to a first loading or unloading position according to the first loading or unloading instruction;
  in a case that the controller confirms that the first loading or unloading position is a loading position, the controller controls a carrying mechanism 150 to transfer goods 200 to the plurality of storage assemblies 121 of a storage mechanism 120; and
  in a case that the controller confirms that the first loading or unloading position is an unloading position, the controller controls the transport robot 100 to unload goods at the unloading position.

Components of the transport robot 100 perform a coordinated action under the control of the controller, and the controller of the transport robot 100 maintains a communication connection with a control center of the transport system or an external server. The transport robot 100 may identify information of to-be-transported goods 200, and the transport robot 100 may obtain information of a loading position and an unloading position corresponding to each piece of the to-be-transported goods 200. The transport robot 100 coordinates and controls the components according to the obtained information, so as to efficiently complete the transport of the goods 200. Optionally, the controller includes, but is not limited to, a CPU, and may also be another component that can implement control.

When loading or unloading is required, the controller receives the first loading or unloading instruction, and then the controller controls, according to the first loading or unloading instruction, the transport robot 100 to move, so that the transport robot 100 moves at the first loading or unloading position. The first loading or unloading position includes a loading position and an unloading position, the loading position is defined as a position at which a shelving unit is located, and the unloading position is at which a plurality of transport mechanisms 320 or a plurality of loading or unloading mechanisms 620 are located. It can be understood that the loading position and the unloading position may be interchanged, that is, the transport robot 100 may load at the unloading position and unload at the loading position.

Generally, the transport robot 100 may be loaded by the carrying mechanism 150 at the loading position, and unloaded by the plurality of transport mechanisms 320 or the plurality of loading or unloading mechanisms 620 at the unloading position. After the controller controls, according to the first loading or unloading instruction, the transport robot 100 to move to the loading position, the controller may control the lifting mechanism 140 to drive the carrying mechanism 150 to ascend or descend, so that the carrying mechanism 150 can pick goods on the shelving unit. Then, the lifting mechanism 140 drives the carrying mechanism 150 to ascend or descend, so as to transfer the goods 200 in the carrying mechanism 150 to the plurality of storage assemblies 121, and implement the loading of the goods 200. This process is repeated until the plurality of storage assemblies 121 store the goods 200. After the controller moves from the loading position to the unloading position according to the first unloading instruction, the controller controls the plurality of transport mechanisms 320 or the plurality of loading or unloading mechanisms 620 to receive and pick the goods 200 in the plurality of storage assemblies 121, so as to implement the unloading of the goods 200.

Certainly, the loading or unloading process may also be performed in a reverse direction, that is, the transport robot 100 is loaded at the unloading position by the plurality of transport mechanisms 320 or the plurality of loading or unloading mechanisms 620 at the unloading position, and is unloaded by the carrying mechanism 150 at the loading position. After the controller controls, according to the first loading or unloading instruction, the transport robot 100 to move to the unloading position, the controller controls the plurality of transport mechanisms 320 or the plurality of loading or unloading mechanisms 620 to transfer the goods 200 thereon to corresponding storage assemblies 121, so as to implement the loading of the goods 200. After the transport robot 100 is filled with the goods 200, the controller moves from the unloading position to the loading position according to the first unloading instruction, the controller may control the lifting mechanism 140 to drive the carrying mechanism 150 to ascend or descend, so that the carrying mechanism 150 can pick goods in the plurality of storage assemblies 121, and then the lifting mechanism 140 drives the carrying mechanism 150 to ascend or descend, so as to remove the goods 200 in the carrying mechanism 150. This process is repeated until the goods 200 of the plurality of storage assemblies 121 are taken away, and the unloading of the goods 200 is implemented.

It is worth noting that after controlling the transport robot 100 to move to the first loading or unloading position, the controller needs to determine whether the first loading or unloading position is the loading position or the unloading position. For example, in a case that there are no goods 200 in the transport robot 100, after the transport robot 100 moves to the first loading or unloading position, in a case that the first loading or unloading position is the loading position, the carrying mechanism 150 loads the goods into the plurality of storage assemblies 121 in this case; and in a case that there are goods 200 in the transport robot 100, after the transport robot 100 moves to the first loading or unloading position, in a case that the first loading or unloading position is the unloading position, the plurality of transport mechanisms 320 or the plurality of loading or unloading mechanisms 620 unload the goods in this case.

In this embodiment described above, the transport method can implement the automatic transport of the goods 200, so that a problem of high cost and low efficiency in a current transport method is effectively resolved, the cost of the loading or unloading of the goods 200 is reduced, and the efficiency of the loading or unloading of the goods 200 is greatly improved. In addition, the carrying mechanism 150 moves to different heights under the driving of the lifting mechanism 140, so that the to-be-transported goods 200 can be delivered to a plurality of storage assemblies 121 at different heights in the storage mechanism 120, which has strong versatility and reduces the floor space.

In an embodiment, when the transport robot 100 is unloading, a plurality of storage assemblies 121 are capable of moving synchronously to perform a synchronous unloading action, and the first loading or unloading instruction includes a first unloading instruction; and that the controller controls the transport robot 100 to unload goods at the unloading position includes the following operation:

the controller receives the first unloading instruction, and the controller controls, according to the first unloading instruction, at least two of the plurality of storage assemblies 121 to simultaneously unload goods.

In a case that the transport robot 100 is the transport robot 100 in the first embodiment, the plurality of storage assemblies 121 in the transport robot 100 can implement synchronous unloading. Specifically, in a case that the first loading or unloading instruction received by the controller is the first unloading instruction, the controller controls, according to the first unloading instruction, the transport robot 100 to move from the loading position to the unloading position. The unloading position in this case corresponds to the auxiliary apparatus 300 of the transport system. In addition, the plurality of storage assemblies 121 are respectively docked with the plurality of transport mechanisms 320. When the controller controls at least two of the plurality of storage assemblies 121 to unload simultaneously, at least two of the plurality of transport mechanisms 320 corresponding to the at least two of the plurality of storage assemblies 121 may receive and pick the goods 200 removed from the at least two of the plurality of storage assemblies 121, so as to complete the unloading operation of the transport robot 100.

In an embodiment, when the transport robot 100 is loading, a plurality of storage assemblies 121 are capable of moving synchronously to perform a synchronous loading action, and the first loading or unloading instruction includes a first loading instruction; and that the controller controls the transport robot 100 to load goods at the loading position includes the following operation:

the controller receives the first loading instruction, and the controller controls, according to the first loading instruction, the auxiliary apparatus 300 to simultaneously load goods to at least two of the plurality of storage assemblies 121.

In a case that the transport robot 100 is the transport robot 100 in the first embodiment, the plurality of storage assemblies 121 in the transport robot 100 can implement synchronous loading. In a case that the transport robot 100 needs to load goods, a loading operation is performed by the auxiliary apparatus 300. Specifically, in a case that the first loading or unloading instruction received by the controller is the first loading instruction, the controller controls, according to the first loading instruction, the transport robot 100 to move from the unloading position to the loading position. In this case, the loading position is opposite to that in the foregoing embodiments, and the unloading position is opposite to that in the foregoing embodiments. It indicates that the loading position in this case corresponds to the auxiliary apparatus 300 of the transport system. In addition, the plurality of storage assemblies 121 are respectively docked with the plurality of transport mechanisms 320. The controller controls a plurality of transport mechanisms 320 of the auxiliary apparatus 300 to move goods into a plurality of storage assemblies 121 at corresponding positions, so that the synchronous loading of the plurality of storage assemblies 121 is implemented, and the loading operation of the transport robot 100 is completed.

In an embodiment, the transport robot 100 includes a linkage mechanism 130 electrically connected to the controller, and that the controller controls, according to the first unloading instruction, at least two of the plurality of storage assemblies 121 to simultaneously unload goods includes the following operation:

the controller controls, according to the first unloading instruction, the linkage mechanism 130 to drive the at least two of the plurality of storage assemblies 121 to simultaneously move.

The controller is electrically connected to the linkage mechanism 130, and is further electrically connected to a linkage driving member 132 of the linkage mechanism 130. The controller may control the movement of the linkage driving member 132, so that the linkage mechanism 130 can drive the at least two of the plurality of storage assemblies 121 to move synchronously to perform an unloading action. It can be understood that, after the controller receives the first unloading instruction, and after the plurality of storage assemblies 121 of the transport robot 100 are docked with the plurality of transport mechanisms 320 of the auxiliary apparatus 300, the controller controls, through the linkage driving member 132, the linkage mechanism 130 to drive the at least two of the plurality of storage assemblies 121 to be lifted up synchronously, so that the goods 200 in the plurality of storage assemblies 121 slide out of the plurality of storage assemblies 121 and move to corresponding transport mechanisms 320, and an unloading operation of the transport robot 100 is completed.

In an embodiment, the transport robot 100 further includes a blocking mechanism 170 electrically connected to the controller and capable of switching between a blocking position and an avoidance position, and the first loading or unloading instruction includes a first unloading instruction; and that the controller controls the transport robot 100 to unload goods at the unloading position further includes the following operation:

the controller receives the first unloading instruction, and the controller controls, according to the first unloading instruction, the blocking mechanism 170 to move to the avoidance position, so that the plurality of storage assemblies 121 are in an unloadable state.

In a case that the transport robot 100 is the transport robot 100 in the second embodiment, the transport robot 100 may block the goods 200 in the plurality of storage assemblies 121, to prevent the goods 200 from sliding out of the plurality of storage assemblies 121 during a process of transporting the goods 200 by the transport robot 100, so as to protect the goods 200 in the plurality of storage assemblies 121 and prevent the goods 200 from being damaged. Specifically, the transport robot 100 of the present disclosure blocks the goods 200 in the plurality of storage assemblies 121 by the blocking mechanism 170 at the blocking position during a transport process. When unloading is required, the blocking mechanism 170 moves from the blocking position to the avoidance position, and at this time, the loading or unloading apparatus 600 may perform an unloading operation on the plurality of storage assemblies 121.

Because a structure and a working principle of the blocking mechanism 170 have been described in detail in the second embodiment, details are not described herein again, and the description herein is only from a perspective of a control method. Specifically, after the controller receives the first unloading instruction, the controller controls, according to the first unloading instruction, the transport robot 100 to move to the unloading position. Subsequently, the controller controls the blocking mechanism 170 to move from the blocking position to the avoidance position, the blocking mechanism 170 no longer blocks the goods 200 in the plurality of storage assemblies 121, and the goods 200 in the plurality of storage assemblies 121 may be moved out and are in the unloadable state, which is specifically implemented by the plurality of loading or unloading mechanisms 620 of the loading or unloading apparatus 600. Specifically, the transport robot 100 is at the unloading position. At this time, the transport robot 100 approaches the loading or unloading apparatus 600, and the plurality of storage assemblies 121 are respectively docked with the plurality of loading or unloading mechanisms 620. Subsequently, the controller controls the blocking mechanism 170 to move from the blocking position to the avoidance position, the blocking mechanism 170 no longer blocks the goods 200 in the plurality of storage assemblies 121, and the plurality of loading or unloading mechanisms 620 may extend into the plurality of storage assemblies 121, and receive and pick and remove the goods 200 in the plurality of storage assemblies 121, so that the unloading operation of the transport robot 100 is performed.

In an embodiment, the transport robot 100 further includes a blocking mechanism 170 electrically connected to the controller and capable of switching between a blocking position and an avoidance position, and the first loading or unloading instruction includes a first loading instruction; and the transport method further includes the following operation:

the controller receives the first loading instruction, and the controller controls, according to the first loading instruction, the blocking mechanism 170 to move to the avoidance position, so that the plurality of storage assemblies 121 are in a loadable state.

In a case that the transport robot 100 is the transport robot 100 in the second embodiment, the transport robot 100 may block the goods 200 in the plurality of storage assemblies 121, to prevent the goods 200 from sliding out of the plurality of storage assemblies 121 during a process of transporting the goods 200 by the transport robot 100, so as to protect the goods 200 in the plurality of storage assemblies 121 and prevent the goods 200 from being damaged. Specifically, during a loading process of the transport robot 100 of the present disclosure, the blocking mechanism 170 moves from the blocking position to the avoidance position. At this time, the plurality of loading or unloading mechanisms 620 may perform a loading operation on the plurality of storage assemblies 121. Specifically, the to-be-transported goods 200 are placed on the plurality of loading or unloading mechanisms 620, and then the blocking mechanism 170 moves from the blocking position to the avoidance position, so that the plurality of loading or unloading mechanisms 620 can extend into the plurality of storage assemblies 121. Subsequently, the goods 200 are placed in the plurality of storage assemblies 121 by the plurality of loading or unloading mechanisms 620 and then removed from the plurality of storage assemblies 121.

In an embodiment, the blocking mechanism 170 includes a plurality of blocking assemblies 172 respectively corresponding to a plurality of storage assemblies 121, and that the controller controls, according to the first unloading instruction, the blocking mechanism 170 to move to the avoidance position includes the following operation:

the controller controls, according to the first unloading instruction, a blocking assembly 172 at a specified position to move to a corresponding avoidance position, so that a storage assembly 121 at the specified position is in the unloadable state; or the controller controls, according to the first unloading instruction, the plurality of blocking assemblies 172 to respectively move into corresponding avoidance positions, so that at least two of the plurality of storage assemblies 121 are in the unloadable state.

The controller is electrically connected to the blocking mechanism 170, and is further electrically connected to a blocking driving member of the blocking mechanism 170. The controller may control the movement of the blocking driving member, thereby causing at least one of the plurality of blocking assemblies 172 in the blocking mechanism 170 to move. It can be understood that in a case that the controller controls the movement of one or more specified blocking assemblies 172 in the blocking mechanism 170, blocking assemblies 172 at storage assemblies 121 corresponding to the one or more specified blocking assemblies 172 move from the blocking position to the avoidance position, so that the storage assemblies 121 corresponding to the one or more specified blocking assemblies 172 are in the unloadable state. In this case, the plurality of loading or unloading mechanisms 620 may receive and pick the goods 200 in the storage assemblies 121 corresponding to the one or more specified blocking assemblies 172. Certainly, the controller may also control all blocking assemblies 172 in the blocking mechanism 170 to move from the blocking position to the avoidance position, so that the plurality of storage assemblies 121 are in the unloadable state. In this case, the plurality of loading or unloading mechanisms 620 may receive and pick the goods 200 in corresponding storage assemblies 121.

In an embodiment, the plurality of storage assemblies 121 include a loading or unloading end 1215 configured to load or unload the goods 200, and the transport method further includes the following operation:

after the controller receives the first unloading instruction, the controller controls the carrying mechanism 150 to avoid the loading or unloading end 1215.

That is, after the controller receives the first unloading instruction, the controller controls the carrying mechanism 150 to move to a specified position, so that the carrying mechanism 150 moves away from the loading or unloading end, so as to avoid the loading or unloading of the goods 200 by the plurality of transport mechanisms 320 or the plurality of loading or unloading mechanisms 620. It can be understood that the loading or unloading end 1215 is an opening used for loading or unloading the goods 200, a specific form thereof has been mentioned above, and details are not described herein again. In a case that the plurality of transport mechanisms 320 or the plurality of loading or unloading mechanisms 620 are configured to unload goods, the carrying mechanism 150 needs to avoid the plurality of transport mechanisms 320 or the plurality of loading or unloading mechanisms 620, so as to avoid interference. Specifically, the controller may control the carrying mechanism 150 to move to a specified position. The specified position herein may be a topmost position of the transport robot 100 or a position higher than the plurality of transport mechanisms 320 and the plurality of loading or unloading mechanisms 620, or may be a position different from the loading or unloading end 1215.

Specifically, in a case that the loading or unloading end 1215 is arranged on a same side as the carrying mechanism 150, the controller may control the carrying mechanism 150 to ascend to a top end of the transport robot 100, and may also control the carrying mechanism 150 to ascend to a position higher than the plurality of transport mechanisms 320 or the plurality of loading or unloading mechanisms 620 or to move to an other side of the vertical frame 110, so that the loading or unloading end 1215 is arranged away from the carrying mechanism 150. In this way, the carrying mechanism 150 can move away from the loading or unloading end 1215, and the interference between the carrying mechanism 150 and the plurality of transport mechanisms 320 or the plurality of loading or unloading mechanisms 620 at the loading or unloading end 1215 can be avoided. In a case that the loading or unloading end 1215 and the carrying mechanism 150 are arranged on opposite sides, the carrying mechanism 150 does not block the loading or unloading end 1215, and in this case, the carrying mechanism 150 may move to a specified position or may not move, as long as the loading or unloading is not affected.

In an embodiment, the plurality of storage assemblies 121 include a loading or unloading end 1215 configured to load or unload the goods 200, and the transport method further includes the following operation:

after the controller receives the first loading instruction, the controller controls the carrying mechanism 150 to avoid the loading or unloading end 1215.

It can be understood that, whether loading or unloading from the loading or unloading end 1215, the controller needs to control the carrying mechanism 150 to avoid the loading or unloading end 1215, so as to avoid interference between the carrying mechanism 150 and the plurality of transport mechanisms 320 or the plurality of loading or unloading mechanisms 620 at the loading or unloading end 1215. An avoidance principle is the same as that in the foregoing embodiments, and details are not described herein again. Exemplarily, when loading or unloading the goods 200 from one end close to the carrying mechanism 150, the carrying mechanism 150 first ascend to a highest position, thereby leaving a space for the transport robot 100 to be docked with the auxiliary apparatus 300 or the loading or unloading apparatus 600.

Based on the transport system of the foregoing two embodiments, the present disclosure further provides a transport method of the transport system, which is applicable to the transport system in the foregoing two embodiments. The transport method includes the following operations:

a control center receives a second loading or unloading instruction;

the control center controls the transport robot 100 to move to a second loading or unloading position according to the second loading or unloading instruction; and the control center confirms that the second loading or unloading position is a loading position or an unloading position, and controls the transport robot 100 to perform a loading or unloading operation.

Components of the transport system perform a coordinated action under the control of the control center, and the control center of the transport system maintains a communication connection with an external server. The control center may identify information of the to-be-transported goods 200, and the control center may obtain information of a loading position and an unloading position corresponding to each piece of the to-be-transported goods 200. The control center coordinates and controls the components according to the obtained information, so as to efficiently complete the transport of the goods 200.

When loading or unloading is required, the control center receives the second loading or unloading instruction, and then the control center controls, according to the second loading or unloading instruction, the transport robot 100 to move, so that the transport robot 100 moves at the second loading or unloading position. The second loading or unloading position also includes a loading position and an unloading position, which is substantially the same as the first loading or unloading position, and is only used for distinction. It can be understood that the loading position and the unloading position may be interchanged, that is, the transport robot 100 may load at the unloading position and unload at the loading position.

Generally, the transport robot 100 may be loaded by the carrying mechanism 150 at the loading position, and unloaded by the plurality of transport mechanisms 320 or the plurality of loading or unloading mechanisms 620 at the unloading position. After the control center controls, according to the second loading or unloading instruction, the transport robot 100 to move to the loading position, the control center may control the lifting mechanism 140 to drive the carrying mechanism 150 to ascend or descend, so that the carrying mechanism 150 can pick goods on a shelving unit. Then, the lifting mechanism 140 drives the carrying mechanism 150 to ascend or descend, so as to transfer the goods 200 in the carrying mechanism 150 to the plurality of storage assemblies 121, and implement the loading of the goods 200. This process is repeated until the plurality of storage assemblies 121 store the goods 200. After the control center moves from the loading position to the unloading position according to the second unloading instruction, the plurality of transport mechanisms 320 or the plurality of loading or unloading mechanisms 620 may receive and pick the goods 200 in the plurality of storage assemblies 121, so as to implement the unloading of the goods 200.

Certainly, the loading or unloading process may also be performed in a reverse direction, that is, the transport robot 100 is loaded at the unloading position by the plurality of transport mechanisms 320 or the plurality of loading or unloading mechanisms 620 at the unloading position, and is unloaded by the carrying mechanism 150 at the loading position. After the control center controls, according to the second loading or unloading instruction, the transport robot 100 to move to the unloading position, the plurality of transport mechanisms 320 or the plurality of loading or unloading mechanisms 620 may transfer the goods 200 thereon to corresponding storage assemblies 121, so as to implement the loading of the goods 200. After the transport robot 100 is filled with the goods 200, the control center moves from the unloading position to the loading position according to the second unloading instruction, the control center may control the lifting mechanism 140 to drive the carrying mechanism 150 to ascend or descend, so that the carrying mechanism 150 can pick the goods in the plurality of storage assemblies 121, and then the lifting mechanism 140 drives the carrying mechanism 150 to ascend or descend, so as to remove the goods 200 in the carrying mechanism 150. This process is repeated until the goods 200 of the plurality of storage assemblies 121 are taken away, and the unloading of the goods 200 is implemented.

It is worth noting that after controlling the transport robot 100 to move to the second loading or unloading position, the control center needs to determine whether the second loading or unloading position is the loading position or the unloading position. For example, in a case that there are no goods 200 in the transport robot 100, after the transport robot 100 moves to the second loading or unloading position, in a case that the second loading or unloading position is the loading position, the carrying mechanism 150 loads the goods into the plurality of storage assemblies 121 in this case; and in a case that there are goods 200 in the transport robot 100, after the transport robot 100 moves to the second loading or unloading position, in a case that the second loading or unloading position is the unloading position, the plurality of transport mechanisms 320 or the plurality of loading or unloading mechanisms 620 unload the goods in this case.

In this embodiment described above, the transport method can implement the automatic transport of the goods 200, so that a problem of high cost and low efficiency in a current transport method is effectively resolved, the cost of the loading or unloading of the goods 200 is reduced, and the efficiency of the loading or unloading of the goods 200 is greatly improved. In addition, the carrying mechanism 150 moves to different heights under the driving of the lifting mechanism 140, so that the to-be-transported goods 200 can be delivered to a plurality of storage assemblies 121 at different heights in the storage mechanism 120, which has strong versatility and reduces the floor space.

In an embodiment, that the control center confirms that the second loading or unloading position is a loading position or an unloading position, and controls the transport robot 100 to perform a loading or unloading operation includes the following operations:

the control center obtains goods information in the plurality of storage assemblies 121;

in a case that there are goods in the plurality of storage assemblies 121 and the control center confirms that the second loading or unloading position is the unloading position, the control center controls the transport robot 100 to unload goods at the unloading position; and in a case that there are no goods in the plurality of storage assemblies 121 and the control center confirms that the second loading or unloading position is the loading position, the control center controls the transport robot 100 to load goods at the loading position.

That is, whether the plurality of storage assemblies 121 perform the loading operation or the unloading operation is determined according to whether or not there are goods 200 therein. In a case that there are goods 200 in the plurality of storage assemblies 121, it indicates that the plurality of storage assemblies 121 do not need to be loaded but need to be unloaded. In this case, after the transport robot 100 moves to the second loading or unloading position, the second loading or unloading position is the unloading position. At this time, the control center may control the transport robot 100 to unload at the loading position. Specifically, the plurality of storage assemblies 121 correspond to the plurality of transport mechanisms 320 of the auxiliary apparatus 300, and the goods in the plurality of storage assemblies 121 may be unloaded to corresponding transport mechanisms 320 synchronously. In a case that there are no goods 200 in the plurality of storage assemblies 121, it indicates that the plurality of storage assemblies 121 do not need to be unloaded but need to be loaded. In this case, after the transport robot 100 moves to the second loading or unloading position, the second loading or unloading position is the loading position. At this time, the control center may control the transport robot 100 to load at the loading position. Specifically, the plurality of storage assemblies 121 correspond to the plurality of transport mechanisms 320 of the auxiliary apparatus 300, and the goods in the plurality of transport mechanisms 320 may be loaded to corresponding storage assemblies 121 synchronously.

In an embodiment, the second loading or unloading instruction includes a second loading instruction, and that the control center controls the transport robot to load goods at the loading position includes the following operations:

the control center receives the second loading instruction;

the control center controls the transport robot 100 to move to the second loading or unloading position according to the second loading instruction;

the control center confirms that the second loading or unloading position is a loading or unloading position, and the control center controls a carrying mechanism 150 to transfer goods 200 to storage assemblies 121 of a storage mechanism 120; and the control center confirms that the second loading or unloading position is an unloading position, and the control center controls at least one of the plurality of loading or unloading mechanisms 620 or at least one of the plurality of transport mechanisms 320 to transfer goods 200 to corresponding storage assemblies 121.

When the transport robot 100 is loading goods, the control center receives the second loading instruction. Optionally, the control center controls, according to the second loading instruction, the transport robot 100 to move to the loading position, and then the control center may control the lifting mechanism 140 to drive the carrying mechanism 150 to ascend or descend, so that the carrying mechanism 150 can pick goods on a shelving unit. Then, the lifting assembly drives the carrying mechanism 150 to ascend or descend, so as to transfer the goods 200 in the carrying mechanism 150 to the plurality of storage assemblies 121, and implement the loading of the goods 200. This process is repeated until the plurality of storage assemblies 121 store the goods 200. Further optionally, the control center controls, according to the second loading instruction, the transport robot 100 to move to the unloading position. After the plurality of storage assemblies 121 are docked with the plurality of transport mechanisms 320 or the plurality of loading or unloading mechanisms 620, the control center controls at least one of the plurality of transport mechanisms 320 or at least one of the plurality of loading or unloading mechanisms 620 to transfer the goods 200 thereon to corresponding storage assemblies 121. It can be understood that one or several transport mechanisms 320 or loading or unloading mechanisms 620 may be specified to perform a loading action, or all transport mechanisms 320 or loading or unloading mechanisms 620 may perform the loading action.

In an embodiment, when the transport robot 100 is unloading, a plurality of storage assemblies 121 are capable of moving synchronously to perform a synchronous unloading action, and the second loading or unloading instruction includes a second unloading instruction; the transport system further includes an auxiliary apparatus 300 comprising a plurality of transport mechanisms 320 arranged at intervals along a vertical direction; and that the control center controls the transport robot 100 to unload goods at the unloading position includes the following operations:

the control center receives the second unloading instruction;

the control center controls the transport robot 100 to move to the unloading position, and the plurality of storage assemblies 121 of the transport robot 100 respectively correspond to the plurality of transport mechanisms 320; and the control center controls at least two of the plurality of storage assemblies 121 to simultaneously unload, so that goods 200 in the at least two of the plurality of storage assemblies 121 can be transferred to corresponding transport mechanisms 320.

In a case that the transport system includes the transport robot 100 in the first embodiment, the plurality of storage assemblies 121 in the transport robot 100 can implement synchronous unloading. Specifically, in a case that the second loading or unloading instruction received by the control center is the second unloading instruction, the control center controls, according to the second unloading instruction, the transport robot 100 to move from the loading position to the unloading position. The unloading position in this case corresponds to the auxiliary apparatus 300 of the transport system. In addition, the plurality of storage assemblies 121 are respectively docked with the plurality of transport mechanisms 320. When the controller controls at least two of the plurality of storage assemblies 121 to unload simultaneously, at least two of the plurality of transport mechanisms 320 corresponding to the at least two of the plurality of storage assemblies 121 may receive and pick the goods 200 removed from the at least two of the plurality of storage assemblies 121, so as to complete the unloading operation of the transport robot 100.

In an embodiment, when the transport robot 100 is loading, a plurality of storage assemblies 121 are capable of moving synchronously to perform a synchronous loading action, and the second loading or unloading instruction includes a second loading instruction; the transport system further includes an auxiliary apparatus 300 including a plurality of transport mechanisms 320 arranged at intervals along a vertical direction; and that the control center controls the transport robot 100 to load goods at the loading position includes the following operations:

the control center receives the second loading instruction;

the control center controls the transport robot 100 to move to the loading position, and the plurality of storage assemblies 121 of the transport robot 100 respectively correspond to the plurality of transport mechanisms 320; and the control center controls at least two of the plurality of transport mechanisms 320 to simultaneously load goods to at least two of the plurality of storage assemblies 121.

In a case that the transport robot 100 is the transport robot 100 in the first embodiment, the plurality of storage assemblies 121 in the transport robot 100 can implement synchronous loading. In a case that the transport robot 100 needs to load goods, a loading operation is performed by the auxiliary apparatus 300. Specifically, in a case that the second loading or unloading instruction received by the controller is the second loading instruction, the controller controls, according the second loading instruction, the transport robot 100 to move from the unloading position to the loading position. In this case, the loading position is opposite to that in the foregoing embodiments, and the unloading position is opposite to that in the foregoing embodiments. It indicates that the loading position in this case corresponds to the auxiliary apparatus 300 of the transport system. In addition, the plurality of storage assemblies 121 are respectively docked with the plurality of transport mechanisms 320. The controller controls a plurality of transport mechanisms 320 of the auxiliary apparatus 300 to move goods into a plurality of storage assemblies 121 at corresponding positions, so that the synchronous loading of the plurality of storage assemblies 121 is implemented, and the loading operation of the transport robot 100 is completed.

In an embodiment, the transport robot 100 includes a linkage mechanism 130 electrically connected to the control center, and that the control center controls, according to the second unloading instruction, at least two of the plurality of storage assemblies 121 to simultaneously unload includes the following operation:

the control center controls, according to the second unloading instruction, the linkage mechanism 130 to drive the at least two of the plurality of storage assemblies 121 to move simultaneously, so as to transfer the goods 200 to the corresponding transport mechanisms 320.

The control center is electrically connected to the linkage mechanism 130, and is further electrically connected to a linkage driving member 132 of the linkage mechanism 130. The control center may control the movement of the linkage driving member 132, so that the linkage mechanism 130 can drive the at least two of the plurality of storage assemblies 121 to move synchronously to perform an unloading action. It can be understood that, after the control center receives the second unloading instruction, and after the plurality of storage assemblies 121 of the transport robot 100 are docked with the plurality of transport mechanisms 320 of the auxiliary apparatus 300, the controller controls, through the linkage driving member 132, the linkage mechanism 130 to drive the at least two of the plurality of storage assemblies 121 to be lifted up synchronously, so that the goods 200 in the plurality of storage assemblies 121 slide out of the plurality of storage assemblies 121 and move to corresponding transport mechanisms 320, and an unloading operation of the transport robot 100 is completed.

In an embodiment, the transport robot 100 further includes a blocking mechanism 170 electrically connected to the control center and capable of switching between a blocking position and an avoidance position, and the second loading or unloading instruction includes a second unloading instruction; and the transport system further includes a loading or unloading apparatus 600 electrically connected to the control center and including a plurality of loading or unloading mechanisms 620 arranged at intervals along a vertical direction, and that the control center controls the transport robot 100 to unload goods at the unloading position includes the following operations:

the control center receives the second unloading instruction;

the control center controls the transport robot 100 to move to the unloading position, and the plurality of storage assemblies 121 of the transport robot 100 respectively correspond to the plurality of loading or unloading mechanisms 620;

the control center controls, according to the second unloading instruction, the blocking mechanism 170 to move to the avoidance position, so that the plurality of storage assemblies 121 are in an unloadable state; and the control center controls the plurality of loading or unloading mechanisms 620 to extend into the plurality of storage assemblies 121 to receive and pick and remove goods 200 of the plurality of storage assemblies 121.

In a case that the transport system includes the transport robot 100 in the second embodiment, the transport robot 100 may block the goods 200 in the plurality of storage assemblies 121, to prevent the goods 200 from sliding out of the plurality of storage assemblies 121 during a process of transporting the goods 200 by the transport robot 100, so as to protect the goods 200 in the plurality of storage assemblies 121 and prevent the goods 200 from being damaged. Specifically, the transport robot 100 of the present disclosure blocks the goods 200 in the plurality of storage assemblies 121 by the blocking mechanism 170 at the blocking position during a transport process. When unloading is required, the blocking mechanism 170 moves from the blocking position to the avoidance position, and at this time, the loading or unloading apparatus 600 may perform an unloading operation on the plurality of storage assemblies 121.

Because a structure and a working principle of the blocking mechanism 170 have been described in detail in the second embodiment, details are not described herein again, and the description herein is only from a perspective of a control method. Specifically, after the control center receives the second unloading instruction, the control center controls, according to the second unloading instruction, the transport robot 100 to move to the unloading position. At this time, the transport robot 100 approaches the loading or unloading apparatus 600, and the plurality of storage assemblies 121 are respectively docked with the plurality of loading or unloading mechanisms 620. Subsequently, the control center controls the blocking mechanism 170 to move from the blocking position to the avoidance position, the blocking mechanism 170 no longer blocks the goods 200 in the plurality of storage assemblies 121, and the control center controls the plurality of loading or unloading mechanisms 620 to extend into the plurality of storage assemblies 121, and receive and pick and remove the goods 200 in the plurality of storage assemblies 121, so that the unloading operation of the transport robot 100 is implemented.

In an embodiment, the transport robot 100 further includes a blocking mechanism 170 electrically connected to the control center and capable of switching between a blocking position and an avoidance position, and the second loading or unloading instruction includes a second loading instruction; and the transport system further includes a loading or unloading apparatus 600 electrically connected to the control center and including a plurality of loading or unloading mechanisms 620 arranged at intervals along a vertical direction, and that the control center controls the transport robot 100 to load goods at the unloading position includes the following operations:

the control center receives the second loading instruction;

the control center controls the transport robot 100 to move to the loading position, and the plurality of storage assemblies 121 of the transport robot 100 respectively correspond to the plurality of loading or unloading mechanisms 620;

the control center controls, according to the second loading instruction, the blocking mechanism 170 to move to the avoidance position, so that the plurality of storage assemblies 121 are in a loadable state; and the control center controls the plurality of loading or unloading mechanisms 620 to carry the goods 200 and extend into the plurality of storage assemblies 121 to place the goods 200 in the plurality of storage assemblies 121.

In a case that the transport system includes the transport robot 100 in the second embodiment, the transport robot 100 may block the goods 200 in the plurality of storage assemblies 121, to prevent the goods 200 from sliding out of the plurality of storage assemblies 121 during a process of transporting the goods 200 by the transport robot 100, so as to protect the goods 200 in the plurality of storage assemblies 121 and prevent the goods 200 from being damaged. Specifically, during a loading process of the transport robot 100 of the present disclosure, the blocking mechanism 170 moves from the blocking position to the avoidance position. At this time, the plurality of loading or unloading mechanisms 620 may perform a loading operation on the plurality of storage assemblies 121. Specifically, the to-be-transported goods 200 are placed on the plurality of loading or unloading mechanisms 620, and then the blocking mechanism 170 moves from the blocking position to the avoidance position, so that the plurality of loading or unloading mechanisms 620 can extend into the plurality of storage assemblies 121. Subsequently, the goods 200 are placed in the plurality of storage assemblies 121 by the plurality of loading or unloading mechanisms 620 and then removed from the plurality of storage assemblies 121.

In an embodiment, that the control center confirms that the second loading or unloading position is an unloading position includes the following operation:

the control center obtains first relative position information corresponding to an unloading identifier, and in a case that a deviation between a current position of the transport robot 100 and the first relative position information is less than a first threshold, the transport robot 100 is at the unloading position; or the control center obtains second relative position information corresponding to the auxiliary apparatus 300 or the loading or unloading apparatus 600, and in a case that a deviation between the current position of the transport robot 100 and the second relative position information is less than a second threshold, the transport robot 100 is at the unloading position.

Optionally, an unloading identifier is arranged near the auxiliary apparatus 300 or the loading or unloading apparatus 600. The unloading identifier is arranged corresponding to the auxiliary apparatus 300 or the loading or unloading apparatus 600, and is used for indicating the unloading position at which the auxiliary apparatus 300 or the loading or unloading apparatus 600 is located. In a case that the transport robot 100 moves to a position indicated by the unloading identifier, it indicates that the transport robot 100 moves in place, and an unloading operation may be performed. That is, position information corresponding to the unloading identifier is the first relative position information, and the control center may determine a position of the auxiliary apparatus 300 or the loading or unloading apparatus 600 according to the first relative position information, and then determine the unloading position to which the transport robot 100 moves.

Specifically, the control center may control the transport robot 100 to approach the auxiliary apparatus 300 or the loading or unloading apparatus 600, and the control center may obtain a current position of the transport robot 100 and compare the current position with the first relative position information. In a case that a distance deviation between the current position of the transport robot 100 and the first relative position information is within a range of the first threshold, it indicates that the transport robot 100 has moved to the unloading position. In this case, the plurality of storage assemblies 121 are docked with the plurality of transport mechanisms 320 or the plurality of loading or unloading mechanisms 620, and a loading or unloading operation may be performed. In a case that the distance deviation between the current position of the transport robot 100 and the first relative position information exceeds the range of the first threshold, it indicates that the transport robot 100 has not moved to the unloading position. In this case, the plurality of storage assemblies 121 deviate from the plurality of transport mechanisms 320 or the plurality of loading or unloading mechanisms 620, and effective docking cannot be implemented. If a loading or unloading operation is performed in this case, there may be a risk of falling of the goods 200. Therefore, the control center needs to continue to control the movement of the transport robot 100 until the distance deviation between the current position of the transport robot 100 and the first relative position information is within the range of the first threshold, and the transport robot 100 stops moving. The range of the first threshold herein refers to a maximum deviation range allowed when the plurality of storage assemblies 121 are docked with the plurality of transport mechanisms 320 or the plurality of loading or unloading mechanisms 620. Within this range, the goods 200 can be conveyed normally. If the range is exceeded, the goods 200 are at a risk of falling.

Further optionally, the control center may record position information of the auxiliary apparatus 300 or the loading or unloading apparatus 600 as the second relative position information. The control center may determine, according to the second relative position information, the unloading position to which the transport robot 100 moves. Specifically, the control center may control the transport robot 100 to approach the auxiliary apparatus 300 or the loading or unloading apparatus 600, and the control center may obtain a current position of the transport robot 100 and compare the current position with the second relative position information. In a case that a distance deviation between the current position of the transport robot 100 and the second relative position information is within a range of the second threshold, it indicates that the transport robot 100 has moved to the unloading position. In this case, the plurality of storage assemblies 121 are docked with the plurality of transport mechanisms 320 or the plurality of loading or unloading mechanisms 620, and a loading or unloading operation may be performed. In a case that the distance deviation between the current position of the transport robot 100 and the second relative position information exceeds the range of the second threshold, it indicates that the transport robot 100 has not moved to the unloading position. In this case, the plurality of storage assemblies 121 deviate from the plurality of transport mechanisms 320 or the plurality of loading or unloading mechanisms 620, and effective docking cannot be implemented. If a loading or unloading operation is performed in this case, there may be a risk of falling of the goods 200. Therefore, the control center needs to continue to control the movement of the transport robot 100 until the distance deviation between the current position of the transport robot 100 and the second relative position information is within the range of the second threshold, and the transport robot 100 stops moving.

The first threshold and the second threshold herein refer to maximum deviation ranges allowed when the plurality of storage assemblies 121 are docked with the plurality of transport mechanisms 320 or the plurality of loading or unloading mechanisms 620. Within this range, the goods 200 can be conveyed normally. If the range is exceeded, the goods 200 are at a risk of falling.

It is worth noting that the operation of loading the transport robot 100 by using the auxiliary apparatus 300 or the loading or unloading apparatus 600 is substantially the same as the operation of unloading the transport robot 100 by using the auxiliary apparatus 300 or the loading or unloading apparatus 600, which is a reverse process of the step of unloading the transport robot 100 by using the auxiliary apparatus 300 or the loading or unloading apparatus 600, and details are not described herein again.

In an embodiment, the transport system further includes a lifting apparatus 400 and a conveying apparatus 500 that are electrically connected to the control center, and the transport method further includes the following operation:

after the plurality of loading or unloading mechanisms 620 or the plurality of transport mechanisms 320 receive the goods 200, the control center controls the lifting apparatus 400 to receive and pick goods 200 of at least one of the plurality of loading or unloading mechanisms 620, or goods 200 of at least one of the plurality of transport mechanisms 320, and transfer the goods 200 to the conveying apparatus 500.

A transfer mechanism 430 can carry a plurality of goods 200 at one time without repeated actions, thereby improving working efficiency. Specifically, when unloading goods, the control center may control a moving mechanism 420 to drive the transfer mechanism 430 to receive and pick the goods 200 of the plurality of transport mechanisms 320 layer by layer, and then descend to the conveying apparatus 500 to transfer all the goods 200 on the transfer mechanism 430 to the conveying apparatus 500 at one time, and the goods are conveyed to a specified position by the conveying apparatus 500. When loading goods, the moving mechanism 420 may drive the transfer mechanism 430 to descend to the conveying apparatus 500, to sequentially receive and pick a plurality of goods 200 conveyed by the conveying apparatus 500; and then, the moving mechanism 420 drives the transfer mechanism 430 to ascend, so that the transfer mechanism 430 transfers the goods 200 to the plurality of transport mechanisms 320 layer by layer.

In an embodiment, the plurality of storage assemblies 121 include a loading or unloading end 1215 configured to load or unload the goods 200, and the transport method further includes the following operation:

after the control center receives the second unloading instruction, the control center controls the carrying mechanism 150 to avoid the loading or unloading end 1215.

That is, after the control center receives the second unloading instruction, the control center controls the carrying mechanism 150 to move to a specified position, so that the carrying mechanism 150 moves away from the loading or unloading end, so as to avoid the loading or unloading of the goods 200 by the plurality of transport mechanisms 320 or the plurality of loading or unloading mechanisms 620. It can be understood that the loading or unloading end 1215 is an opening used for loading or unloading the goods 200, a specific form thereof has been mentioned above, and details are not described herein again. In a case that the plurality of transport mechanisms 320 or the plurality of loading or unloading mechanisms 620 are configured to unload goods, the carrying mechanism 150 needs to avoid the plurality of transport mechanisms 320 or the plurality of loading or unloading mechanisms 620, so as to avoid interference. Specifically, the control center may control the carrying mechanism 150 to move to a specified position. The specified position herein may be a topmost position of the transport robot 100 or a position higher than the plurality of transport mechanisms 320 and the plurality of loading or unloading mechanisms 620, or may be a position different from the loading or unloading end 1215.

Specifically, in a case that the loading or unloading end 1215 is arranged on a same side as the carrying mechanism 150, the control center may control the carrying mechanism 150 to ascend to a top end of the transport robot 100, and may also control the carrying mechanism 150 to ascend to a position higher than the plurality of transport mechanisms 320 or the plurality of loading or unloading mechanisms 620 or to move to an other side of the vertical frame 110, so that the loading or unloading end 1215 is arranged away from the carrying mechanism 150. In this way, the carrying mechanism 150 can move away from the loading or unloading end 1215, and the interference between the carrying mechanism 150 and the plurality of transport mechanisms 320 or the plurality of loading or unloading mechanisms 620 at the loading or unloading end 1215 can be avoided. In a case that the loading or unloading end 1215 and the carrying mechanism 150 are arranged on opposite sides, the carrying mechanism 150 does not block the loading or unloading end 1215, and in this case, the carrying mechanism 150 may move to a specified position or may not move, as long as the loading or unloading is not affected.

In an embodiment, the plurality of storage assemblies 121 include a loading or unloading end 1215 configured to load or unload the goods 200, and the transport method further includes the following operation:

after the control center receives the second loading instruction, the control center controls the carrying mechanism 150 to avoid the loading or unloading end 1215.

It can be understood that, whether loading or unloading from the loading or unloading end 1215, the control center needs to control the carrying mechanism 150 to avoid the loading or unloading end 1215, so as to avoid interference between the carrying mechanism 150 and the plurality of transport mechanisms 320 or the plurality of loading or unloading mechanisms 620 at the loading or unloading end 1215. An avoidance principle is the same as that in the foregoing embodiments, and details are not described herein again. Exemplarily, when loading or unloading the goods 200 from one end close to the carrying mechanism 150, the carrying mechanism 150 (that is, a fork) first ascend to a highest position, thereby leaving a space for the transport robot 100 to be docked with the auxiliary apparatus 300 or the loading or unloading apparatus 600.

Embodiment 3

Referring to FIG. 9 and FIG. 11, the present disclosure provides a transport robot 100. The transport robot 100 is applied to a transport system, and can transport goods 200. It can be understood that the goods 200 may be goods 200 with a bracket 621, and the transport robot 100 transports the goods 200 through the bracket 621; and certainly, the goods may alternatively be goods 200 placed in a container, and the transport robot 100 transports the goods 200 through a box. The goods 200 described below are goods 200 placed in a box, and the box may be loaded with the goods 200, so as to implement the transport of the goods 200. The transport robot 100 transports the box to an unloading position, and after unloading the goods 200 in the box, the box may be transported back to the transport robot 100, so as to reuse the box and reduce the cost. Alternatively, the goods are a box with goods 200, and the transport robot 100 transports the box to the unloading position, and unloads the box with the goods 200 through an unloading apparatus.

The transport robot 100 plays an important role in intelligent warehousing, transports goods 200, ensures a transport speed of the goods 200, improves the transport efficiency of the goods 200, and reduces the consumption of labor resources. The transport robot 100 in the present disclosure can block the goods 200 during a transport process, restrict the goods 200 from sliding out of the transport robot 100, ensure the safety of the goods 200, avoid a risk of sliding out, and improve the transport efficiency. When loading or unloading goods, the transport robot 100 no longer blocks the goods 200, so that the transport robot 100 can perform a loading or unloading operation, which is convenient for use.

Referring to FIG. 9 and FIG. 10, in an embodiment, the transport robot 100 includes a vertical frame 110, a storage mechanism 120, and a blocking mechanism 170. The vertical frame 110 is arranged along a vertical direction. The storage mechanism 120 includes a plurality of storage assemblies 121 configured to store to-be-transported goods 200 and arranged on the vertical frame 110 at equal intervals along the vertical direction. The blocking mechanism 170 is capable of switching between a blocking position and an avoidance position, when the blocking mechanism 170 is at the blocking position, the blocking mechanism 170 is configured to block goods 200 in the plurality of storage assemblies 121 from sliding out, and when the blocking mechanism 170 is at the avoidance position, goods 200 are capable of being moved into or moved out of the plurality of storage assemblies 121.

The vertical frame 110 plays a bearing role, and various components of the transport robot 100 are mounted thereon. When the transport robot 100 transports the goods 200, the vertical frame 110 may drive synchronous movement of the components on the transport robot 100, so as to implement the transport of the goods 200. The storage mechanism 120 is located on the vertical frame 110, is configured to store the goods 200, and is capable of moving synchronously with the vertical frame 110, so as to implement the transport of the goods 200. The transport robot 100 moves to a loading position, and the to-be-transported goods 200 are transported to the storage mechanism 120 for storage. Then, the transport robot 100 moves from the loading position to an unloading position. Correspondingly, the storage mechanism 120 moves to the unloading position along with the vertical frame 110. At this time, the goods 200 in the storage mechanism 120 can be unloaded. The storage mechanism 120 can temporarily store the to-be-transported goods 200, thereby improving the capability of the transport robot 100 to carry the goods 200.

In addition, the storage mechanism 120 includes a plurality of storage assemblies 121 arranged on the vertical frame 110 at equal intervals. Each of the plurality of storage assemblies 121 can carry goods 200 of a box to ensure a storage capacity of the transport robot 100. That is, the plurality of storage assemblies 121 are evenly distributed on the vertical frame 110 along the vertical direction. The to-be-transported goods 200 may be transported to the plurality of storage assemblies 121, and the transport robot 100 drives the goods 200 in the plurality of storage assemblies 121 to be transported to the unloading position. In addition, the plurality of storage assemblies 121 are fixed on the vertical frame 110, and do not move. The specific loading or unloading of the plurality of storage assemblies 121 is implemented by a loading or unloading apparatus 600 of the transport system and/or a carrying mechanism 150 of the transport robot 100, which is specifically described in the following specification.

It can be understood that after the plurality of storage assemblies 121 store the to-be-transported goods 200, during the movement of the transport robot 100 from the loading position to the unloading position, the transport robot 100 travels a specific distance, and the goods 200 stored in the plurality of storage assemblies 121 may be at a risk of falling. Once the goods 200 in the plurality of storage assemblies 121 fall, on the one hand, the goods 200 are damaged, resulting in economic losses; and on the other hand, a manual or intelligent picking apparatus is required to pick the goods 200 and place the goods in the plurality of storage assemblies 121 again for transport, which affects the transport efficiency of the goods 200.

In view of the foregoing description, the transport robot 100 of the present disclosure further includes a blocking mechanism 170, and the goods 200 in the plurality of storage assemblies 121 are blocked by the blocking mechanism 170. In this way, the goods 200 in the plurality of storage assemblies 121 can be prevented from sliding out. Specifically, the blocking mechanism 170 is capable of switching between a blocking position and an avoidance position. When the blocking mechanism 170 is at the avoidance position, the goods 200 may be loaded into the plurality of storage assemblies 121 or the goods 200 may be taken out from the plurality of storage assemblies 121. When the blocking mechanism 170 is at the blocking position, the goods 200 in the plurality of storage assemblies 121 are in abutment with the blocking mechanism 170, and the blocking mechanism 170 may restrict the goods 200 in the plurality of storage assemblies 121 from sliding out and prevent the goods 200 from falling.

Specifically, when the transport robot 100 is at a goods-carrying position, the blocking mechanism 170 is at the avoidance position, and at this time, the goods 200 may be loaded into the plurality of storage assemblies 121; after the loading is completed, the blocking mechanism 170 moves to the blocking position, and at this time, the blocking mechanism 170 may be in abutment with the goods 200 in the plurality of storage assemblies 121 to restrict the goods 200 from sliding out of the plurality of storage assemblies 121; subsequently, the transport robot 100 may move from the loading position to the unloading position, and the blocking mechanism 170 is always at the blocking position during this process; and when the blocking mechanism 170 is at the unloading position, the blocking mechanism 170 moves from the blocking position to the avoidance position, and at this time, the goods 200 in the plurality of storage assemblies 121 may be taken out. In addition, the transport robot 100 reciprocates in this way. It can be understood that the blocking mechanism 170 may play a blocking role during the movement of the transport robot 100 regardless of whether there are goods in the plurality of storage assemblies 121, or may only play a blocking role during goods transport in a case that there are goods in the plurality of storage assemblies 121.

When the transport robot 100 of the foregoing embodiment transports goods, the blocking mechanism 170 moves to the blocking position and may be in abutment with the goods 200 in the plurality of storage assemblies 121, so as to restrict the goods 200 from sliding out of the plurality of storage assemblies 121. Therefore, a current problem that the goods easily slide out of a storage rack of the transport robot during goods transport is effectively resolved, the goods 200 are prevented from sliding out of the plurality of storage assemblies 121 during a transport process of the transport robot 100, the safety of the goods 200 is ensured, a risk of sliding out is avoided, and the transport efficiency is improved. In addition, when the transport robot 100 loads or unloads goods, the blocking mechanism 170 moves to the avoidance position. At this time, the goods 200 may be loaded into the plurality of storage assemblies 121, and the goods 200 in the plurality of storage assemblies 121 may also be removed, which does not hinder a loading or unloading operation of the transport robot 100, and is convenient for use.

In an embodiment, the transport robot 100 further includes a movable chassis 160 arranged at a bottom portion of the vertical frame 110. The movable chassis 160 can drive the transport robot 100 to move, which greatly improves the adaptability of the transport robot 100 to actual working conditions. Specifically, the chassis 160 includes a chassis frame, a travel drive assembly, and a plurality of rotating wheels, the vertical frame 110 is arranged on an upper portion of the chassis frame, the plurality of rotating wheels are arranged on a bottom portion of the chassis frame, the travel drive assembly is arranged on the chassis frame, and at least one of the plurality of rotating wheels is in driving connection with the travel drive assembly. Further, at least two of the plurality of rotating wheels are separately in driving connection with the travel drive assembly, and the at least two of the plurality of rotating wheels being separately in driving connection with the travel drive assembly are distributed on two sides of the chassis frame along a traveling direction, thereby achieving a steering function of the chassis 160. The travel drive assembly includes at least two wheel drive motors, and the at least two of the plurality of rotating wheels distributed on the two sides of the chassis frame along the traveling direction are respectively driven by separate wheel drive motors. That the at least two of the plurality of rotating wheels distributed on the two sides of the chassis frame along the traveling direction are respectively driven by separate wheel drive motors can simplify a transmission structure on the chassis 160.

In an embodiment, each of the plurality of rotating wheels includes a driving wheel and a driven wheel. The driving wheel and the driven wheel are mounted on a bottom portion of the chassis 160, may separately rotate relative to the chassis 160, and jointly support the chassis 160. The driving wheel is driven by a wheel drive motor to enable the chassis 160 to move. By configuring the movable chassis 160, the transport robot 100 can transport the goods 200 between the loading position and the unloading position. There are two driving wheels, and the two driving wheels are symmetrically distributed. Correspondingly, there are two wheel drive motors, and the two driving wheels are respectively driven by the two wheel drive motors, so that rotational speeds of the two driving wheels are different, thereby implementing the steering of the chassis 160. There are four driven wheels, and the four driven wheels are distributed in a rectangular shape. The four driven wheels may be universal wheels or may be of other wheel structures with a steering function. According to actual situations, a quantity of the driven wheel is not limited to four, but may also be six, three, or the like.

In this embodiment, the chassis 160 is also mounted with a guiding apparatus, and the guiding apparatus is a camera configured to identify a graphic code attached to a ground, so that the chassis 160 travels along a preset path. The graphic code may be a two-dimensional code, a barcode, or some customized identification codes. In some other embodiments, the guiding apparatus is a laser guiding apparatus configured to guide the chassis 160 to travel along a laser beam, or the guiding apparatus is a short-wave receiving apparatus configured to receive a preset short-wave signal to guide the chassis 160 to travel along a preset path. It should be noted that, in some other embodiments, the chassis 160 may be omitted, and the vertical frame 110 is directly and fixedly mounted on the ground or another platform, and is only configured to carry the goods 200 between the loading position and the unloading position around the vertical frame.

In an embodiment, the blocking mechanism 170 may simultaneously block the goods 200 in the plurality of storage assemblies 121. That is, the blocking mechanism 170 may simultaneously move to the blocking position, so as to block the goods 200 in the plurality of storage assemblies 121, and the blocking mechanism 170 may also simultaneously move to the avoidance position, so that the plurality of storage assemblies 121 can perform a loading or unloading operation. Certainly, in another implementation of the present disclosure, there are a plurality of blocking mechanisms 170, and each of the plurality of blocking mechanisms 170 may simultaneously block the goods 200 in at least two of the plurality of storage assemblies 121. It can be understood that one blocking mechanism 170 may simultaneously act on goods 200 of all storage assemblies 121, or a plurality of blocking mechanisms 170 may act on a plurality of storage assemblies 121. Exemplarily, there are two blocking mechanisms 170, where one of the two blocking mechanisms 170 is configured to block goods 200 of storage assemblies 121 of first to third layers, and the other one of the two blocking mechanisms 170 is configured to block goods 200 of storage assemblies 121 of fourth to sixth layers. Certainly, in another implementation of the present disclosure, there may be more blocking mechanisms 170. In the present disclosure, only an example in which one blocking mechanism 170 blocks the goods 200 of all storage assemblies 121 is used for description. A working principle of a plurality of blocking mechanisms 170 is substantially the same as that of the one blocking mechanism 170, and details are not described herein again.

It is worth noting that an arrangement position of the blocking mechanism 170 is not limited in principle. The blocking mechanism may be movably arranged on the vertical frame 110, may be movably arranged on the chassis 160, and may also be movably arranged on the plurality of storage assemblies 121, as long as it is ensured that the blocking mechanism 170 can move to the avoidance position or the blocking position. In this embodiment, only an example in which the blocking mechanism 170 is movably arranged on the chassis 160 is used for description. A working principle of the blocking mechanism 170 arranged at another position is substantially the same as a working principle of the blocking mechanism 170 movably arranged on the chassis 160, and details are not described herein again. Specifically, when the blocking mechanism 170 moves relative to the chassis 160, the blocking mechanism 170 may move to the blocking position or the avoidance position. After the blocking mechanism 170 can move to the blocking position, the blocking mechanism 170 may block the goods 200 in the plurality of storage assemblies 121; and after the blocking mechanism 170 can move to the avoidance position, the blocking mechanism 170 no longer blocks the plurality of storage assemblies 121, and the goods 200 may freely enter or exit the plurality of storage assemblies 121.

In an embodiment, the plurality of storage assemblies 121 includes a loading or unloading end 1215 that faces away from the vertical frame 110. The goods 200 are loaded or unloaded from the loading or unloading end 1215 of the plurality of storage assemblies 121 to complete the loading or unloading of the goods 200. Exemplarily, as shown in FIG. 10, one ends of the plurality of storage assemblies 121 away from the vertical frame 110 is provided with the loading or unloading end 1215. During loading, the goods 200 are moved from the loading or unloading end 1215 into the plurality of storage assemblies 121, and during unloading, the goods 200 are moved from the loading or unloading end 1215 out of the plurality of storage assemblies 121. Optionally, the loading or unloading end 1215 is an end opening of the plurality of storage assemblies 121, or another entrance or exit through which the goods 200 can enter or exit. Certainly, in another implementation of the present disclosure, the loading or unloading end 1215 may also be arranged at one ends of the plurality of storage assemblies 121 close to the vertical frame 110. In this way, the loading or unloading of the goods 200 in the plurality of storage assemblies 121 can also be implemented.

Referring to FIG. 9 and FIG. 10, in an embodiment, the blocking mechanism 170 may move into or move out of the loading or unloading end 1215. That is, when the blocking mechanism 170 moves into the loading or unloading end 1215, the blocking mechanism 170 is at the blocking position. At this time, an end portion of the goods 200 is in abutment with the blocking mechanism 170, and the blocking mechanism 170 blocks the goods 200 to restrict the goods 200 from sliding out of the loading or unloading end 1215. When the blocking mechanism 170 moves out of the loading or unloading end 1215, the blocking mechanism 170 is at the avoidance position. At this time, the loading or unloading end 1215 is unobstructed, the goods 200 may be loaded into the plurality of storage assemblies 121 through the loading or unloading end 1215, and the goods 200 in the plurality of storage assemblies 121 may also be unloaded through the loading or unloading end 1215.

In an embodiment, when the blocking mechanism 170 is at the blocking position, the blocking mechanism 170 is in abutment with a side wall or a bottom surface of the goods 200. That is, the blocking position of the blocking mechanism 170 may be located on a bottom surface or a side surface of the plurality of storage assemblies 121. When the blocking mechanism 170 moves to the blocking position, the blocking mechanism 170 may be in abutment with the goods 200 in the plurality of storage assemblies 121 at a side surface or a bottom surface. At this time, the movement of the goods 200 in the plurality of storage assemblies 121 is restricted due to an abutting force of the blocking mechanism 170, so that the goods 200 are prevented from sliding out of the plurality of storage assemblies 121. After the blocking mechanism 170 moves to the avoidance position, the blocking mechanism 170 is separated from the side surface or the bottom surface of the goods 200 of the plurality of storage assemblies 121, and the goods 200 may move in the plurality of storage assemblies 121, so as to perform the loading or unloading operation of the plurality of storage assemblies 121.

In an embodiment, the blocking mechanism 170 is arranged on at least one side of the plurality of storage assemblies 121. It can be understood that the blocking mechanism 170 may be arranged on one side of the plurality of storage assemblies 121, as shown in FIG. 9 and FIG. 10, and in this case, the blocking mechanism 170 may block the goods 200 in the plurality of storage assemblies 121 at the blocking position. Certainly, in another implementation of the present disclosure, blocking mechanisms 170 may also be located on two sides of the plurality of storage assemblies 121 respectively. In this way, the goods 200 in the plurality of storage assemblies 121 can be further blocked. Further, two blocking mechanisms 170 may be arranged symmetrically or asymmetrically, as long as the blocking mechanisms can block the goods 200 in the plurality of storage assemblies 121.

Exemplarily, in this embodiment, only an example in which the blocking mechanism 170 can move into or move out of the loading or unloading end 1215 is used for description. In addition, the blocking mechanism 170 is arranged on one side of the plurality of storage assemblies 121, working principles of blocking mechanisms 170 with different layouts mentioned in other embodiments are substantially the same as that of the blocking mechanism 170 in this embodiment, and details are not described herein again. In this case, the blocking position of the blocking mechanism 170 is located at the loading or unloading end 1215. After the blocking mechanism 170 moves to the loading or unloading end 1215, the blocking mechanism 170 is at the loading or unloading end 1215 and faces the goods 200, so as to block the goods 200.

In an embodiment, the blocking mechanism 170 includes a movable blocking connector 171 and a plurality of blocking assemblies 172 separately connected to the blocking connector 171, and at least one of the plurality of blocking assemblies 172 corresponds to a same storage assembly 121. The blocking connector 171 is capable of driving the plurality of blocking assemblies 172 to move into the loading or unloading end 1215, so as to block the goods 200 in the plurality of storage assemblies 121. The blocking connector 171 functions as a connection, and is configured to connect the plurality of blocking assemblies 172. When moving, the blocking connector 171 may synchronously drive the plurality of blocking assemblies 172 to move, so that the plurality of blocking assemblies 172 can move to a loading or unloading end 1215 of a corresponding storage assembly 121 or move out of the loading or unloading end 1215 of the plurality of storage assemblies 121. Optionally, the blocking connector 171 includes, but is not limited to, a connecting rod or a longboard, and the like.

The plurality of blocking assemblies 172 function as a blocking, and is configured to implement blocking of the goods 200. When the blocking connector 171 drives the plurality of blocking assemblies 172 to move to the blocking position, the plurality of blocking assemblies 172 are located at the loading or unloading end 1215. At this time, the end portion of the goods 200 faces the plurality of blocking assemblies 172, and the plurality of blocking assemblies 172 restrict the goods 200 from moving out of the plurality of storage assemblies 121. When the blocking connector 171 drives the plurality of blocking assemblies 172 to move to the avoidance position, the plurality of blocking assemblies 172 are separated from the loading or unloading end 1215. At this time, there is no object to block the end portion of the goods 200, and the plurality of storage assemblies 121 may be loaded or unloaded.

It can be understood that the avoidance position may be located outside the plurality of blocking assemblies 172, or may be located at a bottom portion of the plurality of storage assemblies 121, or at a position flush with the plurality of storage assemblies 121. The avoidance position is located at the bottom portion of the plurality of storage assemblies 121, as long as the plurality of blocking assemblies 172 are at a position that does not affect the moving in or moving out of goods 200 of a next layer.

Optionally, the blocking connector 171 may ascend or descend, and when ascending or descending, the blocking connector 171 may drive the plurality of blocking assemblies 172 to ascend or descend synchronously, so that the plurality of blocking assemblies 172 are located at the loading or unloading end 1215 or move out of the loading or unloading end 1215. In this case, the avoidance position may be located at the bottom portion of the plurality of storage assemblies 121 or the position flush with the plurality of storage assemblies 121. Certainly, the blocking connector 171 may also move horizontally. When moving horizontally, the blocking connector 171 may drive the plurality of blocking assemblies 172 to move horizontally and synchronously, so that the plurality of blocking assemblies 172 are located at the loading or unloading end 1215 or move out of the loading or unloading end 1215. In this case, the avoidance position may be located outside the plurality of blocking assemblies 172. Certainly, the blocking connector 171 may also perform another form of movement, such as one or a combination of rotating motion, swinging motion, moving motion, and the like, as long as the plurality of blocking assemblies 172 can move into or move out of the loading or unloading end 1215. Exemplarily, in the present disclosure, only an example in which the blocking connector 171 ascends or descends and displaces is used for description. In addition, the avoidance position is located at the bottom portion of the plurality of storage assemblies 121 or the position flush with the plurality of storage assemblies 121.

In an embodiment, each of the plurality of blocking assemblies 172 includes a stopping member fixedly arranged on the blocking connector 171, and movement of the blocking connector 171 is capable of driving the stopping member to move into or move out of the loading or unloading end 1215. In this embodiment, the stopping member is fixedly arranged on the blocking connector 171, and the movement of the blocking connector 171 may directly drive the stopping member to move, so that the stopping member moves to the blocking position or the avoidance position. For example, when the blocking connector 171 drives the stopping member to ascend, the stopping member may move to the loading or unloading end 1215, so as to block the goods 200; and when the blocking connector 171 drives the stopping member to descend, the stopping member may move to the avoidance position, so as to no longer block the goods 200. Optionally, the stopping member may be a baffle plate, a stopper, a limit post, or another component capable of blocking.

Referring to FIG. 9 and FIG. 10, in an embodiment, each of the plurality of blocking assemblies 172 includes a swing member 1721 and a blocking member 1722, one end of the swing member 1721 is rotatably connected to the blocking connector 171, an other end of the swing member 1721 is mounted with the blocking member 1722, and a middle portion of the swing member 1721 is rotatably mounted at the loading or unloading end 1215 of the plurality of storage assemblies 121. When ascending or descending, the blocking connector 171 is capable of driving the swing member 1721 to swing, so that the swing member 1721 drives the blocking member 1722 to move into or move out of the loading or unloading end 1215.

That is, the blocking connector 171 implements the switching between the blocking position and the avoidance position through the indirect movement of the plurality of blocking assemblies 172, such as a swinging motion. Specifically, when the blocking connector 171 moves, one end of the swing member 1721 may be driven to move relative to the plurality of storage assemblies 121, and then an other end of the swing member 1721 may drive the blocking member 1722 to move, so that the blocking member 1722 moves to the avoidance position or the blocking position. A head portion of the swing member 1721 is rotatably connected to the blocking connector 171, the middle portion of the swing member 1721 is rotatably connected to the plurality of storage assemblies 121, and a tail portion of the swing member 1721 is connected to the blocking member 1722. The blocking member 1722 may move to the avoidance position or the blocking position.

Exemplarily, when the blocking connector 171 moves upward along the vertical direction, the blocking connector 171 may drive the blocking member 1722 to move to the blocking position through the swing member 1721, and when the blocking connector 171 moves downward along the vertical direction, the blocking connector 171 may drive the blocking member 1722 to move to the avoidance position through the swing member 1721. Optionally, the swing member 1721 is a swing rod, and the blocking member 1722 is a blocking rod.

It should be noted that, the essential spirit of the present disclosure lies in the movement of the blocking connector 171 and the plurality of blocking assemblies 172, so that the plurality of blocking assemblies 172 respectively move to avoidance positions or blocking positions corresponding to the plurality of storage assemblies 121. In the foregoing two embodiment, two forms of each of the plurality of blocking assemblies 172 are separately described; and in addition, there are various arrangements of the plurality of blocking assemblies 172, which cannot all be listed herein, and a linkage manner in the present disclosure is not limited to being implemented by the foregoing specific structures.

In an embodiment, the blocking mechanism 170 further includes a blocking driving member, and an output end of the blocking driving member is connected to the blocking connector 171, so as to drive the plurality of blocking assemblies 172 to move into or move out of the loading or unloading end 1215. The blocking driving member is a power source for the movement of the blocking mechanism 170, and implements the driving of the movement of a blocking moving member. In addition, the blocking driving member outputs linear motion, so that the blocking connector 171 can ascend or descend, and then the blocking connector 171 may drive the plurality of blocking assemblies 172 to move, so that the plurality of blocking assemblies 172 move to the avoidance position or the blocking position. Optionally, the blocking driving member includes, but is not limited to, an air cylinder, a hydraulic cylinder, a linear motor, or an electric push rod, and may also be another linear driving unit capable of outputting the linear motion. Exemplarily, the blocking driving member is a linear motor. Exemplarily, one end of the blocking driving member is arranged on the chassis 160. Certainly, in another implementation of the present disclosure, a rotation motor cooperates with a protrusion member to drive.

In an embodiment, a bottom portion of each of the plurality of storage assemblies 121 is provided with a movement space used for a loading or unloading mechanism 620 of a transport system to extend into, so as to load goods into or take the goods out of the plurality of storage assemblies 121. Because the plurality of storage assemblies 121 cannot move during loading or unloading, other components such as the carrying mechanism 150 or a matching structure of the loading or unloading apparatus 600 are required to move the goods 200 into the plurality of storage assemblies 121 or take the goods out of the plurality of storage assemblies 121 during loading or unloading. Therefore, a bottom portion of each of the plurality of storage assemblies 121 needs to include a space used for the carrying mechanism 150 and the auxiliary apparatus to extend into, so as to facilitate the goods loading or unloading of the plurality of storage assemblies 121. When loading goods to the plurality of storage assemblies 121, the carrying mechanism 150 or the loading or unloading apparatus 600 may extend into the movement space to place the goods 200 on the plurality of storage assemblies 121, and then exit the movement space; and when unloading goods from the plurality of storage assemblies 121, the carrying mechanism 150 or the loading or unloading apparatus 600 may extend into the movement space to hold the goods 200 in the plurality of storage assemblies 121 and drive the goods 200 to move out of the plurality of storage assemblies 121.

In an embodiment, each of the plurality of storage assemblies 121 include a first side plate 1213 and a second side plate 1214 that are arranged on the vertical frame 110, and the first side plate 1213 and the second side plate 1214 are opposite to each other and surround the movement space. The first side plate 1213 and the second side plate 1214 are arranged at a same height of the vertical frame 110, and are arranged in parallel. In this way, the first side plate 1213 and the second side plate 1214 can be configured to respectively hold bottom portions of two sides of the goods 200, so that the goods 200 is flat, and deflection is avoided. A portion between the first side plate 1213 and the second side plate 1214 is a gap, that is, the foregoing movement space, which allows the carrying mechanism 150 or the loading or unloading apparatus 600 to extend into, so as to perform a loading or unloading operation.

Certainly, in another implementation of the present disclosure, each of the plurality of storage assemblies 121 includes a carrier body configured to carry the goods 200 and being provided with a movement space along an entrance or exit direction of the goods 200, and a size of the movement space along the entrance or exit direction of the goods 200 is less than a size of the carrier body along the entrance or exit direction of the goods 200. That is, the movement space in this case is an opening of the carrier body. The goods 200 are carried by the carrier body, and the movement space of the carrier body may also allow the carrying mechanism 150 or the loading or unloading apparatus 600 to extend into, so as to perform the loading or unloading operation.

In an embodiment, the transport robot 100 further includes a lifting mechanism 140 capable of ascending or descending relative to the vertical frame 110 along the vertical direction and a carrying mechanism 150 configured to carry the goods 200, where the carrying mechanism 150 is movably arranged on the vertical frame 110 along the vertical direction, is connected to the lifting mechanism 140, and is capable of ascending or descending along the vertical direction under driving of the lifting mechanism 140, so as to deliver goods 200 in the carrying mechanism 150 to corresponding storage assemblies 121.

The carrying mechanism 150 is a terminal configured to perform an action of the transport robot 100. At the loading position, the carrying mechanism 150 may carry the to-be-transported goods 200, and transport the goods 200 into the plurality of storage assemblies 121. Certainly, in some occasions, in a case that the goods 200 in the plurality of storage assemblies 121 need to be unloaded separately, the carrying mechanism 150 may also take out the goods 200 in the plurality of storage assemblies 121. Optionally, the carrying mechanism 150 includes, but is not limited to, a mechanical arm, an actionable tow bar, or a plane with a conveying function, and the like. The lifting mechanism 140 is configured to implement the ascending or descending movement of the carrying mechanism 150, and is capable of driving the carrying mechanism 150 to ascend or descend along the vertical direction.

At the loading position, there is a shelving unit with a plurality of layers configured to carry the goods 200. When the transport robot 100 loads goods at the loading position, the lifting mechanism 140 drives the carrying mechanism 150 to ascend or descend, so that the carrying mechanism 150 can pick goods on the shelving unit. Then, a lifting assembly drives the carrying mechanism 150 to ascend or descend, so as to transfer the goods 200 in the carrying mechanism 150 to the plurality of storage assemblies 121. This process is repeated until the plurality of storage assemblies 121 store the goods 200. After the goods loading is completed, the blocking mechanism 170 moves to the blocking position to block the goods 200 in the plurality of storage assemblies 121, so as to prevent the goods 200 from sliding out of the plurality of storage assemblies 121. Subsequently, after the transport robot 100 moves from the loading position to the unloading position, the blocking mechanism 170 moves to the avoidance position. At this time, the goods 200 in the plurality of storage assemblies 121 may be unloaded from the loading or unloading end 1215. After the unloading is completed, the transport robot 100 returns to the loading position, so that continuous transport of the goods 200 can be implemented by repeating the process, thereby improving the transport efficiency.

Optionally, the loading or unloading end 1215 is arranged on a same side as the carrying mechanism 150. When the loading or unloading end 1215 performs a loading or unloading operation, the carrying mechanism 150 needs to avoid the loading or unloading end 1215, so as to avoid interference between the carrying mechanism 1215 and a loading or unloading apparatus 600, and ensure reliable loading or unloading. In this case, the carrying mechanism 150 may ascend to a highest position of the transport robot 100 or a position higher than the loading or unloading apparatus 600, or move to an other side of the transport robot 100. Further optionally, the loading or unloading end 1215 is arranged on an opposite side of the carrying mechanism 150. The goods loading or unloading at the loading or unloading end 1215 is not affected by the carrying mechanism 150, and when the plurality of storage assemblies 121 are loaded or unloaded, the carrying mechanism 150 does not interfere with the loading or unloading apparatus 600.

The function of the lifting mechanism 140 is to drive the carrying mechanism 150 to ascend or descend along the vertical direction. In an embodiment, the lifting mechanism 140 includes a lifting power source and a lifting transmission component, and the lifting power source and the lifting transmission component are separately arranged on the vertical frame 110. The lifting transmission component is in driving connection with the lifting power source and the carrying mechanism 150. Specifically, an output end of the lifting power source is in driving connection with an input end of the lifting transmission component, and an output end of the lifting transmission component is in driving connection with the carrying mechanism 150. That the lifting power source and the lifting transmission component are separately arranged on the vertical frame 110, and the driving connection between the lifting power source and the lifting transmission component facilitate the disassembly or assembly of the lifting mechanism 140 on the vertical frame 110. Optionally, a power output from the lifting power source is in a form of rotation and linear motion, or in any other form of motion, and a final output of the lifting transmission component in driving connection with the lifting power source is movement along the vertical direction. Optionally, the lifting power source includes a driving motor in driving connection with the input end of the lifting transmission component. The lifting power source in a form of a motor runs more stably. Further, the driving motor can rotate forwardly or reversely, which facilitates the control of an ascending or descending process of the lifting mechanism 140.

Optionally, the lifting transmission component may be of a telescopic rod structure, a chain transmission structure, a driving transmission structure, or the like, and may also be of another structure capable of enabling the carrying mechanism 150 to ascend or descend. Exemplarily, the lifting transmission component is of a chain transmission structure, including a sprocket and a chain, the chain is connected to the carrying mechanism 150, and the chain is arranged on the vertical frame 110 along the vertical direction. When the output end of the lifting power source drives the sprocket to rotate, the chain ascends or descends along the vertical frame 110, which may further drive the carrying mechanism 150 to ascend or descend.

It should be noted that, the essence of the lifting transmission component is to output the ascending or descending motion to drive the carrying mechanism 150 to ascend or descend, thereby implementing the loading of the goods 200. In this embodiment, the lifting transmission component is implemented by a chain transmission structure. In addition, there are various structures that can implement ascending or descending, which cannot all be listed herein, and the manner of the ascending or descending motion in the present disclosure is not limited to being implemented by the foregoing specific structures.

In an embodiment, the transport robot 100 further includes a rotary mechanism arranged between the carrying mechanism 150 and the lifting mechanism 140 and configured to drive the carrying mechanism 150 to rotate relative to the lifting mechanism 140, so that the carrying mechanism 150 is aligned with a corresponding storage assembly 121.

The rotary mechanism is rotatably connected to the carrying mechanism 150, and the carrying mechanism 150 is rotatable relative to the rotary mechanism. When the carrying mechanism 150 is rotated by the rotary mechanism, a direction of the carrying mechanism 150 may be adjusted, so that the loading or unloading port of the carrying mechanism 150 can be adjusted. The carrying mechanism 150 implements the loading or unloading of the goods 200 through the loading or unloading port. When the transport robot 100 is at the loading position, the rotary mechanism may drive the carrying mechanism 150 to rotate, so that the loading or unloading port of the carrying mechanism 150 faces a shelving unit, and the goods 200 can be loaded into the carrying mechanism 150. When the carrying mechanism 150 transfers the goods 200 to the plurality of storage assemblies 121, the rotary mechanism may drive the carrying mechanism 150 to rotate, so that the loading or unloading port of the carrying mechanism 150 faces the plurality of storage assemblies 121. At this time, the goods 200 in the carrying mechanism 150 can be transferred to the plurality of storage assemblies 121.

Optionally, the rotary mechanism includes a carrying bracket, an autorotation gear arranged on the carrying bracket, and an autorotation motor fixedly mounted on the carrying bracket. An output end of the autorotation motor is connected to the autorotation gear, the carrying mechanism 150 is mounted on the autorotation gear, and the carrying bracket is mounted on the lifting mechanism 140. The autorotation motor may drive the autorotation gear to rotate, which may further drive the carrying mechanism 150 to rotate.

In addition, when the loading or unloading apparatus 600 loads or unloads the goods 200 with the transport robot 100, the carrying mechanism 150 ascends to a highest position to avoid the loading or unloading apparatus 600. It should be noted that, the essence of the rotary mechanism is to output a rotation motion, so as to drive the carrying mechanism 150 to rotate, thereby implementing the loading or unloading of the goods 200. In this embodiment, the rotary mechanism is implemented by an autorotation motor and an autorotation gear. In addition, there are various structures that can implement rotation, which cannot all be listed herein, and the manner of the rotation motion in the present disclosure is not limited to being implemented by the foregoing specific structures.

In an embodiment, the carrying mechanism 150 includes a transition member 151 and a pick-or-place member 152 that is telescopically arranged on the transition member 151, and the pick-or-place member 152 is capable of taking out goods 200 and storing the goods in the transition member 151, and is further capable of pushing out goods 200 in the transition member 151. The pick-or-place member 152 is telescopically arranged in the transition member 151. At the loading position, the pick-or-place member 152 extends out of the transition member 151 to take out goods 200 on a shelving unit, and then the pick-or-place member 152 retracts into the transition member 151 to temporarily store the goods 200 in the transition member 151. Subsequently, the lifting mechanism 140 and the rotary mechanism drive the carrying mechanism 150 to move, so that the carrying mechanism 150 moves to a plurality of storage assemblies 121 in which the goods are to be placed. At this time, the pick-or-place member 152 extends out of the transition member 151, moves the goods 200 out of the transition member 151, and transfers the goods to the plurality of storage assemblies 121. After the transfer, the pick-or-place member 152 retracts into the transition member 151. Optionally, the transition member 151 includes, but is not limited to, a transition box, and the pick-or-place member 152 includes, but is not limited to, a structure in which a telescopic motor cooperates with a telescopic rod, a mechanical arm mechanism, and the like.

Referring to FIG. 9 and FIG. 11, the present disclosure further provides a transport system including a loading or unloading apparatus 600 and the transport robot 100 in the foregoing embodiments. The loading or unloading apparatus 600 is configured to convey the goods 200 to the transport robot 100 or unload the goods 200 on the transport robot 100. The loading or unloading apparatus 600 includes an upright frame 610 extending along a vertical direction and a plurality of loading or unloading mechanisms 620 arranged on the upright frame 610 at intervals along the vertical direction, and a manner in which the plurality of loading or unloading mechanisms 620 are arranged at intervals is the same as a manner in which a plurality of storage assemblies 121 are arranged at intervals. After the transport robot 100 is docked with the loading or unloading apparatus 600, the plurality of loading or unloading mechanisms 620 are capable of respectively conveying, at different heights, the goods 200 to the plurality of storage assemblies 121 or unloading the goods 200 in the plurality of storage assemblies 121.

The loading or unloading apparatus 600 can implement synchronous unloading or synchronous loading of the goods 200. The loading or unloading apparatus 600 is mounted at an unloading position or a loading position. In a case that the loading or unloading apparatus 600 is unloaded, the loading or unloading apparatus 600 is at the unloading position; and in a case that the loading or unloading apparatus 600 is loaded, the loading or unloading apparatus 600 is at the loading position. In the present disclosure, only an example in which the loading or unloading apparatus 600 is at the unloading position is used for description. The loading or unloading apparatus 600 is located at the unloading position. After the transport robot 100 completes loading at the loading position, the transport robot 100 moves to the unloading position. At this time, the transport robot 100 is docked with the loading or unloading apparatus 600, and the loading or unloading apparatus 600 may receive and pick the goods 200 in the plurality of storage assemblies 121 in the transport robot 100. Certainly, the reverse transport of the goods 200 may also be implemented at this position, that is, after the transport robot 100 is docked with the loading or unloading apparatus 600, the loading or unloading apparatus 600 may transfer the goods 200 to the plurality of storage assemblies 121.

Specifically, the upright frame 610 plays a supporting role, and is configured to support the plurality of loading or unloading mechanisms 620 configured to transport the goods 200. The loading or unloading apparatus 600 includes a same quantity of loading or unloading mechanisms 620 as the plurality of storage assemblies 121. The plurality of loading or unloading mechanisms 620 may separately convey, at different heights, the goods 200 to the transport robot 100, or unload the goods 200 on the transport robot 100, which greatly shortens the waiting time of the transport robot 100 during a loading or unloading process. In addition, heights at which the plurality of loading or unloading mechanisms 620 are located are consistent with heights at which corresponding storage assemblies 121 are located. After the transport robot 100 is docked with the loading or unloading apparatus 600, the plurality of storage assemblies 121 and the plurality of loading or unloading mechanisms 620 are at same heights, and the plurality of loading or unloading mechanisms 620 may convey the goods 200 to all storage assemblies 121 on the transport robot 100 at one time, or the plurality of loading or unloading mechanisms 620 may implement one-time removal of goods 200 from all storage assemblies 121 on the transport robot 100. Certainly, in specific working conditions, one or more loading or unloading mechanisms 620 in the loading or unloading apparatus 600 may simultaneously convey the goods 200 to the transport robot 100 or unload the goods 200 on the transport robot 100.

Each of the plurality of loading or unloading mechanisms 620 may act independently to convey the goods 200 to the transport robot 100 or unload the goods 200 on the transport robot 100. Referring to FIG. 10 to FIG. 13, in an embodiment, each of the plurality of loading or unloading mechanisms 620 includes a bracket 621, a loading or unloading assembly 622, and a loading or unloading driving member 623, a plurality of brackets 621 are arranged on the upright frame 610 at intervals along the vertical direction, the loading or unloading driving member 623 and the loading or unloading assembly 622 are respectively arranged on corresponding brackets 621, the loading or unloading assembly 622 is connected to the loading or unloading driving member 623, and the loading or unloading assembly 622 is configured to convey the goods 200 to the plurality of storage assemblies 121 or unload the goods 200 in the plurality of storage assemblies 121. The loading or unloading driving member 623 may allow a corresponding loading or unloading assembly 622 to individually convey the goods 200 to the transport robot 100 or unload the goods 200 on the transport robot 100.

Further, as shown in FIG. 10 to FIG. 13, the loading or unloading assembly 622 includes a chain 6221 and a protrusion 6222, the chain 6221 is rotatably arranged on the bracket 621 along a loading or unloading direction, and the protrusion 6222 is fixedly arranged on the chain 6221. The loading or unloading driving member 623 includes a driving motor in driving connection with the chain 6221; and the chain 6221 may carry the goods 200. When the driving motor drives the chain 6221 to rotate, the protrusion 6222 pushes a bottom portion of the goods 200, so as to push the goods 200 to the transport robot 100, or the protrusion 6222 pulls a bottom portion of the goods 200, so as to pull the goods 200 from the transport robot 100 to the chain 6221, or the protrusion 6222 blocks the bottom portion of the goods 200, and the goods 200 are transferred to the chain 6221 when the transport robot 100 moves away from the loading or unloading apparatus 600. Specifically, the chain 6221 is arranged on two sprockets arranged at intervals along the loading or unloading direction, and an output shaft of the driving motor is in driving connection with one of the two sprockets. When rotating, the driving motor drives the chain 6221 to operate, and the protrusion 6222 pushes the bottom portion of the goods 200, so as to push the goods 200 to the transport robot 100, or the protrusion 6222 pulls the bottom portion of the goods 200, so as to pull the goods 200 from the transport robot 100 to the chain 6221. Furthermore, each of the plurality of loading or unloading mechanisms 620 includes two sets of loading or unloading assemblies 622, the two sets of loading or unloading assemblies 622 are arranged on the bracket 621 in parallel and at intervals, and the driving motor is in driving connection with two chains 6221. The two sets of loading or unloading assemblies 622 can increase the stability during the loading or unloading of the goods 200. In an embodiment of the present disclosure, as shown in FIG. 13, each of the plurality of loading or unloading mechanisms 620 further includes a synchronization rod 624, the two chains 6221 are separately in driving connection with the synchronization rod 624, and the driving motor is in driving connection with one of the two chains 6221. Specifically, the synchronization rod 624 connects two sprockets arranged at intervals along a horizontal direction perpendicular to the loading or unloading direction, thereby ensuring that the two chains 6221 rotate synchronously.

In another embodiment, as shown in FIG. 10, FIG. 11, FIG. 14, and FIG. 15, each of the plurality of loading or unloading mechanisms 620 includes a loading or unloading cross arm 625 and a push-pull assembly 626, one ends of a plurality of loading or unloading cross arms 625 are arranged on the upright frame 610 at intervals along the vertical direction, and the push-pull assembly 626 is rotatably arranged at other ends corresponding to the plurality of loading or unloading cross arms 625. When rotating, the push-pull assembly 626 includes a push-pull position and an avoidance position, and when rotating to the push-pull position, push-pull assembly 626 conveys the goods 200 to the transport robot 100 or pulls down the goods 200 on the transport robot 100. When the push-pull assembly 626 rotates to the avoidance position, the push-pull assembly 626 avoids the goods 200. It can be understood that when pushing or pulling the goods 200, the push-pull assembly 626 may push or pull a top portion, a middle portion, or a bottom portion of the goods 200. In an embodiment of the present disclosure, two loading or unloading assemblies 620 are arranged at intervals in a same horizontal direction of the upright frame 610, and two push-pull assemblies 626 in the same horizontal direction separately rotate to the push-pull position or the avoidance position. The two push-pull assemblies 626 in the same horizontal direction respectively drive two sides of the goods 200 along the loading or unloading direction. The two push-pull assemblies 626 push or pull the two sides of the goods 200 synchronously, which can effectively ensure the stability of a push-pull process of the goods 200. Further, the two push-pull assemblies 626 in the same horizontal direction push/pull two sides of the middle portion of the goods 200 synchronously along the loading or unloading direction. It can be understood that the two push-pull assemblies 626 in the same horizontal direction rotate to the push-pull position or the avoidance position synchronously, or rotate to the push-pull position or the avoidance position successively.

In an implementation, as shown in FIG. 14 and FIG. 15, the push-pull assembly 626 includes a push-pull rod 6261 and a push-pull motor 6262, the push-pull motor 6262 is arranged at one ends of the plurality of loading or unloading cross arms 625 away from the upright frame 610, the push-pull rod 6261 is arranged on an output shaft of the push-pull motor 6262, and the push-pull motor 6262 is configured to drive the push-pull rod 6261 to rotate to the push-pull position or the avoidance position. Two push-pull rods 6261 may separately be rotated to the push-pull position under the driving of the push-pull motor 6262, so as to pull the goods 200 out of the transport robot 100 or push the goods 200 to the transport robot 100.

In an embodiment, all loading or unloading mechanisms 620 in the loading or unloading apparatus 600 act synchronously to convey, at different heights, the goods 200 to the transport robot 100 or unload the goods 200 on the transport robot 100, or some of the plurality of loading or unloading mechanisms 620 in the loading or unloading apparatus 600 act independently to convey, at specified heights, the goods 200 to the transport robot 100 or unload the goods 200 on the transport robot 100. As shown in FIG. 16 and FIG. 17, in an implementation, the loading or unloading apparatus 600 further includes an adjustment drive mechanism 630 configured to drive the upright frame 610 to approach or move away from the transport robot 100 along the loading or unloading direction, and when the adjustment drive mechanism 630 drives the upright frame 610 to approach the transport robot 100, the plurality of loading or unloading mechanisms 620 convey the goods 200 to the transport robot 100 or unload the goods 200 on the transport robot 100. The loading or unloading apparatus 600 provided in this embodiment can remove all the goods 200 or specified goods 200 on the transport robot 100 at one time, or simultaneously convey a plurality of goods 200 to the transport robot 100. In an implementation, the adjustment drive mechanism 630 adopts a driving structure in the form of a motor and a belt.

In an embodiment of the present disclosure, the loading or unloading apparatus 600 further includes a temporary storage shelving unit 640, the upright frame 610 is movably arranged on the temporary storage shelving unit 640 along a horizontal direction, and the adjustment drive mechanism 630 is configured to drive the upright frame 610 to move relative to the temporary storage shelving unit 640 along the horizontal direction. The temporary storage shelving unit 640 includes a shelving unit with a plurality of layers along the vertical direction, and the plurality of loading or unloading mechanisms 620 are configured to pull goods 200 at different heights on the transport robot 100 to corresponding layers of the shelving unit on the temporary storage shelving unit 640, or the plurality of loading or unloading mechanisms 620 are configured to push goods 200 on the plurality of layers of the shelving unit to the transport robot 100. The temporary storage shelving unit 640 can temporarily store the goods 200 unloaded from the transport robot 100 by the loading or unloading apparatus 600, or temporarily store the to-be-transported goods 200 which are transported to the transport robot 100. In an implementation, the temporary storage shelving unit 640 includes a temporary storage roller 641 with a plurality of layers arranged along the vertical direction, and each layer of the temporary storage roller 641 is capable of individually transporting the goods 200 along the loading or unloading direction. Optionally, each layer of the temporary storage roller 641 can simultaneously carry a plurality of goods 200.

In an embodiment, the loading or unloading apparatus 600 further includes a movable base arranged at a bottom portion of the upright frame 610. The loading or unloading apparatus 600 further includes a movable base arranged at the bottom portion of the upright frame 610. The movable base can drive the loading or unloading apparatus 600 to move, which greatly improves the adaptability of the loading or unloading apparatus 600 to actual working conditions. In this way, the loading or unloading apparatus 600 can easily move to the loading position, the unloading position, or any other position, to work with the transport robot 100. Optionally, a structure of the base is exactly the same as that of the chassis 160 of the transport robot 100, and details are not described herein again.

Referring to FIG. 9 and FIG. 11, in an embodiment, the transport system further includes a conveying apparatus 500 and a lifting apparatus 400 that is arranged between the loading or unloading apparatus 600 and the conveying apparatus 500, and the lifting apparatus 400 is configured to ascend or descend along the vertical direction, so as to be docked with each of the plurality of loading or unloading mechanisms 620 and the conveying apparatus 500. The lifting apparatus 400 is capable of receiving and picking the goods 200 of the plurality of loading or unloading mechanisms 620 and transferring the goods to the conveying apparatus 500; or the lifting apparatus 400 is capable of receiving and picking goods 200 of the conveying apparatus 500 and transferring the goods to the plurality of loading or unloading mechanisms 620.

The lifting apparatus 400 is configured to receive and pick the goods 200 of the plurality of loading or unloading mechanisms 620 or transport the goods 200 to the plurality of loading or unloading mechanisms 620. Because the plurality of loading or unloading mechanisms 620 are arranged at intervals along the vertical direction, to facilitate the goods loading or unloading of the loading or unloading apparatus 600, the lifting apparatus 400 needs to move to a loading or unloading mechanism 620 at a corresponding position, so as to perform a corresponding operation. The conveying apparatus 500 is configured to convey the goods 200, may transport away goods 200 unloaded by the lifting apparatus 400, and may also transport to-be-loaded goods 200 to the lifting apparatus 400. Optionally, the conveying apparatus 500 may be of a structure that can implement the horizontal transport, such as a conveyor belt structure, an assembly line, a conveying roller structure, or a roller structure, or the like. Exemplarily, the conveying apparatus 500 is of an assembly line structure, and specifically, when unloading, the lifting apparatus 400 ascends to one side of a loading or unloading mechanism 620, after receiving the goods 200 of the loading or unloading mechanism 620, the lifting apparatus 400 descends, and transfers the goods 200 to the conveying apparatus 500, and the goods are transported away by the conveying apparatus 500. Subsequently, the lifting apparatus 400 further ascends to another loading or unloading mechanism 620, and this process is repeated until all the goods 200 on the plurality of loading or unloading mechanisms 620 are transported away. When loading, after the lifting apparatus 400 descends and receives and picks the goods 200 conveyed by the conveying apparatus 500, the lifting apparatus 400 ascends to one side of a loading or unloading mechanism 620 and transfers the goods 200 to the loading or unloading mechanism 620; and subsequently, the lifting apparatus 400 further descends to the conveying apparatus 500, and this process is repeated until the plurality of loading or unloading mechanisms 620 are loaded with the goods 200.

In an embodiment, the lifting apparatus 400 includes a lifting frame 410 along the vertical direction, a moving mechanism 420 arranged on the lifting frame 410, and a transfer mechanism 430 with at least one layer arranged on the moving mechanism 420, and the moving mechanism 420 may ascend or descend along the lifting frame 410 and drive the transfer mechanism 430 with at least one layer to move, so as to receive and pick or transfer the goods 200 to the plurality of loading or unloading mechanisms 620. The lifting frame 410 has a bearing function, and is configured to bear the moving mechanism 420 and the transfer mechanism 430 with at least one layer. Optionally, a bottom portion of the lifting frame 410 may also be provided with rotating wheels, so as to adapt to different applications. The transfer mechanism 430 with at least one layer is configured to carry the goods 200 and implement the transfer of the goods 200 between a high position such as a loading or unloading mechanism 620 and a low position such as the conveying apparatus 500. The moving mechanism 420 is arranged on the lifting frame 410 along the vertical direction, and may output movement in the vertical direction, so as to drive the transfer mechanism 430 with at least one layer to ascend or descend.

It can be understood that the moving mechanism 420 is configured to implement the ascending or descending motion of the transfer mechanism 430 with at least one layer along the vertical direction. A specific structure of the moving mechanism 420 may be a telescopic rod structure, a chain transmission structure, a driving transmission structure, or the like, and may also be another structure capable of enabling the carrying mechanism 150 to ascend or descend. Exemplarily, a specific structure of the moving mechanism 420 is the same as a structure of the lifting mechanism 140 of the transport robot 100, and details are not described herein again. Certainly, the specific structure of the moving mechanism 420 may also be different from the structure of the lifting mechanism 140 of the transport robot 100, as long as the moving mechanism 420 can implement the ascending or descending motion.

Exemplarily, there is a transfer mechanism 430 with one layer, and the transfer mechanism 430 with one layer receives and picks goods 200 from one loading or unloading mechanism 620 at one time, or transfers goods 200 to one loading or unloading mechanism 620 at one time. Certainly, in another implementation of the present disclosure, in a case that there is a transfer mechanism 430 with at least two layers, the transfer mechanism 430 with at least two layers may remove goods 200 of at least two loading or unloading mechanisms 620 at one time, or transfer goods 200 to at least two loading or unloading mechanisms 620, so as to improve the efficiency of turnover of the goods 200.

In an embodiment, the transfer mechanism 430 with at least one layer includes a transfer base 431 arranged on the moving mechanism 420 and a transfer portion 432 movably arranged on the transfer base 431, and the transfer portion 432 may drive the goods 200 to move, and may receive and pick or transfer the goods 200 to at least one of the plurality of loading or unloading mechanisms 620. The transfer base 431 plays a bearing role and is configured to carry the transfer portion 432, so as to mount the transfer portion 432 on the moving mechanism 420. When the moving mechanism 420 ascends or descends, the transfer base 431 may drive the transfer portion 432 to ascend or descend synchronously, so as to implement the loading or unloading of the goods 200.

Optionally, the transfer portion 432 is of a structure that can implement horizontal transport, such as a conveyor belt structure, an assembly line, a conveyor roller structure, a roller structure, or the like. Exemplarily, the transfer portion 432 is of a rolling shaft structure, and specifically includes a plurality of rolling shafts, and each of the plurality of rolling shafts includes a built-in rolling motor to drive the each of the plurality of rolling shafts to rotate, thereby implementing the transport of the goods 200. It should be noted that, there are various structures that can implement the horizontal transport of the goods 200, which cannot all be listed herein, and the transfer portion 432 in the present disclosure is not limited to being implemented by the foregoing specific structures.

The transfer portion 432 may receive and pick the goods 200 of one loading or unloading mechanism 620 at one time, as mentioned above. The transfer portion 432 may also receive and pick the goods 200 of a plurality of loading or unloading mechanisms 620 at one time, and the moving mechanism 420 may receive and pick the goods 200 of the plurality of loading or unloading mechanisms 620 layer by layer, and then convey the goods to the conveying apparatus 500 together for transport after receiving and picking the goods. Exemplarily, the moving mechanism 420 drives the transfer portion 432 to ascend to a top portion. After receiving and picking goods 200 of one loading or unloading mechanism 620, the transfer portion 432 descends one layer to receive and pick goods 200 of one loading or unloading mechanism 620. After the transfer portion 432 is full or the goods 200 of the plurality of loading or unloading mechanisms 620 are received, the moving mechanism 420 drives the transfer portion 432 to descend to a position of the conveying apparatus 500, and the transfer portion 432 transfers all the goods 200 thereon to the conveying apparatus 500. Certainly, the moving mechanism 420 may move layer by layer from bottom to top, a principle thereof is substantially the same as a principle from top to bottom, and details are not described herein again.

Certainly, the transfer portion 432 may also receive and pick a plurality of goods 200 transferred by the conveying apparatus 500 at one time, and then transfer the goods to the plurality of loading or unloading mechanisms 620 layer by layer, a principle thereof is substantially the same as the foregoing principle of goods unloading, and details are not described herein again.

In the transport robot 100 and the transport system in the present disclosure, when transporting goods, a blocking mechanism 170 moves to a blocking position and may be in abutment with goods 200 in a plurality of storage assemblies 121, so as to restrict the goods 200 from sliding out of the plurality of storage assemblies 121. Therefore, the goods 200 are prevented from sliding out of the plurality of storage assemblies 121 during a transport process of the transport robot 100, the safety of the goods 200 is ensured, a risk of sliding out is avoided, and the transport efficiency is improved. In addition, when the transport robot 100 loads or unloads goods, the blocking mechanism 170 moves to an avoidance position. At this time, the goods 200 may be loaded into the plurality of storage assemblies 121, and the goods 200 in the plurality of storage assemblies 121 may also be removed, which does not hinder a loading or unloading operation of the transport robot 100, and is convenient for use.

Embodiment 4

Referring to FIG. 1, FIG. 3, FIG. 6, FIG. 9, and FIG. 11, the present disclosure provides a transport robot 100. The transport robot 100 is applied to a transport system, and can transport goods 200. It can be understood that the goods 200 may be goods with a bracket, and the transport robot 100 transports the goods 200 through the bracket; and certainly, the goods may alternatively be goods placed in a container, and the transport robot 100 transports the goods 200 through a box. The goods 200 described below are goods placed in a box, and the box may be loaded with the goods 200, so as to implement the transport of the goods 200. The transport robot 100 transports the box to an unloading position, and after unloading the goods 200 in the box, the box may be transported back to the transport robot 100, so as to reuse the box and reduce the cost. Alternatively, the goods 200 is a box with goods, and the transport robot 100 transports the box to the unloading position, and unloads the box with goods through an unloading apparatus.

The transport robot 100 plays an important role in intelligent warehousing, transports goods 200, ensures a transport speed of the goods 200, improves the transport efficiency of the goods 200, and reduces the consumption of labor resources. The transport robot 100 of the present disclosure can unload synchronously, so that goods 200 in the transport robot 100 can be unloaded at one time, thereby improving the unloading efficiency, reducing the unloading time, and improving the overall working efficiency of the transport robot 100.

Referring to FIG. 1 and FIG. 3, in an embodiment, the transport robot 100 includes a vertical frame 110 and a storage mechanism 120. The vertical frame 110 is arranged along a vertical direction. The storage mechanism 120 includes a plurality of storage assemblies 121 configured to store to-be-transported goods 200 and arranged on the vertical frame 110 at equal intervals along the vertical direction.

The vertical frame 110 plays a bearing role, and various components of the transport robot 100 are mounted thereon. When the transport robot 100 transports the goods 200, the vertical frame 110 may drive synchronous movement of the components on the transport robot 100, so as to implement the transport of the goods 200. The storage mechanism 120 is located on the vertical frame 110, is configured to store the goods 200, and is capable of moving synchronously with the vertical frame 110, so as to implement the transport of the goods 200. The transport robot 100 moves to a loading position, and the to-be-transported goods 200 are transported to the storage mechanism 120 for storage. Then, the transport robot 100 moves from the loading position to an unloading position. Correspondingly, the storage mechanism 120 moves to the unloading position along with the vertical frame 110. At this time, the goods 200 in the storage mechanism 120 can be unloaded. The storage mechanism 120 can temporarily store the to-be-transported goods 200, thereby improving the capability of the transport robot 100 to carry the goods 200.

In addition, the storage mechanism 120 includes a plurality of storage assemblies 121 arranged on the vertical frame 110 at intervals. Each of the plurality of storage assemblies 121 can carry goods 200 of a box to ensure a storage capacity of the transport robot 100. Optionally, a distance between two adjacent storage assemblies 121 may be equal or not equal. Exemplarily, the plurality of storage assemblies 121 are evenly distributed on the vertical frame 110 along the vertical direction. The to-be-transported goods 200 may be transported to the plurality of storage assemblies 121, and the transport robot 100 drives the goods 200 in the plurality of storage assemblies 121 to be transported to the unloading position.

Referring to FIG. 1 and FIG. 3, in an embodiment, the transport robot 100 further includes a lifting mechanism 140 capable of ascending or descending relative to the vertical frame 110 along the vertical direction and a carrying mechanism 150 configured to carry the goods 200, where the carrying mechanism 150 is movably arranged on the vertical frame 110 along the vertical direction, is connected to the lifting mechanism 140, and is capable of ascending or descending along the vertical direction under driving of the lifting mechanism 140, so as to deliver goods 200 in the carrying mechanism 150 to a corresponding storage mechanism 120.

The carrying mechanism 150 is a terminal configured to perform an action of the transport robot 100. At the loading position, the carrying mechanism 150 may carry the to-be-transported goods 200, and transport the goods 200 into the plurality of storage assemblies 121. Certainly, in some occasions, in a case that the goods 200 in the plurality of storage assemblies 121 need to be unloaded separately, the carrying mechanism 150 may also take out the goods 200 in the plurality of storage assemblies 121. Optionally, the carrying mechanism 150 includes, but is not limited to, a mechanical arm, an actionable tow bar, or a plane with a conveying function, and the like. The lifting mechanism 140 is configured to implement the ascending or descending movement of the carrying mechanism 150, and is capable of driving the carrying mechanism 150 to ascend or descend along the vertical direction.

At the loading position, there is a shelving unit with a plurality of layers configured to carry goods 200. When loading goods at the loading position of the transport robot 100, the lifting mechanism 140 drives the carrying mechanism 150 to ascend or descend, so that the carrying mechanism 150 can pick goods on the shelving unit. Then, the lifting mechanism 140 drives the carrying mechanism 150 to ascend or descend, so as to transfer the goods 200 in the carrying mechanism 150 to the plurality of storage assemblies 121. This process is repeated until the plurality of storage assemblies 121 store the goods 200. After the loading is completed, the transport robot 100 moves from the loading position to the unloading position, and the plurality of storage assemblies 121 may perform a synchronous unloading operation. After the unloading is completed, the transport robot 100 returns to the loading position, so that continuous transport of the goods 200 can be implemented by repeating the process, thereby improving the transport efficiency.

The function of the lifting mechanism 140 is to drive the carrying mechanism 150 to ascend or descend along the vertical direction. In an embodiment, the lifting mechanism 140 includes a lifting power source and a lifting transmission component, and the lifting power source and the lifting transmission component are separately arranged on the vertical frame 110. The lifting transmission component is in driving connection with the lifting power source and the carrying mechanism 150. Specifically, an output end of the lifting power source is in driving connection with an input end of the lifting transmission component, and an output end of the lifting transmission component is in driving connection with the carrying mechanism 150. That the lifting power source and the lifting transmission component are separately arranged on the vertical frame 110, and the driving connection between the lifting power source and the lifting transmission component facilitate the disassembly or assembly of the lifting mechanism 140 on the vertical frame 110. Optionally, a power output from the lifting power source is in a form of rotation and linear motion, or in any other form of motion, and a final output of the lifting transmission component in driving connection with the lifting power source is movement along the vertical direction. Optionally, the lifting power source includes a driving motor in driving connection with the input end of the lifting transmission component. The lifting power source in a form of a motor runs more stably. Further, the driving motor can rotate forwardly or reversely, which facilitates the control of an ascending or descending process of the lifting mechanism 140.

Optionally, the lifting transmission component may be of a telescopic rod structure, a chain transmission structure, a driving transmission structure, or the like, and may also be of another structure capable of enabling the carrying mechanism 150 to ascend or descend. Exemplarily, the lifting transmission component is of a chain transmission structure, including a sprocket and a chain, the chain is connected to the carrying mechanism 150, and the chain is arranged on the vertical frame 110 along the vertical direction. When the output end of the lifting power source drives the sprocket to rotate, the chain ascends or descends along the vertical frame 110, which may further drive the carrying mechanism 150 to ascend or descend.

It should be noted that, the essence of the lifting transmission component is to output the ascending or descending motion to drive the carrying mechanism 150 to ascend or descend, thereby implementing the loading of the goods 200. In this embodiment, the lifting transmission component is implemented by a chain transmission structure. In addition, there are various structures that can implement ascending or descending, which cannot all be listed herein, and the manner of the ascending or descending motion in the present disclosure is not limited to being implemented by the foregoing specific structures.

In an embodiment, the transport robot 100 further includes a rotary mechanism arranged between the carrying mechanism 150 and the lifting mechanism 140 and configured to drive the carrying mechanism 150 to rotate relative to the lifting mechanism 140, so that the carrying mechanism 150 is aligned with a corresponding storage mechanism 120. The rotary mechanism is rotatably connected to the carrying mechanism 150, and the carrying mechanism 150 is rotatable relative to the rotary mechanism. When the carrying mechanism 150 is rotated by the rotary mechanism, a direction of the carrying mechanism 150 may be adjusted, so that the loading or unloading port of the carrying mechanism 150 can be adjusted. The carrying mechanism 150 implements the loading or unloading of the goods 200 through the loading or unloading port. When the transport robot 100 is at the loading position, the rotary mechanism may drive the carrying mechanism 150 to rotate, so that the loading or unloading port of the carrying mechanism 150 faces a shelving unit, and the goods 200 can be loaded into the carrying mechanism 150. When the carrying mechanism 150 transfers the goods 200 to the plurality of storage assemblies 121, the rotary mechanism may drive the carrying mechanism 150 to rotate, so that the loading or unloading port of the carrying mechanism 150 faces the plurality of storage assemblies 121. At this time, the goods 200 in the carrying mechanism 150 can be transferred to the plurality of storage assemblies 121.

Optionally, the rotary mechanism includes a carrying bracket, an autorotation gear arranged on the carrying bracket, and an autorotation motor fixedly mounted on the carrying bracket. An output end of the autorotation motor is connected to the autorotation gear, the carrying mechanism 150 is mounted on the autorotation gear, and the carrying bracket is mounted on the lifting mechanism 140. The autorotation motor may drive the autorotation gear to rotate, which may further drive the carrying mechanism 150 to rotate.

It should be noted that, the essence of the rotary mechanism is to output a rotation motion, so as to drive the carrying mechanism 150 to rotate, thereby implementing the loading or unloading of the goods 200. In this embodiment, the rotary mechanism is implemented by an autorotation motor and an autorotation gear. In addition, there are various structures that can implement rotation, which cannot all be listed herein, and the manner of the rotation motion in the present disclosure is not limited to being implemented by the foregoing specific structures.

When the transport robot 100 in the foregoing embodiment loads goods, the lifting mechanism 140 drives the carrying mechanism 150 to transfer the goods 200 to a plurality of storage assemblies 121 at corresponding heights in the storage mechanism 120. When unloading, the lifting mechanism 140 drives the carrying mechanism 150 to take out the goods 200 in a plurality of storage assemblies 121 at corresponding heights in the storage mechanism 120. Through the cooperation between the lifting mechanism 140 and the carrying mechanism 150, the automation of loading or unloading of the goods 200 is implemented, a problem of high cost and low efficiency in a current transport method is effectively resolved, the cost of the loading or unloading of the goods is reduced, and the efficiency of the loading or unloading of the goods 200 is greatly improved. In addition, the carrying mechanism 150 moves to different heights under the driving of the lifting mechanism 140, so that the to-be-transported goods 200 can be delivered to a plurality of storage assemblies 121 at different heights in the storage mechanism 120, which has strong versatility and reduces the floor space.

Referring to FIG. 1 and FIG. 3, in an embodiment, the carrying mechanism 150 includes a transition member 151 and a pick-or-place member 152 that is telescopically arranged on the transition member 151, and the pick-or-place member 152 is capable of taking out goods 200 and storing the goods in the transition member 151, and is further capable of pushing out goods 200 in the transition member 151. The pick-or-place member 152 is telescopically arranged in the transition member 151. At the loading position, the pick-or-place member 152 extends out of the transition member 151 to take out goods 200 on a shelving unit, and then the pick-or-place member 152 retracts into the transition member 151 to temporarily store the goods 200 in the transition member 151. Subsequently, the lifting mechanism 140 and the rotary mechanism drive the carrying mechanism 150 to move, so that the carrying mechanism 150 moves to a plurality of storage assemblies 121 in which the goods are to be placed. At this time, the pick-or-place member 152 extends out of the transition member 151, moves the goods 200 out of the transition member 151, and transfers the goods to the plurality of storage assemblies 121. After the transfer, the pick-or-place member 152 retracts into the transition member 151. Optionally, the transition member 151 includes, but is not limited to, a transition box, and the pick-or-place member 152 includes, but is not limited to, a structure in which a telescopic motor cooperates with a telescopic rod, a mechanical arm mechanism, and the like.

In an embodiment, the transport robot 100 further includes a movable chassis 160 arranged at a bottom portion of the vertical frame 110. The movable chassis 160 can drive the transport robot 100 to move, which greatly improves the adaptability of the transport robot 100 to actual working conditions. Specifically, the chassis 160 includes a chassis frame 161, a travel drive assembly, and a plurality of rotating wheels 162, the vertical frame 110 is arranged on an upper portion of the chassis frame 161, the plurality of rotating wheels 162 are arranged on a bottom portion of the chassis frame 161, the travel drive assembly is arranged on the chassis frame 161, and at least one of the plurality of rotating wheels 162 is in driving connection with the travel drive assembly. Further, at least two of the plurality of rotating wheels 162 are separately in driving connection with the travel drive assembly, and the at least two of the plurality of rotating wheels 162 being separately in driving connection with the travel drive assembly are distributed on two sides of the chassis frame 161 along a traveling direction, thereby achieving a steering function of the chassis 160. The travel drive assembly includes at least two wheel drive motors, and the at least two of the plurality of rotating wheels 162 distributed on the two sides of the chassis frame 161 along the traveling direction are respectively driven by separate wheel drive motors. That the at least two of the plurality of rotating wheels 162 distributed on the two sides of the chassis frame 161 along the traveling direction are respectively driven by separate wheel drive motors can simplify a transmission structure on the chassis 160.

In an embodiment, each of the plurality of rotating wheels 162 includes a driving wheel and a driven wheel. The driving wheel and the driven wheel are mounted on a bottom portion of the chassis 160, may separately rotate relative to the chassis 160, and jointly support the chassis 160. The driving wheel is driven by a wheel drive motor to enable the chassis 160 to move. By configuring the movable chassis 160, the transport robot 100 can transport the goods 200 between the loading position and the unloading position. There are two driving wheels, and the two driving wheels are symmetrically distributed. Correspondingly, there are two wheel drive motors, and the two driving wheels are respectively driven by the two wheel drive motors, so that rotational speeds of the two driving wheels are different, thereby implementing the steering of the chassis 160. There are four driven wheels, and the four driven wheels are distributed in a rectangular shape. The four driven wheels may be universal wheels or may be of other wheel structures with a steering function. According to actual situations, a quantity of the driven wheel is not limited to four, but may also be six, three, or the like.

In this embodiment, the chassis 160 is also mounted with a guiding apparatus, and the guiding apparatus is a camera configured to identify a graphic code attached to a ground, so that the chassis 160 travels along a preset path. The graphic code may be a two-dimensional code, a barcode, or some customized identification codes. In some other embodiments, the guiding apparatus is a laser guiding apparatus configured to guide the chassis 160 to travel along a laser beam, or the guiding apparatus is a short-wave receiving apparatus configured to receive a preset short-wave signal to guide the chassis 160 to travel along a preset path. It should be noted that, in some other embodiments, the chassis 160 may be omitted, and the vertical frame 110 is directly and fixedly mounted on the ground or another platform, and is only configured to carry the goods 200 between the loading position and the unloading position around the vertical frame.

First Embodiment

Referring to FIG. 1 to FIG. 8, in the first embodiment, when the transport robot 100 is unloading, a plurality of storage assemblies 121 are capable of moving synchronously to perform a synchronous unloading action.

To further improve the transport efficiency of the transport robot 100, the transport robot 100 of the present disclosure can implement synchronous unloading at the unloading position. Specifically, during unloading, a plurality of storage assemblies 121 may move synchronously, so that the goods 200 are moved out of the plurality of storage assemblies 121, and a synchronous unloading action is performed in real time. In this way, the goods 200 in the plurality of storage assemblies 121 can be unloaded synchronously, which shortens the unloading time and improves the unloading efficiency of the transport robot 100. After the unloading is completed, the transport robot 100 may return to the loading position to continue loading, which improves the working efficiency of the transport robot 100.

In this embodiment described above, when the transport robot 100 is unloading, a plurality of storage assemblies 121 of a storage mechanism 120 may move synchronously to perform a synchronous unloading action, so that the synchronous unloading of goods 200 in the plurality of storage assemblies 121 is implemented, the current problem of a low unloading efficiency caused by the layer-by-layer unloading of goods is effectively resolved, goods 200 in the transport robot 100 can be unloaded at one time, the unloading efficiency is improved, the unloading time is reduced, and the overall working efficiency of the transport robot 100 is improved.

Referring to FIG. 1 to FIG. 4, in an embodiment, the transport robot 100 further includes at least one linkage mechanism 130, and each of the at least one linkage mechanism 130 is connected to at least two storage assemblies 121 and is configured to drive the at least two storage assemblies 121 to move synchronously relative to the vertical frame 110 to perform a synchronous unloading action. When the at least one linkage mechanism 130 moves, a synchronous movement of the at least two storage assemblies 121 may be implemented. It can be understood that one linkage mechanism 130 may be connected to all storage assemblies 121, and alternatively, among a plurality of linkage mechanisms 130, each of the plurality of linkage mechanisms 130 may be connected to a plurality of storage assemblies 121. Exemplarily, there are two linkage mechanisms 130, where one of the two linkage mechanisms 130 is connected to storage assemblies 121 of first to third layers, and the other one of the two linkage mechanisms 130 is connected to storage assemblies 121 of fourth to sixth layers. Certainly, in another implementation of the present disclosure, there may be more linkage mechanisms 130. The present disclosure is only described by taking an example in which one linkage mechanism 130 is connected to all storage assemblies 121. A working principle of a plurality of linkage mechanisms 130 is substantially the same as that of the one linkage mechanism 130, and details are not described herein again.

The storage mechanism 120 may be rotatably mounted on the vertical frame 110, and may further be connected to the linkage mechanism 130. When moving, the linkage mechanism 130 drives the plurality of storage assemblies 121 to rotate relative to the vertical frame 110, so that the plurality of storage assemblies 121 can undergo a pitching motion. It can be understood that one end of the linkage mechanism 130 may be mounted on the vertical frame 110 or the chassis 160, as long as the linkage mechanism 130 can drive the plurality of storage assemblies 121 to undergo a pitching motion.

When the linkage mechanism 130 drives the plurality of storage assemblies 121 to move upward, one ends of the plurality of storage assemblies 121 are lifted up, and other ends rotate relative to the vertical frame 110, so as to stay at initial positions. At this time, the plurality of storage assemblies 121 are lifted up, and goods 200 thereon may slide out of the plurality of storage assemblies 121 under an action of gravity thereof, so as to implement the unloading of the goods 200. Because the linkage mechanism 130 simultaneously drives the plurality of storage assemblies 121 to move upward, the plurality of storage assemblies 121 can be simultaneously lifted up, thereby simultaneously performing an unloading operation to implement the unloading. After the unloading is completed, the linkage mechanism 130 drives the plurality of storage assemblies 121 to descend, and the plurality of storage assemblies 121 return to horizontal initial positions.

When the linkage mechanism 130 drives the plurality of storage assemblies 121 to move downward, and after external goods 200 are simultaneously conveyed to the plurality of storage assemblies 121, the goods 200 can slide into the plurality of storage assemblies 121 under the action of gravity to implement synchronous loading. It should be noted that the synchronous loading of the transport robot 100 needs to be implemented in cooperation with an auxiliary apparatus 300 of the transport system, a specific implementation process is described in detail in the following specification, and only the synchronous unloading of the transport robot 100 is described in detail in this embodiment.

After the transport robot 100 loads the goods 200 into the plurality of storage assemblies 121 at the loading position, the transport robot 100 moves from the loading position to the unloading position. At this time, the linkage mechanism 130 drives the plurality of storage assemblies 121 to move upward, so that the plurality of storage assemblies 121 are lifted up. In this way, the goods 200 in the plurality of storage assemblies 121 can slide out of the plurality of storage assemblies 121 under the action of gravity thereof, and be stored in a specified apparatus such as the auxiliary apparatus 300, so as to implement the synchronous unloading of the transport robot 100. After the unloading is completed, the transport robot 100 returns to the loading position to load goods, and in this way, a transport function of the transport robot 100 is achieved.

In an embodiment, the linkage mechanism 130 includes a linkage connector 131 simultaneously connected to at least two storage assemblies 121 and capable of synchronously driving the at least two storage assemblies 121 to synchronously undergo a pitching motion. It can be understood that the pitching motion herein may be a pitching rotational motion, or a curved motion, and certainly, may also be in other forms that can generate the pitching motion. One ends of the at least two storage assemblies 121 are rotatably connected to the vertical frame 110, and the at least two storage assemblies 121 are also connected to the linkage connector 131. The linkage connector 131 can ascend or descend. When ascending or descending, the linkage connector 131 may drive the at least two storage assemblies 121 to ascend or descend, so that the at least two storage assemblies 121 rotate relative to the vertical frame 110, that is, the at least two storage assemblies 121 undergo a pitching motion. It can be understood that, when one of the at least two storage assemblies 121 undergo a pitching motion, the linkage connector 131 is driven to ascend or descend, and the remaining storage assemblies 121 may be driven to move through the linkage connector 131; or the linkage connector 131 ascends or descends, and then the at least two storage assemblies 121 are driven to move.

As shown in FIG. 1 and FIG. 2, optionally, the linkage connector 131 and the at least two storage assemblies 121 may be rotatably connected or fixedly connected. When the linkage connector 131 and the at least two storage assemblies 121 are rotatably connected, the at least two storage assemblies 121 may have a rotary shaft, and the at least two storage assemblies 121 may be rotatably mounted on the linkage connector 131 through the rotary shaft. Alternatively, the linkage connector 131 may have a rotary shaft, and the linkage connector 131 may be rotatably mounted on the at least two storage assemblies 121 through the rotary shaft. Alternatively, a connection between the linkage connector 131 and the at least two storage assemblies 121 is similar to an olecranon engagement structure. In addition, the rotary shaft may be replaced with a hinge or another component that can implement a rotatable connection.

Optionally, the linkage connector 131 may be a connecting rod connected to the at least two storage assemblies 121. Further optionally, the linkage member may include a plurality of connecting rods, and two adjacent linkage members are connected by the plurality of connecting rods. In this case, when one of the at least two storage assemblies 121 moves, adjacent connecting rods may drive the remaining storage assemblies 121 to move. It can be understood that a specific structure of the linkage connector 131 is not limited to the connecting rod, but may also be a connecting piece or the like.

It should be noted that, the essential spirit of the present disclosure lies in the linkage between the linkage connector 131 and the at least two storage assemblies 121, and the linkage connector 131 can implement the synchronous movement of the at least two storage assemblies 121, thereby performing a synchronous unloading operation. In this embodiment, the connection of connectors is implemented by connecting rods, and there may be one or more connecting rods. In addition, there are various arrangements of the linkage connector 131, which cannot all be listed herein, and a linkage manner in the present disclosure is not limited to being implemented by the foregoing specific structures.

Referring to FIG. 1 and FIG. 3, in an embodiment, in a same horizontal direction, a distance between the linkage connector 131 and the vertical frame 110 is less than or equal to a length of each of the plurality of storage assemblies 121. It can be understood that a length at a connection position between the linkage connector 131 and the plurality of storage assemblies 121 may be equal to the length of each of the plurality of storage assemblies 121. In this case, the linkage connector 131 and the vertical frame 110 are respectively located at two ends of the plurality of storage assemblies 121. The length at the connection position between the linkage connector 131 and the plurality of storage assemblies 121 may be less than the length of each of the plurality of storage assemblies 121, and the connection position between the linkage connector 131 and the plurality of storage assemblies 121 is located on side surfaces of the plurality of storage assemblies 121. That is, the linkage connector 131 may be located at any position on a peripheral side of each of the plurality of storage assemblies 121. In this way, the linkage connector 131 can drive the plurality of storage assemblies 121 to synchronously ascend or descend when the linkage connector 131 ascends or descends, so as to perform the synchronous unloading operation of the transport robot 100.

In an embodiment, there may be at least one linkage connector 131. In a case that there is one linkage connector 131, the cooperation between the linkage connector with the vertical frame 110 can ensure that the plurality of storage assemblies 121 are fixed and reliable, and simultaneously implement the driving of the movement of the plurality of storage assemblies 121. In a case that there are a plurality of linkage connectors 131, the plurality of linkage connectors 131 can further improve the linkage of the plurality of storage assemblies 121 and ensure that the plurality of storage assemblies 121 move in a consistent manner.

In a case that there is one linkage connector 131, the linkage connector 131 and the vertical frame 110 are respectively arranged at two ends of the plurality of storage assemblies 121. That is, the connection position between the linkage connector 131 and the plurality of storage assemblies 121 and the vertical frame 110 are respectively located at the two ends of the plurality of storage assemblies 121, and a distance between the connection position and the vertical frame 110 is equal to a size of each of the plurality of storage assemblies 121 along a horizontal direction. In this way, the plurality of storage assemblies 121 can be reliably supported by the linkage connector 131 and the vertical frame 110, to prevent the plurality of storage assemblies 121 from falling and dropping, so that the plurality of storage assemblies 121 can reliably store the goods 200.

In a case that there are a plurality of linkage connectors 131, the plurality of linkage connectors 131 are arranged at intervals along the peripheral side of the storage assembly 121. The plurality of linkage connectors 131 are distributed at intervals along the peripheral side of each of the plurality of storage assemblies 121, and may be distributed uniformly, non-uniformly, or symmetrically. The plurality of storage assemblies 121 can be reliably supported by the plurality of linkage connectors 131 and the vertical frame 110, to prevent the plurality of storage assemblies 121 from falling and dropping, so that the plurality of storage assemblies 121 can reliably store the goods 200.

Referring to FIG. 1, FIG. 3, and FIG. 4, in an embodiment, the linkage mechanism 130 further includes a linkage driving member 132 configured to cooperate with the linkage connector 131, so as to drive the plurality of storage assemblies 121 to implement synchronous unloading. The linkage driving member 132 is a power source for the movement of the linkage mechanism 130, and implements the driving of the movement of a linkage moving member. In addition, the linkage driving member 132 outputs linear motion, so that the linkage connector 131 can ascend or descend, and the plurality of storage assemblies 121 can undergo a pitching motion. Optionally, the linkage driving member 132 includes, but is not limited to, an air cylinder, a hydraulic cylinder, a linear motor, or an electric push rod, and may also be another linear driving unit capable of outputting the linear motion. Exemplarily, the linkage driving member 132 is a linear motor. Exemplarily, one end of the linkage driving member 132 is arranged on the chassis 160. Certainly, one end of the linkage driving member 132 may also be arranged on the vertical frame 110.

Optionally, the linkage driving member 132 may be connected to the plurality of storage assemblies 121. In an embodiment, an output end of the linkage driving member 132 is connected to one of the plurality of storage assemblies 121. One end of the linkage driving member 132 is mounted on the vertical frame 110, and an other end is connected to the plurality of storage assemblies 121. After outputting the linear motion, the linkage driving member 132 may drive a plurality of storage assemblies 121 connected thereto to move, and then the plurality of storage assemblies 121 may drive the linkage connector 131 to ascend or descend. At this time, the linkage connector 131 may drive the remaining storage assemblies 121 to move synchronously, so that the plurality of storage assemblies 121 rotate relative to the vertical frame 110, the plurality of storage assemblies 121 are lifted up, and the synchronous unloading operation of the plurality of storage assemblies 121 is performed.

Further, the output end of the linkage driving member 132 is connected to a bottom portion or a top portion of one of the plurality of storage assemblies 121. In a case that the linkage driving member 132 is connected to the top portion of the plurality of storage assemblies 121, the linkage driving member 132 may retract to drive the plurality of storage assemblies 121 to move upward, and the linkage driving member 132 may extend to drive the plurality of storage assemblies 121 to move downward. In a case that the linkage driving member 132 is connected to the bottom portion of the plurality of storage assemblies 121, the linkage driving member 132 may extend to drive the plurality of storage assemblies 121 to move upward, and the linkage driving member 132 may retract to drive the plurality of storage assemblies 121 to move downward. Exemplarily, the linkage driving member 132 is connected to the bottom portion of the plurality of storage assemblies 121. Still further, the linkage driving member 132 is located and connected to a bottom portion of a lowermost storage assembly 121, and the output end of the linkage driving member 132 is in abutment with a middle region of the bottom portion of the storage assembly 121. In this way, the linkage driving member 132 does not affect the loading or unloading of goods 200 of a carrying component, so as to avoid interference.

Further optionally, the output end of the linkage driving member 132 is connected to the linkage connector 131. The linkage driving member 132 may directly drive the linkage connector 131 to ascend or descend, and then the linkage connector 131 may drive the plurality of storage assemblies 121 to move synchronously. Further, the linkage driving member 132 may be located at the bottom portion of the lowermost storage assembly 121 and arranged on the chassis 160, and the output end of the linkage driving member 132 is connected to the linkage connector 131. Certainly, the linkage driving member 132 may also be located at the top portion of the plurality of storage assemblies 121.

The linkage mechanism 130 in this embodiment can implement the simultaneous unloading of a plurality of storage assemblies 121, the plurality of storage assemblies 121 are connected by a same linkage connector 131, and an output end of a linkage driving member 132 is connected to a lowermost storage assembly 121. When the linkage driving member 132 extends, the linkage driving member 132 may push the plurality of storage assemblies 121 upward, so that the plurality of storage assemblies 121 rotate relative to the vertical frame 110. When rotating, the plurality of storage assemblies 121 may drive the linkage connector 131 to move synchronously, and then the linkage connector 131 drives the remaining storage assemblies 121 to move synchronously, so as to implement the synchronous driving of all storage assemblies 121 to move upward, thereby performing the synchronous unloading operation.

It is worth noting that there are various rotational driving forms in which the plurality of storage assemblies 121 rotate relative to the vertical frame 110 to undergo a pitching motion. In this embodiment, only the linkage driving member 132 capable of outputting the linear motion is configured to drive the movement of the plurality of storage assemblies 121, and other driving components that can implement the pitching motion of the plurality of storage assemblies 121 should be considered as falling within the protection scope of the present disclosure.

Referring to FIG. 1, FIG. 3, and FIG. 5, in an embodiment, each of the plurality of storage assemblies 121 includes a carrier body 1211 configured to carry the goods 200 and rotatably connected to the linkage connector 131 and the vertical frame 110 separately. The carrier body 1211 is a main body configured to carry the goods 200, one end of the carrier body 1211 is rotatably connected to the vertical frame 110, and an other end is rotatably connected to the linkage connector 131. One end of the carrier body 1211 connected to the vertical frame 110 is a head end, and one end of the carrier body 1211 connected to the linkage connector 131 is a tail end. When the linkage connector 131 drives the carrier body 1211 to ascend or descend, the tail end of the carrier body 1211 rotates around the head end of the carrier body 1211, so that the carrier body 1211 undergoes a pitching motion. Optionally, an edge of the carrier body 1211 is rotatably connected to the linkage connector 131 and the vertical frame 110 separately, and certainly, a middle region of the carrier body 1211 may also be rotatably connected to the linkage connector 131 and the vertical frame 110 separately.

It can be understood that the rotatable connection between the carrier body 1211 and the vertical frame 110 may be that the carrier body 1211 has a rotary shaft, and the carrier body 1211 is also rotatably mounted on the vertical frame 110 through the rotary shaft, or the vertical frame 110 has a rotary shaft, and the carrier body 1211 may be rotatably mounted on the rotary shaft, or the like. In addition, the foregoing manner of the rotatable connection which is implemented through the rotary shaft may also be replaced by a hinged connection or other forms of rotatable connection.

Optionally, the carrier body 1211 is arranged in a flat plate shape, and a container of the goods 200 may be transferred to the carrier body 1211. Further, the edge of the carrier body 1211 has three sides of flanges, and the three sides of flanges form a loading or unloading port at the vertical frame 110, and the goods 200 are mounted in the carrier body 1211 through the loading or unloading port. In addition, the flanges can limit the displacement of the goods 200 on the carrier body 1211, prevent the goods 200 from falling out of the carrier body 1211, and ensure that the carrier body 1211 can store the goods 200 accurately.

In an embodiment, each of the plurality of storage assemblies 121 further includes a rolling member 1212 arranged on the carrier body 1211 in a rolling manner and configured to be in a rolling contact with the goods 200 in the carrier body 1211. The rolling member 1212 can reduce a frictional force between the goods 200 and the carrier body 1211, so as to facilitate the loading or unloading of the goods 200. When the goods 200 are loaded, a bottom portion of the goods 200 is in contact with the rolling member 1212 under the action of gravity thereof. During the movement of the goods 200 into the carrier body 1211, the goods 200 may drive rollers to rotate, so that the frictional force between the goods 200 and the carrier body 1211 is reduced, and the loading of the goods 200 is facilitated. When the goods 200 are unloaded, the linkage connector 131 drives the carrier body 1211 to move upward. At this time, the tail end of the carrier body 1211 is higher than a top end of the carrier body 1211, and the goods 200 in the carrier body 1211 slide out of the carrier body 1211 under the action of gravity. In addition, during a sliding process of the goods 200 along the carrier body 1211, the bottom portion of the goods 200 drives the rolling member 1212 to roll, so that the goods 200 slide out of the carrier body 1211 more easily, and the unloading of the goods 200 is facilitated.

Optionally, the carrier body 1211 is provided with a rolling groove, the rolling member 1212 may be rotatably mounted in the rolling groove, and a top surface of the rolling member 1212 is slightly higher than a top surface of the carrier body 1211, so as to ensure that the rolling member 1212 can be in contact with the bottom portion of the goods 200. In addition, the bottom portion of the carrier body 1211 also includes a protection cover covering the rolling member 1212 on the bottom portion of the carrier body 1211, so as to avoid interference between a bottom portion of the rolling member 1212 and other components.

Optionally, the rolling member 1212 includes, but is not limited to, rollers, rolling shafts, rolling balls, or other components capable of rolling. In addition, there are a plurality of rolling members 1212, and the plurality of rolling members 1212 may be arranged in one row, or may be arranged in a plurality of rows. Exemplarily, the rolling member 1212 is rollers arranged in three rows.

Referring to FIG. 1, FIG. 3, FIG. 6, and FIG. 7, the first embodiment of the present disclosure further provides a transport system including an auxiliary apparatus 300 and the transport robot 100 in the foregoing embodiment. The auxiliary apparatus 300 includes a support frame 310 and a plurality of transport mechanisms 320 arranged on the support frame 310 at intervals along a vertical direction, and a manner in which the plurality of transport mechanisms 320 are arranged at intervals is the same as a manner in which a plurality of storage assemblies 121 are arranged at intervals. When the transport robot 100 moves to the auxiliary apparatus 300, goods 200 on the plurality of storage assemblies 121 are capable of being simultaneously transferred to corresponding transport mechanisms 320 to implement synchronous unloading; or goods 200 on the plurality of transport mechanisms 320 are capable of being simultaneously transferred to corresponding storage assemblies 121 to implement synchronous loading.

The auxiliary apparatus 300 can implement the synchronous unloading or synchronous loading of the goods 200. The auxiliary apparatus 300 is arranged at an unloading position or a loading position. In a case that the auxiliary apparatus 300 is unloaded, the auxiliary apparatus 300 is at the unloading position; and in a case that the auxiliary apparatus 300 is loaded, the auxiliary apparatus 300 is at the loading position. In the present disclosure, only an example in which the auxiliary apparatus 300 is at the unloading position is used for description. The auxiliary apparatus 300 is located at the unloading position. After the transport robot 100 completes loading at the loading position, the transport robot 100 moves to the unloading position. At this time, the transport robot 100 is docked with the auxiliary apparatus 300, and the auxiliary apparatus 300 may receive and pick the goods 200 in the plurality of storage assemblies 121 in the transport robot 100.

Specifically, the mounting frame 321 functions as a support, which is configured to support a plurality of transport mechanisms 320 configured to transport the goods 200. The auxiliary apparatus 300 includes a same quantity of transport mechanisms 320 as the plurality of storage assemblies 121, and heights at which the plurality of transport mechanisms 320 are located are consistent with heights at which corresponding storage assemblies 121 are located. After the transport robot 100 is docked with the auxiliary apparatus 300, the plurality of storage assemblies 121 and the plurality of transport mechanisms 320 are at same levels and heights.

When unloading, the linkage driving member 132 of the linkage mechanism 130 extends to drive one end of a lowermost storage assembly 121 to be lifted up. During a lifting process of the storage assembly 121, the linkage connector 131 may be driven to ascend, and the linkage connector 131 may drive the remaining storage assemblies 121 to be lifted up during the lifting process. In this way, the plurality of storage assemblies 121 can be simultaneously lifted up, the goods 200 in the plurality of storage assemblies 121 slide out of the plurality of storage assemblies 121 under the action of gravity and the action of the rolling member 1212, and move to corresponding transport mechanisms 320, and the transport mechanisms 320 transport the goods 200 thereon away to implement the unloading of the goods 200.

The auxiliary apparatus 300 may also implement the loading of the goods 200. Specifically, transport mechanisms 320 of different layers drive the goods 200 to move toward corresponding storage assemblies 121, and transfer the goods 200 to the corresponding storage assemblies 121. It can be understood that when loading the goods 200, the linkage mechanism 130 may drive ends of the plurality of storage assemblies 121 to descend, and at the same time, the plurality of transport mechanisms 320 simultaneously transfer the goods 200 to the corresponding storage assemblies 121. After the goods 200 are gradually transferred into the carrier body 1211 and come into contact with the rolling member 1212, the goods 200 may slide into the plurality of storage assemblies 121 under the action of gravity thereof and through the cooperation with the rolling member 1212. Certainly, the plurality of storage assemblies 121 may also be stationary, and the goods 200 may also be moved into the plurality of storage assemblies 121 by a pushing force of the plurality of transport mechanisms 320 in cooperation with the rolling member 1212.

Referring to FIG. 6 and FIG. 7, in an embodiment, each of the plurality of transport mechanisms 320 includes a mounting frame 321 arranged on the support frame 310 and a transport portion 322 movably arranged on the mounting frame 321, and the transport portion 322 may drive the goods 200 to move. The mounting frame 321 is of a frame structure, which carries the transport portion 322 and is configured to implement the mounting of the transport portion 322. The transport portion 322 is a main component that implements the transport of the goods 200. When the goods 200 are in the transport portion 322, the transport portion 322 may drive the goods 200 to move toward or away from the plurality of storage assemblies 121.

Optionally, the transport portion 322 is of a structure that can implement horizontal transport, such as a conveyor belt structure, an assembly line, a conveyor roller structure, a roller structure, or the like. Exemplarily, the transport portion 322 is of a roller structure, and specifically includes a plurality of rollers, and each of the plurality of rollers includes a built-in rolling motor to drive the each of the plurality of rollers to rotate, thereby implementing the transport of the goods 200. It should be noted that, there are various structures that can implement the horizontal transport of the goods 200, which cannot all be listed herein, and the transport portion 322 in the present disclosure is not limited to being implemented by the foregoing specific structures.

In an embodiment, the auxiliary apparatus 300 further includes a movable base arranged at a bottom portion of the support frame 310. The movable base can drive the auxiliary apparatus 300 to move, which greatly improves the adaptation of the auxiliary apparatus 300 to actual working conditions. In this way, the auxiliary apparatus 300 can easily move to the loading position, the unloading position, or any other position, to work with the transport robot 100. Optionally, a structure of the base is exactly the same as that of the chassis 160 of the transport robot 100, and details are not described herein again.

Referring to FIG. 1, FIG. 6, and FIG. 8, in an embodiment, the transport system further includes a conveying apparatus 500 and a lifting apparatus 400 that is arranged between the auxiliary apparatus 300 and the conveying apparatus 500, and the lifting apparatus 400 is configured to ascend or descend along the vertical direction, so as to be docked with each of the plurality of transport mechanisms 320 and the conveying apparatus 500. The lifting apparatus 400 is capable of receiving and picking goods 200 of the plurality of transport mechanisms 320 and transferring the goods to the conveying apparatus 500; or the lifting apparatus 400 is capable of receiving and picking goods 200 of the conveying apparatus 500 and transferring the goods to the plurality of transport mechanisms 320.

The lifting apparatus 400 is configured to receive and pick the goods 200 of the plurality of transport mechanisms 320 or transport the goods 200 to the plurality of transport mechanisms 320. Because the plurality of transport mechanisms 320 are arranged at intervals along the vertical direction, to facilitate the goods loading or unloading of the auxiliary apparatus 300, the lifting apparatus 400 needs to move to a transport mechanism 320 at a corresponding position, so as to perform a corresponding operation. The conveying apparatus 500 is configured to convey the goods 200, may transport away goods 200 unloaded by the lifting apparatus 400, and may also transport to-be-loaded goods 200 to the lifting apparatus 400. Optionally, the conveying apparatus 500 may be of a structure that can implement the horizontal transport, such as a conveyor belt structure, an assembly line, a conveying roller structure, or a roller structure, or the like. Exemplarily, the conveying apparatus 500 is of an assembly line structure, and specifically, when unloading, the lifting apparatus 400 ascends to one side of a transport mechanism 320, after receiving the goods 200 of the transport mechanism 320, the lifting apparatus 400 descends, and transfers the goods 200 to the conveying apparatus 500, and the goods are transported away by the conveying apparatus 500. Subsequently, the lifting apparatus 400 further ascends to another transport mechanism 320, and this process is repeated until all the goods 200 on the plurality of transport mechanisms 320 are transported away. When loading, after the lifting apparatus 400 descends and receives and picks the goods 200 conveyed by the conveying apparatus 500, the lifting apparatus 400 ascends to one side of a transport mechanism 320 and transfers the goods 200 to the transport mechanism 320; and subsequently, the lifting apparatus 400 further descends to the conveying apparatus 500, and this process is repeated until the plurality of transport mechanisms 320 are loaded with the goods 200.

In an embodiment, the lifting apparatus 400 includes a lifting frame 410 along the vertical direction, a moving mechanism 420 arranged on the lifting frame 410, and a transfer mechanism 430 with at least one layer arranged on the moving mechanism 420. The moving mechanism 420 may ascend or descend along the lifting frame 410 and drive the transfer mechanism 430 with at least one layer to move, so as to receive and pick goods from or transfer goods 200 to the plurality of transport mechanisms 320. The lifting frame 410 has a bearing function, and is configured to bear the moving mechanism 420 and the transfer mechanism 430 with at least one layer. Optionally, a bottom portion of the lifting frame 410 may also be provided with rotating wheels 162, so as to adapt to different applications. The transfer mechanism 430 with at least one layer is configured to carry the goods 200 and implement the transfer of the goods 200 between a high position such as a transport mechanism 320 and a low position such as the conveying apparatus 500. The moving mechanism 420 is arranged on the lifting frame 410 along the vertical direction, and may output movement in the vertical direction, so as to drive the transfer mechanism 430 with at least one layer to ascend or descend.

It can be understood that the moving mechanism 420 is configured to implement the ascending or descending motion of the transfer mechanism 430 with at least one layer along the vertical direction. A specific structure of the moving mechanism 420 may be a telescopic rod structure, a chain transmission structure, a driving transmission structure, or the like, and may also be another structure capable of enabling the carrying mechanism 150 to ascend or descend. Exemplarily, a specific structure of the moving mechanism 420 is the same as a structure of the lifting mechanism 140 of the transport robot 100, and details are not described herein again. Certainly, the specific structure of the moving mechanism 420 may also be different from the structure of the lifting mechanism 140 of the transport robot 100, as long as the moving mechanism 420 can implement the ascending or descending motion.

Exemplarily, there is a transfer mechanism 430 with one layer, and the transfer mechanism 430 with one layer receives and picks goods from one transport mechanism 320 at one time, or transfers goods to one transport mechanism 320 at one time. Certainly, in another implementation of the present disclosure, in a case that there is a transfer mechanism 430 with at least two layers, the transfer mechanism 430 with at least two layers may remove goods on at least two transport mechanisms 320 at one time, or transfer goods to at least two transport mechanisms 320, so as to improve the efficiency of goods turnover.

In an embodiment, the transfer mechanism 430 with at least one layer includes a transfer base 431 arranged on the moving mechanism 420 and a transfer portion 432 movably arranged on the transfer base 431, and the transfer portion 432 may drive goods 200 to move, and may receive and pick goods from or transfer goods 200 to at least one of the plurality of transport mechanisms 320. The transfer base 431 plays a bearing role and is configured to carry the transfer portion 432, so as to mount the transfer portion 432 on the moving mechanism 420. When the moving mechanism 420 ascends or descends, the transfer base 431 may drive the transfer portion 432 to ascend or descend synchronously, so as to implement the loading or unloading of the goods 200.

Optionally, the transfer portion 432 is of a structure that can implement horizontal transport, such as a conveyor belt structure, an assembly line, a conveyor roller structure, a roller structure, or the like. Exemplarily, the transfer portion 432 is of a rolling shaft structure, and specifically includes a plurality of rolling shafts, and each of the plurality of rolling shafts includes a built-in rolling motor to drive the each of the plurality of rolling shafts to rotate, thereby implementing the transport of the goods 200. It should be noted that, there are various structures that can implement the horizontal transport of the goods 200, which cannot all be listed herein, and the transfer portion 432 in the present disclosure is not limited to being implemented by the foregoing specific structures.

The transfer portion 432 may receive and pick the goods 200 of one transport mechanism 320 at one time, as mentioned above. The transfer portion 432 may also receive and pick the goods 200 of a plurality of transport mechanisms 320 at one time, and the moving mechanism 420 may receive and pick the goods 200 of the plurality of transport mechanisms 320 layer by layer, and then convey the goods to the conveying apparatus 500 together for transport after receiving and picking the goods. Exemplarily, the moving mechanism 420 drives the transfer portion 432 to ascend to a top portion. After receiving and picking goods 200 of one transport mechanism 320, the transfer portion 432 descends one layer to receive and pick goods 200 of one transport mechanism 320. After the transfer portion 432 is full or the goods 200 of the plurality of transport mechanisms 320 are received, the moving mechanism 420 drives the transfer portion 432 to descend to a position of the conveying apparatus 500, and the transfer portion 432 transfers all the goods 200 thereon to the conveying apparatus 500. Certainly, the moving mechanism 420 may move layer by layer from bottom to top, a principle thereof is substantially the same as a principle from top to bottom, and details are not described herein again.

Certainly, the transfer portion 432 may also receive and pick a plurality of goods 200 transferred by the conveying apparatus 500 at one time, and then transfer the goods to the plurality of transport mechanisms 320 layer by layer, a principle thereof is substantially the same as a foregoing principle of goods unloading, and details are not described herein again.

In an embodiment, the transport system further includes a control center, components of the transport system perform a coordinated action under the control of the control center, and the control center of the transport system maintains a communication connection with an external server. The control center may identify information of the to-be-transported goods 200, and the control center may obtain information of a loading position and an unloading position corresponding to each piece of the to-be-transported goods 200. The control center coordinates and controls the components according to the obtained information, so as to efficiently complete the transport of the goods 200.

In the transport robot 100 and the transport system in this embodiment, when unloading, a plurality of storage assemblies 121 of a storage mechanism 120 may move synchronously to perform a synchronous unloading action, so that the synchronous unloading of goods 200 in the plurality of storage assemblies 121 is implemented, goods 200 in the transport robot 100 can be unloaded at one time, the unloading efficiency is improved, the unloading time is reduced, and the overall working efficiency of the transport robot 100 is improved. In addition, after the transport robot 100 is used in cooperation with the auxiliary apparatus 300, the loading or unloading can be simultaneously implemented, thereby improving the working efficiency of the transport system.

Second Embodiment

Referring to FIG. 9 and FIG. 17, in the second embodiment, the transport robot 100 further includes a blocking mechanism 170 capable of switching between a blocking position and an avoidance position, where when the blocking mechanism 170 is at the blocking position, the blocking mechanism 170 is configured to block goods 200 in the plurality of storage assemblies 121 from sliding out, and when the blocking mechanism 170 is at the avoidance position, goods 200 are capable of being moved into or moved out of the plurality of storage assemblies 121.

It can be understood that after the plurality of storage assemblies 121 store the to-be-transported goods 200, during the movement of the transport robot 100 from the loading position to the unloading position, the transport robot 100 travels a specific distance, and the goods 200 stored in the plurality of storage assemblies 121 may be at a risk of falling. Once the goods 200 in the plurality of storage assemblies 121 fall, on the one hand, the goods 200 are damaged, resulting in economic losses; and on the other hand, a manual or intelligent picking apparatus is required to pick the goods 200 and place the goods in the plurality of storage assemblies 121 again for transport, which affects the transport efficiency of the goods 200.

In view of the foregoing description, the transport robot 100 of the present disclosure further includes a blocking mechanism 170, and the goods 200 in the plurality of storage assemblies 121 are blocked by the blocking mechanism 170. In this way, the goods 200 in the plurality of storage assemblies 121 can be prevented from sliding out. Specifically, the blocking mechanism 170 is capable of switching between a blocking position and an avoidance position. When the blocking mechanism 170 is at the avoidance position, the goods 200 may be loaded into the plurality of storage assemblies 121 or the goods 200 may be taken out from the plurality of storage assemblies 121. When the blocking mechanism 170 is at the blocking position, the goods 200 in the plurality of storage assemblies 121 are in abutment with the blocking mechanism 170, and the blocking mechanism 170 may restrict the goods 200 in the plurality of storage assemblies 121 from sliding out and prevent the goods 200 from falling.

Specifically, when the transport robot 100 is at the loading position, the blocking mechanism 170 is at the avoidance position, and at this time, the goods 200 may be loaded into the plurality of storage assemblies 121; after the loading is completed, the blocking mechanism 170 moves to the blocking position, and at this time, the blocking mechanism 170 may be in abutment with the goods 200 in the plurality of storage assemblies 121 to restrict the goods 200 from sliding out of the plurality of storage assemblies 121; subsequently, the transport robot 100 may move from the loading position to the unloading position, and the blocking mechanism 170 is always at the blocking position during this process; and when the blocking mechanism 170 is at the unloading position, the blocking mechanism 170 moves from the blocking position to the avoidance position, and at this time, the goods 200 in the plurality of storage assemblies 121 may be taken out. In addition, the transport robot 100 reciprocates in this way. It can be understood that the blocking mechanism 170 may play a blocking role during the movement of the transport robot 100 regardless of whether there are goods in the plurality of storage assemblies 121, or may only play a blocking role during goods transport in a case that there are goods in the plurality of storage assemblies 121.

When the transport robot 100 of the foregoing embodiment transports goods, the blocking mechanism 170 moves to the blocking position and may be in abutment with the goods 200 in the plurality of storage assemblies 121, so as to restrict the goods 200 from sliding out of the plurality of storage assemblies 121. Therefore, a current problem that the goods easily slide out of a storage rack of the transport robot during goods transport is effectively resolved, the goods 200 are prevented from sliding out of the plurality of storage assemblies 121 during a transport process of the transport robot 100, the safety of the goods 200 is ensured, a risk of sliding out is avoided, and the transport efficiency is improved. In addition, when the transport robot 100 loads or unloads goods, the blocking mechanism 170 moves to the avoidance position. At this time, the goods 200 may be loaded into the plurality of storage assemblies 121, and the goods 200 in the plurality of storage assemblies 121 may also be removed, which does not hinder a loading or unloading operation of the transport robot 100, and is convenient for use.

In an embodiment, the blocking mechanism 170 may simultaneously block the goods 200 in the plurality of storage assemblies 121. That is, the blocking mechanism 170 may simultaneously move to the blocking position, so as to block the goods 200 in the plurality of storage assemblies 121, and the blocking mechanism 170 may also simultaneously move to the avoidance position, so that the plurality of storage assemblies 121 can perform a loading or unloading operation. Certainly, in another implementation of the present disclosure, there are a plurality of blocking mechanisms 170, and each of the plurality of blocking mechanisms 170 may simultaneously block the goods 200 in at least two of the plurality of storage assemblies 121. It can be understood that one blocking mechanism 170 may simultaneously act on goods 200 of all storage assemblies 121, or a plurality of blocking mechanisms 170 may act on a plurality of storage assemblies 121. Exemplarily, there are two blocking mechanisms 170, where one of the two blocking mechanisms 170 is configured to block goods 200 of storage assemblies 121 of first to third layers, and the other one of the two blocking mechanisms 170 is configured to block goods 200 of storage assemblies 121 of fourth to sixth layers. Certainly, in another implementation of the present disclosure, there may be more blocking mechanisms 170. In the present disclosure, only an example in which one blocking mechanism 170 blocks the goods 200 of all storage assemblies 121 is used for description. A working principle of a plurality of blocking mechanisms 170 is substantially the same as that of the one blocking mechanism 170, and details are not described herein again.

It is worth noting that an arrangement position of the blocking mechanism 170 is not limited in principle. The blocking mechanism may be movably arranged on the vertical frame 110, may be movably arranged on the chassis 160, and may also be movably arranged on the plurality of storage assemblies 121, as long as it is ensured that the blocking mechanism 170 can move to the avoidance position or the blocking position. In this embodiment, only an example in which the blocking mechanism 170 is movably arranged on the chassis 160 is used for description. A working principle of the blocking mechanism 170 arranged at another position is substantially the same as a working principle of the blocking mechanism 170 movably arranged on the chassis 160, and details are not described herein again. Specifically, when the blocking mechanism 170 moves relative to the chassis 160, the blocking mechanism 170 may move to the blocking position or the avoidance position. After the blocking mechanism 170 can move to the blocking position, the blocking mechanism 170 may block the goods 200 in the plurality of storage assemblies 121; and after the blocking mechanism 170 can move to the avoidance position, the blocking mechanism 170 no longer blocks the plurality of storage assemblies 121, and the goods 200 may freely enter or exit the plurality of storage assemblies 121.

In an embodiment, the plurality of storage assemblies 121 includes a loading or unloading end 1215 that faces away from the vertical frame 110. The goods 200 are loaded or unloaded from the loading or unloading end 1215 of the plurality of storage assemblies 121 to complete the loading or unloading of the goods 200. Exemplarily, as shown in FIG. 10, one ends of the plurality of storage assemblies 121 away from the vertical frame 110 is provided with the loading or unloading end 1215. During loading, the goods 200 are moved from the loading or unloading end 1215 into the plurality of storage assemblies 121, and during unloading, the goods 200 are moved from the loading or unloading end 1215 out of the plurality of storage assemblies 121. Optionally, the loading or unloading end 1215 is an end opening of the plurality of storage assemblies 121, or another entrance or exit through which the goods 200 can enter or exit. Certainly, in another implementation of the present disclosure, the loading or unloading end 1215 may also be arranged at one ends of the plurality of storage assemblies 121 close to the vertical frame 110. In this way, the loading or unloading of the goods 200 in the plurality of storage assemblies 121 can also be implemented.

Optionally, the loading or unloading end 1215 is arranged on a same side as the carrying mechanism 150. When the loading or unloading end 1215 performs a loading or unloading operation, the carrying mechanism 150 needs to avoid the loading or unloading end 1215, so as to avoid interference between the carrying mechanism 1215 and a loading or unloading apparatus 600, and ensure reliable loading or unloading. In this case, the carrying mechanism 150 may ascend to a highest position of the transport robot 100 or a position higher than the loading or unloading apparatus 600, or move to an other side of the transport robot 100. Further optionally, the loading or unloading end 1215 is arranged on an opposite side of the carrying mechanism 150. The goods loading or unloading at the loading or unloading end 1215 is not affected by the carrying mechanism 150, and when the plurality of storage assemblies 121 are loaded or unloaded, the carrying mechanism 150 does not interfere with the loading or unloading apparatus 600.

Referring to FIG. 9 and FIG. 10, in an embodiment, the blocking mechanism 170 may move into or move out of the loading or unloading end 1215. That is, when the blocking mechanism 170 moves into the loading or unloading end 1215, the blocking mechanism 170 is at the blocking position. At this time, an end portion of the goods 200 is in abutment with the blocking mechanism 170, and the blocking mechanism 170 blocks the goods 200 to restrict the goods 200 from sliding out of the loading or unloading end 1215. When the blocking mechanism 170 moves out of the loading or unloading end 1215, the blocking mechanism 170 is at the avoidance position. At this time, the loading or unloading end 1215 is unobstructed, the goods 200 may be loaded into the plurality of storage assemblies 121 through the loading or unloading end 1215, and the goods 200 in the plurality of storage assemblies 121 may also be unloaded through the loading or unloading end 1215.

In an embodiment, when the blocking mechanism 170 is at the blocking position, the blocking mechanism 170 is in abutment with a side wall or a bottom surface of the goods 200. That is, the blocking position of the blocking mechanism 170 may be located on a bottom surface or a side surface of the plurality of storage assemblies 121. When the blocking mechanism 170 moves to the blocking position, the blocking mechanism 170 may be in abutment with the goods 200 in the plurality of storage assemblies 121 at a side surface or a bottom surface. At this time, the movement of the goods 200 in the plurality of storage assemblies 121 is restricted due to an abutting force of the blocking mechanism 170, so that the goods 200 are prevented from sliding out of the plurality of storage assemblies 121. After the blocking mechanism 170 moves to the avoidance position, the blocking mechanism 170 is separated from the side surface or the bottom surface of the goods 200 of the plurality of storage assemblies 121, and the goods 200 may move in the plurality of storage assemblies 121, so as to perform the loading or unloading operation of the plurality of storage assemblies 121.

In an embodiment, the blocking mechanism 170 is arranged on at least one side of the plurality of storage assemblies 121. It can be understood that the blocking mechanism 170 may be arranged on one side of the plurality of storage assemblies 121, as shown in FIG. 9 and FIG. 10, and in this case, the blocking mechanism 170 may block the goods 200 in the plurality of storage assemblies 121 at the blocking position. Certainly, in another implementation of the present disclosure, blocking mechanisms 170 may also be located on two sides of the plurality of storage assemblies 121 respectively. In this way, the goods 200 in the plurality of storage assemblies 121 can be further blocked. Further, two blocking mechanisms 170 may be arranged symmetrically or asymmetrically, as long as the blocking mechanisms can block the goods 200 in the plurality of storage assemblies 121.

Exemplarily, in this embodiment, only an example in which the blocking mechanism 170 can move into or move out of the loading or unloading end 1215 is used for description. In addition, the blocking mechanism 170 is arranged on one side of the plurality of storage assemblies 121, working principles of blocking mechanisms 170 with different layouts mentioned in other embodiments are substantially the same as that of the blocking mechanism 170 in this embodiment, and details are not described herein again. In this case, the blocking position of the blocking mechanism 170 is located at the loading or unloading end 1215. After the blocking mechanism 170 moves to the loading or unloading end 1215, the blocking mechanism 170 is at the loading or unloading end 1215 and faces the goods 200, so as to block the goods 200.

In an embodiment, the blocking mechanism 170 includes a movable blocking connector 171 and a plurality of blocking assemblies 172 separately connected to the blocking connector 171, and at least one of the plurality of blocking assemblies 172 corresponds to a same storage assembly 121. The blocking connector 171 is capable of driving the plurality of blocking assemblies 172 to move into the loading or unloading end 1215, so as to block the goods 200 in the plurality of storage assemblies 121. The blocking connector 171 functions as a connection, and is configured to connect the plurality of blocking assemblies 172. When moving, the blocking connector 171 may synchronously drive the plurality of blocking assemblies 172 to move, so that the plurality of blocking assemblies 172 can move to a loading or unloading end 1215 of a corresponding storage assembly 121 or move out of the loading or unloading end 1215 of the plurality of storage assemblies 121. Optionally, the blocking connector 171 includes, but is not limited to, a connecting rod or a longboard, and the like.

The plurality of blocking assemblies 172 function as a blocking, and is configured to implement blocking of the goods 200. When the blocking connector 171 drives the plurality of blocking assemblies 172 to move to the blocking position, the plurality of blocking assemblies 172 are located at the loading or unloading end 1215. At this time, the end portion of the goods 200 faces the plurality of blocking assemblies 172, and the plurality of blocking assemblies 172 restrict the goods 200 from moving out of the plurality of storage assemblies 121. When the blocking connector 171 drives the plurality of blocking assemblies 172 to move to the avoidance position, the plurality of blocking assemblies 172 are separated from the loading or unloading end 1215. At this time, there is no object to block the end portion of the goods 200, and the plurality of storage assemblies 121 may be loaded or unloaded.

It can be understood that the avoidance position may be located outside the plurality of blocking assemblies 172, or may be located at a bottom portion of the plurality of storage assemblies 121, or at a position flush with the plurality of storage assemblies 121. The avoidance position is located at the bottom portion of the plurality of storage assemblies 121, as long as the plurality of blocking assemblies 172 are at a position that does not affect the moving in or moving out of goods 200 of a next layer.

Optionally, the blocking connector 171 may ascend or descend, and when ascending or descending, the blocking connector 171 may drive the plurality of blocking assemblies 172 to ascend or descend synchronously, so that the plurality of blocking assemblies 172 are located at the loading or unloading end 1215 or move out of the loading or unloading end 1215. In this case, the avoidance position may be located at the bottom portion of the plurality of storage assemblies 121 or the position flush with the plurality of storage assemblies 121. Certainly, the blocking connector 171 may also move horizontally. When moving horizontally, the blocking connector 171 may drive the plurality of blocking assemblies 172 to move horizontally and synchronously, so that the plurality of blocking assemblies 172 are located at the loading or unloading end 1215 or move out of the loading or unloading end 1215. In this case, the avoidance position may be located outside the plurality of blocking assemblies 172. Certainly, the blocking connector 171 may also perform another form of movement, such as one or a combination of rotating motion, swinging motion, moving motion, and the like, as long as the plurality of blocking assemblies 172 can move into or move out of the loading or unloading end 1215. Exemplarily, in the present disclosure, only an example in which the blocking connector 171 ascends or descends and displaces is used for description. In addition, the avoidance position is located at the bottom portion of the plurality of storage assemblies 121 or the position flush with the plurality of storage assemblies 121.

In an embodiment, each of the plurality of blocking assemblies 172 includes a stopping member fixedly arranged on the blocking connector 171, and movement of the blocking connector 171 is capable of driving the stopping member to move into or move out of the loading or unloading end 1215. In this embodiment, the stopping member is fixedly arranged on the blocking connector 171, and the movement of the blocking connector 171 may directly drive the stopping member to move, so that the stopping member moves to the blocking position or the avoidance position. For example, when the blocking connector 171 drives the stopping member to ascend, the stopping member may move to the loading or unloading end 1215, so as to block the goods 200; and when the blocking connector 171 drives the stopping member to descend, the stopping member may move to the avoidance position, so as to no longer block the goods 200. Optionally, the stopping member may be a baffle plate, a stopper, a limit post, or another component capable of blocking.

Referring to FIG. 9 and FIG. 10, in an embodiment, each of the plurality of blocking assemblies 172 includes a swing member 1721 and a blocking member 1722, one end of the swing member 1721 is rotatably connected to the blocking connector 171, an other end of the swing member 1721 is mounted with the blocking member 1722, and a middle portion of the swing member 1721 is rotatably mounted at the loading or unloading end 1215 of the plurality of storage assemblies 121. When ascending or descending, the blocking connector 171 is capable of driving the swing member 1721 to swing, so that the swing member 1721 drives the blocking member 1722 to move into or move out of the loading or unloading end 1215.

That is, the blocking connector 171 implements the switching between the blocking position and the avoidance position through the indirect movement of the plurality of blocking assemblies 172, such as a swinging motion. Specifically, when the blocking connector 171 moves, one end of the swing member 1721 may be driven to move relative to the plurality of storage assemblies 121, and then an other end of the swing member 1721 may drive the blocking member 1722 to move, so that the blocking member 1722 moves to the avoidance position or the blocking position. A head portion of the swing member 1721 is rotatably connected to the blocking connector 171, the middle portion of the swing member 1721 is rotatably connected to the plurality of storage assemblies 121, and a tail portion of the swing member 1721 is connected to the blocking member 1722. The blocking member 1722 may move to the avoidance position or the blocking position.

Exemplarily, when the blocking connector 171 moves upward along the vertical direction, the blocking connector 171 may drive the blocking member 1722 to move to the blocking position through the swing member 1721, and when the blocking connector 171 moves downward along the vertical direction, the blocking connector 171 may drive the blocking member 1722 to move to the avoidance position through the swing member 1721. Optionally, the swing member 1721 is a swing rod, and the blocking member 1722 is a blocking rod.

It should be noted that, the essential spirit of the present disclosure lies in the movement of the blocking connector 171 and the plurality of blocking assemblies 172, so that the plurality of blocking assemblies 172 respectively move to avoidance positions or blocking positions corresponding to the plurality of storage assemblies 121. In the foregoing two embodiment, two forms of each of the plurality of blocking assemblies 172 are separately described; and in addition, there are various arrangements of the plurality of blocking assemblies 172, which cannot all be listed herein, and a linkage manner in the present disclosure is not limited to being implemented by the foregoing specific structures.

In an embodiment, the blocking mechanism 170 further includes a blocking driving member, and an output end of the blocking driving member is connected to the blocking connector 171, so as to drive the plurality of blocking assemblies 172 to move into or move out of the loading or unloading end 1215. The blocking driving member is a power source for the movement of the blocking mechanism 170, and implements the driving of the movement of a blocking moving member. In addition, the blocking driving member outputs linear motion, so that the blocking connector 171 can ascend or descend, and then the blocking connector 171 may drive the plurality of blocking assemblies 172 to move, so that the plurality of blocking assemblies 172 move to the avoidance position or the blocking position. Optionally, the blocking driving member includes, but is not limited to, an air cylinder, a hydraulic cylinder, a linear motor, or an electric push rod, and may also be another linear driving unit capable of outputting the linear motion. Exemplarily, the blocking driving member is a linear motor. Exemplarily, one end of the blocking driving member is arranged on the chassis 160. Certainly, in another implementation of the present disclosure, a rotation motor cooperates with a protrusion member to drive.

In an embodiment, a bottom portion of each of the plurality of storage assemblies 121 is provided with a movement space used for a loading or unloading mechanism 620 of a transport system to extend into, so as to load goods into or take the goods out of the plurality of storage assemblies 121. Because the plurality of storage assemblies 121 cannot move during loading or unloading, other components such as the carrying mechanism 150 or a matching structure of the loading or unloading apparatus 600 are required to move the goods 200 into the plurality of storage assemblies 121 or take the goods out of the plurality of storage assemblies 121 during loading or unloading. Therefore, a bottom portion of each of the plurality of storage assemblies 121 needs to include a space used for the carrying mechanism 150 and the auxiliary apparatus 300 to extend into, so as to facilitate the goods loading or unloading of the plurality of storage assemblies 121. When loading goods to the plurality of storage assemblies 121, the carrying mechanism 150 or the loading or unloading apparatus 600 may extend into the movement space to place the goods 200 on the plurality of storage assemblies 121, and then exit the movement space; and when unloading goods from the plurality of storage assemblies 121, the carrying mechanism 150 or the loading or unloading apparatus 600 may extend into the movement space to hold the goods 200 in the plurality of storage assemblies 121 and drive the goods 200 to move out of the plurality of storage assemblies 121.

In an embodiment, each of the plurality of storage assemblies 121 include a first side plate 1213 and a second side plate 1214 that are arranged on the vertical frame 110, and the first side plate 1213 and the second side plate 1214 are opposite to each other and surround the movement space. The first side plate 1213 and the second side plate 1214 are arranged at a same height of the vertical frame 110, and are arranged in parallel. In this way, the first side plate 1213 and the second side plate 1214 can be configured to respectively hold bottom portions of two sides of the goods 200, so that the goods 200 is flat, and deflection is avoided. A portion between the first side plate 1213 and the second side plate 1214 is a gap, that is, the foregoing movement space, which allows the carrying mechanism 150 or the loading or unloading apparatus 600 to extend into, so as to perform a loading or unloading operation.

Certainly, in another implementation of the present disclosure, each of the plurality of storage assemblies 121 includes a carrier body configured to carry the goods 200 and being provided with a movement space along an entrance or exit direction of the goods 200, and a size of the movement space along the entrance or exit direction of the goods 200 is less than a size of the carrier body along the entrance or exit direction of the goods 200. That is, the movement space in this case is an opening of the carrier body. The goods 200 are carried by the carrier body, and the movement space of the carrier body may also allow the carrying mechanism 150 or the loading or unloading apparatus 600 to extend into, so as to perform the loading or unloading operation.

Referring to FIG. 9 and FIG. 11, the second embodiment of the present disclosure further provides a transport system including a loading or unloading apparatus 600 and the transport robot 100 in the foregoing embodiment. The loading or unloading apparatus 600 is configured to convey the goods 200 to the transport robot 100 or unload the goods 200 on the transport robot 100. The loading or unloading apparatus 600 includes an upright frame 610 extending along a vertical direction and a plurality of loading or unloading mechanisms 620 arranged on the upright frame 610 at intervals along the vertical direction, and a manner in which the plurality of loading or unloading mechanisms 620 are arranged at intervals is the same as a manner in which a plurality of storage assemblies 121 are arranged at intervals. After the transport robot 100 is docked with the loading or unloading apparatus 600, the plurality of loading or unloading mechanisms 620 are capable of respectively conveying, at different heights, the goods 200 to the plurality of storage assemblies 121 or unloading the goods 200 in the plurality of storage assemblies 121.

The loading or unloading apparatus 600 can implement synchronous unloading or synchronous loading of the goods 200. The loading or unloading apparatus 600 is mounted at an unloading position or a loading position. In a case that the loading or unloading apparatus 600 is unloaded, the loading or unloading apparatus 600 is at the unloading position; and in a case that the loading or unloading apparatus 600 is loaded, the loading or unloading apparatus 600 is at the loading position. In the present disclosure, only an example in which the loading or unloading apparatus 600 is at the unloading position is used for description. The loading or unloading apparatus 600 is located at the unloading position. After the transport robot 100 completes loading at the loading position, the transport robot 100 moves to the unloading position. At this time, the transport robot 100 is docked with the loading or unloading apparatus 600, and the loading or unloading apparatus 600 may receive and pick the goods 200 in the plurality of storage assemblies 121 in the transport robot 100. Certainly, the reverse transport of the goods 200 may also be implemented at this position, that is, after the transport robot 100 is docked with the loading or unloading apparatus 600, the loading or unloading apparatus 600 may transfer the goods 200 to the plurality of storage assemblies 121.

Specifically, the upright frame 610 plays a supporting role, and is configured to support the plurality of loading or unloading mechanisms 620 configured to transport the goods 200. The loading or unloading apparatus 600 includes a same quantity of loading or unloading mechanisms 620 as the plurality of storage assemblies 121. The plurality of loading or unloading mechanisms 620 may separately convey, at different heights, the goods 200 to the transport robot 100, or unload the goods 200 on the transport robot 100, which greatly shortens the waiting time of the transport robot 100 during a loading or unloading process. In addition, heights at which the plurality of loading or unloading mechanisms 620 are located are consistent with heights at which corresponding storage assemblies 121 are located. After the transport robot 100 is docked with the loading or unloading apparatus 600, the plurality of storage assemblies 121 and the plurality of loading or unloading mechanisms 620 are at same heights, and the plurality of loading or unloading mechanisms 620 may convey the goods 200 to all storage assemblies 121 on the transport robot 100 at one time, or the plurality of loading or unloading mechanisms 620 may implement one-time removal of goods 200 from all storage assemblies 121 on the transport robot 100. Certainly, in specific working conditions, one or more loading or unloading mechanisms 620 in the loading or unloading apparatus 600 may simultaneously convey the goods 200 to the transport robot 100 or unload the goods 200 on the transport robot 100.

Each of the plurality of loading or unloading mechanisms 620 may act independently to convey the goods 200 to the transport robot 100 or unload the goods 200 on the transport robot 100. Referring to FIG. 10 to FIG. 13, in an embodiment, each of the plurality of loading or unloading mechanisms 620 includes a bracket 621, a loading or unloading assembly 622, and a loading or unloading driving member 623, a plurality of brackets 621 are arranged on the upright frame 610 at intervals along the vertical direction, the loading or unloading driving member 623 and the loading or unloading assembly 622 are respectively arranged on corresponding brackets 621, the loading or unloading assembly 622 is connected to the loading or unloading driving member 623, and the loading or unloading assembly 622 is configured to convey the goods 200 to the plurality of storage assemblies 121 or unload the goods 200 in the plurality of storage assemblies 121. The loading or unloading driving member 623 may allow a corresponding loading or unloading assembly 622 to individually convey the goods 200 to the transport robot 100 or unload the goods 200 on the transport robot 100. It can be understood that the chain 6221 in the foregoing embodiment only plays a role of driving and carrying goods. In another embodiment of the present disclosure, a belt, a timing belt, or the like, are used to replace the chain.

Further, as shown in FIG. 10 to FIG. 13, the loading or unloading assembly 622 includes a chain 6221 and a protrusion 6222, the chain 6221 is rotatably arranged on the bracket 621 along a loading or unloading direction, and the protrusion 6222 is fixedly arranged on the chain 6221. The loading or unloading driving member 623 includes a driving motor in driving connection with the chain 6221; and the chain 6221 may carry the goods 200. When the driving motor drives the chain 6221 to rotate, the protrusion 6222 pushes a bottom portion of the goods 200, so as to push the goods 200 to the transport robot 100, or the protrusion 6222 pulls a bottom portion of the goods 200, so as to pull the goods 200 from the transport robot 100 to the chain 6221, or the protrusion 6222 blocks the bottom portion of the goods 200, and the goods 200 are transferred to the chain 6221 when the transport robot 100 moves away from the loading or unloading apparatus 600. Specifically, the chain 6221 is arranged on two sprockets arranged at intervals along the loading or unloading direction, and an output shaft of the driving motor is in driving connection with one of the two sprockets. When rotating, the driving motor drives the chain 6221 to operate, and the protrusion 6222 pushes the bottom portion of the goods 200, so as to push the goods 200 to the transport robot 100, or the protrusion 6222 pulls the bottom portion of the goods 200, so as to pull the goods 200 from the transport robot 100 to the chain 6221. Furthermore, each of the plurality of loading or unloading mechanisms 620 includes two sets of loading or unloading assemblies 622, the two sets of loading or unloading assemblies 622 are arranged on the bracket 621 in parallel and at intervals, and the driving motor is in driving connection with two chains 6221. The two sets of loading or unloading assemblies 622 can increase the stability during the loading or unloading of the goods 200. In an embodiment of the present disclosure, as shown in FIG. 13, each of the plurality of loading or unloading mechanisms 620 further includes a synchronization rod 624, the two chains 6221 are separately in driving connection with the synchronization rod 624, and the driving motor is in driving connection with one of the two chains 6221. Specifically, the synchronization rod 624 connects two sprockets arranged at intervals along a horizontal direction perpendicular to the loading or unloading direction, thereby ensuring that the two chains 6221 rotate synchronously.

In another embodiment, as shown in FIG. 10, FIG. 11, FIG. 14, and FIG. 15, each of the plurality of loading or unloading mechanisms 620 includes a loading or unloading cross arm 625 and a push-pull assembly 626, one ends of a plurality of loading or unloading cross arms 625 are arranged on the upright frame 610 at intervals along the vertical direction, and the push-pull assembly 626 is rotatably arranged at other ends corresponding to the plurality of loading or unloading cross arms 625. When rotating, the push-pull assembly 626 includes a push-pull position and an avoidance position, and when rotating to the push-pull position, push-pull assembly 626 conveys the goods 200 to the transport robot 100 or pulls down the goods 200 on the transport robot 100. When the push-pull assembly 626 rotates to the avoidance position, the push-pull assembly 626 avoids the goods 200. It can be understood that when pushing or pulling the goods 200, the push-pull assembly 626 may push or pull a top portion, a middle portion, or a bottom portion of the goods 200. In an embodiment of the present disclosure, two loading or unloading assemblies 620 are arranged at intervals in a same horizontal direction of the upright frame 610, and two push-pull assemblies 626 in the same horizontal direction separately rotate to the push-pull position or the avoidance position. The two push-pull assemblies 626 in the same horizontal direction respectively drive two sides of the goods 200 along the loading or unloading direction. The two push-pull assemblies 626 push or pull the two sides of the goods 200 synchronously, which can effectively ensure the stability of a push-pull process of the goods 200. Further, the two push-pull assemblies 626 in the same horizontal direction push/pull two sides of the middle portion of the goods 200 synchronously along the loading or unloading direction. It can be understood that the two push-pull assemblies 626 in the same horizontal direction rotate to the push-pull position or the avoidance position synchronously, or rotate to the push-pull position or the avoidance position successively. In another embodiment of the present disclosure, only one loading or unloading mechanism 620 is arranged in a same height direction of the upright frame 610, and the one loading or unloading mechanism 620 pushes or pulls the top portion or the bottom portion of the goods 200 when pushing or pulling the goods 200.

In an implementation, as shown in FIG. 14 and FIG. 15, the push-pull assembly 626 includes a push-pull rod 6261 and a push-pull motor 6262, the push-pull motor 6262 is arranged at one ends of the plurality of loading or unloading cross arms 625 away from the upright frame 610, the push-pull rod 6261 is arranged on an output shaft of the push-pull motor 6262, and the push-pull motor 6262 is configured to drive the push-pull rod 6261 to rotate to the push-pull position or the avoidance position. Two push-pull rods 6261 may separately be rotated to the push-pull position under the driving of the push-pull motor 6262, so as to pull the goods 200 out of the transport robot 100 or push the goods 200 to the transport robot 100. It can be understood that the function of the push-pull motor 6262 is to drive the push-pull rod 6261 to rotate, and the push-pull rod 6261 is directly arranged on the output shaft of the push-pull motor 6262, or the push-pull rod 6261 is connected to the output shaft of the push-pull motor 6262 through a transmission mechanism, as long as the push-pull motor 6262 can drive the push-pull rod 6261 to rotate to the push-pull position or the avoidance position.

In an embodiment, all loading or unloading mechanisms 620 in the loading or unloading apparatus 600 act synchronously to convey, at different heights, the goods 200 to the transport robot 100 or unload the goods 200 on the transport robot 100, or some of the plurality of loading or unloading mechanisms 620 in the loading or unloading apparatus 600 act independently to convey, at specified heights, the goods 200 to the transport robot 100 or unload the goods 200 on the transport robot 100. As shown in FIG. 16 and FIG. 17, in an implementation, the loading or unloading apparatus 600 further includes an adjustment drive mechanism 630 configured to drive the upright frame 610 to approach or move away from the transport robot 100 along the loading or unloading direction, and when the adjustment drive mechanism 630 drives the upright frame 610 to approach or move away from the transport robot 100, the plurality of loading or unloading mechanisms 620 convey the goods 200 to the transport robot 100 or unload the goods 200 on the transport robot 100. The loading or unloading apparatus 600 provided in this embodiment can remove all the goods 200 or specified goods 200 on the transport robot 100 at one time, or simultaneously convey a plurality of goods 200 to the transport robot 100. In an implementation, the adjustment drive mechanism 630 adopts a driving structure in the form of a motor and a belt.

In an embodiment of the present disclosure, the loading or unloading apparatus 600 further includes a temporary storage shelving unit 640, the upright frame 610 is movably arranged on the temporary storage shelving unit 640 along a horizontal direction, and the adjustment drive mechanism 630 is configured to drive the upright frame 610 to move relative to the temporary storage shelving unit 640 along the horizontal direction. The temporary storage shelving unit 640 includes a shelving unit with a plurality of layers along the vertical direction, and the plurality of loading or unloading mechanisms 620 are configured to pull goods 200 at different heights on the transport robot 100 to corresponding layers of the shelving unit on the temporary storage shelving unit 640, or the plurality of loading or unloading mechanisms 620 are configured to push goods 200 on the plurality of layers of the shelving unit to the transport robot 100. The temporary storage shelving unit 640 can temporarily store the goods 200 unloaded from the transport robot 100 by the loading or unloading apparatus 600, or temporarily store the to-be-transported goods 200 which are transported to the transport robot 100. In an implementation, the temporary storage shelving unit 640 includes a temporary storage roller 641 with a plurality of layers arranged along the vertical direction, and each layer of the temporary storage roller 641 is capable of individually transporting the goods 200 along the loading or unloading direction. Optionally, each layer of the temporary storage roller 641 can simultaneously carry a plurality of goods 200.

In an embodiment, the loading or unloading apparatus 600 further includes a movable base arranged at a bottom portion of the upright frame 610. The loading or unloading apparatus 600 further includes a movable base arranged at the bottom portion of the upright frame 610. The movable base can drive the loading or unloading apparatus 600 to move, which greatly improves the adaptability of the loading or unloading apparatus 600 to actual working conditions. In this way, the loading or unloading apparatus 600 can easily move to the loading position, the unloading position, or any other position, to work with the transport robot 100. Optionally, a structure of the base is exactly the same as that of the chassis 160 of the transport robot 100, and details are not described herein again.

Referring to FIG. 9 and FIG. 11, in an embodiment, the transport system further includes a conveying apparatus 500 and a lifting apparatus 400 that is arranged between the loading or unloading apparatus 600 and the conveying apparatus 500, and the lifting apparatus 400 is configured to ascend or descend along the vertical direction, so as to be docked with each of the plurality of loading or unloading mechanisms 620 and the conveying apparatus 500. The lifting apparatus 400 is capable of receiving and picking the goods 200 of the plurality of loading or unloading mechanisms 620 and transferring the goods to the conveying apparatus 500; or the lifting apparatus 400 is capable of receiving and picking goods 200 of the conveying apparatus 500 and transferring the goods to the plurality of loading or unloading mechanisms 620.

The lifting apparatus 400 is configured to receive and pick the goods 200 of the plurality of loading or unloading mechanisms 620 or transport the goods 200 to the plurality of loading or unloading mechanisms 620. Because the plurality of loading or unloading mechanisms 620 are arranged at intervals along the vertical direction, to facilitate the goods loading or unloading of the loading or unloading apparatus 600, the lifting apparatus 400 needs to move to a loading or unloading mechanism 620 at a corresponding position, so as to perform a corresponding operation. The conveying apparatus 500 is configured to convey the goods 200, may transport away goods 200 unloaded by the lifting apparatus 400, and may also transport to-be-loaded goods 200 to the lifting apparatus 400. Optionally, the conveying apparatus 500 may be of a structure that can implement the horizontal transport, such as a conveyor belt structure, an assembly line, a conveying roller structure, or a roller structure, or the like. Exemplarily, the conveying apparatus 500 is of an assembly line structure, and specifically, when unloading, the lifting apparatus 400 ascends to one side of a loading or unloading mechanism 620, after receiving the goods 200 of the loading or unloading mechanism 620, the lifting apparatus 400 descends, and transfers the goods 200 to the conveying apparatus 500, and the goods are transported away by the conveying apparatus 500. Subsequently, the lifting apparatus 400 further ascends to another loading or unloading mechanism 620, and this process is repeated until all the goods 200 on the plurality of loading or unloading mechanisms 620 are transported away. When loading, after the lifting apparatus 400 descends and receives and picks the goods 200 conveyed by the conveying apparatus 500, the lifting apparatus 400 ascends to one side of a loading or unloading mechanism 620 and transfers the goods 200 to the loading or unloading mechanism 620; and subsequently, the lifting apparatus 400 further descends to the conveying apparatus 500, and this process is repeated until the plurality of loading or unloading mechanisms 620 are loaded with the goods 200.

In an embodiment, the lifting apparatus 400 includes a lifting frame 410 along the vertical direction, a moving mechanism 420 arranged on the lifting frame 410, and a transfer mechanism 430 with at least one layer arranged on the moving mechanism 420, and the moving mechanism 420 may ascend or descend along the lifting frame 410 and drive the transfer mechanism 430 with at least one layer to move, so as to receive and pick or transfer the goods 200 to the plurality of loading or unloading mechanisms 620. The lifting frame 410 has a bearing function, and is configured to bear the moving mechanism 420 and the transfer mechanism 430 with at least one layer. Optionally, a bottom portion of the lifting frame 410 may also be provided with rotating wheels, so as to adapt to different applications. The transfer mechanism 430 with at least one layer is configured to carry the goods 200 and implement the transfer of the goods 200 between a high position such as a loading or unloading mechanism 620 and a low position such as the conveying apparatus 500. The moving mechanism 420 is arranged on the lifting frame 410 along the vertical direction, and may output movement in the vertical direction, so as to drive the transfer mechanism 430 with at least one layer to ascend or descend.

It can be understood that the moving mechanism 420 is configured to implement the ascending or descending motion of the transfer mechanism 430 with at least one layer along the vertical direction. A specific structure of the moving mechanism 420 may be a telescopic rod structure, a chain transmission structure, a driving transmission structure, or the like, and may also be another structure capable of enabling the carrying mechanism 150 to ascend or descend. Exemplarily, a specific structure of the moving mechanism 420 is the same as a structure of the lifting mechanism 140 of the transport robot 100, and details are not described herein again. Certainly, the specific structure of the moving mechanism 420 may also be different from the structure of the lifting mechanism 140 of the transport robot 100, as long as the moving mechanism 420 can implement the ascending or descending motion.

Exemplarily, there is a transfer mechanism 430 with one layer, and the transfer mechanism 430 with one layer receives and picks goods 200 from one loading or unloading mechanism 620 at one time, or transfers goods 200 to one loading or unloading mechanism 620 at one time. Certainly, in another implementation of the present disclosure, in a case that there is a transfer mechanism 430 with at least two layers, the transfer mechanism 430 with at least two layers may remove goods 200 of at least two loading or unloading mechanisms 620 at one time, or transfer goods 200 to at least two loading or unloading mechanisms 620, so as to improve the efficiency of turnover of the goods 200.

In an embodiment, the transfer mechanism 430 with at least one layer includes a transfer base 431 arranged on the moving mechanism 420 and a transfer portion 432 movably arranged on the transfer base 431, and the transfer portion 432 may drive the goods 200 to move, and may receive and pick or transfer the goods 200 to at least one of the plurality of loading or unloading mechanisms 620. The transfer base 431 plays a bearing role and is configured to carry the transfer portion 432, so as to mount the transfer portion 432 on the moving mechanism 420. When the moving mechanism 420 ascends or descends, the transfer base 431 may drive the transfer portion 432 to ascend or descend synchronously, so as to implement the loading or unloading of the goods 200.

Optionally, the transfer portion 432 is of a structure that can implement horizontal transport, such as a conveyor belt structure, an assembly line, a conveyor roller structure, a roller structure, or the like. Exemplarily, the transfer portion 432 is of a rolling shaft structure, and specifically includes a plurality of rolling shafts, and each of the plurality of rolling shafts includes a built-in rolling motor to drive the each of the plurality of rolling shafts to rotate, thereby implementing the transport of the goods 200. It should be noted that, there are various structures that can implement the horizontal transport of the goods 200, which cannot all be listed herein, and the transfer portion 432 in the present disclosure is not limited to being implemented by the foregoing specific structures.

The transfer portion 432 may receive and pick the goods 200 of one loading or unloading mechanism 620 at one time, as mentioned above. The transfer portion 432 may also receive and pick the goods 200 of a plurality of loading or unloading mechanisms 620 at one time, and the moving mechanism 420 may receive and pick the goods 200 of the plurality of loading or unloading mechanisms 620 layer by layer, and then convey the goods to the conveying apparatus 500 together for transport after receiving and picking the goods. Exemplarily, the moving mechanism 420 drives the transfer portion 432 to ascend to a top portion. After receiving and picking goods 200 of one loading or unloading mechanism 620, the transfer portion 432 descends one layer to receive and pick goods 200 of one loading or unloading mechanism 620. After the transfer portion 432 is full or the goods 200 of the plurality of loading or unloading mechanisms 620 are received, the moving mechanism 420 drives the transfer portion 432 to descend to a position of the conveying apparatus 500, and the transfer portion 432 transfers all the goods 200 thereon to the conveying apparatus 500. Certainly, the moving mechanism 420 may move layer by layer from bottom to top, a principle thereof is substantially the same as a principle from top to bottom, and details are not described herein again.

Certainly, the transfer portion 432 may also receive and pick a plurality of goods 200 transferred by the conveying apparatus 500 at one time, and then transfer the goods to the plurality of loading or unloading mechanisms 620 layer by layer, a principle thereof is substantially the same as the foregoing principle of goods unloading, and details are not described herein again.

In an embodiment, the transport system further includes a control center, components of the transport system perform a coordinated action under the control of the control center, and the control center of the transport system maintains a communication connection with an external server. The control center may identify information of the to-be-transported goods 200, and the control center may obtain information of a loading position and an unloading position corresponding to each piece of the to-be-transported goods 200. The control center coordinates and controls the components according to the obtained information, so as to efficiently complete the transport of the goods 200.

In the transport robot 100 and the transport system in this embodiment, when transporting goods, a blocking mechanism 170 moves to a blocking position and may be in abutment with goods 200 in a plurality of storage assemblies 121, so as to restrict the goods 200 from sliding out of the plurality of storage assemblies 121. Therefore, the goods 200 are prevented from sliding out of the plurality of storage assemblies 121 during a transport process of the transport robot 100, the safety of the goods 200 is ensured, a risk of sliding out is avoided, and the transport efficiency is improved. In addition, when the transport robot 100 loads or unloads goods, the blocking mechanism 170 moves to an avoidance position. At this time, goods 200 may be loaded into the plurality of storage assemblies 121, and the goods 200 in the plurality of storage assemblies 121 may also be removed, which does not hinder a loading or unloading operation of the transport robot 100, and is convenient for use.

Embodiment 5

Referring to FIG. 1, FIG. 3, FIG. 6, FIG. 9, and FIG. 11, the present disclosure provides a transport robot 100. The transport robot 100 is applied to a transport system, and can transport goods 200. It can be understood that the goods 200 may be goods with a bracket, and the transport robot 100 transports the goods 200 through the bracket; and certainly, the goods may alternatively be goods placed in a container, and the transport robot 100 transports the goods 200 through a box. The goods 200 described below are goods placed in a box, and the box may be loaded with the goods 200, so as to implement the transport of the goods 200. The transport robot 100 transports the box to an unloading position, and after unloading the goods 200 in the box, the box may be transported back to the transport robot 100, so as to reuse the box and reduce the cost. Alternatively, the goods 200 is a box with goods, and the transport robot 100 transports the box to the unloading position, and unloads the box with goods through an unloading apparatus.

The transport robot 100 plays an important role in intelligent warehousing, transports goods 200, ensures a transport speed of the goods 200, improves the transport efficiency of the goods 200, and reduces the consumption of labor resources. The transport robot 100 of the present disclosure can unload synchronously, so that goods 200 in the transport robot 100 can be unloaded at one time, thereby improving the unloading efficiency, reducing the unloading time, and improving the overall working efficiency of the transport robot 100.

Referring to FIG. 1 and FIG. 3, in an embodiment, the transport robot 100 includes a vertical frame 110 and a storage mechanism 120. The vertical frame 110 is arranged along a vertical direction. The storage mechanism 120 includes a plurality of storage assemblies 121 configured to store to-be-transported goods 200 and arranged on the vertical frame 110 at equal intervals along the vertical direction.

The vertical frame 110 plays a bearing role, and various components of the transport robot 100 are mounted thereon. When the transport robot 100 transports the goods 200, the vertical frame 110 may drive synchronous movement of the components on the transport robot 100, so as to implement the transport of the goods 200. The storage mechanism 120 is located on the vertical frame 110, is configured to store the goods 200, and is capable of moving synchronously with the vertical frame 110, so as to implement the transport of the goods 200. The transport robot 100 moves to a loading position, and the to-be-transported goods 200 are transported to the storage mechanism 120 for storage. Then, the transport robot 100 moves from the loading position to an unloading position. Correspondingly, the storage mechanism 120 moves to the unloading position along with the vertical frame 110. At this time, the goods 200 in the storage mechanism 120 can be unloaded. The storage mechanism 120 can temporarily store the to-be-transported goods 200, thereby improving the capability of the transport robot 100 to carry the goods 200.

In addition, the storage mechanism 120 includes a plurality of storage assemblies 121 arranged on the vertical frame 110 at intervals. Each of the plurality of storage assemblies 121 can carry goods 200 of a box to ensure a storage capacity of the transport robot 100. Optionally, a distance between two adjacent storage assemblies 121 may be equal or not equal. Exemplarily, the plurality of storage assemblies 121 are evenly distributed on the vertical frame 110 along the vertical direction. The to-be-transported goods 200 may be transported to the plurality of storage assemblies 121, and the transport robot 100 drives the goods 200 in the plurality of storage assemblies 121 to be transported to the unloading position.

Referring to FIG. 1 and FIG. 3, in an embodiment, the transport robot 100 further includes a lifting mechanism 140 capable of ascending or descending relative to the vertical frame 110 along the vertical direction and a carrying mechanism 150 configured to carry the goods 200, where the carrying mechanism 150 is movably arranged on the vertical frame 110 along the vertical direction, is connected to the lifting mechanism 140, and is capable of ascending or descending along the vertical direction under driving of the lifting mechanism 140, so as to deliver goods 200 in the carrying mechanism 150 to a corresponding storage mechanism 120.

The carrying mechanism 150 is a terminal configured to perform an action of the transport robot 100. At the loading position, the carrying mechanism 150 may carry the to-be-transported goods 200, and transport the goods 200 into the plurality of storage assemblies 121. Certainly, in some occasions, in a case that the goods 200 in the plurality of storage assemblies 121 need to be unloaded separately, the carrying mechanism 150 may also take out the goods 200 in the plurality of storage assemblies 121. Optionally, the carrying mechanism 150 includes, but is not limited to, a mechanical arm, an actionable tow bar, or a plane with a conveying function, and the like. The lifting mechanism 140 is configured to implement the ascending or descending movement of the carrying mechanism 150, and is capable of driving the carrying mechanism 150 to ascend or descend along the vertical direction.

At the loading position, there is a shelving unit with a plurality of layers configured to carry goods 200. When loading goods at the loading position of the transport robot 100, the lifting mechanism 140 drives the carrying mechanism 150 to ascend or descend, so that the carrying mechanism 150 can pick goods on the shelving unit. Then, the lifting mechanism 140 drives the carrying mechanism 150 to ascend or descend, so as to transfer the goods 200 in the carrying mechanism 150 to the plurality of storage assemblies 121. This process is repeated until the plurality of storage assemblies 121 store the goods 200. After the loading is completed, the transport robot 100 moves from the loading position to the unloading position, and the plurality of storage assemblies 121 may perform a synchronous unloading operation. After the unloading is completed, the transport robot 100 returns to the loading position, so that continuous transport of the goods 200 can be implemented by repeating the process, thereby improving the transport efficiency.

The function of the lifting mechanism 140 is to drive the carrying mechanism 150 to ascend or descend along the vertical direction. In an embodiment, the lifting mechanism 140 includes a lifting power source and a lifting transmission component, and the lifting power source and the lifting transmission component are separately arranged on the vertical frame 110. The lifting transmission component is in driving connection with the lifting power source and the carrying mechanism 150. Specifically, an output end of the lifting power source is in driving connection with an input end of the lifting transmission component, and an output end of the lifting transmission component is in driving connection with the carrying mechanism 150. That the lifting power source and the lifting transmission component are separately arranged on the vertical frame 110, and the driving connection between the lifting power source and the lifting transmission component facilitate the disassembly or assembly of the lifting mechanism 140 on the vertical frame 110. Optionally, a power output from the lifting power source is in a form of rotation and linear motion, or in any other form of motion, and a final output of the lifting transmission component in driving connection with the lifting power source is movement along the vertical direction. Optionally, the lifting power source includes a driving motor in driving connection with the input end of the lifting transmission component. The lifting power source in a form of a motor runs more stably. Further, the driving motor can rotate forwardly or reversely, which facilitates the control of an ascending or descending process of the lifting mechanism 140.

Optionally, the lifting transmission component may be of a telescopic rod structure, a chain transmission structure, a driving transmission structure, or the like, and may also be of another structure capable of enabling the carrying mechanism 150 to ascend or descend. Exemplarily, the lifting transmission component is of a chain transmission structure, including a sprocket and a chain, the chain is connected to the carrying mechanism 150, and the chain is arranged on the vertical frame 110 along the vertical direction. When the output end of the lifting power source drives the sprocket to rotate, the chain ascends or descends along the vertical frame 110, which may further drive the carrying mechanism 150 to ascend or descend.

It should be noted that, the essence of the lifting transmission component is to output the ascending or descending motion to drive the carrying mechanism 150 to ascend or descend, thereby implementing the loading of the goods 200. In this embodiment, the lifting transmission component is implemented by a chain transmission structure. In addition, there are various structures that can implement ascending or descending, which cannot all be listed herein, and the manner of the ascending or descending motion in the present disclosure is not limited to being implemented by the foregoing specific structures.

In an embodiment, the transport robot 100 further includes a rotary mechanism arranged between the carrying mechanism 150 and the lifting mechanism 140 and configured to drive the carrying mechanism 150 to rotate relative to the lifting mechanism 140, so that the carrying mechanism 150 is aligned with a corresponding storage mechanism 120. The rotary mechanism is rotatably connected to the carrying mechanism 150, and the carrying mechanism 150 is rotatable relative to the rotary mechanism. When the carrying mechanism 150 is rotated by the rotary mechanism, a direction of the carrying mechanism 150 may be adjusted, so that the loading or unloading port of the carrying mechanism 150 can be adjusted. The carrying mechanism 150 implements the loading or unloading of the goods 200 through the loading or unloading port. When the transport robot 100 is at the loading position, the rotary mechanism may drive the carrying mechanism 150 to rotate, so that the loading or unloading port of the carrying mechanism 150 faces a shelving unit, and the goods 200 can be loaded into the carrying mechanism 150. When the carrying mechanism 150 transfers the goods 200 to the plurality of storage assemblies 121, the rotary mechanism may drive the carrying mechanism 150 to rotate, so that the loading or unloading port of the carrying mechanism 150 faces the plurality of storage assemblies 121. At this time, the goods 200 in the carrying mechanism 150 can be transferred to the plurality of storage assemblies 121.

Optionally, the rotary mechanism includes a carrying bracket, an autorotation gear arranged on the carrying bracket, and an autorotation motor fixedly mounted on the carrying bracket. An output end of the autorotation motor is connected to the autorotation gear, the carrying mechanism 150 is mounted on the autorotation gear, and the carrying bracket is mounted on the lifting mechanism 140. The autorotation motor may drive the autorotation gear to rotate, which may further drive the carrying mechanism 150 to rotate.

It should be noted that, the essence of the rotary mechanism is to output a rotation motion, so as to drive the carrying mechanism 150 to rotate, thereby implementing the loading or unloading of the goods 200. In this embodiment, the rotary mechanism is implemented by an autorotation motor and an autorotation gear. In addition, there are various structures that can implement rotation, which cannot all be listed herein, and the manner of the rotation motion in the present disclosure is not limited to being implemented by the foregoing specific structures.

When the transport robot 100 in the foregoing embodiment loads goods, the lifting mechanism 140 drives the carrying mechanism 150 to transfer the goods 200 to a plurality of storage assemblies 121 at corresponding heights in the storage mechanism 120. When unloading, the lifting mechanism 140 drives the carrying mechanism 150 to take out the goods 200 in a plurality of storage assemblies 121 at corresponding heights in the storage mechanism 120. Through the cooperation between the lifting mechanism 140 and the carrying mechanism 150, the automation of loading or unloading of the goods 200 is implemented, a problem of high cost and low efficiency in a current transport method is effectively resolved, the cost of the loading or unloading of the goods is reduced, and the efficiency of the loading or unloading of the goods 200 is greatly improved. In addition, the carrying mechanism 150 moves to different heights under the driving of the lifting mechanism 140, so that the to-be-transported goods 200 can be delivered to a plurality of storage assemblies 121 at different heights in the storage mechanism 120, which has strong versatility and reduces the floor space.

Referring to FIG. 1 and FIG. 3, in an embodiment, the carrying mechanism 150 includes a transition member 151 and a pick-or-place member 152 that is telescopically arranged on the transition member 151, and the pick-or-place member 152 is capable of taking out goods 200 and storing the goods in the transition member 151, and is further capable of pushing out goods 200 in the transition member 151. The pick-or-place member 152 is telescopically arranged in the transition member 151. At the loading position, the pick-or-place member 152 extends out of the transition member 151 to take out goods 200 on a shelving unit, and then the pick-or-place member 152 retracts into the transition member 151 to temporarily store the goods 200 in the transition member 151. Subsequently, the lifting mechanism 140 and the rotary mechanism drive the carrying mechanism 150 to move, so that the carrying mechanism 150 moves to a plurality of storage assemblies 121 in which the goods are to be placed. At this time, the pick-or-place member 152 extends out of the transition member 151, moves the goods 200 out of the transition member 151, and transfers the goods to the plurality of storage assemblies 121. After the transfer, the pick-or-place member 152 retracts into the transition member 151. Optionally, the transition member 151 includes, but is not limited to, a transition box, and the pick-or-place member 152 includes, but is not limited to, a structure in which a telescopic motor cooperates with a telescopic rod, a mechanical arm mechanism, and the like.

In an embodiment, the transport robot 100 further includes a movable chassis 160 arranged at a bottom portion of the vertical frame 110. The movable chassis 160 can drive the transport robot 100 to move, which greatly improves the adaptability of the transport robot 100 to actual working conditions. Specifically, the chassis 160 includes a chassis frame 161, a travel drive assembly, and a plurality of rotating wheels 162, the vertical frame 110 is arranged on an upper portion of the chassis frame 161, the plurality of rotating wheels 162 are arranged on a bottom portion of the chassis frame 161, the travel drive assembly is arranged on the chassis frame 161, and at least one of the plurality of rotating wheels 162 is in driving connection with the travel drive assembly. Further, at least two of the plurality of rotating wheels 162 are separately in driving connection with the travel drive assembly, and the at least two of the plurality of rotating wheels 162 being separately in driving connection with the travel drive assembly are distributed on two sides of the chassis frame 161 along a traveling direction, thereby achieving a steering function of the chassis 160. The travel drive assembly includes at least two wheel drive motors, and the at least two of the plurality of rotating wheels 162 distributed on the two sides of the chassis frame 161 along the traveling direction are respectively driven by separate wheel drive motors. That the at least two of the plurality of rotating wheels 162 distributed on the two sides of the chassis frame 161 along the traveling direction are respectively driven by separate wheel drive motors can simplify a transmission structure on the chassis 160.

In an embodiment, each of the plurality of rotating wheels 162 includes a driving wheel and a driven wheel. The driving wheel and the driven wheel are mounted on a bottom portion of the chassis 160, may separately rotate relative to the chassis 160, and jointly support the chassis 160. The driving wheel is driven by a wheel drive motor to enable the chassis 160 to move. By configuring the movable chassis 160, the transport robot 100 can transport the goods 200 between the loading position and the unloading position. There are two driving wheels, and the two driving wheels are symmetrically distributed. Correspondingly, there are two wheel drive motors, and the two driving wheels are respectively driven by the two wheel drive motors, so that rotational speeds of the two driving wheels are different, thereby implementing the steering of the chassis 160. There are four driven wheels, and the four driven wheels are distributed in a rectangular shape. The four driven wheels may be universal wheels or may be of other wheel structures with a steering function. According to actual situations, a quantity of the driven wheel is not limited to four, but may also be six, three, or the like.

In this embodiment, the chassis 160 is also mounted with a guiding apparatus, and the guiding apparatus is a camera configured to identify a graphic code attached to a ground, so that the chassis 160 travels along a preset path. The graphic code may be a two-dimensional code, a barcode, or some customized identification codes. In some other embodiments, the guiding apparatus is a laser guiding apparatus configured to guide the chassis 160 to travel along a laser beam, or the guiding apparatus is a short-wave receiving apparatus configured to receive a preset short-wave signal to guide the chassis 160 to travel along a preset path. It should be noted that, in some other embodiments, the chassis 160 may be omitted, and the vertical frame 110 is directly and fixedly mounted on the ground or another platform, and is only configured to carry the goods 200 between the loading position and the unloading position around the vertical frame.

In an embodiment, the transport robot 100 further includes a controller electrically connected to the chassis 160, the carrying mechanism 150, the lifting mechanism 140, and the rotary mechanism separately, so as to control the synchronous movement of components or control the movement of at least one component, to achieve a function of automatic goods carrying.

First Embodiment

Referring to FIG. 1 to FIG. 8, in the first embodiment of the present disclosure, when a transport robot 100 is unloading, a plurality of storage assemblies 121 are capable of moving synchronously to perform a synchronous unloading action.

To further improve the transport efficiency of the transport robot 100, the transport robot 100 of the present disclosure can implement synchronous unloading at the unloading position. Specifically, during unloading, a plurality of storage assemblies 121 may move synchronously, so that the goods 200 are moved out of the plurality of storage assemblies 121, and a synchronous unloading action is performed in real time. In this way, the goods 200 in the plurality of storage assemblies 121 can be unloaded synchronously, which shortens the unloading time and improves the unloading efficiency of the transport robot 100. After the unloading is completed, the transport robot 100 may return to the loading position to continue loading, which improves the working efficiency of the transport robot 100.

In this embodiment described above, when the transport robot 100 is unloading, a plurality of storage assemblies 121 of a storage mechanism 120 may move synchronously to perform a synchronous unloading action, so that the synchronous unloading of goods 200 in the plurality of storage assemblies 121 is implemented, the current problem of a low unloading efficiency caused by the layer-by-layer unloading of goods is effectively resolved, goods 200 in the transport robot 100 can be unloaded at one time, the unloading efficiency is improved, the unloading time is reduced, and the overall working efficiency of the transport robot 100 is improved.

Referring to FIG. 1 to FIG. 4, in an embodiment, the transport robot 100 further includes at least one linkage mechanism 130, and each of the at least one linkage mechanism 130 is connected to at least two storage assemblies 121 and is configured to drive the at least two storage assemblies 121 to move synchronously relative to the vertical frame 110 to perform a synchronous unloading action. When the at least one linkage mechanism 130 moves, a synchronous movement of the at least two storage assemblies 121 may be implemented. It can be understood that one linkage mechanism 130 may be connected to all storage assemblies 121, and alternatively, among a plurality of linkage mechanisms 130, each of the plurality of linkage mechanisms 130 may be connected to a plurality of storage assemblies 121. Exemplarily, there are two linkage mechanisms 130, where one of the two linkage mechanisms 130 is connected to storage assemblies 121 of first to third layers, and the other one of the two linkage mechanisms 130 is connected to storage assemblies 121 of fourth to sixth layers. Certainly, in another implementation of the present disclosure, there may be more linkage mechanisms 130. The present disclosure is only described by taking an example in which one linkage mechanism 130 is connected to all storage assemblies 121. A working principle of a plurality of linkage mechanisms 130 is substantially the same as that of the one linkage mechanism 130, and details are not described herein again.

The storage mechanism 120 may be rotatably mounted on the vertical frame 110, and may further be connected to the linkage mechanism 130. When moving, the linkage mechanism 130 drives the plurality of storage assemblies 121 to rotate relative to the vertical frame 110, so that the plurality of storage assemblies 121 can undergo a pitching motion. It can be understood that one end of the linkage mechanism 130 may be mounted on the vertical frame 110 or the chassis 160, as long as the linkage mechanism 130 can drive the plurality of storage assemblies 121 to undergo a pitching motion.

When the linkage mechanism 130 drives the plurality of storage assemblies 121 to move upward, one ends of the plurality of storage assemblies 121 are lifted up, and other ends rotate relative to the vertical frame 110, so as to stay at initial positions. At this time, the plurality of storage assemblies 121 are lifted up, and goods 200 thereon may slide out of the plurality of storage assemblies 121 under an action of gravity thereof, so as to implement the unloading of the goods 200. Because the linkage mechanism 130 simultaneously drives the plurality of storage assemblies 121 to move upward, the plurality of storage assemblies 121 can be simultaneously lifted up, thereby simultaneously performing an unloading operation to implement the unloading. After the unloading is completed, the linkage mechanism 130 drives the plurality of storage assemblies 121 to descend, and the plurality of storage assemblies 121 return to horizontal initial positions.

When the linkage mechanism 130 drives the plurality of storage assemblies 121 to move downward, and after external goods 200 are simultaneously conveyed to the plurality of storage assemblies 121, the goods 200 can slide into the plurality of storage assemblies 121 under the action of gravity to implement synchronous loading. It should be noted that the synchronous loading of the transport robot 100 needs to be implemented in cooperation with an auxiliary apparatus 300 of the transport system, a specific implementation process is described in detail in the following specification, and only the synchronous unloading of the transport robot 100 is described in detail in this embodiment.

After the transport robot 100 loads the goods 200 into the plurality of storage assemblies 121 at the loading position, the transport robot 100 moves from the loading position to the unloading position. At this time, the linkage mechanism 130 drives the plurality of storage assemblies 121 to move upward, so that the plurality of storage assemblies 121 are lifted up. In this way, the goods 200 in the plurality of storage assemblies 121 can slide out of the plurality of storage assemblies 121 under the action of gravity thereof, and be stored in a specified apparatus such as the auxiliary apparatus 300, so as to implement the synchronous unloading of the transport robot 100. After the unloading is completed, the transport robot 100 returns to the loading position to load goods, and in this way, a transport function of the transport robot 100 is achieved.

In an embodiment, the linkage mechanism 130 includes a linkage connector 131 simultaneously connected to at least two storage assemblies 121 and capable of synchronously driving the at least two storage assemblies 121 to synchronously undergo a pitching motion. It can be understood that the pitching motion herein may be a pitching rotational motion, or a curved motion, and certainly, may also be in other forms that can generate the pitching motion. One ends of the at least two storage assemblies 121 are rotatably connected to the vertical frame 110, and the at least two storage assemblies 121 are also connected to the linkage connector 131. The linkage connector 131 can ascend or descend. When ascending or descending, the linkage connector 131 may drive the at least two storage assemblies 121 to ascend or descend, so that the at least two storage assemblies 121 rotate relative to the vertical frame 110, that is, the at least two storage assemblies 121 undergo a pitching motion. It can be understood that, when one of the at least two storage assemblies 121 undergo a pitching motion, the linkage connector 131 is driven to ascend or descend, and the remaining storage assemblies 121 may be driven to move through the linkage connector 131; or the linkage connector 131 ascends or descends, and then the at least two storage assemblies 121 are driven to move.

As shown in FIG. 1 and FIG. 2, optionally, the linkage connector 131 and the at least two storage assemblies 121 may be rotatably connected or fixedly connected. When the linkage connector 131 and the at least two storage assemblies 121 are rotatably connected, the at least two storage assemblies 121 may have a rotary shaft, and the at least two storage assemblies 121 may be rotatably mounted on the linkage connector 131 through the rotary shaft. Alternatively, the linkage connector 131 may have a rotary shaft, and the linkage connector 131 may be rotatably mounted on the at least two storage assemblies 121 through the rotary shaft. Alternatively, a connection between the linkage connector 131 and the at least two storage assemblies 121 is similar to an olecranon engagement structure. In addition, the rotary shaft may be replaced with a hinge or another component that can implement a rotatable connection.

Optionally, the linkage connector 131 may be a connecting rod connected to the at least two storage assemblies 121. Further optionally, the linkage member may include a plurality of connecting rods, and two adjacent linkage members are connected by the plurality of connecting rods. In this case, when one of the at least two storage assemblies 121 moves, adjacent connecting rods may drive the remaining storage assemblies 121 to move. It can be understood that a specific structure of the linkage connector 131 is not limited to the connecting rod, but may also be a connecting piece or the like.

It should be noted that, the essential spirit of the present disclosure lies in the linkage between the linkage connector 131 and the at least two storage assemblies 121, and the linkage connector 131 can implement the synchronous movement of the at least two storage assemblies 121, thereby performing a synchronous unloading operation. In this embodiment, the connection of connectors is implemented by connecting rods, and there may be one or more connecting rods. In addition, there are various arrangements of the linkage connector 131, which cannot all be listed herein, and a linkage manner in the present disclosure is not limited to being implemented by the foregoing specific structures.

Referring to FIG. 1 and FIG. 3, in an embodiment, in a same horizontal direction, a distance between the linkage connector 131 and the vertical frame 110 is less than or equal to a length of each of the plurality of storage assemblies 121. It can be understood that a length at a connection position between the linkage connector 131 and the plurality of storage assemblies 121 may be equal to the length of each of the plurality of storage assemblies 121. In this case, the linkage connector 131 and the vertical frame 110 are respectively located at two ends of the plurality of storage assemblies 121. The length at the connection position between the linkage connector 131 and the plurality of storage assemblies 121 may be less than the length of each of the plurality of storage assemblies 121, and the connection position between the linkage connector 131 and the plurality of storage assemblies 121 is located on side surfaces of the plurality of storage assemblies 121. That is, the linkage connector 131 may be located at any position on a peripheral side of each of the plurality of storage assemblies 121. In this way, the linkage connector 131 can drive the plurality of storage assemblies 121 to synchronously ascend or descend when the linkage connector 131 ascends or descends, so as to perform the synchronous unloading operation of the transport robot 100.

In an embodiment, there may be at least one linkage connector 131. In a case that there is one linkage connector 131, the cooperation between the linkage connector with the vertical frame 110 can ensure that the plurality of storage assemblies 121 are fixed and reliable, and simultaneously implement the driving of the movement of the plurality of storage assemblies 121. In a case that there are a plurality of linkage connectors 131, the plurality of linkage connectors 131 can further improve the linkage of the plurality of storage assemblies 121 and ensure that the plurality of storage assemblies 121 move in a consistent manner.

In a case that there is one linkage connector 131, the linkage connector 131 and the vertical frame 110 are respectively arranged at two ends of the plurality of storage assemblies 121. That is, the connection position between the linkage connector 131 and the plurality of storage assemblies 121 and the vertical frame 110 are respectively located at the two ends of the plurality of storage assemblies 121, and a distance between the connection position and the vertical frame 110 is equal to a size of each of the plurality of storage assemblies 121 along a horizontal direction. In this way, the plurality of storage assemblies 121 can be reliably supported by the linkage connector 131 and the vertical frame 110, to prevent the plurality of storage assemblies 121 from falling and dropping, so that the plurality of storage assemblies 121 can reliably store the goods 200.

In a case that there are a plurality of linkage connectors 131, the plurality of linkage connectors 131 are arranged at intervals along the peripheral side of the storage assembly 121. The plurality of linkage connectors 131 are distributed at intervals along the peripheral side of each of the plurality of storage assemblies 121, and may be distributed uniformly, non-uniformly, or symmetrically. The plurality of storage assemblies 121 can be reliably supported by the plurality of linkage connectors 131 and the vertical frame 110, to prevent the plurality of storage assemblies 121 from falling and dropping, so that the plurality of storage assemblies 121 can reliably store the goods 200.

Referring to FIG. 1, FIG. 3, and FIG. 4, in an embodiment, the linkage mechanism 130 further includes a linkage driving member 132 configured to cooperate with the linkage connector 131, so as to drive the plurality of storage assemblies 121 to implement synchronous unloading. The linkage driving member 132 is a power source for the movement of the linkage mechanism 130, and implements the driving of the movement of a linkage moving member. In addition, the linkage driving member 132 outputs linear motion, so that the linkage connector 131 can ascend or descend, and the plurality of storage assemblies 121 can undergo a pitching motion. Optionally, the linkage driving member 132 includes, but is not limited to, an air cylinder, a hydraulic cylinder, a linear motor, or an electric push rod, and may also be another linear driving unit capable of outputting the linear motion. Exemplarily, the linkage driving member 132 is a linear motor. Exemplarily, one end of the linkage driving member 132 is arranged on the chassis 160. Certainly, one end of the linkage driving member 132 may also be arranged on the vertical frame 110.

Optionally, the linkage driving member 132 may be connected to the plurality of storage assemblies 121. In an embodiment, an output end of the linkage driving member 132 is connected to one of the plurality of storage assemblies 121. One end of the linkage driving member 132 is mounted on the vertical frame 110, and an other end is connected to the plurality of storage assemblies 121. After outputting the linear motion, the linkage driving member 132 may drive a plurality of storage assemblies 121 connected thereto to move, and then the plurality of storage assemblies 121 may drive the linkage connector 131 to ascend or descend. At this time, the linkage connector 131 may drive the remaining storage assemblies 121 to move synchronously, so that the plurality of storage assemblies 121 rotate relative to the vertical frame 110, the plurality of storage assemblies 121 are lifted up, and the synchronous unloading operation of the plurality of storage assemblies 121 is performed.

Further, the output end of the linkage driving member 132 is connected to a bottom portion or a top portion of one of the plurality of storage assemblies 121. In a case that the linkage driving member 132 is connected to the top portion of the plurality of storage assemblies 121, the linkage driving member 132 may retract to drive the plurality of storage assemblies 121 to move upward, and the linkage driving member 132 may extend to drive the plurality of storage assemblies 121 to move downward. In a case that the linkage driving member 132 is connected to the bottom portion of the plurality of storage assemblies 121, the linkage driving member 132 may extend to drive the plurality of storage assemblies 121 to move upward, and the linkage driving member 132 may retract to drive the plurality of storage assemblies 121 to move downward. Exemplarily, the linkage driving member 132 is connected to the bottom portion of the plurality of storage assemblies 121. Still further, the linkage driving member 132 is located and connected to a bottom portion of a lowermost storage assembly 121, and the output end of the linkage driving member 132 is in abutment with a middle region of the bottom portion of the storage assembly 121. In this way, the linkage driving member 132 does not affect the loading or unloading of goods 200 of a carrying component, so as to avoid interference.

Further optionally, the output end of the linkage driving member 132 is connected to the linkage connector 131. The linkage driving member 132 may directly drive the linkage connector 131 to ascend or descend, and then the linkage connector 131 may drive the plurality of storage assemblies 121 to move synchronously. Further, the linkage driving member 132 may be located at the bottom portion of the lowermost storage assembly 121 and arranged on the chassis 160, and the output end of the linkage driving member 132 is connected to the linkage connector 131. Certainly, the linkage driving member 132 may also be located at the top portion of the plurality of storage assemblies 121.

The linkage mechanism 130 in this embodiment can implement the simultaneous unloading of a plurality of storage assemblies 121, the plurality of storage assemblies 121 are connected by a same linkage connector 131, and an output end of a linkage driving member 132 is connected to a lowermost storage assembly 121. When the linkage driving member 132 extends, the linkage driving member 132 may push the plurality of storage assemblies 121 upward, so that the plurality of storage assemblies 121 rotate relative to the vertical frame 110. When rotating, the plurality of storage assemblies 121 may drive the linkage connector 131 to move synchronously, and then the linkage connector 131 drives the remaining storage assemblies 121 to move synchronously, so as to implement the synchronous driving of all storage assemblies 121 to move upward, thereby performing the synchronous unloading operation.

It is worth noting that there are various rotational driving forms in which the plurality of storage assemblies 121 rotate relative to the vertical frame 110 to undergo a pitching motion. In this embodiment, only the linkage driving member 132 capable of outputting the linear motion is configured to drive the movement of the plurality of storage assemblies 121, and other driving components that can implement the pitching motion of the plurality of storage assemblies 121 should be considered as falling within the protection scope of the present disclosure.

Referring to FIG. 1, FIG. 3, and FIG. 5, in an embodiment, each of the plurality of storage assemblies 121 includes a carrier body 1211 configured to carry the goods 200 and rotatably connected to the linkage connector 131 and the vertical frame 110 separately. The carrier body 1211 is a main body configured to carry the goods 200, one end of the carrier body 1211 is rotatably connected to the vertical frame 110, and an other end is rotatably connected to the linkage connector 131. One end of the carrier body 1211 connected to the vertical frame 110 is a head end, and one end of the carrier body 1211 connected to the linkage connector 131 is a tail end. When the linkage connector 131 drives the carrier body 1211 to ascend or descend, the tail end of the carrier body 1211 rotates around the head end of the carrier body 1211, so that the carrier body 1211 undergoes a pitching motion. Optionally, an edge of the carrier body 1211 is rotatably connected to the linkage connector 131 and the vertical frame 110 separately, and certainly, a middle region of the carrier body 1211 may also be rotatably connected to the linkage connector 131 and the vertical frame 110 separately.

It can be understood that the rotatable connection between the carrier body 1211 and the vertical frame 110 may be that the carrier body 1211 has a rotary shaft, and the carrier body 1211 is also rotatably mounted on the vertical frame 110 through the rotary shaft, or the vertical frame 110 has a rotary shaft, and the carrier body 1211 may be rotatably mounted on the rotary shaft, or the like. In addition, the foregoing manner of the rotatable connection which is implemented through the rotary shaft may also be replaced by a hinged connection or other forms of rotatable connection.

Optionally, the carrier body 1211 is arranged in a flat plate shape, and a container of the goods 200 may be transferred to the carrier body 1211. Further, the edge of the carrier body 1211 has three sides of flanges, and the three sides of flanges form a loading or unloading port at the vertical frame 110, and the goods 200 are mounted in the carrier body 1211 through the loading or unloading port. In addition, the flanges can limit the displacement of the goods 200 on the carrier body 1211, prevent the goods 200 from falling out of the carrier body 1211, and ensure that the carrier body 1211 can store the goods 200 accurately. It can be understood that the loading or unloading port herein is the loading or unloading end 1215 in the second embodiment.

In an embodiment, each of the plurality of storage assemblies 121 further includes a rolling member 1212 arranged on the carrier body 1211 in a rolling manner and configured to be in a rolling contact with the goods 200 in the carrier body 1211. The rolling member 1212 can reduce a frictional force between the goods 200 and the carrier body 1211, so as to facilitate the loading or unloading of the goods 200. When the goods 200 are loaded, a bottom portion of the goods 200 is in contact with the rolling member 1212 under the action of gravity thereof. During the movement of the goods 200 into the carrier body 1211, the goods 200 may drive rollers to rotate, so that the frictional force between the goods 200 and the carrier body 1211 is reduced, and the loading of the goods 200 is facilitated. When the goods 200 are unloaded, the linkage connector 131 drives the carrier body 1211 to move upward. At this time, the tail end of the carrier body 1211 is higher than a top end of the carrier body 1211, and the goods 200 in the carrier body 1211 slide out of the carrier body 1211 under the action of gravity. In addition, during a sliding process of the goods 200 along the carrier body 1211, the bottom portion of the goods 200 drives the rolling member 1212 to roll, so that the goods 200 slide out of the carrier body 1211 more easily, and the unloading of the goods 200 is facilitated.

Optionally, the carrier body 1211 is provided with a rolling groove, the rolling member 1212 may be rotatably mounted in the rolling groove, and a top surface of the rolling member 1212 is slightly higher than a top surface of the carrier body 1211, so as to ensure that the rolling member 1212 can be in contact with the bottom portion of the goods 200. In addition, the bottom portion of the carrier body 1211 also includes a protection cover covering the rolling member 1212 on the bottom portion of the carrier body 1211, so as to avoid interference between a bottom portion of the rolling member 1212 and other components.

Optionally, the rolling member 1212 includes, but is not limited to, rollers, rolling shafts, rolling balls, or other components capable of rolling. In addition, there are a plurality of rolling members 1212, and the plurality of rolling members 1212 may be arranged in one row, or may be arranged in a plurality of rows. Exemplarily, the rolling member 1212 is rollers arranged in three rows.

Referring to FIG. 1, FIG. 3, FIG. 6, and FIG. 7, the first embodiment of the present disclosure further provides a transport system including an auxiliary apparatus 300 and the transport robot 100 in the foregoing embodiment. The auxiliary apparatus 300 includes a support frame 310 and a plurality of transport mechanisms 320 arranged on the support frame 310 at intervals along a vertical direction, and a manner in which the plurality of transport mechanisms 320 are arranged at intervals is the same as a manner in which a plurality of storage assemblies 121 are arranged at intervals. When the transport robot 100 moves to the auxiliary apparatus 300, goods 200 on the plurality of storage assemblies 121 are capable of being simultaneously transferred to corresponding transport mechanisms 320 to implement synchronous unloading; or goods 200 on the plurality of transport mechanisms 320 are capable of being simultaneously transferred to corresponding storage assemblies 121 to implement synchronous loading.

The auxiliary apparatus 300 can implement the synchronous unloading or synchronous loading of the goods 200. The auxiliary apparatus 300 is arranged at an unloading position or a loading position. In a case that the auxiliary apparatus 300 is unloaded, the auxiliary apparatus 300 is at the unloading position; and in a case that the auxiliary apparatus 300 is loaded, the auxiliary apparatus 300 is at the loading position. In the present disclosure, only an example in which the auxiliary apparatus 300 is at the unloading position is used for description. The auxiliary apparatus 300 is located at the unloading position. After the transport robot 100 completes loading at the loading position, the transport robot 100 moves to the unloading position. At this time, the transport robot 100 is docked with the auxiliary apparatus 300, and the auxiliary apparatus 300 may receive and pick the goods 200 in the plurality of storage assemblies 121 in the transport robot 100.

Specifically, the mounting frame 321 functions as a support, which is configured to support a plurality of transport mechanisms 320 configured to transport the goods 200. The auxiliary apparatus 300 includes a same quantity of transport mechanisms 320 as the plurality of storage assemblies 121, and heights at which the plurality of transport mechanisms 320 are located are consistent with heights at which corresponding storage assemblies 121 are located. After the transport robot 100 is docked with the auxiliary apparatus 300, the plurality of storage assemblies 121 and the plurality of transport mechanisms 320 are at same levels and heights. When unloading, the linkage driving member 132 of the linkage mechanism 130 extends to drive one end of a lowermost storage assembly 121 to be lifted up. During a lifting process of the storage assembly 121, the linkage connector 131 may be driven to ascend, and the linkage connector 131 may drive the remaining storage assemblies 121 to be lifted up during the lifting process. In this way, the plurality of storage assemblies 121 can be simultaneously lifted up, the goods 200 in the plurality of storage assemblies 121 slide out of the plurality of storage assemblies 121 under the action of gravity and the action of the rolling member 1212, and move to corresponding transport mechanisms 320, and the transport mechanisms 320 transport the goods 200 thereon away to implement the unloading of the goods 200.

The auxiliary apparatus 300 may also implement the loading of the goods 200. Specifically, transport mechanisms 320 of different layers drive the goods 200 to move toward corresponding storage assemblies 121, and transfer the goods 200 to the corresponding storage assemblies 121. It can be understood that when loading the goods 200, the linkage mechanism 130 may drive ends of the plurality of storage assemblies 121 to descend, and at the same time, the plurality of transport mechanisms 320 simultaneously transfer the goods 200 to the corresponding storage assemblies 121. After the goods 200 are gradually transferred into the carrier body 1211 and come into contact with the rolling member 1212, the goods 200 may slide into the plurality of storage assemblies 121 under the action of gravity thereof and through the cooperation with the rolling member 1212. Certainly, the plurality of storage assemblies 121 may also be stationary, and the goods 200 may also be moved into the plurality of storage assemblies 121 by a pushing force of the plurality of transport mechanisms 320 in cooperation with the rolling member 1212.

Referring to FIG. 6 and FIG. 7, in an embodiment, each of the plurality of transport mechanisms 320 includes a mounting frame 321 arranged on the support frame 310 and a transport portion 322 movably arranged on the mounting frame 321, and the transport portion 322 may drive the goods 200 to move. The mounting frame 321 is of a frame structure, which carries the transport portion 322 and is configured to implement the mounting of the transport portion 322. The transport portion 322 is a main component that implements the transport of the goods 200. When the goods 200 are in the transport portion 322, the transport portion 322 may drive the goods 200 to move toward or away from the plurality of storage assemblies 121.

Optionally, the transport portion 322 is of a structure that can implement horizontal transport, such as a conveyor belt structure, an assembly line, a conveyor roller structure, a roller structure, or the like. Exemplarily, the transport portion 322 is of a roller structure, and specifically includes a plurality of rollers, and each of the plurality of rollers includes a built-in rolling motor to drive the each of the plurality of rollers to rotate, thereby implementing the transport of the goods 200. It should be noted that, there are various structures that can implement the horizontal transport of the goods 200, which cannot all be listed herein, and the transport portion 322 in the present disclosure is not limited to being implemented by the foregoing specific structures.

In an embodiment, the auxiliary apparatus 300 further includes a movable base arranged at a bottom portion of the support frame 310. The movable base can drive the auxiliary apparatus 300 to move, which greatly improves the adaptation of the auxiliary apparatus 300 to actual working conditions. In this way, the auxiliary apparatus 300 can easily move to the loading position, the unloading position, or any other position, to work with the transport robot 100. Optionally, a structure of the base is exactly the same as that of the chassis 160 of the transport robot 100, and details are not described herein again.

Referring to FIG. 1, FIG. 6, and FIG. 8, in an embodiment, the transport system further includes a conveying apparatus 500 and a lifting apparatus 400 that is arranged between the auxiliary apparatus 300 and the conveying apparatus 500, and the lifting apparatus 400 is configured to ascend or descend along the vertical direction, so as to be docked with each of the plurality of transport mechanisms 320 and the conveying apparatus 500. The lifting apparatus 400 is capable of receiving and picking goods 200 of the plurality of transport mechanisms 320 and transferring the goods to the conveying apparatus 500; or the lifting apparatus 400 is capable of receiving and picking goods 200 of the conveying apparatus 500 and transferring the goods to the plurality of transport mechanisms 320.

The lifting apparatus 400 is configured to receive and pick the goods 200 of the plurality of transport mechanisms 320 or transport the goods 200 to the plurality of transport mechanisms 320. Because the plurality of transport mechanisms 320 are arranged at intervals along the vertical direction, to facilitate the goods loading or unloading of the auxiliary apparatus 300, the lifting apparatus 400 needs to move to a transport mechanism 320 at a corresponding position, so as to perform a corresponding operation. The conveying apparatus 500 is configured to convey the goods 200, may transport away goods 200 unloaded by the lifting apparatus 400, and may also transport to-be-loaded goods 200 to the lifting apparatus 400. Optionally, the conveying apparatus 500 may be of a structure that can implement the horizontal transport, such as a conveyor belt structure, an assembly line, a conveying roller structure, or a roller structure, or the like. Exemplarily, the conveying apparatus 500 is of an assembly line structure, and specifically, when unloading, the lifting apparatus 400 ascends to one side of a transport mechanism 320, after receiving the goods 200 of the transport mechanism 320, the lifting apparatus 400 descends, and transfers the goods 200 to the conveying apparatus 500, and the goods are transported away by the conveying apparatus 500. Subsequently, the lifting apparatus 400 further ascends to another transport mechanism 320, and this process is repeated until all the goods 200 on the plurality of transport mechanisms 320 are transported away. When loading, after the lifting apparatus 400 descends and receives and picks the goods 200 conveyed by the conveying apparatus 500, the lifting apparatus 400 ascends to one side of a transport mechanism 320 and transfers the goods 200 to the transport mechanism 320; and subsequently, the lifting apparatus 400 further descends to the conveying apparatus 500, and this process is repeated until the plurality of transport mechanisms 320 are loaded with the goods 200.

In an embodiment, the lifting apparatus 400 includes a lifting frame 410 along the vertical direction, a moving mechanism 420 arranged on the lifting frame 410, and a transfer mechanism 430 with at least one layer arranged on the moving mechanism 420. The moving mechanism 420 may ascend or descend along the lifting frame 410 and drive the transfer mechanism 430 with at least one layer to move, so as to receive and pick goods from or transfer goods 200 to the plurality of transport mechanisms 320. The lifting frame 410 has a bearing function, and is configured to bear the moving mechanism 420 and the transfer mechanism 430 with at least one layer. Optionally, a bottom portion of the lifting frame 410 may also be provided with rotating wheels, so as to adapt to different applications. The transfer mechanism 430 with at least one layer is configured to carry the goods 200 and implement the transfer of the goods 200 between a high position such as a transport mechanism 320 and a low position such as the conveying apparatus 500. The moving mechanism 420 is arranged on the lifting frame 410 along the vertical direction, and may output movement in the vertical direction, so as to drive the transfer mechanism 430 with at least one layer to ascend or descend.

It can be understood that the moving mechanism 420 is configured to implement the ascending or descending motion of the transfer mechanism 430 with at least one layer along the vertical direction. A specific structure of the moving mechanism 420 may be a telescopic rod structure, a chain transmission structure, a driving transmission structure, or the like, and may also be another structure capable of enabling the carrying mechanism 150 to ascend or descend. Exemplarily, a specific structure of the moving mechanism 420 is the same as a structure of the lifting mechanism 140 of the transport robot 100, and details are not described herein again. Certainly, the specific structure of the moving mechanism 420 may also be different from the structure of the lifting mechanism 140 of the transport robot 100, as long as the moving mechanism 420 can implement the ascending or descending motion.

Exemplarily, there is a transfer mechanism 430 with one layer, and the transfer mechanism 430 with one layer receives and picks goods from one transport mechanism 320 at one time, or transfers goods to one transport mechanism 320 at one time. Certainly, in another implementation of the present disclosure, in a case that there is a transfer mechanism 430 with at least two layers, the transfer mechanism 430 with at least two layers may remove goods on at least two transport mechanisms 320 at one time, or transfer goods to at least two transport mechanisms 320, so as to improve the efficiency of goods turnover.

In an embodiment, the transfer mechanism 430 with at least one layer includes a transfer base 431 arranged on the moving mechanism 420 and a transfer portion 432 movably arranged on the transfer base 431, and the transfer portion 432 may drive goods 200 to move, and may receive and pick goods from or transfer goods 200 to at least one of the plurality of transport mechanisms 320. The transfer base 431 plays a bearing role and is configured to carry the transfer portion 432, so as to mount the transfer portion 432 on the moving mechanism 420. When the moving mechanism 420 ascends or descends, the transfer base 431 may drive the transfer portion 432 to ascend or descend synchronously, so as to implement the loading or unloading of the goods 200.

Optionally, the transfer portion 432 is of a structure that can implement horizontal transport, such as a conveyor belt structure, an assembly line, a conveyor roller structure, a roller structure, or the like. Exemplarily, the transfer portion 432 is of a rolling shaft structure, and specifically includes a plurality of rolling shafts, and each of the plurality of rolling shafts includes a built-in rolling motor to drive the each of the plurality of rolling shafts to rotate, thereby implementing the transport of the goods 200. It should be noted that, there are various structures that can implement the horizontal transport of the goods 200, which cannot all be listed herein, and the transfer portion 432 in the present disclosure is not limited to being implemented by the foregoing specific structures.

The transfer portion 432 may receive and pick the goods 200 of one transport mechanism 320 at one time, as mentioned above. The transfer portion 432 may also receive and pick the goods 200 of a plurality of transport mechanisms 320 at one time, and the moving mechanism 420 may receive and pick the goods 200 of the plurality of transport mechanisms 320 layer by layer, and then convey the goods to the conveying apparatus 500 together for transport after receiving and picking the goods. Exemplarily, the moving mechanism 420 drives the transfer portion 432 to ascend to a top portion. After receiving and picking goods 200 of one transport mechanism 320, the transfer portion 432 descends one layer to receive and pick goods 200 of one transport mechanism 320. After the transfer portion 432 is full or the goods 200 of the plurality of transport mechanisms 320 are received, the moving mechanism 420 drives the transfer portion 432 to descend to a position of the conveying apparatus 500, and the transfer portion 432 transfers all the goods 200 thereon to the conveying apparatus 500. Certainly, the moving mechanism 420 may move layer by layer from bottom to top, a principle thereof is substantially the same as a principle from top to bottom, and details are not described herein again.

Certainly, the transfer portion 432 may also receive and pick a plurality of goods 200 transferred by the conveying apparatus 500 at one time, and then transfer the goods to the plurality of transport mechanisms 320 layer by layer, a principle thereof is substantially the same as a foregoing principle of goods unloading, and details are not described herein again.

In an embodiment, the transport system further includes a control center, components of the transport system perform a coordinated action under the control of the control center, and the control center of the transport system maintains a communication connection with an external server. The control center may identify information of the to-be-transported goods 200, and the control center may obtain information of a loading position and an unloading position corresponding to each piece of the to-be-transported goods 200. The control center coordinates and controls the components according to the obtained information, so as to efficiently complete the transport of the goods 200.

In the transport robot 100 and the transport system in this embodiment, when unloading, a plurality of storage assemblies 121 of a storage mechanism 120 may move synchronously to perform a synchronous unloading action, so that the synchronous unloading of goods 200 in the plurality of storage assemblies 121 is implemented, goods 200 in the transport robot 100 can be unloaded at one time, the unloading efficiency is improved, the unloading time is reduced, and the overall working efficiency of the transport robot 100 is improved. In addition, after the transport robot 100 is used in cooperation with the auxiliary apparatus 300, the loading or unloading can be simultaneously implemented, thereby improving the working efficiency of the transport system.

Second Embodiment

Referring to FIG. 9 and FIG. 17, in the second embodiment of the present disclosure, the transport robot 100 further includes a blocking mechanism 170 capable of switching between a blocking position and an avoidance position, where when the blocking mechanism 170 is at the blocking position, the blocking mechanism 170 is configured to block goods 200 in the storage assemblies 121 from sliding out, and when the blocking mechanism 170 is at the avoidance position, goods 200 are capable of being moved into or moved out of the plurality of storage assemblies 121.

It can be understood that after the plurality of storage assemblies 121 store the to-be-transported goods 200, during the movement of the transport robot 100 from the loading position to the unloading position, the transport robot 100 travels a specific distance, and the goods 200 stored in the plurality of storage assemblies 121 may be at a risk of falling. Once the goods 200 in the plurality of storage assemblies 121 fall, on the one hand, the goods 200 are damaged, resulting in economic losses; and on the other hand, a manual or intelligent picking apparatus is required to pick the goods 200 and place the goods in the plurality of storage assemblies 121 again for transport, which affects the transport efficiency of the goods 200.

In view of the foregoing description, the transport robot 100 of the present disclosure further includes a blocking mechanism 170, and the goods 200 in the plurality of storage assemblies 121 are blocked by the blocking mechanism 170. In this way, the goods 200 in the plurality of storage assemblies 121 can be prevented from sliding out. Specifically, the blocking mechanism 170 is capable of switching between a blocking position and an avoidance position. When the blocking mechanism 170 is at the avoidance position, the goods 200 may be loaded into the plurality of storage assemblies 121 or the goods 200 may be taken out from the plurality of storage assemblies 121. When the blocking mechanism 170 is at the blocking position, the goods 200 in the plurality of storage assemblies 121 are in abutment with the blocking mechanism 170, and the blocking mechanism 170 may restrict the goods 200 in the plurality of storage assemblies 121 from sliding out and prevent the goods 200 from falling.

Specifically, when the transport robot 100 is at the loading position, the blocking mechanism 170 is at the avoidance position, and at this time, the goods 200 may be loaded into the plurality of storage assemblies 121; after the loading is completed, the blocking mechanism 170 moves to the blocking position, and at this time, the blocking mechanism 170 may be in abutment with the goods 200 in the plurality of storage assemblies 121 to restrict the goods 200 from sliding out of the plurality of storage assemblies 121; subsequently, the transport robot 100 may move from the loading position to the unloading position, and the blocking mechanism 170 is always at the blocking position during this process; and when the blocking mechanism 170 is at the unloading position, the blocking mechanism 170 moves from the blocking position to the avoidance position, and at this time, the goods 200 in the plurality of storage assemblies 121 may be taken out. In addition, the transport robot 100 reciprocates in this way. It can be understood that the blocking mechanism 170 may play a blocking role during the movement of the transport robot 100 regardless of whether there are goods in the plurality of storage assemblies 121, or may only play a blocking role during goods transport in a case that there are goods in the plurality of storage assemblies 121.

When the transport robot 100 of the foregoing embodiment transports goods, the blocking mechanism 170 moves to the blocking position and may be in abutment with the goods 200 in the plurality of storage assemblies 121, so as to restrict the goods 200 from sliding out of the plurality of storage assemblies 121. Therefore, a current problem that the goods easily slide out of a storage rack of the transport robot during goods transport is effectively resolved, the goods 200 are prevented from sliding out of the plurality of storage assemblies 121 during a transport process of the transport robot 100, the safety of the goods 200 is ensured, a risk of sliding out is avoided, and the transport efficiency is improved. In addition, when the transport robot 100 loads or unloads goods, the blocking mechanism 170 moves to the avoidance position. At this time, the goods 200 may be loaded into the plurality of storage assemblies 121, and the goods 200 in the plurality of storage assemblies 121 may also be removed, which does not hinder a loading or unloading operation of the transport robot 100, and is convenient for use.

In an embodiment, the blocking mechanism 170 may simultaneously block the goods 200 in the plurality of storage assemblies 121. That is, the blocking mechanism 170 may simultaneously move to the blocking position, so as to block the goods 200 in the plurality of storage assemblies 121, and the blocking mechanism 170 may also simultaneously move to the avoidance position, so that the plurality of storage assemblies 121 can perform a loading or unloading operation. Certainly, in another implementation of the present disclosure, there are a plurality of blocking mechanisms 170, and each of the plurality of blocking mechanisms 170 may simultaneously block the goods 200 in at least two of the plurality of storage assemblies 121. It can be understood that one blocking mechanism 170 may simultaneously act on goods 200 of all storage assemblies 121, or a plurality of blocking mechanisms 170 may act on a plurality of storage assemblies 121. Exemplarily, there are two blocking mechanisms 170, where one of the two blocking mechanisms 170 is configured to block goods 200 of storage assemblies 121 of first to third layers, and the other one of the two blocking mechanisms 170 is configured to block goods 200 of storage assemblies 121 of fourth to sixth layers. Certainly, in another implementation of the present disclosure, there may be more blocking mechanisms 170. In the present disclosure, only an example in which one blocking mechanism 170 blocks the goods 200 of all storage assemblies 121 is used for description. A working principle of a plurality of blocking mechanisms 170 is substantially the same as that of the one blocking mechanism 170, and details are not described herein again.

It is worth noting that an arrangement position of the blocking mechanism 170 is not limited in principle. The blocking mechanism may be movably arranged on the vertical frame 110, may be movably arranged on the chassis 160, and may also be movably arranged on the plurality of storage assemblies 121, as long as it is ensured that the blocking mechanism 170 can move to the avoidance position or the blocking position. In this embodiment, only an example in which the blocking mechanism 170 is movably arranged on the chassis 160 is used for description. A working principle of the blocking mechanism 170 arranged at another position is substantially the same as a working principle of the blocking mechanism 170 movably arranged on the chassis 160, and details are not described herein again. Specifically, when the blocking mechanism 170 moves relative to the chassis 160, the blocking mechanism 170 may move to the blocking position or the avoidance position. After the blocking mechanism 170 can move to the blocking position, the blocking mechanism 170 may block the goods 200 in the plurality of storage assemblies 121; and after the blocking mechanism 170 can move to the avoidance position, the blocking mechanism 170 no longer blocks the plurality of storage assemblies 121, and the goods 200 may freely enter or exit the plurality of storage assemblies 121.

In an embodiment, the plurality of storage assemblies 121 includes a loading or unloading end 1215 that faces away from the vertical frame 110. The goods 200 are loaded or unloaded from the loading or unloading end 1215 of the plurality of storage assemblies 121 to complete the loading or unloading of the goods 200. Exemplarily, as shown in FIG. 10, one ends of the plurality of storage assemblies 121 away from the vertical frame 110 is provided with the loading or unloading end 1215. During loading, the goods 200 are moved from the loading or unloading end 1215 into the plurality of storage assemblies 121, and during unloading, the goods 200 are moved from the loading or unloading end 1215 out of the plurality of storage assemblies 121. Optionally, the loading or unloading end 1215 is an end opening of the plurality of storage assemblies 121, or another entrance or exit through which the goods 200 can enter or exit. Certainly, in another implementation of the present disclosure, the loading or unloading end 1215 may also be arranged at one ends of the plurality of storage assemblies 121 close to the vertical frame 110. In this way, the loading or unloading of the goods 200 in the plurality of storage assemblies 121 can also be implemented.

Optionally, the loading or unloading end 1215 is arranged on a same side as the carrying mechanism 150. When the loading or unloading end 1215 performs a loading or unloading operation, the carrying mechanism 150 needs to avoid the loading or unloading end 1215, so as to avoid interference between the carrying mechanism 1215 and a loading or unloading apparatus 600, and ensure reliable loading or unloading. In this case, the carrying mechanism 150 may ascend to a highest position of the transport robot 100 or a position higher than the loading or unloading apparatus 600, or move to an other side of the transport robot 100. Further optionally, the loading or unloading end 1215 is arranged on an opposite side of the carrying mechanism 150. The goods loading or unloading at the loading or unloading end 1215 is not affected by the carrying mechanism 150, and when the plurality of storage assemblies 121 are loaded or unloaded, the carrying mechanism 150 does not interfere with the loading or unloading apparatus 600.

Referring to FIG. 9 and FIG. 10, in an embodiment, the blocking mechanism 170 may move into or move out of the loading or unloading end 1215. That is, when the blocking mechanism 170 moves into the loading or unloading end 1215, the blocking mechanism 170 is at the blocking position. At this time, an end portion of the goods 200 is in abutment with the blocking mechanism 170, and the blocking mechanism 170 blocks the goods 200 to restrict the goods 200 from sliding out of the loading or unloading end 1215. When the blocking mechanism 170 moves out of the loading or unloading end 1215, the blocking mechanism 170 is at the avoidance position. At this time, the loading or unloading end 1215 is unobstructed, the goods 200 may be loaded into the plurality of storage assemblies 121 through the loading or unloading end 1215, and the goods 200 in the plurality of storage assemblies 121 may also be unloaded through the loading or unloading end 1215.

In an embodiment, when the blocking mechanism 170 is at the blocking position, the blocking mechanism 170 is in abutment with a side wall or a bottom surface of the goods 200. That is, the blocking position of the blocking mechanism 170 may be located on a bottom surface or a side surface of the plurality of storage assemblies 121. When the blocking mechanism 170 moves to the blocking position, the blocking mechanism 170 may be in abutment with the goods 200 in the plurality of storage assemblies 121 at a side surface or a bottom surface. At this time, the movement of the goods 200 in the plurality of storage assemblies 121 is restricted due to an abutting force of the blocking mechanism 170, so that the goods 200 are prevented from sliding out of the plurality of storage assemblies 121. After the blocking mechanism 170 moves to the avoidance position, the blocking mechanism 170 is separated from the side surface or the bottom surface of the goods 200 of the plurality of storage assemblies 121, and the goods 200 may move in the plurality of storage assemblies 121, so as to perform the loading or unloading operation of the plurality of storage assemblies 121.

In an embodiment, the blocking mechanism 170 is arranged on at least one side of the plurality of storage assemblies 121. It can be understood that the blocking mechanism 170 may be arranged on one side of the plurality of storage assemblies 121, as shown in FIG. 9 and FIG. 10, and in this case, the blocking mechanism 170 may block the goods 200 in the plurality of storage assemblies 121 at the blocking position. Certainly, in another implementation of the present disclosure, blocking mechanisms 170 may also be located on two sides of the plurality of storage assemblies 121 respectively. In this way, the goods 200 in the plurality of storage assemblies 121 can be further blocked. Further, two blocking mechanisms 170 may be arranged symmetrically or asymmetrically, as long as the blocking mechanisms can block the goods 200 in the plurality of storage assemblies 121.

Exemplarily, in this embodiment, only an example in which the blocking mechanism 170 can move into or move out of the loading or unloading end 1215 is used for description. In addition, the blocking mechanism 170 is arranged on one side of the plurality of storage assemblies 121, working principles of blocking mechanisms 170 with different layouts mentioned in other embodiments are substantially the same as that of the blocking mechanism 170 in this embodiment, and details are not described herein again. In this case, the blocking position of the blocking mechanism 170 is located at the loading or unloading end 1215. After the blocking mechanism 170 moves to the loading or unloading end 1215, the blocking mechanism 170 is at the loading or unloading end 1215 and faces the goods 200, so as to block the goods 200.

In an embodiment, the blocking mechanism 170 includes a movable blocking connector 171 and a plurality of blocking assemblies 172 separately connected to the blocking connector 171, and at least one of the plurality of blocking assemblies 172 corresponds to a same storage assembly 121. The blocking connector 171 is capable of driving the plurality of blocking assemblies 172 to move into the loading or unloading end 1215, so as to block the goods 200 in the plurality of storage assemblies 121. The blocking connector 171 functions as a connection, and is configured to connect the plurality of blocking assemblies 172. When moving, the blocking connector 171 may synchronously drive the plurality of blocking assemblies 172 to move, so that the plurality of blocking assemblies 172 can move to a loading or unloading end 1215 of a corresponding storage assembly 121 or move out of the loading or unloading end 1215 of the plurality of storage assemblies 121. Optionally, the blocking connector 171 includes, but is not limited to, a connecting rod or a longboard, and the like.

The plurality of blocking assemblies 172 function as a blocking, and is configured to implement blocking of the goods 200. When the blocking connector 171 drives the plurality of blocking assemblies 172 to move to the blocking position, the plurality of blocking assemblies 172 are located at the loading or unloading end 1215. At this time, the end portion of the goods 200 faces the plurality of blocking assemblies 172, and the plurality of blocking assemblies 172 restrict the goods 200 from moving out of the plurality of storage assemblies 121. When the blocking connector 171 drives the plurality of blocking assemblies 172 to move to the avoidance position, the plurality of blocking assemblies 172 are separated from the loading or unloading end 1215. At this time, there is no object to block the end portion of the goods 200, and the plurality of storage assemblies 121 may be loaded or unloaded.

It can be understood that the avoidance position may be located outside the plurality of blocking assemblies 172, or may be located at a bottom portion of the plurality of storage assemblies 121, or at a position flush with the plurality of storage assemblies 121. The avoidance position is located at the bottom portion of the plurality of storage assemblies 121, as long as the plurality of blocking assemblies 172 are at a position that does not affect the moving in or moving out of goods 200 of a next layer.

Optionally, the blocking connector 171 may ascend or descend, and when ascending or descending, the blocking connector 171 may drive the plurality of blocking assemblies 172 to ascend or descend synchronously, so that the plurality of blocking assemblies 172 are located at the loading or unloading end 1215 or move out of the loading or unloading end 1215. In this case, the avoidance position may be located at the bottom portion of the plurality of storage assemblies 121 or the position flush with the plurality of storage assemblies 121. Certainly, the blocking connector 171 may also move horizontally. When moving horizontally, the blocking connector 171 may drive the plurality of blocking assemblies 172 to move horizontally and synchronously, so that the plurality of blocking assemblies 172 are located at the loading or unloading end 1215 or move out of the loading or unloading end 1215. In this case, the avoidance position may be located outside the plurality of blocking assemblies 172. Certainly, the blocking connector 171 may also perform another form of movement, such as one or a combination of rotating motion, swinging motion, moving motion, and the like, as long as the plurality of blocking assemblies 172 can move into or move out of the loading or unloading end 1215. Exemplarily, in the present disclosure, only an example in which the blocking connector 171 ascends or descends and displaces is used for description. In addition, the avoidance position is located at the bottom portion of the plurality of storage assemblies 121 or the position flush with the plurality of storage assemblies 121.

In an embodiment, each of the plurality of blocking assemblies 172 includes a stopping member fixedly arranged on the blocking connector 171, and movement of the blocking connector 171 is capable of driving the stopping member to move into or move out of the loading or unloading end 1215. In this embodiment, the stopping member is fixedly arranged on the blocking connector 171, and the movement of the blocking connector 171 may directly drive the stopping member to move, so that the stopping member moves to the blocking position or the avoidance position. For example, when the blocking connector 171 drives the stopping member to ascend, the stopping member may move to the loading or unloading end 1215, so as to block the goods 200; and when the blocking connector 171 drives the stopping member to descend, the stopping member may move to the avoidance position, so as to no longer block the goods 200. Optionally, the stopping member may be a baffle plate, a stopper, a limit post, or another component capable of blocking.

Referring to FIG. 9 and FIG. 10, in an embodiment, each of the plurality of blocking assemblies 172 includes a swing member 1721 and a blocking member 1722, one end of the swing member 1721 is rotatably connected to the blocking connector 171, an other end of the swing member 1721 is mounted with the blocking member 1722, and a middle portion of the swing member 1721 is rotatably mounted at the loading or unloading end 1215 of the plurality of storage assemblies 121. When ascending or descending, the blocking connector 171 is capable of driving the swing member 1721 to swing, so that the swing member 1721 drives the blocking member 1722 to move into or move out of the loading or unloading end 1215.

That is, the blocking connector 171 implements the switching between the blocking position and the avoidance position through the indirect movement of the plurality of blocking assemblies 172, such as a swinging motion. Specifically, when the blocking connector 171 moves, one end of the swing member 1721 may be driven to move relative to the plurality of storage assemblies 121, and then an other end of the swing member 1721 may drive the blocking member 1722 to move, so that the blocking member 1722 moves to the avoidance position or the blocking position. A head portion of the swing member 1721 is rotatably connected to the blocking connector 171, the middle portion of the swing member 1721 is rotatably connected to the plurality of storage assemblies 121, and a tail portion of the swing member 1721 is connected to the blocking member 1722. The blocking member 1722 may move to the avoidance position or the blocking position.

Exemplarily, when the blocking connector 171 moves upward along the vertical direction, the blocking connector 171 may drive the blocking member 1722 to move to the blocking position through the swing member 1721, and when the blocking connector 171 moves downward along the vertical direction, the blocking connector 171 may drive the blocking member 1722 to move to the avoidance position through the swing member 1721. Optionally, the swing member 1721 is a swing rod, and the blocking member 1722 is a blocking rod.

It should be noted that, the essential spirit of the present disclosure lies in the movement of the blocking connector 171 and the plurality of blocking assemblies 172, so that the plurality of blocking assemblies 172 respectively move to avoidance positions or blocking positions corresponding to the plurality of storage assemblies 121. In the foregoing two embodiment, two forms of each of the plurality of blocking assemblies 172 are separately described; and in addition, there are various arrangements of the plurality of blocking assemblies 172, which cannot all be listed herein, and a linkage manner in the present disclosure is not limited to being implemented by the foregoing specific structures.

In an embodiment, the blocking mechanism 170 further includes a blocking driving member, and an output end of the blocking driving member is connected to the blocking connector 171, so as to drive the plurality of blocking assemblies 172 to move into or move out of the loading or unloading end 1215. The blocking driving member is a power source for the movement of the blocking mechanism 170, and implements the driving of the movement of a blocking moving member. In addition, the blocking driving member outputs linear motion, so that the blocking connector 171 can ascend or descend, and then the blocking connector 171 may drive the plurality of blocking assemblies 172 to move, so that the plurality of blocking assemblies 172 move to the avoidance position or the blocking position. Optionally, the blocking driving member includes, but is not limited to, an air cylinder, a hydraulic cylinder, a linear motor, or an electric push rod, and may also be another linear driving unit capable of outputting the linear motion. Exemplarily, the blocking driving member is a linear motor. Exemplarily, one end of the blocking driving member is arranged on the chassis 160. Certainly, in another implementation of the present disclosure, a rotation motor cooperates with a protrusion member to drive.

In an embodiment, a bottom portion of each of the plurality of storage assemblies 121 is provided with a movement space used for a loading or unloading mechanism 620 of a transport system to move into, so as to load goods into or take goods out of the plurality of storage assemblies 121. Because the plurality of storage assemblies 121 cannot move during loading or unloading, other components such as the carrying mechanism 150 or a matching structure of the loading or unloading apparatus 600 are required to move the goods 200 into the plurality of storage assemblies 121 or take the goods out of the plurality of storage assemblies 121 during loading or unloading. Therefore, a bottom portion of each of the plurality of storage assemblies 121 needs to include a space used for the carrying mechanism 150 and the auxiliary apparatus 300 to extend into, so as to facilitate the goods loading or unloading of the plurality of storage assemblies 121. When loading goods to the plurality of storage assemblies 121, the carrying mechanism 150 or the loading or unloading apparatus 600 may extend into the movement space to place the goods 200 on the plurality of storage assemblies 121, and then exit the movement space; and when unloading goods from the plurality of storage assemblies 121, the carrying mechanism 150 or the loading or unloading apparatus 600 may extend into the movement space to hold the goods 200 in the plurality of storage assemblies 121 and drive the goods 200 to move out of the plurality of storage assemblies 121.

In an embodiment, each of the plurality of storage assemblies 121 include a first side plate 1213 and a second side plate 1214 that are arranged on the vertical frame 110, and the first side plate 1213 and the second side plate 1214 are opposite to each other and surround the movement space. The first side plate 1213 and the second side plate 1214 are arranged at a same height of the vertical frame 110, and are arranged in parallel. In this way, the first side plate 1213 and the second side plate 1214 can be configured to respectively hold bottom portions of two sides of the goods 200, so that the goods 200 is flat, and deflection is avoided. A portion between the first side plate 1213 and the second side plate 1214 is a gap, that is, the foregoing movement space, which allows the carrying mechanism 150 or the loading or unloading apparatus 600 to extend into, so as to perform a loading or unloading operation.

Certainly, in another implementation of the present disclosure, each of the plurality of storage assemblies 121 includes a carrier body configured to carry the goods 200 and being provided with a movement space along an entrance or exit direction of the goods 200, and a size of the movement space along the entrance or exit direction of the goods 200 is less than a size of the carrier body along the entrance or exit direction of the goods 200. That is, the movement space in this case is an opening of the carrier body. The goods 200 are carried by the carrier body, and the movement space of the carrier body may also allow the carrying mechanism 150 or the loading or unloading apparatus 600 to extend into, so as to perform the loading or unloading operation.

Referring to FIG. 9 and FIG. 11, the second embodiment of the present disclosure further provides a transport system including a loading or unloading apparatus 600 and the transport robot 100 in the foregoing embodiment. The loading or unloading apparatus 600 is configured to convey the goods 200 to the transport robot 100 or unload the goods 200 on the transport robot 100. The loading or unloading apparatus 600 includes an upright frame 610 extending along a vertical direction and a plurality of loading or unloading mechanisms 620 arranged on the upright frame 610 at intervals along the vertical direction, and a manner in which the plurality of loading or unloading mechanisms 620 are arranged at intervals is the same as a manner in which a plurality of storage assemblies 121 are arranged at intervals. After the transport robot 100 is docked with the loading or unloading apparatus 600, the plurality of loading or unloading mechanisms 620 are capable of respectively conveying, at different heights, the goods 200 to the plurality of storage assemblies 121 or unloading the goods 200 in the plurality of storage assemblies 121.

The loading or unloading apparatus 600 can implement synchronous unloading or synchronous loading of the goods 200. The loading or unloading apparatus 600 is mounted at an unloading position or a loading position. In a case that the loading or unloading apparatus 600 is unloaded, the loading or unloading apparatus 600 is at the unloading position; and in a case that the loading or unloading apparatus 600 is loaded, the loading or unloading apparatus 600 is at the loading position. In the present disclosure, only an example in which the loading or unloading apparatus 600 is at the unloading position is used for description. The loading or unloading apparatus 600 is located at the unloading position. After the transport robot 100 completes loading at the loading position, the transport robot 100 moves to the unloading position. At this time, the transport robot 100 is docked with the loading or unloading apparatus 600, and the loading or unloading apparatus 600 may receive and pick the goods 200 in the plurality of storage assemblies 121 in the transport robot 100. Certainly, the reverse transport of the goods 200 may also be implemented at this position, that is, after the transport robot 100 is docked with the loading or unloading apparatus 600, the loading or unloading apparatus 600 may transfer the goods 200 to the plurality of storage assemblies 121.

Specifically, the upright frame 610 plays a supporting role, and is configured to support the plurality of loading or unloading mechanisms 620 configured to transport the goods 200. The loading or unloading apparatus 600 includes a same quantity of loading or unloading mechanisms 620 as the plurality of storage assemblies 121. The plurality of loading or unloading mechanisms 620 may separately convey, at different heights, the goods 200 to the transport robot 100, or unload the goods 200 on the transport robot 100, which greatly shortens the waiting time of the transport robot 100 during a loading or unloading process. In addition, heights at which the plurality of loading or unloading mechanisms 620 are located are consistent with heights at which corresponding storage assemblies 121 are located. After the transport robot 100 is docked with the loading or unloading apparatus 600, the plurality of storage assemblies 121 and the plurality of loading or unloading mechanisms 620 are at same heights, and the plurality of loading or unloading mechanisms 620 may convey the goods 200 to all storage assemblies 121 on the transport robot 100 at one time, or the plurality of loading or unloading mechanisms 620 may implement one-time removal of goods 200 from all storage assemblies 121 on the transport robot 100. Certainly, in specific working conditions, one or more loading or unloading mechanisms 620 in the loading or unloading apparatus 600 may simultaneously convey the goods 200 to the transport robot 100 or unload the goods 200 on the transport robot 100.

Each of the plurality of loading or unloading mechanisms 620 may act independently to convey the goods 200 to the transport robot 100 or unload the goods 200 on the transport robot 100. Referring to FIG. 10 to FIG. 13, in an embodiment, each of the plurality of loading or unloading mechanisms 620 includes a bracket 621, a loading or unloading assembly 622, and a loading or unloading driving member 623, a plurality of brackets 621 are arranged on the upright frame 610 at intervals along the vertical direction, the loading or unloading driving member 623 and the loading or unloading assembly 622 are respectively arranged on corresponding brackets 621, the loading or unloading assembly 622 is connected to the loading or unloading driving member 623, and the loading or unloading assembly 622 is configured to convey the goods 200 to the plurality of storage assemblies 121 or unload the goods 200 in the plurality of storage assemblies 121. The loading or unloading driving member 623 may allow a corresponding loading or unloading assembly 622 to individually convey the goods 200 to the transport robot 100 or unload the goods 200 on the transport robot 100.

Further, as shown in FIG. 10 to FIG. 13, the loading or unloading assembly 622 includes a chain 6221 and a protrusion 6222, the chain 6221 is rotatably arranged on the bracket 621 along a loading or unloading direction, and the protrusion 6222 is fixedly arranged on the chain 6221. The loading or unloading driving member 623 includes a driving motor in driving connection with the chain 6221; and the chain 6221 may carry the goods 200. When the driving motor drives the chain 6221 to rotate, the protrusion 6222 pushes a bottom portion of the goods 200, so as to push the goods 200 to the transport robot 100, or the protrusion 6222 pulls a bottom portion of the goods 200, so as to pull the goods 200 from the transport robot 100 to the chain 6221, or the protrusion 6222 blocks the bottom portion of the goods 200, and the goods 200 are transferred to the chain 6221 when the transport robot 100 moves away from the loading or unloading apparatus 600. Specifically, the chain 6221 is arranged on two sprockets arranged at intervals along the loading or unloading direction, and an output shaft of the driving motor is in driving connection with one of the two sprockets. When rotating, the driving motor drives the chain 6221 to operate, and the protrusion 6222 pushes the bottom portion of the goods 200, so as to push the goods 200 to the transport robot 100, or the protrusion 6222 pulls the bottom portion of the goods 200, so as to pull the goods 200 from the transport robot 100 to the chain 6221. Furthermore, each of the plurality of loading or unloading mechanisms 620 includes two sets of loading or unloading assemblies 622, the two sets of loading or unloading assemblies 622 are arranged on the bracket 621 in parallel and at intervals, and the driving motor is in driving connection with two chains 6221. The two sets of loading or unloading assemblies 622 can increase the stability during the loading or unloading of the goods 200. In an embodiment of the present disclosure, as shown in FIG. 13, each of the plurality of loading or unloading mechanisms 620 further includes a synchronization rod 624, the two chains 6221 are separately in driving connection with the synchronization rod 624, and the driving motor is in driving connection with one of the two chains 6221. Specifically, the synchronization rod 624 connects two sprockets arranged at intervals along a horizontal direction perpendicular to the loading or unloading direction, thereby ensuring that the two chains 6221 rotate synchronously. It can be understood that the chain 6221 in the foregoing embodiment only plays a role of driving and carrying goods. In another embodiment of the present disclosure, a belt, a timing belt, or the like, are used to replace the chain.

In another embodiment, as shown in FIG. 10, FIG. 11, FIG. 14, and FIG. 15, each of the plurality of loading or unloading mechanisms 620 includes a loading or unloading cross arm 625 and a push-pull assembly 626, one ends of a plurality of loading or unloading cross arms 625 are arranged on the upright frame 610 at intervals along the vertical direction, and the push-pull assembly 626 is rotatably arranged at other ends corresponding to the plurality of loading or unloading cross arms 625. When rotating, the push-pull assembly 626 includes a push-pull position and an avoidance position, and when rotating to the push-pull position, push-pull assembly 626 conveys the goods 200 to the transport robot 100 or pulls down the goods 200 on the transport robot 100. When the push-pull assembly 626 rotates to the avoidance position, the push-pull assembly 626 avoids the goods 200. It can be understood that when pushing or pulling the goods 200, the push-pull assembly 626 may push or pull a top portion, a middle portion, or a bottom portion of the goods 200. In an embodiment of the present disclosure, two loading or unloading assemblies 620 are arranged at intervals in a same horizontal direction of the upright frame 610, and two push-pull assemblies 626 in the same horizontal direction separately rotate to the push-pull position or the avoidance position. The two push-pull assemblies 626 in the same horizontal direction respectively drive two sides of the goods 200 along the loading or unloading direction. The two push-pull assemblies 626 push or pull the two sides of the goods 200 synchronously, which can effectively ensure the stability of a push-pull process of the goods 200. Further, the two push-pull assemblies 626 in the same horizontal direction push/pull two sides of the middle portion of the goods 200 synchronously along the loading or unloading direction. It can be understood that the two push-pull assemblies 626 in the same horizontal direction rotate to the push-pull position or the avoidance position synchronously, or rotate to the push-pull position or the avoidance position successively. In another embodiment of the present disclosure, only one loading or unloading mechanism 620 is arranged in a same height direction of the upright frame 610, and the one loading or unloading mechanism 620 pushes or pulls the top portion or the bottom portion of the goods 200 when pushing or pulling the goods 200.

In an implementation, as shown in FIG. 14 and FIG. 15, the push-pull assembly 626 includes a push-pull rod 6261 and a push-pull motor 6262, the push-pull motor 6262 is arranged at one ends of the plurality of loading or unloading cross arms 625 away from the upright frame 610, the push-pull rod 6261 is arranged on an output shaft of the push-pull motor 6262, and the push-pull motor 6262 is configured to drive the push-pull rod 6261 to rotate to the push-pull position or the avoidance position. Two push-pull rods 6261 may separately be rotated to the push-pull position under the driving of the push-pull motor 6262, so as to pull the goods 200 out of the transport robot 100 or push the goods 200 to the transport robot 100. It can be understood that the function of the push-pull motor 6262 is to drive the push-pull rod 6261 to rotate, and the push-pull rod 6261 is directly arranged on the output shaft of the push-pull motor 6262, or the push-pull rod 6261 is connected to the output shaft of the push-pull motor 6262 through a transmission mechanism, as long as the push-pull motor 6262 can drive the push-pull rod 6261 to rotate to the push-pull position or the avoidance position.

In an embodiment, all loading or unloading mechanisms 620 in the loading or unloading apparatus 600 act synchronously to convey, at different heights, the goods 200 to the transport robot 100 or unload the goods 200 on the transport robot 100, or some of the plurality of loading or unloading mechanisms 620 in the loading or unloading apparatus 600 act independently to convey, at specified heights, the goods 200 to the transport robot 100 or unload the goods 200 on the transport robot 100. As shown in FIG. 16 and FIG. 17, in an implementation, the loading or unloading apparatus 600 further includes an adjustment drive mechanism 630 configured to drive the upright frame 610 to approach or move away from the transport robot 100 along the loading or unloading direction, and when the adjustment drive mechanism 630 drives the upright frame 610 to approach or move away from the transport robot 100, the plurality of loading or unloading mechanisms 620 convey the goods 200 to the transport robot 100 or unload the goods 200 on the transport robot 100. The loading or unloading apparatus 600 provided in this embodiment can remove all the goods 200 or specified goods 200 on the transport robot 100 at one time, or simultaneously convey a plurality of goods 200 to the transport robot 100. In an implementation, the adjustment drive mechanism 630 adopts a driving structure in the form of a motor and a belt.

In an embodiment of the present disclosure, the loading or unloading apparatus 600 further includes a temporary storage shelving unit 640, the upright frame 610 is movably arranged on the temporary storage shelving unit 640 along a horizontal direction, and the adjustment drive mechanism 630 is configured to drive the upright frame 610 to move relative to the temporary storage shelving unit 640 along the horizontal direction. The temporary storage shelving unit 640 includes a shelving unit with a plurality of layers along the vertical direction, and the plurality of loading or unloading mechanisms 620 are configured to pull goods 200 at different heights on the transport robot 100 to corresponding layers of the shelving unit on the temporary storage shelving unit 640, or the plurality of loading or unloading mechanisms 620 are configured to push goods 200 on the plurality of layers of the shelving unit to the transport robot 100. The temporary storage shelving unit 640 can temporarily store the goods 200 unloaded from the transport robot 100 by the loading or unloading apparatus 600, or temporarily store the to-be-transported goods 200 which are transported to the transport robot 100. In an implementation, the temporary storage shelving unit 640 includes a temporary storage roller 641 with a plurality of layers arranged along the vertical direction, and each layer of the temporary storage roller 641 is capable of individually transporting the goods 200 along the loading or unloading direction. Optionally, each layer of the temporary storage roller 641 can simultaneously carry a plurality of goods 200.

In an embodiment, the loading or unloading apparatus 600 further includes a movable base arranged at a bottom portion of the upright frame 610. The loading or unloading apparatus 600 further includes a movable base arranged at the bottom portion of the upright frame 610. The movable base can drive the loading or unloading apparatus 600 to move, which greatly improves the adaptability of the loading or unloading apparatus 600 to actual working conditions.

In this way, the loading or unloading apparatus 600 can easily move to the loading position, the unloading position, or any other position, to work with the transport robot 100. Optionally, a structure of the base is exactly the same as that of the chassis 160 of the transport robot 100, and details are not described herein again.

Referring to FIG. 9 and FIG. 11, in an embodiment, the transport system further includes a conveying apparatus 500 and a lifting apparatus 400 that is arranged between the loading or unloading apparatus 600 and the conveying apparatus 500, and the lifting apparatus 400 is configured to ascend or descend along the vertical direction, so as to be docked with each of the plurality of loading or unloading mechanisms 620 and the conveying apparatus 500. The lifting apparatus 400 is capable of receiving and picking the goods 200 of the plurality of loading or unloading mechanisms 620 and transferring the goods to the conveying apparatus 500; or the lifting apparatus 400 is capable of receiving and picking goods 200 of the conveying apparatus 500 and transferring the goods to the plurality of loading or unloading mechanisms 620.

The lifting apparatus 400 is configured to receive and pick the goods 200 of the plurality of loading or unloading mechanisms 620 or transport the goods 200 to the plurality of loading or unloading mechanisms 620. Because the plurality of loading or unloading mechanisms 620 are arranged at intervals along the vertical direction, to facilitate the goods loading or unloading of the loading or unloading apparatus 600, the lifting apparatus 400 needs to move to a loading or unloading mechanism 620 at a corresponding position, so as to perform a corresponding operation. The conveying apparatus 500 is configured to convey the goods 200, may transport away goods 200 unloaded by the lifting apparatus 400, and may also transport to-be-loaded goods 200 to the lifting apparatus 400. Optionally, the conveying apparatus 500 may be of a structure that can implement the horizontal transport, such as a conveyor belt structure, an assembly line, a conveying roller structure, or a roller structure, or the like. Exemplarily, the conveying apparatus 500 is of an assembly line structure, and specifically, when unloading, the lifting apparatus 400 ascends to one side of a loading or unloading mechanism 620, after receiving the goods 200 of the loading or unloading mechanism 620, the lifting apparatus 400 descends, and transfers the goods 200 to the conveying apparatus 500, and the goods are transported away by the conveying apparatus 500. Subsequently, the lifting apparatus 400 further ascends to another loading or unloading mechanism 620, and this process is repeated until all the goods 200 on the plurality of loading or unloading mechanisms 620 are transported away. When loading, after the lifting apparatus 400 descends and receives and picks the goods 200 conveyed by the conveying apparatus 500, the lifting apparatus 400 ascends to one side of a loading or unloading mechanism 620 and transfers the goods 200 to the loading or unloading mechanism 620; and subsequently, the lifting apparatus 400 further descends to the conveying apparatus 500, and this process is repeated until the plurality of loading or unloading mechanisms 620 are loaded with the goods 200.

In an embodiment, the lifting apparatus 400 includes a lifting frame 410 along the vertical direction, a moving mechanism 420 arranged on the lifting frame 410, and a transfer mechanism 430 with at least one layer arranged on the moving mechanism 420, and the moving mechanism 420 may ascend or descend along the lifting frame 410 and drive the transfer mechanism 430 with at least one layer to move, so as to receive and pick or transfer the goods 200 to the plurality of loading or unloading mechanisms 620. The lifting frame 410 has a bearing function, and is configured to bear the moving mechanism 420 and the transfer mechanism 430 with at least one layer. Optionally, a bottom portion of the lifting frame 410 may also be provided with rotating wheels, so as to adapt to different applications. The transfer mechanism 430 with at least one layer is configured to carry the goods 200 and implement the transfer of the goods 200 between a high position such as a loading or unloading mechanism 620 and a low position such as the conveying apparatus 500. The moving mechanism 420 is arranged on the lifting frame 410 along the vertical direction, and may output movement in the vertical direction, so as to drive the transfer mechanism 430 with at least one layer to ascend or descend.

It can be understood that the moving mechanism 420 is configured to implement the ascending or descending motion of the transfer mechanism 430 with at least one layer along the vertical direction. A specific structure of the moving mechanism 420 may be a telescopic rod structure, a chain transmission structure, a driving transmission structure, or the like, and may also be another structure capable of enabling the carrying mechanism 150 to ascend or descend. Exemplarily, a specific structure of the moving mechanism 420 is the same as a structure of the lifting mechanism 140 of the transport robot 100, and details are not described herein again. Certainly, the specific structure of the moving mechanism 420 may also be different from the structure of the lifting mechanism 140 of the transport robot 100, as long as the moving mechanism 420 can implement the ascending or descending motion.

Exemplarily, there is a transfer mechanism 430 with one layer, and the transfer mechanism 430 with one layer receives and picks goods 200 from one loading or unloading mechanism 620 at one time, or transfers goods 200 to one loading or unloading mechanism 620 at one time. Certainly, in another implementation of the present disclosure, in a case that there is a transfer mechanism 430 with at least two layers, the transfer mechanism 430 with at least two layers may remove goods 200 of at least two loading or unloading mechanisms 620 at one time, or transfer goods 200 to at least two loading or unloading mechanisms 620, so as to improve the efficiency of turnover of the goods 200.

In an embodiment, the transfer mechanism 430 with at least one layer includes a transfer base 431 arranged on the moving mechanism 420 and a transfer portion 432 movably arranged on the transfer base 431, and the transfer portion 432 may drive the goods 200 to move, and may receive and pick or transfer the goods 200 to at least one of the plurality of loading or unloading mechanisms 620. The transfer base 431 plays a bearing role and is configured to carry the transfer portion 432, so as to mount the transfer portion 432 on the moving mechanism 420. When the moving mechanism 420 ascends or descends, the transfer base 431 may drive the transfer portion 432 to ascend or descend synchronously, so as to implement the loading or unloading of the goods 200.

Optionally, the transfer portion 432 is of a structure that can implement horizontal transport, such as a conveyor belt structure, an assembly line, a conveyor roller structure, a roller structure, or the like. Exemplarily, the transfer portion 432 is of a rolling shaft structure, and specifically includes a plurality of rolling shafts, and each of the plurality of rolling shafts includes a built-in rolling motor to drive the each of the plurality of rolling shafts to rotate, thereby implementing the transport of the goods 200. It should be noted that, there are various structures that can implement the horizontal transport of the goods 200, which cannot all be listed herein, and the transfer portion 432 in the present disclosure is not limited to being implemented by the foregoing specific structures.

The transfer portion 432 may receive and pick the goods 200 of one loading or unloading mechanism 620 at one time, as mentioned above. The transfer portion 432 may also receive and pick the goods 200 of a plurality of loading or unloading mechanisms 620 at one time, and the moving mechanism 420 may receive and pick the goods 200 of the plurality of loading or unloading mechanisms 620 layer by layer, and then convey the goods to the conveying apparatus 500 together for transport after receiving and picking the goods. Exemplarily, the moving mechanism 420 drives the transfer portion 432 to ascend to a top portion. After receiving and picking goods 200 of one loading or unloading mechanism 620, the transfer portion 432 descends one layer to receive and pick goods 200 of one loading or unloading mechanism 620. After the transfer portion 432 is full or the goods 200 of the plurality of loading or unloading mechanisms 620 are received, the moving mechanism 420 drives the transfer portion 432 to descend to a position of the conveying apparatus 500, and the transfer portion 432 transfers all the goods 200 thereon to the conveying apparatus 500. Certainly, the moving mechanism 420 may move layer by layer from bottom to top, a principle thereof is substantially the same as a principle from top to bottom, and details are not described herein again.

Certainly, the transfer portion 432 may also receive and pick a plurality of goods 200 transferred by the conveying apparatus 500 at one time, and then transfer the goods to the plurality of loading or unloading mechanisms 620 layer by layer, a principle thereof is substantially the same as the foregoing principle of goods unloading, and details are not described herein again.

In an embodiment, the transport system further includes a control center, components of the transport system perform a coordinated action under the control of the control center, and the control center of the transport system maintains a communication connection with an external server. The control center may identify information of the to-be-transported goods 200, and the control center may obtain information of a loading position and an unloading position corresponding to each piece of the to-be-transported goods 200. The control center coordinates and controls the components according to the obtained information, so as to efficiently complete the transport of the goods 200.

In the transport robot 100 and the transport system in this embodiment, when transporting goods, a blocking mechanism 170 moves to a blocking position and may be in abutment with goods 200 in a plurality of storage assemblies 121, so as to restrict the goods 200 from sliding out of the plurality of storage assemblies 121. Therefore, the goods 200 are prevented from sliding out of the plurality of storage assemblies 121 during a transport process of the transport robot 100, the safety of the goods 200 is ensured, a risk of sliding out is avoided, and the transport efficiency is improved. In addition, when the transport robot 100 loads or unloads goods, the blocking mechanism 170 moves to an avoidance position. At this time, goods 200 may be loaded into the plurality of storage assemblies 121, and the goods 200 in the plurality of storage assemblies 121 may also be removed, which does not hinder a loading or unloading operation of the transport robot 100, and is convenient for use.

Based on the transport robot 100 of the foregoing two embodiments, the present disclosure further provides a transport method of the transport robot 100, which is applicable to the transport robot 100 in the foregoing two embodiments. The transport method includes the following operations:

a controller receives a first loading or unloading instruction;

the controller controls the transport robot 100 to move to a first loading or unloading position according to the first loading or unloading instruction;

in a case that the controller confirms that the first loading or unloading position is a loading position, the controller controls a carrying mechanism 150 to transfer goods 200 to the plurality of storage assemblies 121 of a storage mechanism 120; and in a case that the controller confirms that the first loading or unloading position is an unloading position, the controller controls the transport robot 100 to unload goods at the unloading position.

Components of the transport robot 100 perform a coordinated action under the control of the controller, and the controller of the transport robot 100 maintains a communication connection with a control center of the transport system or an external server. The transport robot 100 may identify information of to-be-transported goods 200, and the transport robot 100 may obtain information of a loading position and an unloading position corresponding to each piece of the to-be-transported goods 200. The transport robot 100 coordinates and controls the components according to the obtained information, so as to efficiently complete the transport of the goods 200. Optionally, the controller includes, but is not limited to, a CPU, and may also be another component that can implement control.

When loading or unloading is required, the controller receives the first loading or unloading instruction, and then the controller controls, according to the first loading or unloading instruction, the transport robot 100 to move, so that the transport robot 100 moves at the first loading or unloading position. The first loading or unloading position includes a loading position and an unloading position, the loading position is defined as a position at which a shelving unit is located, and the unloading position is at which a plurality of transport mechanisms 320 or a plurality of loading or unloading mechanisms 620 are located. It can be understood that the loading position and the unloading position may be interchanged, that is, the transport robot 100 may load at the unloading position and unload at the loading position.

Generally, the transport robot 100 may be loaded by the carrying mechanism 150 at the loading position, and unloaded by the plurality of transport mechanisms 320 or the plurality of loading or unloading mechanisms 620 at the unloading position. After the controller controls, according to the first loading or unloading instruction, the transport robot 100 to move to the loading position, the controller may control the lifting mechanism 140 to drive the carrying mechanism 150 to ascend or descend, so that the carrying mechanism 150 can pick goods on the shelving unit. Then, the lifting mechanism 140 drives the carrying mechanism 150 to ascend or descend, so as to transfer the goods 200 in the carrying mechanism 150 to the plurality of storage assemblies 121, and implement the loading of the goods 200. This process is repeated until the plurality of storage assemblies 121 store the goods 200. After the controller moves from the loading position to the unloading position according to the first unloading instruction, the controller controls the plurality of transport mechanisms 320 or the plurality of loading or unloading mechanisms 620 to receive and pick the goods 200 in the plurality of storage assemblies 121, so as to implement the unloading of the goods 200.

Certainly, the loading or unloading process may also be performed in a reverse direction, that is, the transport robot 100 is loaded at the unloading position by the plurality of transport mechanisms 320 or the plurality of loading or unloading mechanisms 620 at the unloading position, and is unloaded by the carrying mechanism 150 at the loading position. After the controller controls, according to the first loading or unloading instruction, the transport robot 100 to move to the unloading position, the controller controls the plurality of transport mechanisms 320 or the plurality of loading or unloading mechanisms 620 to transfer the goods 200 thereon to corresponding storage assemblies 121, so as to implement the loading of the goods 200. After the transport robot 100 is filled with the goods 200, the controller moves from the unloading position to the loading position according to the first unloading instruction, the controller may control the lifting mechanism 140 to drive the carrying mechanism 150 to ascend or descend, so that the carrying mechanism 150 can pick goods in the plurality of storage assemblies 121, and then the lifting mechanism 140 drives the carrying mechanism 150 to ascend or descend, so as to remove the goods 200 in the carrying mechanism 150. This process is repeated until the goods 200 of the plurality of storage assemblies 121 are taken away, and the unloading of the goods 200 is implemented.

It is worth noting that after controlling the transport robot 100 to move to the first loading or unloading position, the controller needs to determine whether the first loading or unloading position is the loading position or the unloading position. For example, in a case that there are no goods 200 in the transport robot 100, after the transport robot 100 moves to the first loading or unloading position, in a case that the first loading or unloading position is the loading position, the carrying mechanism 150 loads the goods into the plurality of storage assemblies 121 in this case; and in a case that there are goods 200 in the transport robot 100, after the transport robot 100 moves to the first loading or unloading position, in a case that the first loading or unloading position is the unloading position, the plurality of transport mechanisms 320 or the plurality of loading or unloading mechanisms 620 unload the goods in this case.

In this embodiment described above, the transport method can implement the automatic transport of the goods 200, so that a problem of high cost and low efficiency in a current transport method is effectively resolved, the cost of the loading or unloading of the goods 200 is reduced, and the efficiency of the loading or unloading of the goods 200 is greatly improved. In addition, the carrying mechanism 150 moves to different heights under the driving of the lifting mechanism 140, so that the to-be-transported goods 200 can be delivered to a plurality of storage assemblies 121 at different heights in the storage mechanism 120, which has strong versatility and reduces the floor space.

In an embodiment, when the transport robot 100 is unloading, a plurality of storage assemblies 121 are capable of moving synchronously to perform a synchronous unloading action, and the first loading or unloading instruction includes a first unloading instruction; and that the controller controls the transport robot 100 to unload goods at the unloading position includes the following operation:

the controller receives the first unloading instruction, and the controller controls, according to the first unloading instruction, at least two of the plurality of storage assemblies 121 to simultaneously unload goods.

In a case that the transport robot 100 is the transport robot 100 in the first embodiment, the plurality of storage assemblies 121 in the transport robot 100 can implement synchronous unloading. Specifically, in a case that the first loading or unloading instruction received by the controller is the first unloading instruction, the controller controls, according to the first unloading instruction, the transport robot 100 to move from the loading position to the unloading position. The unloading position in this case corresponds to the auxiliary apparatus 300 of the transport system. In addition, the plurality of storage assemblies 121 are respectively docked with the plurality of transport mechanisms 320. When the controller controls at least two of the plurality of storage assemblies 121 to unload simultaneously, at least two of the plurality of transport mechanisms 320 corresponding to the at least two of the plurality of storage assemblies 121 may receive and pick the goods 200 removed from the at least two of the plurality of storage assemblies 121, so as to complete the unloading operation of the transport robot 100.

In an embodiment, when the transport robot 100 is loading, a plurality of storage assemblies 121 are capable of moving synchronously to perform a synchronous loading action, and the first loading or unloading instruction includes a first loading instruction; and that the controller controls the transport robot 100 to load goods at the loading position includes the following operation:

the controller receives the first loading instruction, and the controller controls, according to the first loading instruction, the auxiliary apparatus 300 to simultaneously load goods to at least two of the plurality of storage assemblies 121.

In a case that the transport robot 100 is the transport robot 100 in the first embodiment, the plurality of storage assemblies 121 in the transport robot 100 can implement synchronous loading. In a case that the transport robot 100 needs to load goods, a loading operation is performed by the auxiliary apparatus 300. Specifically, in a case that the first loading or unloading instruction received by the controller is the first loading instruction, the controller controls, according to the first loading instruction, the transport robot 100 to move from the unloading position to the loading position. In this case, the loading position is opposite to that in the foregoing embodiments, and the unloading position is opposite to that in the foregoing embodiments. It indicates that the loading position in this case corresponds to the auxiliary apparatus 300 of the transport system. In addition, the plurality of storage assemblies 121 are respectively docked with the plurality of transport mechanisms 320. The controller controls a plurality of transport mechanisms 320 of the auxiliary apparatus 300 to move goods into a plurality of storage assemblies 121 at corresponding positions, so that the synchronous loading of the plurality of storage assemblies 121 is implemented, and the loading operation of the transport robot 100 is completed.

In an embodiment, the transport robot 100 includes a linkage mechanism 130 electrically connected to the controller, and that the controller controls, according to the first unloading instruction, at least two of the plurality of storage assemblies 121 to simultaneously unload goods includes the following operation:

the controller controls, according to the first unloading instruction, the linkage mechanism 130 to drive the at least two of the plurality of storage assemblies 121 to simultaneously move.

The controller is electrically connected to the linkage mechanism 130, and is further electrically connected to a linkage driving member 132 of the linkage mechanism 130. The controller may control the movement of the linkage driving member 132, so that the linkage mechanism 130 can drive the at least two of the plurality of storage assemblies 121 to move synchronously to perform an unloading action. It can be understood that, after the controller receives the first unloading instruction, and after the plurality of storage assemblies 121 of the transport robot 100 are docked with the plurality of transport mechanisms 320 of the auxiliary apparatus 300, the controller controls, through the linkage driving member 132, the linkage mechanism 130 to drive the at least two of the plurality of storage assemblies 121 to be lifted up synchronously, so that the goods 200 in the plurality of storage assemblies 121 slide out of the plurality of storage assemblies 121 and move to corresponding transport mechanisms 320, and an unloading operation of the transport robot 100 is completed.

In an embodiment, the transport robot 100 further includes a blocking mechanism 170 electrically connected to the controller and capable of switching between a blocking position and an avoidance position, and the first loading or unloading instruction includes a first unloading instruction; and that the controller controls the transport robot 100 to unload goods at the unloading position further includes the following operation:

the controller receives the first unloading instruction, and the controller controls, according to the first unloading instruction, the blocking mechanism 170 to move to the avoidance position, so that the plurality of storage assemblies 121 are in an unloadable state.

In a case that the transport robot 100 is the transport robot 100 in the second embodiment, the transport robot 100 may block the goods 200 in the plurality of storage assemblies 121, to prevent the goods 200 from sliding out of the plurality of storage assemblies 121 during a process of transporting the goods 200 by the transport robot 100, so as to protect the goods 200 in the plurality of storage assemblies 121 and prevent the goods 200 from being damaged. Specifically, the transport robot 100 of the present disclosure blocks the goods 200 in the plurality of storage assemblies 121 by the blocking mechanism 170 at the blocking position during a transport process. When unloading is required, the blocking mechanism 170 moves from the blocking position to the avoidance position, and at this time, the loading or unloading apparatus 600 may perform an unloading operation on the plurality of storage assemblies 121.

Because a structure and a working principle of the blocking mechanism 170 have been described in detail in the second embodiment, details are not described herein again, and the description herein is only from a perspective of a control method. Specifically, after the controller receives the first unloading instruction, the controller controls, according to the first unloading instruction, the transport robot 100 to move to the unloading position. Subsequently, the controller controls the blocking mechanism 170 to move from the blocking position to the avoidance position, the blocking mechanism 170 no longer blocks the goods 200 in the plurality of storage assemblies 121, and the goods 200 in the plurality of storage assemblies 121 may be moved out and are in the unloadable state, which is specifically implemented by the plurality of loading or unloading mechanisms 620 of the loading or unloading apparatus 600. Specifically, the transport robot 100 is at the unloading position. At this time, the transport robot 100 approaches the loading or unloading apparatus 600, and the plurality of storage assemblies 121 are respectively docked with the plurality of loading or unloading mechanisms 620. Subsequently, the controller controls the blocking mechanism 170 to move from the blocking position to the avoidance position, the blocking mechanism 170 no longer blocks the goods 200 in the plurality of storage assemblies 121, and the plurality of loading or unloading mechanisms 620 may extend into the plurality of storage assemblies 121, and receive and pick and remove the goods 200 in the plurality of storage assemblies 121, so that the unloading operation of the transport robot 100 is performed.

In an embodiment, the transport robot 100 further includes a blocking mechanism 170 electrically connected to the controller and capable of switching between a blocking position and an avoidance position, and the first loading or unloading instruction includes a first loading instruction; and the transport method further includes the following operation:

the controller receives the first loading instruction, and the controller controls, according to the first loading instruction, the blocking mechanism 170 to move to the avoidance position, so that the plurality of storage assemblies 121 are in a loadable state.

In a case that the transport robot 100 is the transport robot 100 in the second embodiment, the transport robot 100 may block the goods 200 in the plurality of storage assemblies 121, to prevent the goods 200 from sliding out of the plurality of storage assemblies 121 during a process of transporting the goods 200 by the transport robot 100, so as to protect the goods 200 in the plurality of storage assemblies 121 and prevent the goods 200 from being damaged. Specifically, during a loading process of the transport robot 100 of the present disclosure, the blocking mechanism 170 moves from the blocking position to the avoidance position. At this time, the plurality of loading or unloading mechanisms 620 may perform a loading operation on the plurality of storage assemblies 121. Specifically, the to-be-transported goods 200 are placed on the plurality of loading or unloading mechanisms 620, and then the blocking mechanism 170 moves from the blocking position to the avoidance position, so that the plurality of loading or unloading mechanisms 620 can extend into the plurality of storage assemblies 121. Subsequently, the goods 200 are placed in the plurality of storage assemblies 121 by the plurality of loading or unloading mechanisms 620 and then removed from the plurality of storage assemblies 121.

In an embodiment, the blocking mechanism 170 includes a plurality of blocking assemblies 172 respectively corresponding to a plurality of storage assemblies 121, and that the controller controls, according to the first unloading instruction, the blocking mechanism 170 to move to the avoidance position includes the following operation:

the controller controls, according to the first unloading instruction, a blocking assembly 172 at a specified position to move to a corresponding avoidance position, so that a storage assembly 121 at the specified position is in the unloadable state; or the controller controls, according to the first unloading instruction, the plurality of blocking assemblies 172 to respectively move into corresponding avoidance positions, so that at least two of the plurality of storage assemblies 121 are in the unloadable state.

The controller is electrically connected to the blocking mechanism 170, and is further electrically connected to a blocking driving member of the blocking mechanism 170. The controller may control the movement of the blocking driving member, thereby causing at least one of the plurality of blocking assemblies 172 in the blocking mechanism 170 to move. It can be understood that in a case that the controller controls the movement of one or more specified blocking assemblies 172 in the blocking mechanism 170, blocking assemblies 172 at storage assemblies 121 corresponding to the one or more specified blocking assemblies 172 move from the blocking position to the avoidance position, so that the storage assemblies 121 corresponding to the one or more specified blocking assemblies 172 are in the unloadable state. In this case, the plurality of loading or unloading mechanisms 620 may receive and pick the goods 200 in the storage assemblies 121 corresponding to the one or more specified blocking assemblies 172. Certainly, the controller may also control all blocking assemblies 172 in the blocking mechanism 170 to move from the blocking position to the avoidance position, so that the plurality of storage assemblies 121 are in the unloadable state. In this case, the plurality of loading or unloading mechanisms 620 may receive and pick the goods 200 in corresponding storage assemblies 121.

In an embodiment, the plurality of storage assemblies 121 include a loading or unloading end 1215 configured to load or unload the goods 200, and the transport method further includes the following operation:

after the controller receives the first unloading instruction, the controller controls the carrying mechanism 150 to avoid the loading or unloading end 1215.

That is, after the controller receives the first unloading instruction, the controller controls the carrying mechanism 150 to move to a specified position, so that the carrying mechanism 150 moves away from the loading or unloading end, so as to avoid the loading or unloading of the goods 200 by the plurality of transport mechanisms 320 or the plurality of loading or unloading mechanisms 620. It can be understood that the loading or unloading end 1215 is an opening used for loading or unloading the goods 200, a specific form thereof has been mentioned above, and details are not described herein again. In a case that the plurality of transport mechanisms 320 or the plurality of loading or unloading mechanisms 620 are configured to unload goods, the carrying mechanism 150 needs to avoid the plurality of transport mechanisms 320 or the plurality of loading or unloading mechanisms 620, so as to avoid interference. Specifically, the controller may control the carrying mechanism 150 to move to a specified position. The specified position herein may be a topmost position of the transport robot 100 or a position higher than the plurality of transport mechanisms 320 and the plurality of loading or unloading mechanisms 620, or may be a position different from the loading or unloading end 1215.

Specifically, in a case that the loading or unloading end 1215 is arranged on a same side as the carrying mechanism 150, the controller may control the carrying mechanism 150 to ascend to a top end of the transport robot 100, and may also control the carrying mechanism 150 to ascend to a position higher than the plurality of transport mechanisms 320 or the plurality of loading or unloading mechanisms 620 or to move to an other side of the vertical frame 110, so that the loading or unloading end 1215 is arranged away from the carrying mechanism 150. In this way, the carrying mechanism 150 can move away from the loading or unloading end 1215, and the interference between the carrying mechanism 150 and the plurality of transport mechanisms 320 or the plurality of loading or unloading mechanisms 620 at the loading or unloading end 1215 can be avoided. In a case that the loading or unloading end 1215 and the carrying mechanism 150 are arranged on opposite sides, the carrying mechanism 150 does not block the loading or unloading end 1215, and in this case, the carrying mechanism 150 may move to a specified position or may not move, as long as the loading or unloading is not affected.

In an embodiment, the plurality of storage assemblies 121 include a loading or unloading end 1215 configured to load or unload the goods 200, and the transport method further includes the following operation:

after the controller receives the first loading instruction, the controller controls the carrying mechanism 150 to avoid the loading or unloading end 1215.

It can be understood that, whether loading or unloading from the loading or unloading end 1215, the controller needs to control the carrying mechanism 150 to avoid the loading or unloading end 1215, so as to avoid interference between the carrying mechanism 150 and the plurality of transport mechanisms 320 or the plurality of loading or unloading mechanisms 620 at the loading or unloading end 1215. An avoidance principle is the same as that in the foregoing embodiments, and details are not described herein again.

Embodiment 6

As shown in FIG. 18 and FIG. 19, and FIG. 23 and FIG. 24, an embodiment of the present disclosure provides a loading or unloading apparatus 10a configured to convey goods 90a to a transport robot 60a or unload goods 90a on the transport robot 60a and including an upright frame 100a and a plurality of goods loading or unloading assemblies 200a. The upright frame 100a extends along a vertical direction. The plurality of goods loading or unloading assemblies 200a are arranged on the upright frame 100a at intervals along the vertical direction and capable of separately conveying, at different heights, the goods 90a to the transport robot 60a or unloading the goods 90a on the transport robot 60a. In the loading or unloading apparatus 10a, the plurality of goods loading or unloading assemblies 200a may separately convey, at different heights, the goods 90a to the transport robot 60a, or unload the goods 90a on the transport robot 60a, which greatly shortens the waiting time of the transport robot 60a during a loading or unloading process, thereby significantly improving the loading or unloading efficiency of the transport robot 60a, and finally improving the overall transport efficiency of a loading or unloading system. It can be understood that the goods 90a in the present disclosure may also be an empty box or a box carrying the goods 90a.

It can be understood that heights of the plurality of goods loading or unloading assemblies 200a respectively correspond to heights of a plurality of storage trays 640a on the transport robot 60a, so that the plurality of goods loading or unloading assemblies 200a can convey the goods 90a to all storage trays 640a on the transport robot 60a at one time, or the plurality of goods loading or unloading assemblies 200a can remove the goods 90a on all storage trays 640a on the transport robot 60a at one time. Certainly, in specific working conditions, one or more goods loading or unloading assemblies 200a in the loading or unloading apparatus 10a may simultaneously convey the goods 90a to the transport robot 60a or unload the goods 90a on the transport robot 60a.

Figure 18:
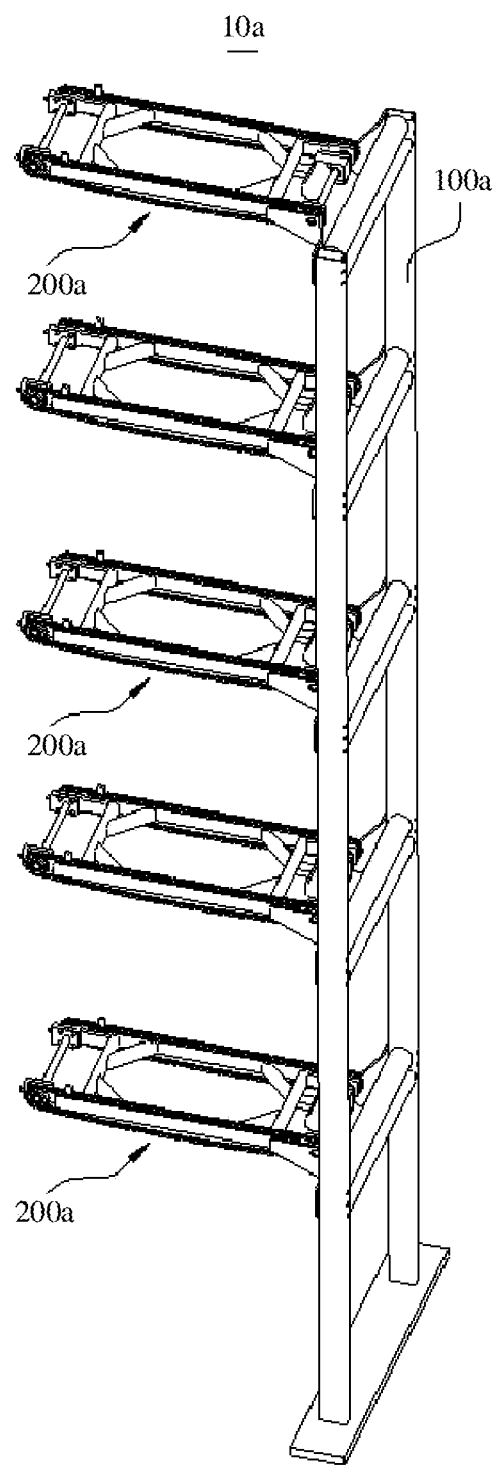
FIG. 18 is a schematic structural diagram of a loading or unloading apparatus according to an embodiment of the present disclosure.
Figure 19:
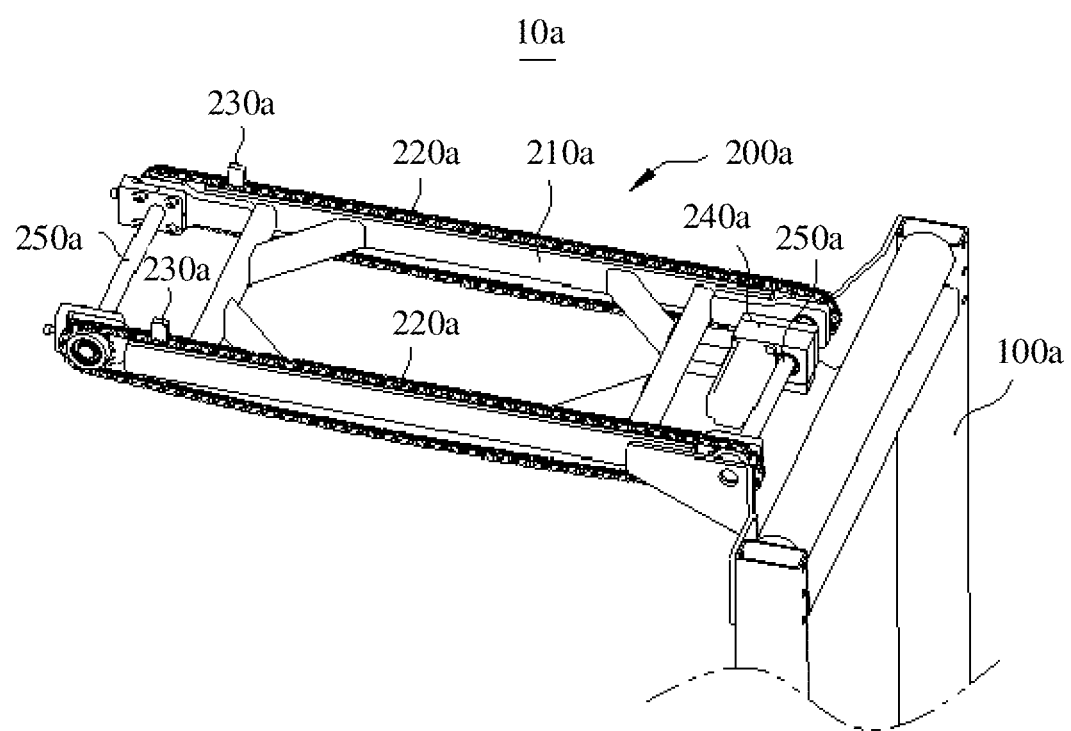
FIG. 19 is an enlarged schematic view of a partial structure in FIG. 18.

As shown in FIG. 18 and FIG. 19, in an embodiment of the present disclosure, each of the plurality of goods loading or unloading assemblies 200a may act independently to convey the goods 90a to the transport robot 60a or unload the goods 90a on the transport robot 60a. In an implementation, each of the plurality of goods loading or unloading assemblies 200a includes a bracket 210a, a loading or unloading structure, and a first driving structure, a plurality of brackets 210a are arranged on the upright frame 100a at intervals along the vertical direction, the first driving structure and the loading or unloading structure are respectively arranged on corresponding brackets 210a, and the loading or unloading structure is in driving connection with the first driving structure and is configured to convey the goods 90a to the transport robot 60a or unload the goods 90a on the transport robot 60a. An independent first driving structure in each of the plurality of goods loading or unloading assemblies 200a can allow the each of the plurality of goods loading or unloading assemblies 200a to individually convey the goods 90a to the transport robot 60a or unload the goods 90a on the transport robot 60a.

Further, as shown in FIG. 19, the loading or unloading structure includes a chain 220a and a protrusion 230a, the chain 220a is rotatably arranged on the bracket 210a along a loading or unloading direction, and the protrusion 230a is fixedly arranged on the chain 220a. The first driving structure includes a driving motor 240a in driving connection with the chain 220a; and the chain 220a is capable of carrying the goods 90a, and when the driving motor 240a drives the chain 220a to rotate, the protrusion 230a pushes a bottom portion of goods 90a, so that the goods 90a are pushed to the transport robot 60a, or the protrusion 230a pulls a bottom portion of goods 90a, so that the goods 90a are pulled from the transport robot 60a to the chain 220a. Specifically, the chain 220a is arranged on two sprockets arranged at intervals along the loading or unloading direction, and an output shaft of the driving motor 240a is in driving connection with one of the two sprockets. When rotating, the driving motor 240a drives the chain 220a to operate, and the protrusion 230a pushes the bottom portion of the goods 90a, so as to push the goods 90a to the transport robot 60a, or the protrusion 230a pulls the bottom portion of the goods 90a, so as to pull the goods 90a from the transport robot 60a to the chain 220a.

Furthermore, each of the plurality of goods loading or unloading assemblies 200a includes two sets of loading or unloading structures, the two sets of loading or unloading structures are arranged on the bracket 210a in parallel and at intervals, and the driving motor 240a is in driving connection with two chains 220a. The two sets of loading or unloading structures can increase the stability during the loading or unloading of the goods 90a. In an embodiment of the present disclosure, as shown in FIG. 19, each of the plurality of goods loading or unloading assemblies 200a further includes a synchronization rod 250a, the two chains 220a are separately in driving connection with the synchronization rod 250a, and the driving motor 240a is in driving connection with one of the two chains 220a. Specifically, the synchronization rod 250a connects two sprockets arranged at intervals along a horizontal direction perpendicular to the loading or unloading direction, thereby ensuring that the two chains 220a rotate synchronously. It can be understood that the chain 220a in the foregoing embodiment only plays a role of driving and carrying goods. In another embodiment of the present disclosure, a belt, a timing belt, or the like, are used to replace the chain.

Figure 22:
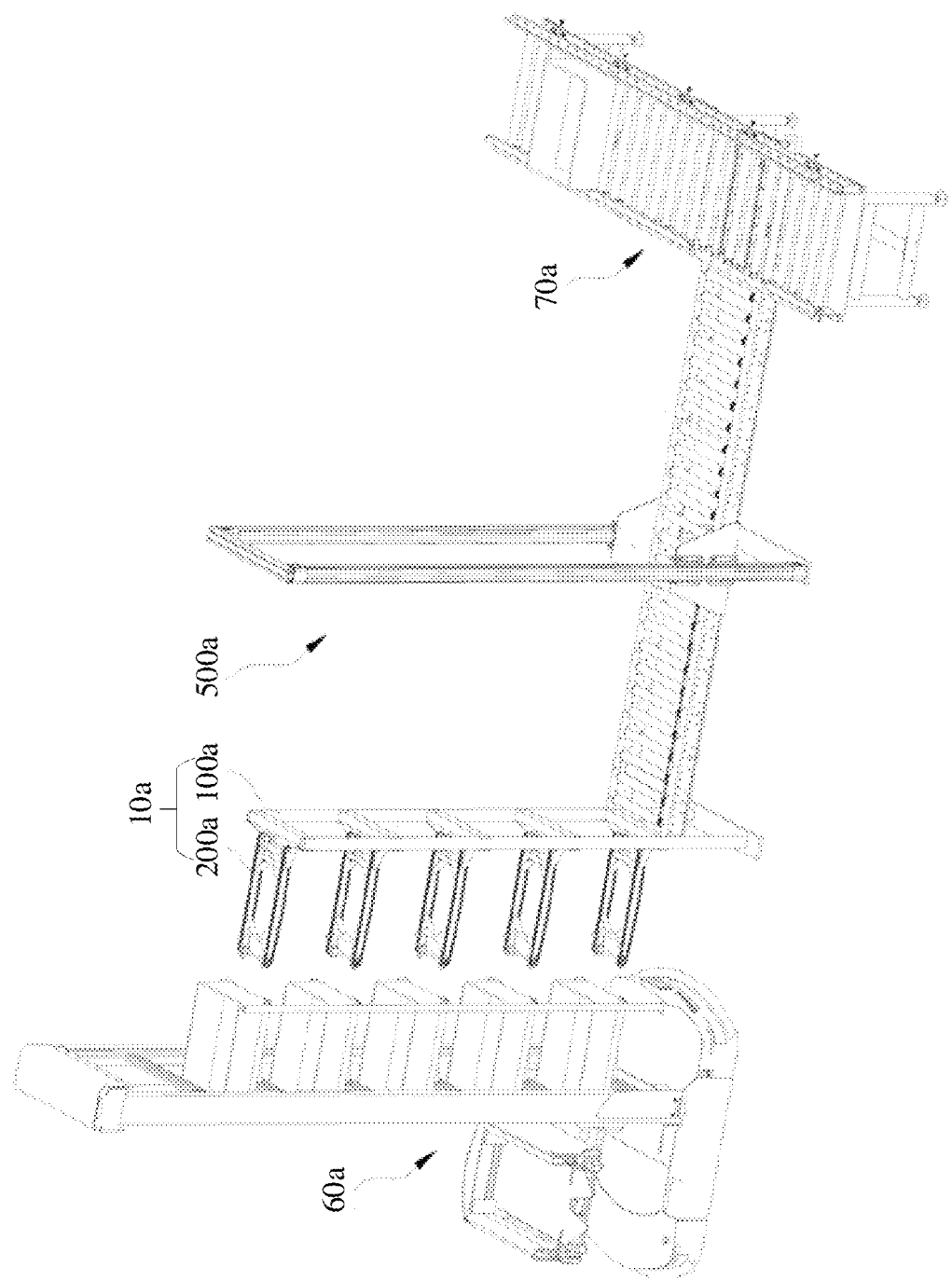
FIG. 22 is a schematic structural diagram of a loading or unloading system according to an embodiment of the present disclosure.

In an embodiment of the present disclosure, as shown in FIG. 22a, the loading or unloading apparatus 10a further includes a lifting assembly, arranged at one ends of the plurality of goods loading or unloading assemblies 200a away from the transport robot 60a, where the lifting assembly is configured to successively receive the goods 90a unloaded by the plurality of goods loading or unloading assemblies 200a, or successively convey the goods 90a to the plurality of goods loading or unloading assemblies 200a. In an implementation, as shown in FIG. 22, the lifting assembly includes a lifting roller 500a extending along the loading or unloading direction and capable of simultaneously carrying a plurality of goods 90a. The lifting assembly can receive goods 90a on a temporary storage shelving unit 400a or the goods 90a on the plurality of goods loading or unloading assemblies 200a, and then transfer the goods 90a to a corresponding transport line, thereby implementing the automation of a transport process of the goods 90a. Alternatively, the lifting assembly can convey the goods 90a to a temporary storage shelving unit 400a or the plurality of goods loading or unloading assemblies 200a.

Figure 23:
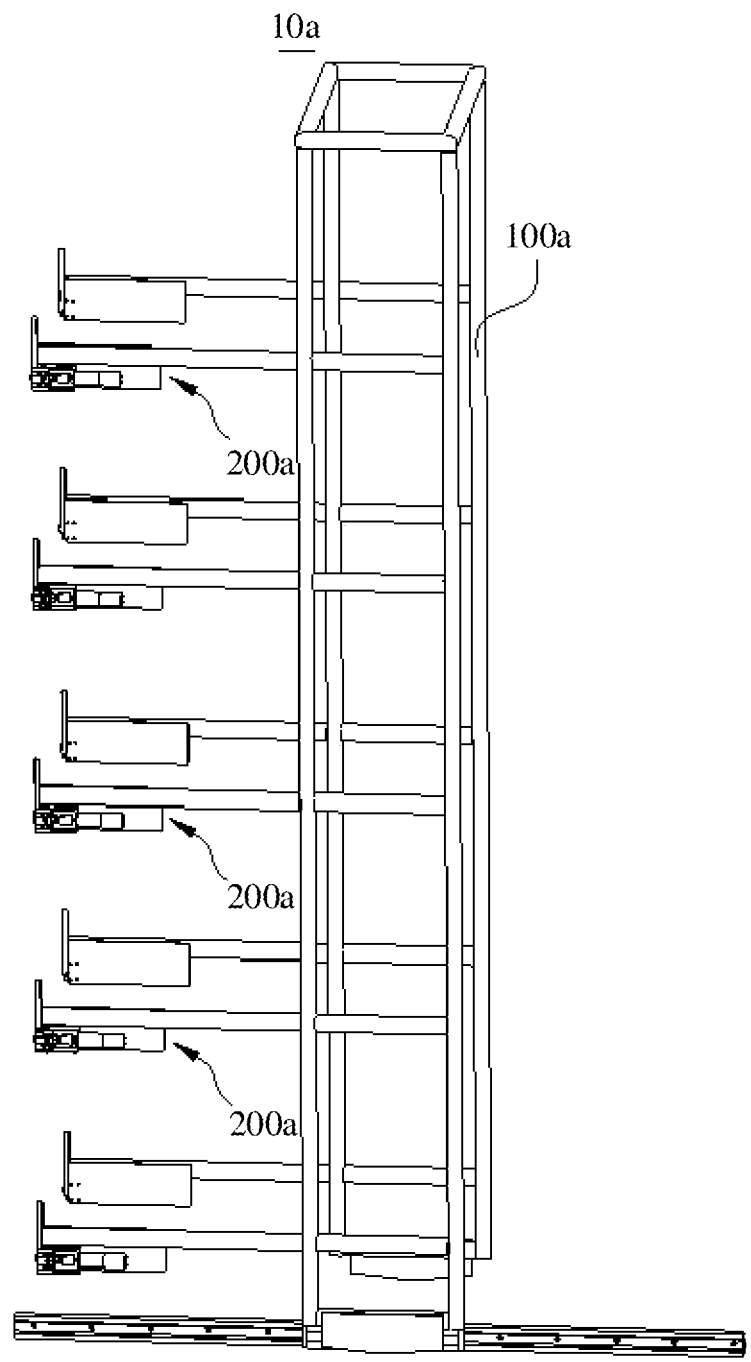
FIG. 23 is a schematic structural diagram of a loading or unloading apparatus according to another embodiment of the present disclosure.
Figure 24:
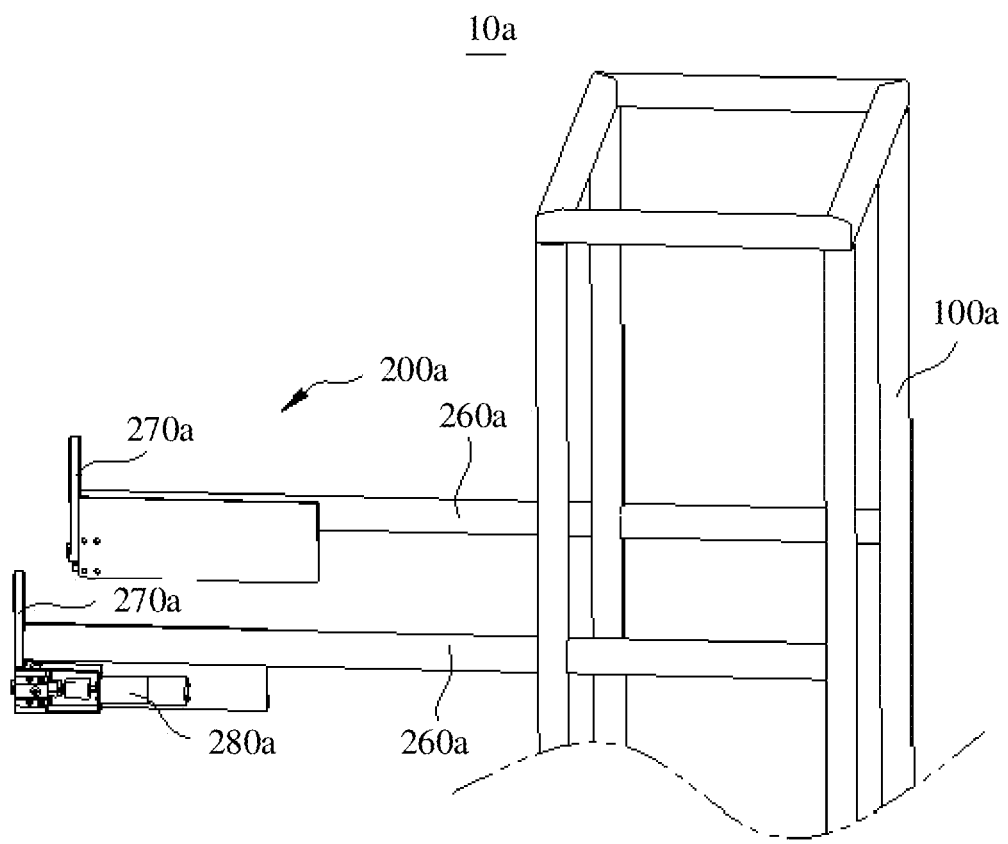
FIG. 24 is an enlarged schematic view of a partial structure in FIG. 23.
Figure 25:
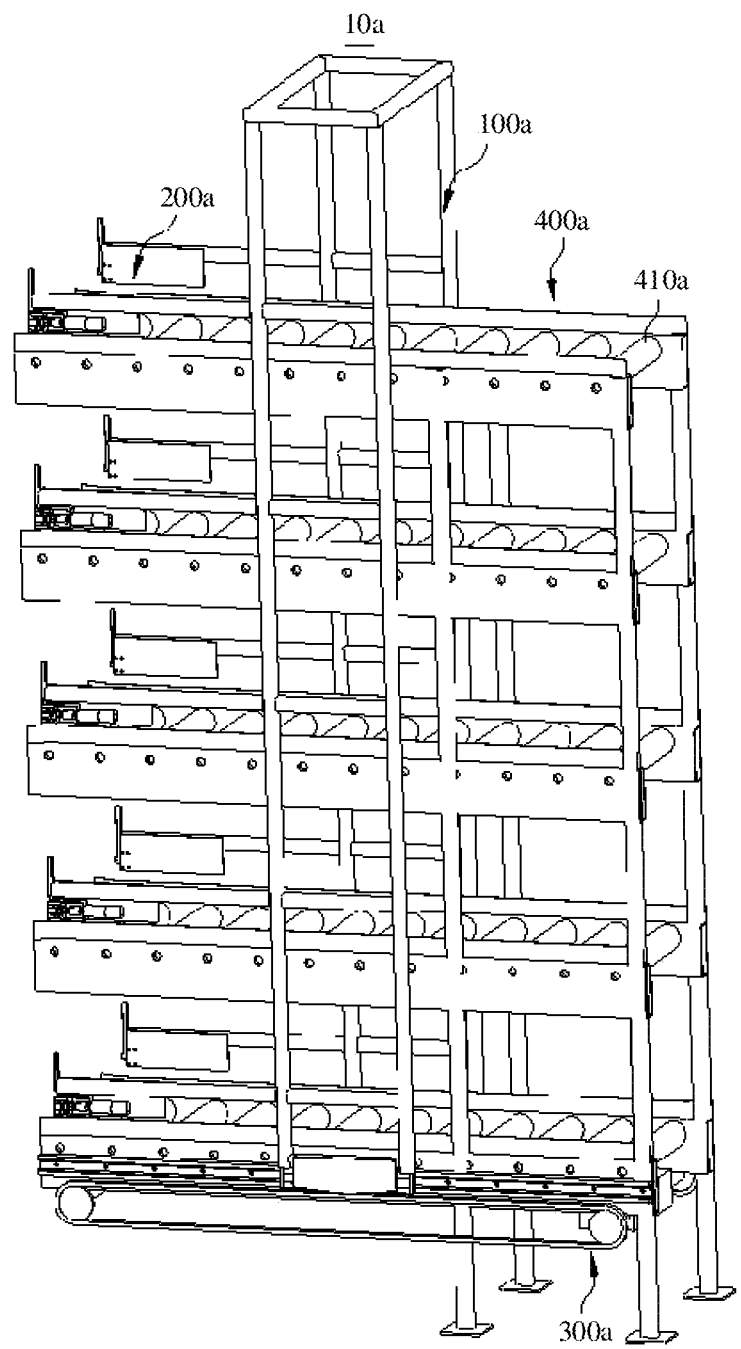
FIG. 25 is a schematic structural diagram of a loading or unloading apparatus according to still another embodiment of the present disclosure.

In an embodiment of the present disclosure, all goods loading or unloading assemblies 200a in the loading or unloading apparatus 10a act synchronously to convey, at different heights, the goods 90a to the transport robot 60a or unload the goods 90a on the transport robot 60a. As shown in FIG. 23 to FIG. 25, in an implementation, the loading or unloading apparatus 10a further includes a second driving structure 300a configured to drive the upright frame 100a to approach or move away from the transport robot 60a along the loading or unloading direction, and when the second driving structure 300a drives the upright frame 100a to approach or move away from the transport robot 60a, the plurality of goods loading or unloading assemblies 200a convey the goods 90a to the transport robot 60a or unload the goods 90a on the transport robot 60a. The loading or unloading apparatus 10a provided in this embodiment can remove all the goods 90a on the transport robot 60a at one time, or simultaneously convey a plurality of goods 90a to the transport robot 60a. In an implementation, the second driving structure 300a adopts a driving structure in the form of a motor and a belt.

In an embodiment of the present disclosure, as shown in FIG. 23 and FIG. 24, each of the plurality of goods loading or unloading assemblies 200a includes a loading or unloading cross arm 260a and a push-pull structure, one ends of a plurality of loading or unloading cross arms 260a are arranged on the upright frame 100a at intervals along the vertical direction, and the push-pull structure is rotatably arranged at other ends corresponding to the plurality of loading or unloading cross arms 260a. When rotating, the push-pull structure includes a push-pull position and an avoidance position, and when rotating to the push-pull position, the push-pull structure conveys the goods 90a to the transport robot 60a or pulls down the goods 90a on the transport robot 60a. When the push-pull structure rotates to the avoidance position, the push-pull structure avoids the goods 90a. It can be understood that when pushing or pulling the goods 90a, the push-pull structure may push or pull a top portion, a middle portion, or a bottom portion of the goods 90a. In an embodiment of the present disclosure, two of the plurality of goods loading or unloading assemblies 200a are arranged at intervals in a same horizontal direction of the upright frame 100a, and two push-pull structures in the same horizontal direction synchronously rotate to the push-pull position or the avoidance position. The two push-pull structures in the same horizontal direction synchronously drive two sides of the goods 90a along the loading or unloading direction. The two push-pull structures push or pull the two sides of the goods 90a synchronously, which can effectively ensure the stability of a push-pull process of the goods 90a. Further, the two push-pull structures in the same horizontal direction push/pull two sides of the middle portion of the goods 90a synchronously along the loading or unloading direction. In another embodiment of the present disclosure, only one of the plurality of goods loading or unloading assemblies 200a is arranged in a same height direction of the upright frame 100a, and the one of the plurality of goods loading or unloading assemblies 200a pushes or pulls the top portion or the bottom portion of the goods 90a when pushing or pulling the goods 90a.

In an implementation, as shown in FIG. 24 and FIG. 25, the push-pull structure includes a push-pull rod 270a and a push-pull motor 280a, the push-pull motor 280a is arranged at one ends of the plurality of loading or unloading cross arms 260a away from the upright frame 100a, the push-pull rod 270a is arranged on an output shaft of the push-pull motor 280a, and the push-pull motor 280a is configured to drive the push-pull rod 270a to rotate to the push-pull position or the avoidance position. Two push-pull rods 270a may separately be rotated to the push-pull position under the driving of the push-pull motor 280a, so as to pull the goods 90a out of the transport robot 60a or push the goods 90a to the transport robot 60a. It can be understood that the function of the push-pull motor 280a is to drive the push-pull rod 270a to rotate, and the push-pull rod 270a is directly arranged on the output shaft of the push-pull motor 280a, or the push-pull rod 270a is connected to the output shaft of the push-pull motor 280a through a transmission mechanism, as long as the push-pull motor 280a can drive the push-pull rod 270a to rotate to the push-pull position or the avoidance position.

In an embodiment of the present disclosure, the loading or unloading apparatus 10a further includes a temporary storage shelving unit 400a, the upright frame 100a is movably arranged on the temporary storage shelving unit 400a along a horizontal direction, and the second driving structure 300a is configured to drive the upright frame 100a to move relative to the temporary storage shelving unit 400a along the horizontal direction. The temporary storage shelving unit 400a includes a shelving unit with a plurality of layers along the vertical direction, and the plurality of goods loading or unloading assemblies 200a are configured to pull goods 90a at different heights on the transport robot 60a to corresponding layers of the shelving unit on the temporary storage shelving unit 400a, or the plurality of goods loading or unloading assemblies 200a are configured to push goods 90a on the plurality of layers of the shelving unit to the transport robot 60a. The temporary storage shelving unit 400a can temporarily store the goods 90a unloaded from the transport robot 60a by the loading or unloading apparatus 10a, or temporarily store the to-be-transported goods 90a which are transported to the transport robot 60a. In an implementation, the temporary storage shelving unit 400a includes a temporary storage roller 410a with a plurality of layers arranged along the vertical direction, and each layer of the temporary storage roller 410a is capable of individually transporting the goods 90a along the loading or unloading direction. Optionally, each layer of the temporary storage roller 410a can simultaneously carry a plurality of goods 90a.

Figure 26:
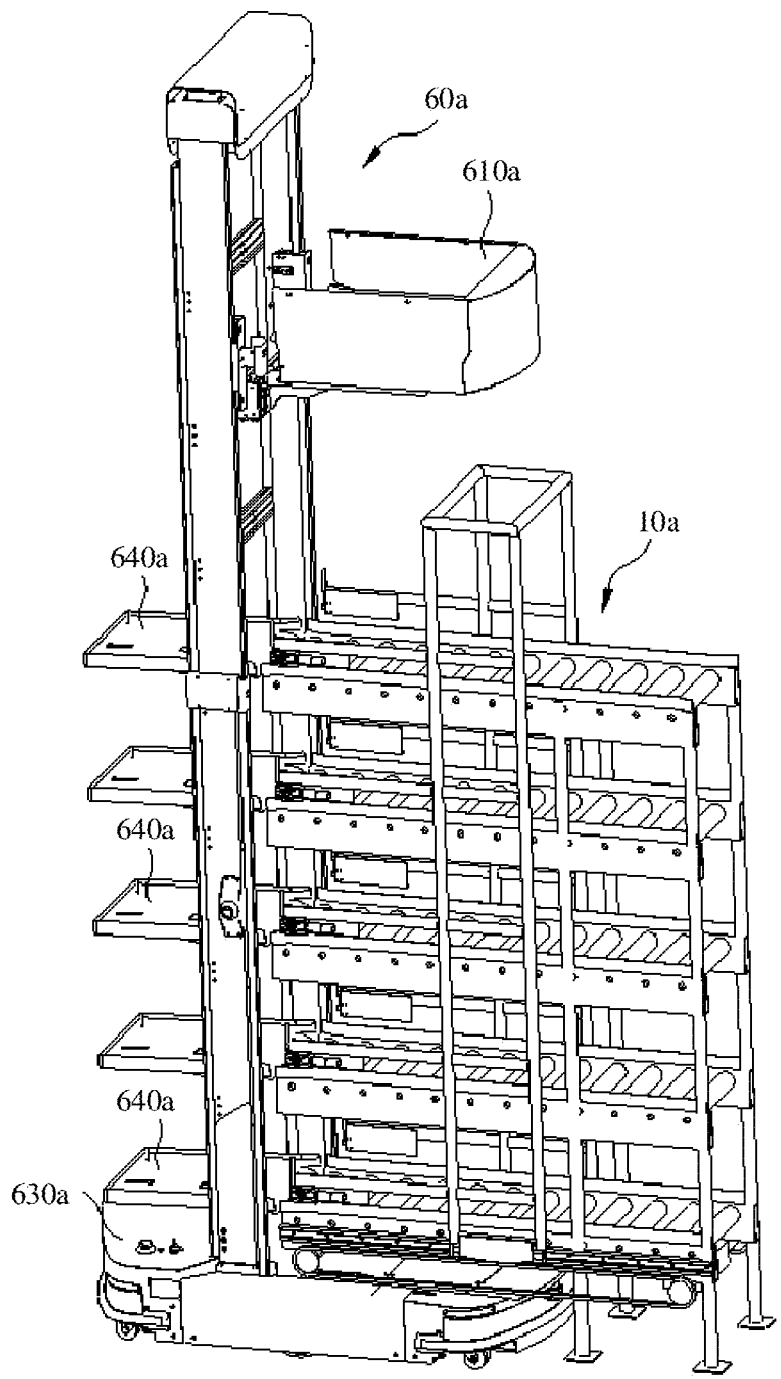
FIG. 26 is a schematic structural diagram of a loading or unloading system according to another embodiment of the present disclosure.

In the present disclosure, corresponding to the loading or unloading apparatus 10a in the foregoing embodiments, as shown in FIG. 22 and FIG. 26, an embodiment of the present disclosure further provides a loading or unloading system, including a transport robot 60a and the loading or unloading apparatus 10a according to any one of the foregoing solutions. The loading or unloading apparatus 10a is configured to convey the goods 90a to the transport robot 60a or unload the goods 90a on the transport robot 60a. In the loading or unloading apparatus 10a and the loading or unloading system, a plurality of goods loading or unloading assemblies 200a may separately convey, at different heights, goods 90a to a transport robot 60a, or unload goods 90a on the transport robot 60a, which greatly shortens the waiting time of the transport robot 60a during a loading or unloading process, thereby significantly improving the loading or unloading efficiency of the transport robot 60a, and finally improving the overall transport efficiency of the loading or unloading system.

Figure 20:
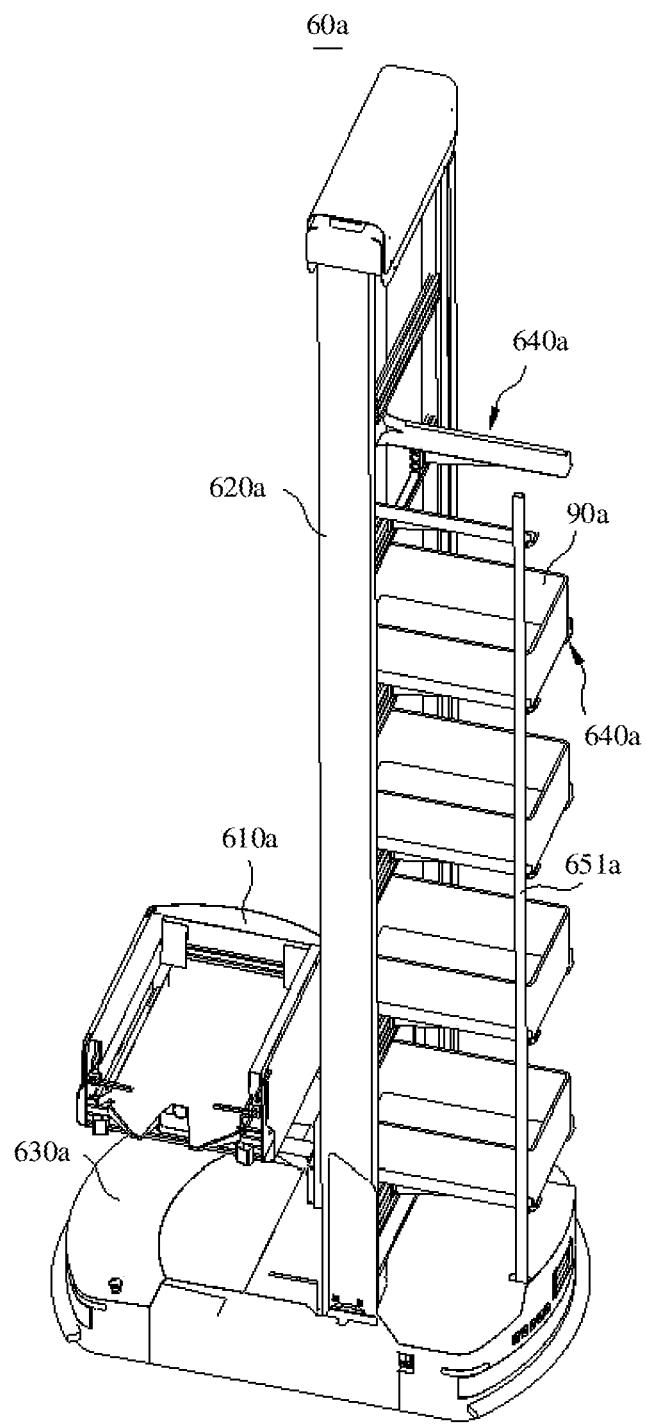
FIG. 20 is a schematic structural diagram of a transport robot corresponding to the loading or unloading apparatus in FIG. 18 according to an embodiment of the present disclosure.
Figure 21:
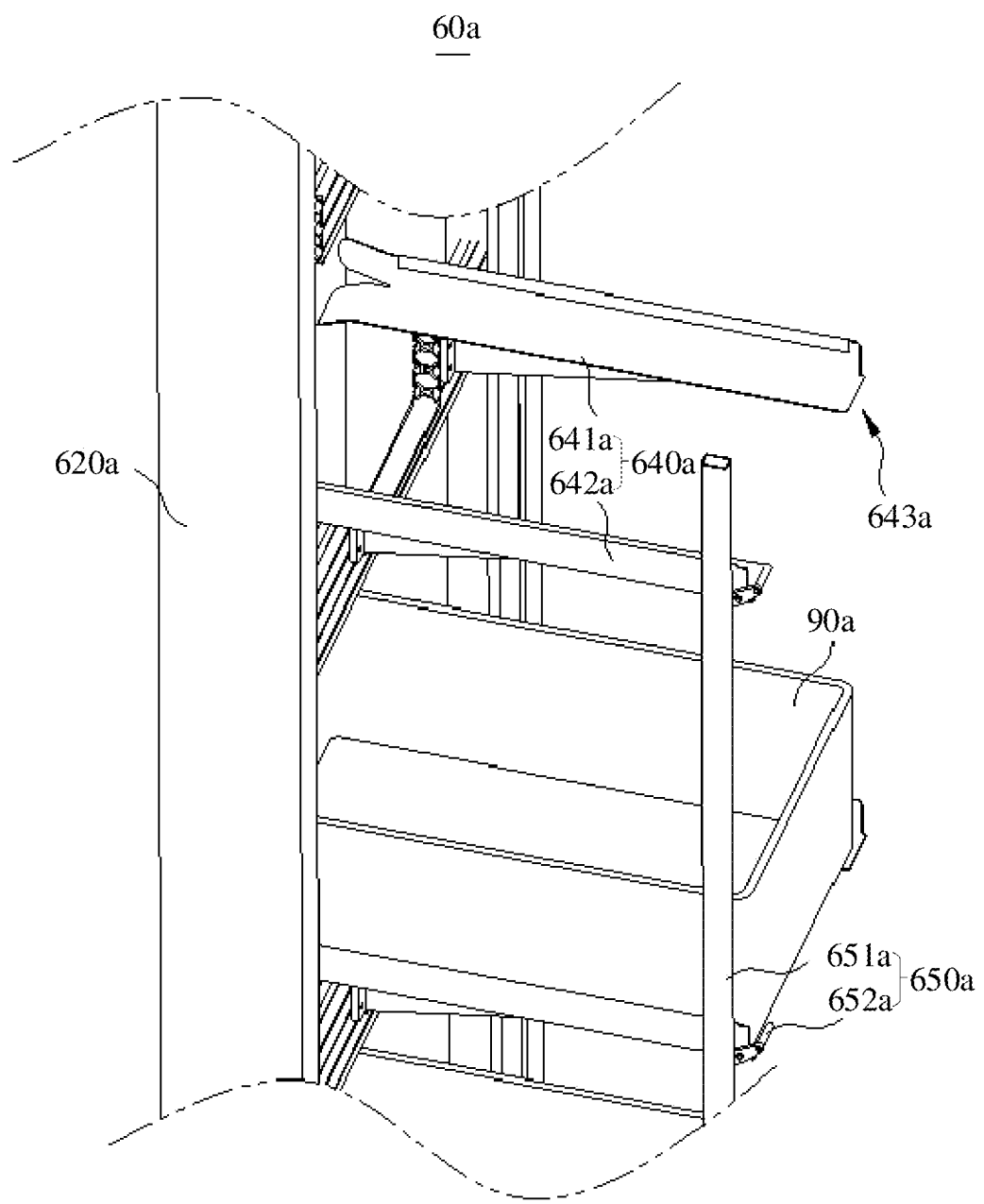
FIG. 21 is an enlarged schematic view of a partial structure in FIG. 20.

In an embodiment of the present disclosure, the transport robot 60a receives the goods 90a transported by the loading or unloading apparatus 10a in the foregoing embodiments, or the transport robot 60a allows the loading or unloading apparatus 10a in the foregoing embodiments to remove the goods 90a carried by the transport robot. In an implementation, as shown in FIG. 20 and FIG. 21 and FIG. 26, the transport robot 60a includes a carrying component 610a, a vertical frame 620a, a movable chassis 630a, and a storage tray 640a with a plurality of layers, the vertical frame 620a is arranged on the movable chassis 630a, the storage tray 640a with a plurality of layers are separately arranged on one side of the vertical frame 620a at intervals along a vertical direction, the carrying component 610a is arranged on an other side of the vertical frame 620a along the vertical direction, and the carrying component 610a is capable of conveying goods 90a to the storage tray 640a with a plurality of layers or taking out goods 90a on the storage tray 640a with a plurality of layers. It can be understood that the transport robot 60a provided in this embodiment allows a plurality of goods loading or unloading assemblies 200a in a loading or unloading apparatus 10a to synchronously act to load or unload goods 90a, and also allows the plurality of goods loading or unloading assemblies 200a in the loading or unloading apparatus 10a to act separately to load or unload the goods 90a.

Corresponding to the plurality of goods loading or unloading assemblies 200a in the form of a push-pull structure, in an embodiment of the present disclosure, as shown in FIG. 26, the plurality of goods loading or unloading assemblies 200a directly complete the loading or unloading of the goods 90a through a loading or unloading end 643a of the storage tray 640a on a conventional transport robot 60a. In this case, the carrying component 610a needs to avoid the loading or unloading apparatus 10a. In an implementation, the carrying component 610a ascends to a highest position, so as to avoid the loading or unloading apparatus 10a. Optionally, when the transport robot 60a moves to the loading or unloading apparatus 10a and a blocking rod 652a blocks the goods 90a, the plurality of goods loading or unloading assemblies 200a move away from the transport robot 60a or the transport robot 60a moves away from the plurality of goods loading or unloading assemblies 200a, thereby completing the loading or unloading of the goods 90a.

Corresponding to the plurality of goods loading or unloading assemblies 200a with the structure of a chain 220a and a protrusion 230a, in an embodiment of the present disclosure, as shown in FIG. 20 to FIG. 22, the storage tray 640a includes a first side plate 641a and a second side plate 642a that are arranged at a same height of the vertical frame 620a, arranged on the vertical frame 620a in parallel and at intervals, and respectively configured to hold bottom portions of two sides of the goods 90a; and the storage tray 640a allows the loading or unloading apparatus 10a to pull the goods 90a from a bottom portion of the goods 90a or allows the loading or unloading apparatus 10a to push the goods 90a onto the storage tray 640a. A middle portion of the storage tray 640a of a split structure is a gap, which allows a chain 220a of an assembly protrusion 230a to extend into a bottom portion of the goods 90a through the middle portion of the storage tray 640a, and when the chain 220a rotates, the protrusion 230a pushes the bottom portion of the goods 90a, so that the goods 90a are pushed to the transport robot 60a, or the protrusion 230a pulls a bottom portion of the goods 90a, so that the goods 90a are pulled from the transport robot 60a to the chain 220a. Optionally, when the transport robot 60a moves to the loading or unloading apparatus 10a and the protrusion 230a blocks the goods 90a, the chain 220a continues to rotate to complete an action of loading or unloading the goods 90a, or the transport robot 60a moves away from the loading or unloading apparatus 10a to complete an unloading process.

Optionally, the storage tray 640a includes a loading or unloading end 643a away from or close to the carrying component 610a, and the loading or unloading apparatus 10a completes the loading or unloading of the goods 90a through the loading or unloading end 643a of the storage tray 640a. In an embodiment of the present disclosure, one end of the storage tray 640a close to the carrying component 610a includes a loading or unloading end 643a, and when the loading or unloading apparatus 10a loads or unloads the goods 90a with the transport robot 60a, the carrying component 610a ascends to a highest position to avoid the loading or unloading apparatus 10a. In another embodiment of the present disclosure, as shown in FIG. 20 and FIG. 21, one end of the storage tray 640a away from the carrying component 610a includes a loading or unloading end 643a. The transport robot 60a further includes a blocking assembly 650a capable of switching between a blocking position and an avoidance position, and when being located at the blocking position, the blocking assembly 650a protrudes from the loading or unloading end 643a, so as to prevent the goods 90a on the storage tray 640a from sliding out. When being located at the avoidance position, the blocking assembly 650a avoids the loading or unloading end 643a. The carrying component 610a can complete the loading or unloading of the goods 90a of the storage tray 640a through one end of the storage tray 640a which is close thereto. The blocking assembly 650a can effectively prevent the goods 90a from sliding out from the loading or unloading end 643a of the storage tray 640a when the carrying component 610a completes the loading or unloading of the storage tray 640a.

Optionally, blocking assemblies 650a corresponding to a plurality of storage trays 640a may act synchronously or may act separately. In an embodiment of the present disclosure, the blocking assemblies 650a corresponding to the plurality of storage trays 640a act synchronously. Specifically, as shown in FIG. 20 and FIG. 21, the blocking assembly 650a includes a driving rod 651a and a plurality of blocking rods 652a, middle portions of the plurality of blocking rods 652a are separately and rotatably arranged at the loading or unloading end 643a of one storage tray 640a, tail portions of the plurality of blocking rods 652a are separately and rotatably arranged on the driving rod 651a, and when the driving rod 651a drives the tail portions of the plurality of blocking rods 652a to move, head portions of the plurality of blocking rods 652a separately protrude from the loading or unloading end 643a or avoid the loading or unloading end 643a. Only when the blocking assembly 650a moves to the avoidance position, the loading or unloading apparatus 10a can load or unload the goods 90a to the transport robot 60a. In an implementation, when moving upward along the vertical direction, the driving rod 651a drives the plurality of blocking rods 652a to move to the blocking position, when moving downward along the vertical direction, the driving rod 651a drives the plurality of blocking rods 652a to move to the avoidance position, and the driving rod 651a is driven by a linear motor, or is driven by a rotation motor in cooperation with the protrusion 230a.

In an embodiment of the present disclosure, as shown in FIG. 22, the loading or unloading system further includes a conveyor line 70a, the loading or unloading apparatus 10a transports the goods 90a to the conveyor line 70a or receives the goods 90a on the conveyor line 70a, and the conveyor line 70a can convey the goods 90a to a corresponding destination. Further, the loading or unloading system further includes a stationary shelving unit, where the transport robot 60a carries goods 90a out of the stationary shelving unit, or carries goods 90a to the stationary shelving unit. The stationary shelving unit is a starting point or an end point of the transport of the goods 90a.

In the loading or unloading system of the foregoing embodiments, a transport robot 60a carrying goods 90a on a storage tray 640a moves to a loading or unloading apparatus 10a, a plurality of goods loading or unloading assemblies 200a in the loading or unloading apparatus 10a remove all or some of the goods 90a on the transport robot 60a, then the plurality of goods loading or unloading assemblies 200a sequentially transport the removed goods 90a to a lifting assembly, and the lifting assembly conveys the goods 90a to a conveyor line 70a. The foregoing process may also be implemented in a reverse direction, which still implements the transport of the goods 90a.

Embodiment 7

As shown in FIG. 18 and FIG. 19, and FIG. 23 and FIG. 24, an embodiment of the present disclosure provides a loading or unloading apparatus 10a configured to convey goods 90a to a transport robot 60a or unload goods 90a on the transport robot 60a and including an upright frame 100a and a plurality of goods loading or unloading assemblies 200a. The upright frame 100a extends along a vertical direction. The plurality of goods loading or unloading assemblies 200a are arranged on the upright frame 100a at intervals along the vertical direction and capable of separately conveying, at different heights, the goods 90a to the transport robot 60a or unloading the goods 90a on the transport robot 60a. It can be understood that intervals among the plurality of goods loading or unloading assemblies 200a correspond to intervals among storage trays 640a on the transport robot 60a. In an implementation, the plurality of goods loading or unloading assemblies 200a are arranged on the upright frame 100a at equal intervals along the vertical direction. In the loading or unloading apparatus 10a, a plurality of goods loading or unloading assemblies 200a may separately convey, at different heights, goods 90a to a transport robot 60a, or unload goods 90a on the transport robot 60a, which greatly shortens the waiting time of the transport robot 60a during a loading or unloading process, thereby significantly improving the loading or unloading efficiency of the transport robot 60a. In addition, the loading or unloading apparatus 10a may load or unload, at a specified height, the goods 90a, or load or unload all goods 90a at all heights at one time, which has high flexibility and ultimately improves the overall transport efficiency of loading or unloading. It can be understood that the goods 90a in the present disclosure may also be an empty box or a box carrying the goods 90a. It should be noted that the transport robot 60a includes various mechanical devices that can transfer goods, such as a device configured to convey goods between two positions, a device with a sorting function, a stacker with a stacking function, and the like.

It can be understood that heights of the plurality of goods loading or unloading assemblies 200a respectively correspond to heights of a plurality of storage trays 640a on the transport robot 60a, so that the plurality of goods loading or unloading assemblies 200a can convey the goods 90a to all storage trays 640a on the transport robot 60a at one time, or the plurality of goods loading or unloading assemblies 200a can remove the goods 90a on all storage trays 640a on the transport robot 60a at one time. Certainly, in specific working conditions, one or more goods loading or unloading assemblies 200a in the loading or unloading apparatus 10a may simultaneously convey the goods 90a to the transport robot 60a or unload the goods 90a on the transport robot 60a.

As shown in FIG. 18 and FIG. 19, in an embodiment of the present disclosure, each of the plurality of goods loading or unloading assemblies 200a may act independently to convey the goods 90a to the transport robot 60a or unload the goods 90a on the transport robot 60a. In an implementation, each of the plurality of goods loading or unloading assemblies 200a includes a bracket 210a, a loading or unloading structure, and a first driving structure, a plurality of brackets 210a are arranged on the upright frame 100a at intervals along the vertical direction, the first driving structure and the loading or unloading structure are respectively arranged on corresponding brackets 210a, and the loading or unloading structure is in driving connection with the first driving structure and is configured to convey the goods 90a to the transport robot 60a or unload the goods 90a on the transport robot 60a. An independent first driving structure in each of the plurality of goods loading or unloading assemblies 200a can allow the each of the plurality of goods loading or unloading assemblies 200a to individually convey the goods 90a to the transport robot 60a or unload the goods 90a on the transport robot 60a.

Further, as shown in FIG. 19, the loading or unloading structure includes a chain 220a and a protrusion 230a, the chain 220a is rotatably arranged on the bracket 210a along a loading or unloading direction, and the protrusion 230a is fixedly arranged on the chain 220a. The first driving structure includes a driving motor 240a in driving connection with the chain 220a; and the chain 220a can carry the goods 90a. When the driving motor 240a drives the chain 220a to rotate, the protrusion 230a pushes a bottom portion of goods 90a, so as to push the goods 90a to the transport robot 60a, or the protrusion 230a pulls a bottom portion of goods 90a, so as to pull the goods 90a from the transport robot 60a to the chain 220a, or the protrusion 230a blocks the bottom portion of the goods 90a, and the goods are transferred to the chain 220a in the loading or unloading apparatus 10a when the transport robot 60a moves away from the loading or unloading apparatus 10a. Specifically, the chain 220a is arranged on two sprockets arranged at intervals along the loading or unloading direction, and an output shaft of the driving motor 240a is in driving connection with one of the two sprockets. When rotating, the driving motor 240a drives the chain 220a to operate, and the protrusion 230a pushes the bottom portion of the goods 90a, so as to push the goods 90a to the transport robot 60a, or the protrusion 230a pulls the bottom portion of the goods 90a, so as to pull the goods 90a from the transport robot 60a to the chain 220a.

Furthermore, each of the plurality of goods loading or unloading assemblies 200a includes two sets of loading or unloading structures, the two sets of loading or unloading structures are arranged on the bracket 210a in parallel and at intervals, and the driving motor 240a is in driving connection with two chains 220a. The two sets of loading or unloading structures can increase the stability during the loading or unloading of the goods 90a. In an embodiment of the present disclosure, as shown in FIG. 19, each of the plurality of goods loading or unloading assemblies 200a further includes a synchronization rod 250a, the two chains 220a are separately in driving connection with the synchronization rod 250a, and the driving motor 240a is in driving connection with one of the two chains 220a. Specifically, the synchronization rod 250a connects two sprockets arranged at intervals along a horizontal direction perpendicular to the loading or unloading direction, thereby ensuring that the two chains 220a rotate synchronously. It can be understood that the chain 220a in the foregoing embodiment only plays a role of driving and carrying goods. In another embodiment of the present disclosure, a belt, a timing belt, or the like, are used to replace the chain.

In an embodiment of the present disclosure, all goods loading or unloading assemblies 200a in the loading or unloading apparatus 10a act synchronously to convey, at different heights, the goods 90a to the transport robot 60a or unload the goods 90a on the transport robot 60a, or some of the plurality of goods loading or unloading assemblies 200a in the loading or unloading apparatus 10a act independently to convey, at specified heights, the goods 90a to the transport robot 60a or unload the goods 90a on the transport robot 60a. As shown in FIG. 23 to FIG. 25, in an implementation, the loading or unloading apparatus 10a further includes a second driving structure 300a configured to drive the upright frame 100a to approach or move away from the transport robot 60a along the loading or unloading direction, and when the second driving structure 300a drives the upright frame 100a to approach or move away from the transport robot 60a, the plurality of goods loading or unloading assemblies 200a convey the goods 90a to the transport robot 60a or unload the goods 90a on the transport robot 60a. The loading or unloading apparatus 10a provided in this embodiment can remove all the goods 90a or specified goods 90a on the transport robot 60a at one time, or simultaneously convey a plurality of goods 90a to the transport robot 60a. In an implementation, the second driving structure 300a adopts a driving structure in the form of a motor and a belt.

In an embodiment of the present disclosure, as shown in FIG. 23 and FIG. 24, each of the plurality of goods loading or unloading assemblies 200a includes a loading or unloading cross arm 260a and a push-pull structure, one ends of a plurality of loading or unloading cross arms 260a are arranged on the upright frame 100a at intervals along the vertical direction, and the push-pull structure is rotatably arranged at other ends corresponding to the plurality of loading or unloading cross arms 260a. When the plurality of loading or unloading cross arms 260a approach or move away from the transport robot 60a along a loading or unloading direction, the push-pull structure pushes or pulls the goods 90a, so as to convey the goods 90a to the transport robot 60a or unload the goods 90a on the transport robot 60a. When rotating, the push-pull structure includes a push-pull position and a second avoidance position, and when rotating to the push-pull position, the push-pull structure conveys the goods 90a to the transport robot 60a or pulls down the goods 90a on the transport robot 60a. When the push-pull structure rotates to the second avoidance position, the push-pull structure avoids the goods 90a.

It can be understood that when pushing or pulling the goods 90a, the push-pull structure may push or pull a top portion, a middle portion, or a bottom portion of the goods 90a. In an embodiment of the present disclosure, two of the plurality of goods loading or unloading assemblies 200a are arranged at intervals in a same horizontal direction of the upright frame 100a, and two push-pull structures in the same horizontal direction separately rotate to the push-pull position or the second avoidance position. The two push-pull structures in the same horizontal direction respectively drive two sides of the goods 90a along the loading or unloading direction. The two push-pull structures push or pull the two sides of the goods 90a synchronously, which can effectively ensure the stability of a push-pull process of the goods 90a. Further, the two push-pull structures in the same horizontal direction push/pull two sides of the middle portion of the goods 90a synchronously along the loading or unloading direction. It can be understood that the two push-pull structures in the same horizontal direction rotate to the push-pull position or the second avoidance position synchronously, or rotate to the push-pull position or the second avoidance position successively. In another embodiment of the present disclosure, only one of the plurality of goods loading or unloading assemblies 200a is arranged in a same height direction of the upright frame 100a, and the one of the plurality of goods loading or unloading assemblies 200a pushes or pulls the top portion or the bottom portion of the goods 90a when pushing or pulling the goods 90a.

In an implementation, as shown in FIG. 24 and FIG. 25, the push-pull structure includes a push-pull rod 270a and a push-pull motor 280a, the push-pull motor 280a is arranged at one ends of the plurality of loading or unloading cross arms 260a away from the upright frame 100a, the push-pull rod 270a is arranged on an output shaft of the push-pull motor 280a, and the push-pull motor 280a is configured to drive the push-pull rod 270a to rotate to the push-pull position or the second avoidance position. Two push-pull rods 270a may separately be rotated to the push-pull position under the driving of the push-pull motor 280a, so as to pull the goods 90a out of the transport robot 60a or push the goods 90a to the transport robot 60a. It can be understood that the function of the push-pull motor 280a is to drive the push-pull rod 270a to rotate, and the push-pull rod 270a is directly arranged on the output shaft of the push-pull motor 280a, or the push-pull rod 270a is connected to the output shaft of the push-pull motor 280a through a transmission mechanism, as long as the push-pull motor 280a can drive the push-pull rod 270a to rotate to the push-pull position or the second avoidance position.

In an embodiment of the present disclosure, the loading or unloading apparatus 10a further includes at least one temporary storage shelving unit 400a, the upright frame 100a is movably arranged on the temporary storage shelving unit 400a along a horizontal direction, and the second driving structure 300a is configured to drive the upright frame 100a to move relative to the temporary storage shelving unit 400a along the horizontal direction. The temporary storage shelving unit 400a includes a shelving unit with a plurality of layers along the vertical direction, and the plurality of goods loading or unloading assemblies 200a are configured to pull goods 90a at different heights on the transport robot 60a to corresponding layers of the shelving unit on the temporary storage shelving unit 400a, or the plurality of goods loading or unloading assemblies 200a are configured to push goods 90a on the plurality of layers of the shelving unit to the transport robot 60a. The temporary storage shelving unit 400a can temporarily store the goods 90a unloaded from the transport robot 60a by the loading or unloading apparatus 10a, or temporarily store the to-be-transported goods 90a which are transported to the transport robot 60a. In an implementation, the temporary storage shelving unit 400a includes a temporary storage roller 410a with a plurality of layers arranged along the vertical direction, and each layer of the temporary storage roller 410a is capable of individually transporting the goods 90a along the loading or unloading direction. Optionally, each layer of the temporary storage roller 410a can simultaneously carry a plurality of goods 90a.

In the present disclosure, corresponding to the loading or unloading apparatus 10a in the foregoing embodiments, as shown in FIG. 22 and FIG. 26, an embodiment of the present disclosure further provides a loading or unloading system, including a transport robot 60a and the loading or unloading apparatus 10a according to any one of the foregoing solutions. The loading or unloading apparatus 10a is configured to convey the goods 90a to the transport robot 60a or unload the goods 90a on the transport robot 60a. In the loading or unloading apparatus 10a and the loading or unloading system, a plurality of goods loading or unloading assemblies 200a may separately convey, at different heights, goods 90a to a transport robot 60a, or unload goods 90a on the transport robot 60a, which greatly shortens the waiting time of the transport robot 60a during a loading or unloading process, thereby significantly improving the loading or unloading efficiency of the transport robot 60a, and finally improving the overall transport efficiency of the loading or unloading system.

In an embodiment of the present disclosure, the transport robot 60a receives the goods 90a transported by the loading or unloading apparatus 10a in the foregoing embodiments, or the transport robot 60a allows the loading or unloading apparatus 10a in the foregoing embodiments to remove the goods 90a carried by the transport robot. In an implementation, as shown in FIG. 20 and FIG. 21 and FIG. 26, the transport robot 60a includes a carrying component 610a, a vertical frame 620a, a movable chassis 630a, and a storage tray 640a with a plurality of layers, the vertical frame 620a is arranged on the movable chassis 630a, the storage tray 640a with a plurality of layers are separately arranged on one side of the vertical frame 620a at intervals along a vertical direction, the carrying component 610a is arranged on an other side of the vertical frame 620a along the vertical direction, and the carrying component 610a is capable of conveying goods 90a to the storage tray 640a with a plurality of layers or taking out goods 90a on the storage tray 640a with a plurality of layers. It can be understood that the transport robot 60a provided in this embodiment allows a plurality of goods loading or unloading assemblies 200a in a loading or unloading apparatus 10a to synchronously act to load or unload goods 90a, and also allows the plurality of goods loading or unloading assemblies 200a in the loading or unloading apparatus 10a to act separately to load or unload the goods 90a.

Corresponding to the plurality of goods loading or unloading assemblies 200a in the form of a push-pull structure, in an embodiment of the present disclosure, as shown in FIG. 26, the plurality of goods loading or unloading assemblies 200a directly complete the loading or unloading of the goods 90a through a loading or unloading end 643a of the storage tray 640a on a conventional transport robot 60a. In this case, the carrying component 610a needs to avoid the loading or unloading apparatus 10a. In an implementation, the carrying component 610a ascends to a highest position, so as to avoid the loading or unloading apparatus 10a. Optionally, when the transport robot 60a moves to the loading or unloading apparatus 10a and a blocking rod 652a blocks the goods 90a, the plurality of goods loading or unloading assemblies 200a move away from the transport robot 60a or the transport robot 60a moves away from the plurality of goods loading or unloading assemblies 200a, thereby completing the loading or unloading of the goods 90a. It can be understood that when the plurality of goods loading or unloading assemblies 200a are loaded or unloaded through one end of the storage tray 640a on the transport robot 60a away from the carrying component 610a, the carrying component 610a does not need to avoid the loading or unloading apparatus 10a.

Corresponding to the plurality of goods loading or unloading assemblies 200a with the structure of a chain 220a and a protrusion 230a, in an embodiment of the present disclosure, as shown in FIG. 20 to FIG. 22, the storage tray 640a includes a first side plate 641a and a second side plate 642a that are arranged at a same height of the vertical frame 620a, arranged on the vertical frame 620a in parallel and at intervals, and respectively configured to hold bottom portions of two sides of the goods 90a; and the storage tray 640a allows the loading or unloading apparatus 10a to pull the goods 90a from a bottom portion of the goods 90a or allows the loading or unloading apparatus 10a to push the goods 90a onto the storage tray 640a. A middle portion of the storage tray 640a of a split structure is a gap, which allows a chain 220a of an assembly protrusion 230a to extend into a bottom portion of the goods 90a through the middle portion of the storage tray 640a, and when the chain 220a rotates, the protrusion 230a pushes the bottom portion of the goods 90a, so that the goods 90a are pushed to the transport robot 60a, or the protrusion 230a pulls a bottom portion of the goods 90a, so that the goods 90a are pulled from the transport robot 60a to the chain 220a. Optionally, when the transport robot 60a moves to the loading or unloading apparatus 10a and the protrusion 230a blocks the goods 90a, the chain 220a continues to rotate to complete an action of loading or unloading the goods 90a, or the transport robot 60a moves away from the loading or unloading apparatus 10a to complete an unloading process.

Optionally, the storage tray 640a includes a loading or unloading end 643a, the loading or unloading end 643a is one end of the storage tray 640a away from or close to the carrying component 610a along the loading or unloading direction, and the loading or unloading apparatus 10a completes the loading or unloading of the goods 90a through the loading or unloading end 643a of the storage tray 640a. In an embodiment of the present disclosure, one end of the storage tray 640a close to the carrying component 610a includes a loading or unloading end 643a, and when the loading or unloading apparatus 10a loads or unloads the goods 90a with the transport robot 60a, the carrying component 610a ascends to a highest position to avoid the loading or unloading apparatus 10a. In another embodiment of the present disclosure, as shown in FIG. 20 and FIG. 21, one end of the storage tray 640a away from the carrying component 610a includes a loading or unloading end 643a. The transport robot 60a further includes a blocking assembly 650a capable of switching between a blocking position and a third avoidance position, and when being located at the blocking position, the blocking assembly 650a protrudes from the loading or unloading end 643a, so as to prevent the goods 90a on the storage tray 640a from sliding out. When being located at the third avoidance position, the blocking assembly 650a avoids the loading or unloading end 643a. The carrying component 610a can complete the loading or unloading of the goods 90a of the storage tray 640a through one end of the storage tray 640a which is close thereto. The blocking assembly 650a can effectively prevent the goods 90a from sliding out from the loading or unloading end 643a of the storage tray 640a when the carrying component 610a completes the loading or unloading of the storage tray 640a.

Optionally, blocking assemblies 650a corresponding to a plurality of storage trays 640a may act synchronously or may act separately. In an embodiment of the present disclosure, the blocking assemblies 650a corresponding to the plurality of storage trays 640a act synchronously. Specifically, as shown in FIG. 20 and FIG. 21, the blocking assembly 650a includes a driving rod 651a and a plurality of blocking rods 652a, middle portions of the plurality of blocking rods 652a are separately and rotatably arranged at the loading or unloading end 643a of one storage tray 640a, tail portions of the plurality of blocking rods 652a are separately and rotatably arranged on the driving rod 651a, and when the driving rod 651a drives the tail portions of the plurality of blocking rods 652a to move, head portions of the plurality of blocking rods 652a separately protrude from the loading or unloading end 643a or avoid the loading or unloading end 643a. Only when the blocking assembly 650a moves to the third avoidance position, the loading or unloading apparatus 10a can load or unload the goods 90a to the transport robot 60a. In an implementation, when moving upward along the vertical direction, the driving rod 651a drives the plurality of blocking rods 652a to move to the blocking position, when moving downward along the vertical direction, the driving rod 651a drives the plurality of blocking rods 652a to move to the third avoidance position, and the driving rod 651a is driven by a linear motor, or is driven by a rotation motor in cooperation with the protrusion 230a.

In an embodiment of the present disclosure, as shown in FIG. 22a, the loading or unloading system further includes a lifting assembly, arranged at one ends of the plurality of goods loading or unloading assemblies 200a away from the transport robot 60a, where the lifting assembly is configured to successively receive the goods 90a unloaded by the plurality of goods loading or unloading assemblies 200a, or successively convey the goods 90a to the plurality of goods loading or unloading assemblies 200a. In an implementation, as shown in FIG. 22, the lifting assembly includes a lifting roller 500a extending along the loading or unloading direction and capable of simultaneously carrying one or more goods 90a. The lifting assembly can receive goods 90a on a temporary storage shelving unit 400a or the goods 90a on the plurality of goods loading or unloading assemblies 200a, and then transfer the goods 90a to a corresponding transport line, thereby implementing the automation of a transport process of the goods 90a. Alternatively, the lifting assembly can convey the goods 90a to a temporary storage shelving unit 400a or the plurality of goods loading or unloading assemblies 200a.

In an embodiment of the present disclosure, as shown in FIG. 22, the loading or unloading system further includes a conveyor line 70a, the lifting assembly transports the goods 90a to the conveyor line 70a or receives the goods 90a on the conveyor line 70a, and the conveyor line 70a can convey the goods 90a to a corresponding destination. Further, the loading or unloading system further includes a stationary shelving unit, where the transport robot 60a carries goods 90a out of the stationary shelving unit, or carries goods 90a to the stationary shelving unit. The stationary shelving unit is a starting point or an end point of the transport of the goods 90a.

In the loading or unloading system of the foregoing embodiments, a transport robot 60a carrying goods 90a on a storage tray 640a moves to a loading or unloading apparatus 10a, a plurality of goods loading or unloading assemblies 200a in the loading or unloading apparatus 10a remove all or some of the goods 90a on the transport robot 60a, then the plurality of goods loading or unloading assemblies 200a sequentially transport the removed goods 90a to a lifting assembly, and the lifting assembly conveys the goods 90a to a conveyor line 70a. The foregoing process may also be implemented in a reverse direction, which still implements the transport of the goods 90a.

An embodiment of the present disclosure further provides a loading or unloading method, which is applied to the loading or unloading apparatus 10a according to any one of the foregoing embodiments. The loading or unloading method includes: S30: receiving a second loading/unloading instruction; and S40: at least some goods loading or unloading assemblies 200a separately perform an action according to the second loading/unloading instruction to load/unload goods 90a, or the at least some goods loading or unloading assemblies 200a perform a synchronous linkage to load/unload the goods 90a. The loading or unloading method provided in this embodiment at least has the advantages corresponding to the loading or unloading apparatus 10a, and details are not described herein again.

Optionally, during a loading or unloading process of the goods 90a, the loading or unloading apparatus 10a may complete the loading or unloading of the goods 90a independently or the loading or unloading apparatus 10a cooperates with the transport robot 60a to complete the loading or unloading of the goods 90a. In an embodiment of the present disclosure, in the operation S40: when performing the action, the at least some goods loading or unloading assemblies 200a pull the goods 90a from the transport robot 60a to the loading or unloading apparatus 10a; or when performing the action, the at least some goods loading or unloading assemblies 200a block the goods 90a, and when the transport robot 60a moves away from the loading or unloading apparatus 10a, the goods 90a are left on corresponding goods loading or unloading assemblies 200a; or when performing the action, the at least some goods loading or unloading assemblies 200a push the goods 90a from the loading or unloading apparatus 10a to the transport robot 60a. Further, in the operation S40, the loading or unloading apparatus 10a loads or unloads the goods 90a from one end of the storage tray 640a on the transport robot 60a that is close to the carrying component 610a, or loads or unloads or unloads the goods 90a from one end of the storage tray 640a on the transport robot 60a that is away from the carrying component 610a. When loading or unloading the goods 90a from one end close to the carrying component 610a, the carrying component 610a first ascend to a highest position, thereby leaving a space for the transport robot 60a to be docked with the loading or unloading apparatus 10a. The loading or unloading method provided in this embodiment provides more manners for loading or unloading, and improves the adaptability to actual working conditions.

In an embodiment of the present disclosure, as shown in FIG. 18 and FIG. 19, each of the plurality of goods loading or unloading assemblies 200a includes a bracket 210a, a loading or unloading structure, and a driving motor 240a, a plurality of brackets 210a are arranged on an upright frame 100a at intervals along a vertical direction, the driving motor 240a and the loading or unloading structure are respectively arranged on corresponding brackets 210a; the loading or unloading structure includes a chain 220a and a protrusion 230a, the chain 220a is rotatably arranged on the bracket 210a along a loading or unloading direction, the protrusion 230a is fixedly arranged on the chain 220a, and the driving motor 240a is in driving connection with the chain 220a; and the chain 220a can carry the goods 90a. In the operation S40, the protrusion 230a pushes a bottom portion of goods 90a, so as to push the goods 90a to the transport robot 60a, or the protrusion 230a pulls a bottom portion of goods 90a, so as to pull the goods 90a from the transport robot 60a to the chain 220a, or the protrusion 230a blocks the bottom portion of the goods 90a, and the goods 90a are transferred to the chain 220a when the transport robot 60a moves away from the loading or unloading apparatus 10a. The loading or unloading structure in the form of the chain 220a and the protrusion 230a can implement the loading or unloading of the goods 90a through the bottom portion of the goods 90a.

Figure 27:
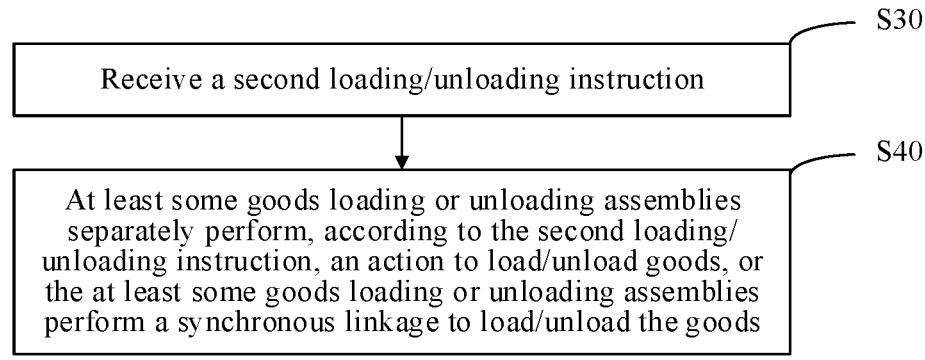
FIG. 27 is a schematic structural diagram of a loading or unloading method according to an embodiment of the present disclosure.
Figure 28:
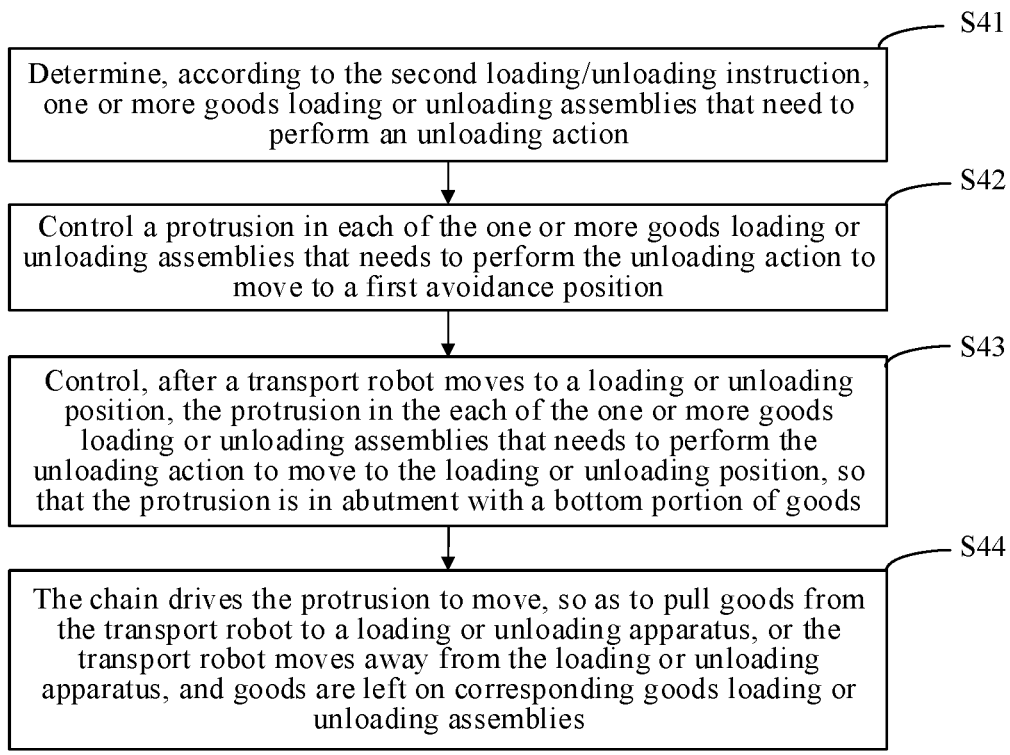
FIG. 28 is a schematic diagram of specific operations of an operation S40 according to an embodiment of the present disclosure.

Specifically, when rotating, the chain 220a drives the protrusion 230a to move, so as to form a loading or unloading position and a first avoidance position, and when being located at the loading or unloading position, the protrusion 230a is capable of being in abutment with the bottom portion of the goods 90a along the loading or unloading direction; and as shown in FIG. 27 and FIG. 28, the operation S40 includes: S41: determining, according to the second loading/unloading instruction, one or more goods loading or unloading assemblies 200a that need to perform an unloading action; S42: controlling a protrusion 230a in each of the plurality of goods loading or unloading assemblies 200a that needs to perform the unloading action to move to the first avoidance position; S43: controlling, after the transport robot 60a moves to the loading or unloading position, the protrusion 230a in the each of the plurality of goods loading or unloading assemblies 200a that needs to perform the unloading action to move to the loading or unloading position, so that the protrusion 230a is in abutment with the bottom portion of the goods 90a; and S44: the chain 220a drives the protrusion 230a to move, so as to pull the goods 90a from the transport robot 60a to the loading or unloading apparatus 10a, or the transport robot 60a moves away from the loading or unloading apparatus 10a, and the goods 90a are left on corresponding goods loading or unloading assemblies 200a.

During a loading or unloading process of the goods 90a, there may be goods 90a that do not need to be unloaded from the transport robot 60a at this time. Optionally, in the operation S42, whether there are goods 90a on the transport robot 60a at a height corresponding to each of the plurality of goods loading or unloading assemblies 200a is determined, and in a case that there are goods 90a on the transport robot 60a at a corresponding height, the protrusion 230a in the each of the plurality of goods loading or unloading assemblies 200a at the corresponding height is controlled to move to the first avoidance position; or in the operation S42, protrusions 230a in all goods loading or unloading assemblies 200a are controlled to rotate to the first avoidance position. The loading or unloading method provided in this embodiment avoids the influence on the loading or unloading process of the goods 90a on the transport robot 60a that do not need to be unloaded temporarily.

It can be understood that a loading process of the loading or unloading apparatus 10a to the transport robot 60a is a reverse process of the foregoing unloading process. Before the foregoing loading or unloading apparatus 10a performs loading, at least one of the plurality of goods loading or unloading assemblies 200a carries the goods 90a, and the protrusion 230a is in abutment with one side of the goods 90a close to the upright frame 100a. In an embodiment of the present disclosure, the operation S40 includes: S411: determining, according to the second loading/unloading instruction, one or more goods loading or unloading assemblies 200a that need to perform a loading action; S422: controlling a protrusion 230a in each of the plurality of goods loading or unloading assemblies 200a that needs to perform the loading action to be in abutment with one side of the goods 90a close to the upright frame 100a; and S43: controlling, after the transport robot 60a moves to the loading or unloading position, the protrusion 230a in the each of the plurality of goods loading or unloading assemblies 200a that needs to perform the loading action to move to the first avoidance position, where during this process, the protrusion 230a is driven by the chain 220a to move toward a direction close to the transport robot 60a, so as to push the goods 90a from the loading or unloading apparatus 10a to the transport robot 60a.

In another embodiment of the present disclosure, as shown in FIG. 23 to FIG. 25, the loading or unloading apparatus 10a further includes a second driving structure 300a configured to drive the upright frame 100a to approach or move away from the transport robot 60a along the loading or unloading direction, and when the second driving structure 300a drives the upright frame 100a to approach the transport robot 60a, the plurality of goods loading or unloading assemblies 200a convey the goods 90a to the transport robot 60a or unload the goods 90a on the transport robot 60a. Each of the plurality of goods loading or unloading assemblies 200a includes a loading or unloading cross arm 260a and a push-pull structure, one ends of a plurality of loading or unloading cross arms 260a are arranged on the upright frame 100a at intervals along the vertical direction, and the push-pull structure is rotatably arranged at other ends corresponding to the plurality of loading or unloading cross arms 260a. In the operation S40, when the plurality of loading or unloading cross arms 260a approach or move away from the transport robot 60a along a loading or unloading direction under driving of the second driving structure 300a, the push-pull structure pushes or pulls the goods 90a, so as to convey the goods 90a to the transport robot 60a or unload the goods 90a on the transport robot 60a, or the push-pull structure blocks the goods 90a, and when the transport robot 60a moves away from the loading or unloading apparatus 10a, the goods 90a are transferred to the loading or unloading apparatus 10a. The loading or unloading method provided in this embodiment at least has the advantages corresponding to the loading or unloading apparatus 10a, and details are not described herein again.

Figure 29:
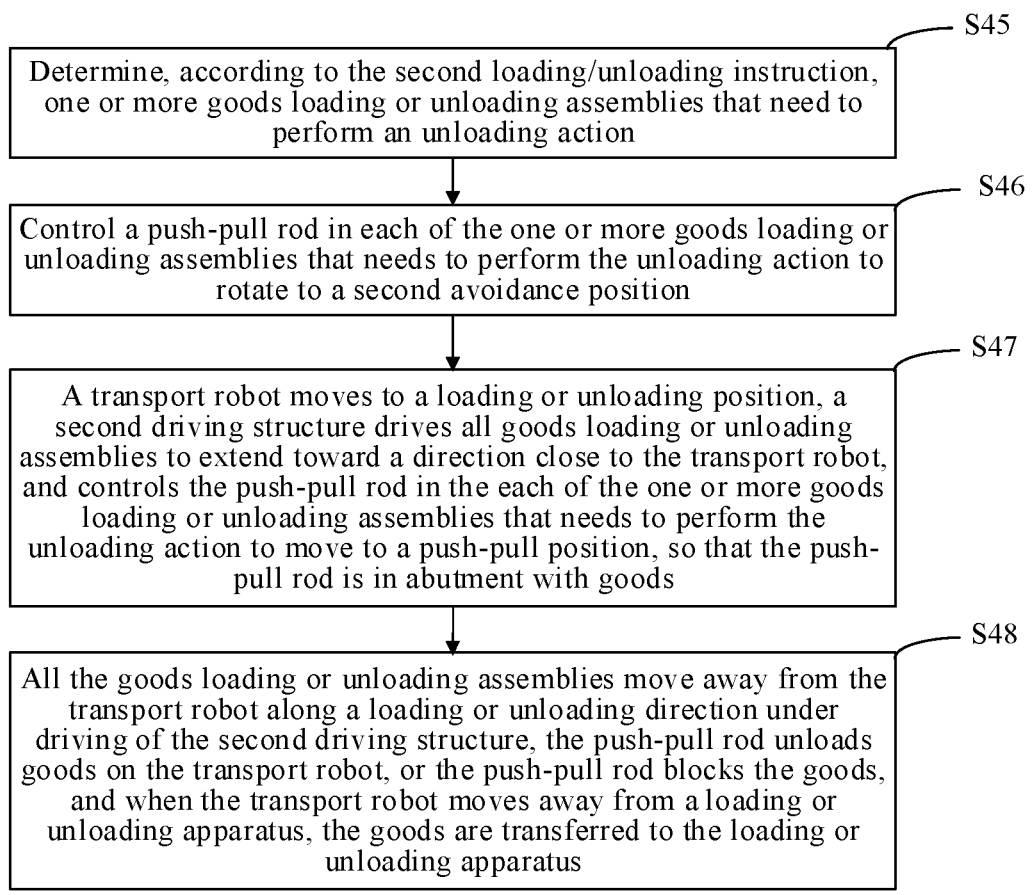
FIG. 29 is a schematic diagram of specific operations of an operation S40 according to another embodiment of the present disclosure.

In an embodiment of the present disclosure, as shown in FIG. 23 to FIG. 25, the push-pull structure includes a push-pull rod 270a and a push-pull motor 280a, the push-pull motor 280a is arranged at one ends of the plurality of loading or unloading cross arms 260a away from the upright frame 100a, and the push-pull rod 270a is arranged on an output shaft of the push-pull motor 280a. When driving the push-pull rod 270a to rotate, the push-pull motor 280a includes a push-pull position or a second avoidance position, and when rotating to the push-pull position, the push-pull rod 270a is in abutment with the goods 90a in the loading or unloading direction. As shown in FIG. 29, the operation S40 includes: S45: determining, according to the second loading/unloading instruction, one or more goods loading or unloading assemblies 200a that need to perform an unloading action; S46: controlling a push-pull rod 270a in each of the plurality of goods loading or unloading assemblies 200a that needs to perform the unloading action to rotate to the second avoidance position; S47: the transport robot 60a moves to the loading or unloading position, the second driving structure 300a drives all goods loading or unloading assemblies 200a to extend toward a direction close to the transport robot 60a, and controls the push-pull rod 270a in the each of the plurality of goods loading or unloading assemblies 200a that needs to perform the unloading action to move to the push-pull position, so that the push-pull rod 270a is in abutment with the goods 90a; and S48: all the goods loading or unloading assemblies 200a move away from the transport robot 60a along the loading or unloading direction under the driving of the second driving structure 300a, the push-pull rod 270a unloads the goods 90a on the transport robot 60a, or the push-pull rod 270a blocks the goods 90a, and when the transport robot 60a moves away from the loading or unloading apparatus 10a, the goods 90a are transferred to the loading or unloading apparatus 10a.

During a loading or unloading process of the goods 90a, there may be goods 90a that do not need to be unloaded from the transport robot 60a at this time. Optionally, in the operation S46, whether there are goods 90a on the transport robot 60a at a height corresponding to each of the plurality of goods loading or unloading assemblies 200a is determined, and in a case that there are goods 90a on the transport robot 60a at a corresponding height, the push-pull rod 270a in the each of the plurality of goods loading or unloading assemblies 200a at the corresponding height is controlled to move to the second avoidance position; or in the operation S46, push-pull rods 270a in all goods loading or unloading assemblies 200a are controlled to rotate to the second avoidance position. The loading or unloading method provided in this embodiment avoids the influence on the loading or unloading process of the goods 90a on the transport robot 60a that do not need to be unloaded temporarily.

In an embodiment of the present disclosure, as shown in FIG. 24 and FIG. 25, the loading or unloading apparatus 10a further includes at least one temporary storage shelving unit 400a, the upright frame 100a is movably arranged on the temporary storage shelving unit 400a along a horizontal direction, and the second driving structure 300a is configured to drive the upright frame 100a to move relative to the temporary storage shelving unit 400a along the horizontal direction. The temporary storage shelving unit 400a includes a shelving unit with a plurality of layers along the vertical direction. In the operation S40, the plurality of goods loading or unloading assemblies 200a are configured to pull goods 90a at different heights on the transport robot 60a to corresponding layers of the shelving unit on the temporary storage shelving unit 400a, or the plurality of goods loading or unloading assemblies 200a are configured to push goods 90a on the plurality of layers of the shelving unit to the transport robot 60a. The loading or unloading method provided in this embodiment at least has the advantages corresponding to the loading or unloading apparatus 10a, and details are not described herein again.

It can be understood that a loading process of the loading or unloading apparatus 10a to the transport robot 60a is a reverse process of the foregoing unloading process. Before the foregoing loading or unloading apparatus 10a performs loading, at least one of the plurality of goods loading or unloading assemblies 200a carries the goods 90a, and the push-pull rod 270a located at the push-pull position is in abutment with one side of the goods 90a close to the upright frame 100a. In an embodiment of the present disclosure, the operation S40 includes: S455: determining, according to the second loading/unloading instruction, one or more goods loading or unloading assemblies 200a that need to perform a loading action; S466: controlling a push-pull rod 270a in each of the plurality of goods loading or unloading assemblies 200a that needs to perform the loading action to rotate to the push-pull position or stay at the push-pull position;

and S477: the transport robot 60a moves to the loading or unloading position, the second driving structure 300a drives all loading or unloading assemblies 200a to push out toward the direction close to the transport robot 60a, and then the plurality of goods loading or unloading assemblies 200a push the goods 90a to storage trays 640a on the transport robot 60a along the loading or unloading direction under driving of the second driving structure 300a.

During a loading or unloading process of the goods 90a, there may be goods 90a that do not need to be transported from the loading or unloading apparatus 10a to the transport robot 60a at this time. Optionally, in the operation S466, it is also necessary to control a push-pull rod 270a in each of the plurality of goods loading or unloading assemblies 200a that do not need to perform the loading action to rotate to the second avoidance position or stay at the second avoidance position. The loading or unloading method provided in this embodiment avoids the influence on the loading or unloading process of the goods 90a on the loading or unloading apparatus 10a that do not need to be transported to the transport robot 60a temporarily.

Embodiment 8

As shown in FIG. 18 and FIG. 19, and FIG. 23 and FIG. 24, an embodiment of the present disclosure provides a loading or unloading apparatus 10a configured to convey goods 90a to a transport robot 60a or unload goods 90a on the transport robot 60a and including an upright frame 100a and a plurality of goods loading or unloading assemblies 200a. The upright frame 100a extends along a vertical direction. The plurality of goods loading or unloading assemblies 200a are arranged on the upright frame 100a at intervals along the vertical direction and capable of separately conveying, at different heights, the goods 90a to the transport robot 60a or unloading the goods 90a on the transport robot 60a. It can be understood that intervals among the plurality of goods loading or unloading assemblies 200a correspond to intervals among storage trays 640a on the transport robot 60a. In an implementation, the plurality of goods loading or unloading assemblies 200a are arranged on the upright frame 100a at equal intervals along the vertical direction. In the loading or unloading apparatus 10a, a plurality of goods loading or unloading assemblies 200a may separately convey, at different heights, goods 90a to a transport robot 60a, or unload goods 90a on the transport robot 60a, which greatly shortens the waiting time of the transport robot 60a during a loading or unloading process, thereby significantly improving the loading or unloading efficiency of the transport robot 60a. In addition, the loading or unloading apparatus 10a may load or unload, at a specified height, the goods 90a, or load or unload all goods 90a at all heights at one time, which has high flexibility and ultimately improves the overall transport efficiency of a loading or unloading system. It can be understood that the goods 90a in the present disclosure may also be an empty box or a box carrying the goods 90a. It should be noted that the transport robot 60a includes various mechanical devices that can transfer goods, such as a device configured to convey goods between two positions, a device with a sorting function, a stacker with a stacking function, and the like.

It can be understood that heights of the plurality of goods loading or unloading assemblies 200a respectively correspond to heights of a plurality of storage trays 640a on the transport robot 60a, so that the plurality of goods loading or unloading assemblies 200a can convey the goods 90a to all storage trays 640a on the transport robot 60a at one time, or the plurality of goods loading or unloading assemblies 200a can remove the goods 90a on all storage trays 640a on the transport robot 60a at one time. Certainly, in specific working conditions, one or more goods loading or unloading assemblies 200a in the loading or unloading apparatus 10a may simultaneously convey the goods 90a to the transport robot 60a or unload the goods 90a on the transport robot 60a.

As shown in FIG. 18 and FIG. 19, in an embodiment of the present disclosure, each of the plurality of goods loading or unloading assemblies 200a may act independently to convey the goods 90a to the transport robot 60a or unload the goods 90a on the transport robot 60a. In an implementation, each of the plurality of goods loading or unloading assemblies 200a includes a bracket 210a, a loading or unloading structure, and a first driving structure, a plurality of brackets 210a are arranged on the upright frame 100a at intervals along the vertical direction, the first driving structure and the loading or unloading structure are respectively arranged on corresponding brackets 210a, and the loading or unloading structure is in driving connection with the first driving structure and is configured to convey the goods 90a to the transport robot 60a or unload the goods 90a on the transport robot 60a. An independent first driving structure in each of the plurality of goods loading or unloading assemblies 200a can allow the each of the plurality of goods loading or unloading assemblies 200a to individually convey the goods 90a to the transport robot 60a or unload the goods 90a on the transport robot 60a. Optionally, projections of the plurality of brackets 210a in a horizontal plane overlap, or the distribution of the plurality of brackets 210a in the horizontal plane is adapted to an actual structure of the transport robot 60a, for example, the projections of the plurality of brackets 210a in the horizontal plane partially overlap or do not overlap at all.

Further, as shown in FIG. 19, the loading or unloading structure includes a chain 220a and a protrusion 230a, the chain 220a is rotatably arranged on the bracket 210a along a loading or unloading direction, and the protrusion 230a is fixedly arranged on the chain 220a. The first driving structure includes a driving motor 240a in driving connection with the chain 220a; and the chain 220a can carry the goods 90a. When the driving motor 240a drives the chain 220a to rotate, the protrusion 230a pushes a bottom portion of goods 90a, so as to push the goods 90a to the transport robot 60a, or the protrusion 230a pulls a bottom portion of goods 90a, so as to pull the goods 90a from the transport robot 60a to the chain 220a, or the protrusion 230a blocks the bottom portion of the goods 90a, and the goods are transferred to the chain 220a in the loading or unloading apparatus 10a when the transport robot 60a moves away from the loading or unloading apparatus 10a. Specifically, the chain 220a is arranged on two sprockets arranged at intervals along the loading or unloading direction, and an output shaft of the driving motor 240a is in driving connection with one of the two sprockets. When rotating, the driving motor 240a drives the chain 220a to operate, and the protrusion 230a pushes the bottom portion of the goods 90a, so as to push the goods 90a to the transport robot 60a, or the protrusion 230a pulls the bottom portion of the goods 90a, so as to pull the goods 90a from the transport robot 60a to the chain 220a. Furthermore, each of the plurality of goods loading or unloading assemblies 200a includes two sets of loading or unloading structures, the two sets of loading or unloading structures are arranged on the bracket 210a in parallel and at intervals, and the driving motor 240a is in driving connection with two chains 220a. The two sets of loading or unloading structures can increase the stability during the loading or unloading of the goods 90a. In an embodiment of the present disclosure, as shown in FIG. 19, each of the plurality of goods loading or unloading assemblies 200a further includes a synchronization rod 250a, the two chains 220a are separately in driving connection with the synchronization rod 250a, and the driving motor 240a is in driving connection with one of the two chains 220a. Specifically, the synchronization rod 250a connects two sprockets arranged at intervals along a horizontal direction perpendicular to the loading or unloading direction, thereby ensuring that the two chains 220a rotate synchronously. It can be understood that the chain 220a in the foregoing embodiment only plays a role of driving and carrying goods. In another embodiment of the present disclosure, a belt, a timing belt, or the like, are used to replace the chain.

In an embodiment of the present disclosure, all goods loading or unloading assemblies 200a in the loading or unloading apparatus 10a act synchronously to convey, at different heights, the goods 90a to the transport robot 60a or unload the goods 90a on the transport robot 60a, or some of the plurality of goods loading or unloading assemblies 200a in the loading or unloading apparatus 10a act independently to convey, at specified heights, the goods 90a to the transport robot 60a or unload the goods 90a on the transport robot 60a. As shown in FIG. 23 to FIG. 25, in an implementation, the loading or unloading apparatus 10a further includes a second driving structure 300a configured to drive the upright frame 100a to approach or move away from the transport robot 60a along the loading or unloading direction, and when the second driving structure 300a drives the upright frame 100a to approach or move away from the transport robot 60a, the plurality of goods loading or unloading assemblies 200a convey the goods 90a to the transport robot 60a or unload the goods 90a on the transport robot 60a. The loading or unloading apparatus 10a provided in this embodiment can remove all the goods 90a or specified goods 90a on the transport robot 60a at one time, or simultaneously convey a plurality of goods 90a to the transport robot 60a. In an implementation, the second driving structure 300a adopts a driving structure in the form of a motor and a belt.

In an embodiment of the present disclosure, as shown in FIG. 23 and FIG. 24, each of the plurality of goods loading or unloading assemblies 200a includes a loading or unloading cross arm 260a and a push-pull structure, one ends of a plurality of loading or unloading cross arms 260a are arranged on the upright frame 100a at intervals along the vertical direction, and the push-pull structure is rotatably arranged at other ends corresponding to the plurality of loading or unloading cross arms 260a. When the plurality of loading or unloading cross arms 260a approach or move away from the transport robot 60a along a loading or unloading direction, the push-pull structure pushes or pulls the goods 90a, so as to convey the goods 90a to the transport robot 60a or unload the goods 90a on the transport robot 60a. When rotating, the push-pull structure includes a push-pull position and an avoidance position, and when rotating to the push-pull position, the push-pull structure conveys the goods 90a to the transport robot 60a or pulls down the goods 90a on the transport robot 60a. When the push-pull structure rotates to the avoidance position, the push-pull structure avoids the goods 90a. It can be understood that when pushing or pulling the goods 90a, the push-pull structure may push or pull a top portion, a middle portion, or a bottom portion of the goods 90a. In an embodiment of the present disclosure, two of the plurality of goods loading or unloading assemblies 200a are arranged at intervals in a same horizontal direction of the upright frame 100a, and two push-pull structures in the same horizontal direction separately rotate to the push-pull position or the avoidance position. The two push-pull structures in the same horizontal direction respectively drive two sides of the goods 90a along the loading or unloading direction. The two push-pull structures push or pull the two sides of the goods 90a synchronously, which can effectively ensure the stability of a push-pull process of the goods 90a. Further, the two push-pull structures in the same horizontal direction push/pull two sides of the middle portion of the goods 90a synchronously along the loading or unloading direction. It can be understood that the two push-pull structures in the same horizontal direction rotate to the push-pull position or the avoidance position synchronously, or rotate to the push-pull position or the avoidance position successively.

In an implementation, as shown in FIG. 24 and FIG. 25, the push-pull structure includes a push-pull rod 270a and a push-pull motor 280a, the push-pull motor 280a is arranged at one ends of the plurality of loading or unloading cross arms 260a away from the upright frame 100a, the push-pull rod 270a is arranged on an output shaft of the push-pull motor 280a, and the push-pull motor 280a is configured to drive the push-pull rod 270a to rotate to the push-pull position or the avoidance position. Two push-pull rods 270a may separately be rotated to the push-pull position under the driving of the push-pull motor 280a, so as to pull the goods 90a out of the transport robot 60a or push the goods 90a to the transport robot 60a. In an embodiment of the present disclosure, the loading or unloading apparatus 10a further includes at least one temporary storage shelving unit 400a, the upright frame 100a is movably arranged on the temporary storage shelving unit 400a along a horizontal direction, and the second driving structure 300a is configured to drive the upright frame 100a to move relative to the temporary storage shelving unit 400a along the horizontal direction. The temporary storage shelving unit 400a includes a shelving unit with a plurality of layers along the vertical direction, and the plurality of goods loading or unloading assemblies 200a are configured to pull goods 90a at different heights on the transport robot 60a to corresponding layers of the shelving unit on the temporary storage shelving unit 400a, or the plurality of goods loading or unloading assemblies 200a are configured to push goods 90a on the plurality of layers of the shelving unit to the transport robot 60a. The temporary storage shelving unit 400a can temporarily store the goods 90a unloaded from the transport robot 60a by the loading or unloading apparatus 10a, or temporarily store the to-be-transported goods 90a which are transported to the transport robot 60a. In an implementation, the temporary storage shelving unit 400a includes a temporary storage roller 410a with a plurality of layers arranged along the vertical direction, and each layer of the temporary storage roller 410a is capable of individually transporting the goods 90a along the loading or unloading direction. Optionally, each layer of the temporary storage roller 410a can simultaneously carry a plurality of goods 90a.

In the present disclosure, corresponding to the loading or unloading apparatus 10a in the foregoing embodiments, as shown in FIG. 22 and FIG. 26, an embodiment of the present disclosure further provides a loading or unloading system, including a transport robot 60a and the loading or unloading apparatus 10a according to any one of the foregoing solutions. The loading or unloading apparatus 10a is configured to convey the goods 90a to the transport robot 60a or unload the goods 90a on the transport robot 60a. In the loading or unloading apparatus 10a and the loading or unloading system, a plurality of goods loading or unloading assemblies 200a may separately convey, at different heights, goods 90a to a transport robot 60a, or unload goods 90a on the transport robot 60a, which greatly shortens the waiting time of the transport robot 60a during a loading or unloading process, thereby significantly improving the loading or unloading efficiency of the transport robot 60a, and finally improving the overall transport efficiency of the loading or unloading system.

In an embodiment of the present disclosure, the transport robot 60a receives the goods 90a transported by the loading or unloading apparatus 10a in the foregoing embodiments, or the transport robot 60a allows the loading or unloading apparatus 10a in the foregoing embodiments to remove the goods 90a carried by the transport robot. In an implementation, as shown in FIG. 20 and FIG. 21 and FIG. 26, the transport robot 60a includes a carrying component 610a, a vertical frame 620a, a movable chassis 630a, and a storage tray 640a with a plurality of layers, the vertical frame 620a is arranged on the movable chassis 630a, the storage tray 640a with a plurality of layers are separately arranged on one side of the vertical frame 620a at intervals along a vertical direction, the carrying component 610a is arranged on an other side of the vertical frame 620a along the vertical direction, and the carrying component 610a is capable of conveying goods 90a to the storage tray 640a with a plurality of layers or taking out goods 90a on the storage tray 640a with a plurality of layers. It can be understood that the transport robot 60a provided in this embodiment allows a plurality of goods loading or unloading assemblies 200a in a loading or unloading apparatus 10a to synchronously act to load or unload goods 90a, and also allows the plurality of goods loading or unloading assemblies 200a in the loading or unloading apparatus 10a to act separately to load or unload the goods 90a.

Corresponding to the plurality of goods loading or unloading assemblies 200a in the form of a push-pull structure, in an embodiment of the present disclosure, as shown in FIG. 26, the plurality of goods loading or unloading assemblies 200a directly complete the loading or unloading of the goods 90a through a loading or unloading end 643a of the storage tray 640a on a conventional transport robot 60a. In this case, the carrying component 610a needs to avoid the loading or unloading apparatus 10a. In an implementation, the carrying component 610a ascends to a highest position, so as to avoid the loading or unloading apparatus 10a. Optionally, when the transport robot 60a moves to the loading or unloading apparatus 10a and a blocking rod 652a blocks the goods 90a, the plurality of goods loading or unloading assemblies 200a move away from the transport robot 60a or the transport robot 60a moves away from the plurality of goods loading or unloading assemblies 200a, thereby completing the loading or unloading of the goods 90a. It can be understood that when the plurality of goods loading or unloading assemblies 200a are loaded or unloaded through one end of the storage tray 640a on the transport robot 60a away from the carrying component 610a, the carrying component 610a does not need to avoid the loading or unloading apparatus 10a.

Corresponding to the plurality of goods loading or unloading assemblies 200a with the structure of a chain 220a and a protrusion 230a, in an embodiment of the present disclosure, as shown in FIG. 20 to FIG. 22, the storage tray 640a includes a first side plate 641a and a second side plate 642a that are arranged at a same height of the vertical frame 620a, arranged on the vertical frame 620a in parallel and at intervals, and respectively configured to hold bottom portions of two sides of the goods 90a; and the storage tray 640a allows the loading or unloading apparatus 10a to pull the goods 90a from a bottom portion of the goods 90a or allows the loading or unloading apparatus 10a to push the goods 90a onto the storage tray 640a. A middle portion of the storage tray 640a of a split structure is a gap, which allows a chain 220a of an assembly protrusion 230a to extend into a bottom portion of the goods 90a through the middle portion of the storage tray 640a, and when the chain 220a rotates, the protrusion 230a pushes the bottom portion of the goods 90a, so that the goods 90a are pushed to the transport robot 60a, or the protrusion 230a pulls a bottom portion of the goods 90a, so that the goods 90a are pulled from the transport robot 60a to the chain 220a. Optionally, when the transport robot 60a moves to the loading or unloading apparatus 10a and the protrusion 230a blocks the goods 90a, the chain 220a continues to rotate to complete an action of loading or unloading the goods 90a, or the transport robot 60a moves away from the loading or unloading apparatus 10a to complete an unloading process.

Optionally, the storage tray 640a includes a loading or unloading end 643a, the loading or unloading end 643a is one end of the storage tray 640a away from or close to the carrying component 610a along the loading or unloading direction, and the loading or unloading apparatus 10a completes the loading or unloading of the goods 90a through the loading or unloading end 643a of the storage tray 640a. In an embodiment of the present disclosure, one end of the storage tray 640a close to the carrying component 610a includes a loading or unloading end 643a, and when the loading or unloading apparatus 10a loads or unloads the goods 90a with the transport robot 60a, the carrying component 610a ascends to a highest position to avoid the loading or unloading apparatus 10a. In another embodiment of the present disclosure, as shown in FIG. 20 and FIG. 21, one end of the storage tray 640a away from the carrying component 610a includes a loading or unloading end 643a. The transport robot 60a further includes a blocking assembly 650a capable of switching between a blocking position and an avoidance position, and when being located at the blocking position, the blocking assembly 650a protrudes from the loading or unloading end 643a, so as to prevent the goods 90a on the storage tray 640a from sliding out. When being located at the avoidance position, the blocking assembly 650a avoids the loading or unloading end 643a. The carrying component 610a can complete the loading or unloading of the goods 90a of the storage tray 640a through one end of the storage tray 640a which is close thereto. The blocking assembly 650a can effectively prevent the goods 90a from sliding out from the loading or unloading end 643a of the storage tray 640a when the carrying component 610a completes the loading or unloading of the storage tray 640a.

Optionally, blocking assemblies 650a corresponding to a plurality of storage trays 640a may act synchronously or may act separately. In an embodiment of the present disclosure, the blocking assemblies 650a corresponding to the plurality of storage trays 640a act synchronously. Specifically, as shown in FIG. 20 and FIG. 21, the blocking assembly 650a includes a driving rod 651a and a plurality of blocking rods 652a, middle portions of the plurality of blocking rods 652a are separately and rotatably arranged at the loading or unloading end 643a of one storage tray 640a, tail portions of the plurality of blocking rods 652a are separately and rotatably arranged on the driving rod 651a, and when the driving rod 651a drives the tail portions of the plurality of blocking rods 652a to move, head portions of the plurality of blocking rods 652a separately protrude from the loading or unloading end 643a or avoid the loading or unloading end 643a. Only when the blocking assembly 650a moves to the avoidance position, the loading or unloading apparatus 10a can load or unload the goods 90a to the transport robot 60a. In an implementation, when moving upward along the vertical direction, the driving rod 651a drives the plurality of blocking rods 652a to move to the blocking position, when moving downward along the vertical direction, the driving rod 651a drives the plurality of blocking rods 652a to move to the avoidance position, and the driving rod 651a is driven by a linear motor, or is driven by a rotation motor in cooperation with the protrusion 230a.

In an embodiment of the present disclosure, as shown in FIG. 22a, the loading or unloading system further includes a lifting assembly, arranged at one ends of the plurality of goods loading or unloading assemblies 200a away from the transport robot 60a, where the lifting assembly is configured to successively receive the goods 90a unloaded by the plurality of goods loading or unloading assemblies 200a, or successively convey the goods 90a to the plurality of goods loading or unloading assemblies 200a. In an implementation, as shown in FIG. 22, the lifting assembly includes a lifting roller 500a extending along the loading or unloading direction and capable of simultaneously carrying one or more goods 90a. The lifting assembly can receive goods 90a on a temporary storage shelving unit 400a or the goods 90a on the plurality of goods loading or unloading assemblies 200a, and then transfer the goods 90a to a corresponding transport line, thereby implementing the automation of a transport process of the goods 90a. Alternatively, the lifting assembly can convey the goods 90a to a temporary storage shelving unit 400a or the plurality of goods loading or unloading assemblies 200a.

In an embodiment of the present disclosure, as shown in FIG. 22, the loading or unloading system further includes a conveyor line 70a, the lifting assembly transports the goods 90a to the conveyor line 70a or receives the goods 90a on the conveyor line 70a, and the conveyor line 70a can convey the goods 90a to a corresponding destination. Further, the loading or unloading system further includes a stationary shelving unit, where the transport robot 60a carries goods 90a out of the stationary shelving unit, or carries goods 90a to the stationary shelving unit. The stationary shelving unit is a starting point or an end point of the transport of the goods 90a.

In the loading or unloading system of the foregoing embodiments, a transport robot 60a carrying goods 90a on a storage tray 640a moves to a loading or unloading apparatus 10a, a plurality of goods loading or unloading assemblies 200a in the loading or unloading apparatus 10a remove all or some of the goods 90a on the transport robot 60a, then the plurality of goods loading or unloading assemblies 200a sequentially transport the removed goods 90a to a lifting assembly, and the lifting assembly conveys the goods 90a to a conveyor line 70a. The foregoing process may also be implemented in a reverse direction, which still implements the transport of the goods 90a.

Embodiment 9

As shown in FIG. 18 and FIG. 19, and FIG. 23 and FIG. 24, an embodiment of the present disclosure provides a loading or unloading apparatus 10a configured to convey goods 90a to a transport robot 60a or unload goods 90a on the transport robot 60a and including an upright frame 100a and a plurality of goods loading or unloading assemblies 200a. The upright frame 100a extends along a vertical direction. The plurality of goods loading or unloading assemblies 200a are arranged on the upright frame 100a at intervals along the vertical direction according to set intervals and capable of separately conveying, at different heights, the goods 90a to the transport robot 60a or unloading the goods 90a on the transport robot 60a. It can be understood that set intervals among the plurality of goods loading or unloading assemblies 200a correspond to intervals among storage trays 640a on the transport robot 60a. In an implementation, the plurality of goods loading or unloading assemblies 200a are arranged on the upright frame 100a at equal intervals along the vertical direction. In another implementation, the intervals among the plurality of goods loading or unloading assemblies 200a are different in size, which facilitates loading or unloading of living creatures 90a at different heights.

In the loading or unloading apparatus 10a, a plurality of goods loading or unloading assemblies 200a may separately convey, at different heights, goods 90a to a transport robot 60a, or unload goods 90a on the transport robot 60a, which greatly shortens the waiting time of the transport robot 60a during a loading or unloading process, thereby significantly improving the loading or unloading efficiency of the transport robot 60a. In addition, the loading or unloading apparatus 10a may load or unload, at a specified height, the goods 90a, or load or unload all goods 90a at all heights at one time, which has high flexibility and ultimately improves the overall transport efficiency of a loading or unloading system. It can be understood that the goods 90a in the present disclosure may also be an empty box or a box carrying the goods 90a. It should be noted that the transport robot 60a includes various mechanical devices that can transfer goods, such as a device configured to convey goods between two positions, a device with a sorting function, a stacker with a stacking function, and the like.

It can be understood that heights of the plurality of goods loading or unloading assemblies 200a respectively correspond to heights of a plurality of storage trays 640a on the transport robot 60a, so that the plurality of goods loading or unloading assemblies 200a can convey the goods 90a to all storage trays 640a on the transport robot 60a at one time, or the plurality of goods loading or unloading assemblies 200a can remove the goods 90a on all storage trays 640a on the transport robot 60a at one time. Certainly, in specific working conditions, one or more goods loading or unloading assemblies 200a in the loading or unloading apparatus 10a may simultaneously convey the goods 90a to the transport robot 60a or unload the goods 90a on the transport robot 60a.

As shown in FIG. 18 and FIG. 19, in an embodiment of the present disclosure, each of the plurality of goods loading or unloading assemblies 200a may act independently to convey the goods 90a to the transport robot 60a or unload the goods 90a on the transport robot 60a. In an implementation, each of the plurality of goods loading or unloading assemblies 200a includes a bracket 210a, a loading or unloading structure, and a first driving structure, a plurality of brackets 210a are arranged on the upright frame 100a at intervals along the vertical direction, the first driving structure and the loading or unloading structure are respectively arranged on corresponding brackets 210a, and the loading or unloading structure is in driving connection with the first driving structure and is configured to convey the goods 90a to the transport robot 60a or unload the goods 90a on the transport robot 60a. An independent first driving structure in each of the plurality of goods loading or unloading assemblies 200a can allow the each of the plurality of goods loading or unloading assemblies 200a to individually convey the goods 90a to the transport robot 60a or unload the goods 90a on the transport robot 60a.

Further, as shown in FIG. 19, the loading or unloading structure includes a chain 220a and a protrusion 230a, the chain 220a is rotatably arranged on the bracket 210a along a loading or unloading direction, and the protrusion 230a is fixedly arranged on the chain 220a. The first driving structure includes a driving motor 240a in driving connection with the chain 220a; and the chain 220a can carry the goods 90a. When the driving motor 240a drives the chain 220a to rotate, the protrusion 230a pushes a bottom portion of goods 90a, so as to push the goods 90a to the transport robot 60a, or the protrusion 230a pulls a bottom portion of goods 90a, so as to pull the goods 90a from the transport robot 60a to the chain 220a, or the protrusion 230a blocks the bottom portion of the goods 90a, and the goods are transferred to the chain 220a in the loading or unloading apparatus 10a when the transport robot 60a moves away from the loading or unloading apparatus 10a. Specifically, the chain 220a is arranged on two sprockets arranged at intervals along the loading or unloading direction, and an output shaft of the driving motor 240a is in driving connection with one of the two sprockets. When rotating, the driving motor 240a drives the chain 220a to operate, and the protrusion 230a pushes the bottom portion of the goods 90a, so as to push the goods 90a to the transport robot 60a, or the protrusion 230a pulls the bottom portion of the goods 90a, so as to pull the goods 90a from the transport robot 60a to the chain 220a. Furthermore, each of the plurality of goods loading or unloading assemblies 200a includes two sets of loading or unloading structures, the two sets of loading or unloading structures are arranged on the bracket 210a in parallel and at intervals, and the driving motor 240a is in driving connection with two chains 220a. The two sets of loading or unloading structures can increase the stability during the loading or unloading of the goods 90a. In an embodiment of the present disclosure, as shown in FIG. 19, each of the plurality of goods loading or unloading assemblies 200a further includes a synchronization rod 250a, the two chains 220a are separately in driving connection with the synchronization rod 250a, and the driving motor 240a is in driving connection with one of the two chains 220a. Specifically, the synchronization rod 250a connects two sprockets arranged at intervals along a horizontal direction perpendicular to the loading or unloading direction, thereby ensuring that the two chains 220a rotate synchronously.

In an embodiment of the present disclosure, all goods loading or unloading assemblies 200a in the loading or unloading apparatus 10a act synchronously to convey, at different heights, the goods 90a to the transport robot 60a or unload the goods 90a on the transport robot 60a, or some of the plurality of goods loading or unloading assemblies 200a in the loading or unloading apparatus 10a act independently to convey, at specified heights, the goods 90a to the transport robot 60a or unload the goods 90a on the transport robot 60a. As shown in FIG. 23 to FIG. 25, in an implementation, the loading or unloading apparatus 10a further includes a second driving structure 300a configured to drive the upright frame 100a to approach or move away from the transport robot 60a along the loading or unloading direction, and when the second driving structure 300a drives the upright frame 100a to approach or move away from the transport robot 60a, the plurality of goods loading or unloading assemblies 200a convey the goods 90a to the transport robot 60a or unload the goods 90a on the transport robot 60a. The loading or unloading apparatus 10a provided in this embodiment can remove all the goods 90a or specified goods 90a on the transport robot 60a at one time, or simultaneously convey a plurality of goods 90a to the transport robot 60a. In an implementation, the second driving structure 300a adopts a driving structure in the form of a motor and a belt.

In an embodiment of the present disclosure, as shown in FIG. 23 and FIG. 24, each of the plurality of goods loading or unloading assemblies 200a includes a loading or unloading cross arm 260a and a push-pull structure, one ends of a plurality of loading or unloading cross arms 260a are arranged on the upright frame 100a at intervals along the vertical direction, and the push-pull structure is rotatably arranged at other ends corresponding to the plurality of loading or unloading cross arms 260a. When the plurality of loading or unloading cross arms 260a approach or move away from the transport robot 60a along a loading or unloading direction, the push-pull structure pushes or pulls the goods 90a, so as to convey the goods 90a to the transport robot 60a or unload the goods 90a on the transport robot 60a. When rotating, the push-pull structure includes a push-pull position and an avoidance position, and when rotating to the push-pull position, the push-pull structure conveys the goods 90a to the transport robot 60a or pulls down the goods 90a on the transport robot 60a. When the push-pull structure rotates to the avoidance position, the push-pull structure avoids the goods 90a.

It can be understood that when pushing or pulling the goods 90a, the push-pull structure may push or pull a top portion, a middle portion, or a bottom portion of the goods 90a. In an embodiment of the present disclosure, two of the plurality of goods loading or unloading assemblies 200a are arranged at intervals in a same horizontal direction of the upright frame 100a, and two push-pull structures in the same horizontal direction separately rotate to the push-pull position or the avoidance position. The two push-pull structures in the same horizontal direction respectively drive two sides of the goods 90a along the loading or unloading direction. The two push-pull structures push or pull the two sides of the goods 90a synchronously, which can effectively ensure the stability of a push-pull process of the goods 90a. Further, the two push-pull structures in the same horizontal direction push/pull two sides of the middle portion of the goods 90a synchronously along the loading or unloading direction. It can be understood that the two push-pull structures in the same horizontal direction rotate to the push-pull position or the avoidance position synchronously, or rotate to the push-pull position or the avoidance position successively. In another embodiment of the present disclosure, only one of the plurality of goods loading or unloading assemblies 200a is arranged in a same height direction of the upright frame 100a, and the one of the plurality of goods loading or unloading assemblies 200a pushes or pulls the top portion or the bottom portion of the goods 90a when pushing or pulling the goods 90a.

In an implementation, as shown in FIG. 24 and FIG. 25, the push-pull structure includes a push-pull rod 270a and a push-pull motor 280a, the push-pull motor 280a is arranged at one ends of the plurality of loading or unloading cross arms 260a away from the upright frame 100a, the push-pull rod 270a is arranged on an output shaft of the push-pull motor 280a, and the push-pull motor 280a is configured to drive the push-pull rod 270a to rotate to the push-pull position or the avoidance position. Two push-pull rods 270a may separately be rotated to the push-pull position under the driving of the push-pull motor 280a, so as to pull the goods 90a out of the transport robot 60a or push the goods 90a to the transport robot 60a. It can be understood that the function of the push-pull motor 280a is to drive the push-pull rod 270a to rotate, and the push-pull rod 270a is directly arranged on the output shaft of the push-pull motor 280a, or the push-pull rod 270a is connected to the output shaft of the push-pull motor 280a through a transmission mechanism, as long as the push-pull motor 280a can drive the push-pull rod 270a to rotate to the push-pull position or the avoidance position.

In an embodiment of the present disclosure, referring to FIG. 25, the loading or unloading apparatus 10a further includes at least one temporary storage shelving unit 400a, the upright frame 100a is movably arranged on the temporary storage shelving unit 400a along a horizontal direction, and the second driving structure 300a is configured to drive the upright frame 100a to move relative to the temporary storage shelving unit 400a along the horizontal direction. The temporary storage shelving unit 400a includes a shelving unit with a plurality of layers along the vertical direction, and the plurality of goods loading or unloading assemblies 200a are configured to pull goods 90a at different heights on the transport robot 60a to corresponding layers of the shelving unit on the temporary storage shelving unit 400a, or the plurality of goods loading or unloading assemblies 200a are configured to push goods 90a on the plurality of layers of the shelving unit to the transport robot 60a. The temporary storage shelving unit 400a can temporarily store the goods 90a unloaded from the transport robot 60a by the loading or unloading apparatus 10a, or temporarily store the to-be-transported goods 90a which are transported to the transport robot 60a. In an implementation, the temporary storage shelving unit 400a includes a temporary storage roller 410a with a plurality of layers arranged along the vertical direction, and each layer of the temporary storage roller 410a is capable of individually transporting the goods 90a along the loading or unloading direction. Optionally, each layer of the temporary storage roller 410a can simultaneously carry a plurality of goods 90a.

Corresponding to the plurality of goods loading or unloading apparatus 10a in the foregoing embodiments, as shown in FIG. 22 and FIG. 26, an embodiment of the present disclosure further provides a loading or unloading system, including a transport robot 60a and the loading or unloading apparatus 10a according to any one of the foregoing solutions. The loading or unloading apparatus 10a is configured to convey the goods 90a to the transport robot 60a or unload the goods 90a on the transport robot 60a. In the loading or unloading apparatus 10a and the loading or unloading system, a plurality of goods loading or unloading assemblies 200a may separately convey, at different heights, goods 90a to a transport robot 60a, or unload goods 90a on the transport robot 60a, which greatly shortens the waiting time of the transport robot 60a during a loading or unloading process, thereby significantly improving the loading or unloading efficiency of the transport robot 60a, and finally improving the overall transport efficiency of the loading or unloading system.

In an embodiment of the present disclosure, the transport robot 60a receives the goods 90a transported by the loading or unloading apparatus 10a in the foregoing embodiments, or the transport robot 60a allows the loading or unloading apparatus 10a in the foregoing embodiments to remove the goods 90a carried by the transport robot. In an implementation, as shown in FIG. 20 and FIG. 21 and FIG. 26, the transport robot 60a includes a carrying component 610a, a vertical frame 620a, a movable chassis 630a, and a storage tray 640a with a plurality of layers, the vertical frame 620a is arranged on the movable chassis 630a, the storage tray 640a with a plurality of layers are separately arranged on one side of the vertical frame 620a at intervals along a vertical direction, the carrying component 610a is arranged on an other side of the vertical frame 620a along the vertical direction, and the carrying component 610a is capable of conveying goods 90a to the storage tray 640a with a plurality of layers or taking out goods 90a on the storage tray 640a with a plurality of layers. It can be understood that the transport robot 60a provided in this embodiment allows a plurality of goods loading or unloading assemblies 200a in a loading or unloading apparatus 10a to synchronously act to load or unload goods 90a, and also allows the plurality of goods loading or unloading assemblies 200a in the loading or unloading apparatus 10a to act separately to load or unload the goods 90a.

Corresponding to the plurality of goods loading or unloading assemblies 200a in the form of a push-pull structure, in an embodiment of the present disclosure, as shown in FIG. 26, the plurality of goods loading or unloading assemblies 200a directly complete the loading or unloading of the goods 90a through a loading or unloading end 643a of the storage tray 640a on a conventional transport robot 60a. In this case, the carrying component 610a needs to avoid the loading or unloading apparatus 10a. In an implementation, the carrying component 610a ascends to a highest position, so as to avoid the loading or unloading apparatus 10a. Optionally, when the transport robot 60a moves to the loading or unloading apparatus 10a and a blocking rod 652a blocks the goods 90a, the plurality of goods loading or unloading assemblies 200a move away from the transport robot 60a or the transport robot 60a moves away from the plurality of goods loading or unloading assemblies 200a, thereby completing the loading or unloading of the goods 90a. It can be understood that when the plurality of goods loading or unloading assemblies 200a are loaded or unloaded through one end of the storage tray 640a on the transport robot 60a away from the carrying component 610a, the carrying component 610a does not need to avoid the loading or unloading apparatus 10a.

Corresponding to the plurality of goods loading or unloading assemblies 200a with the structure of a chain 220a and a protrusion 230a, in an embodiment of the present disclosure, as shown in FIG. 20 to FIG. 22, the storage tray 640a includes a first side plate 641a and a second side plate 642a that are arranged at a same height of the vertical frame 620a, arranged on the vertical frame 620a in parallel and at intervals, and respectively configured to hold bottom portions of two sides of the goods 90a; and the storage tray 640a allows the loading or unloading apparatus 10a to pull the goods 90a from a bottom portion of the goods 90a or allows the loading or unloading apparatus 10a to push the goods 90a onto the storage tray 640a. A middle portion of the storage tray 640a of a split structure is a gap, which allows a chain 220a of an assembly protrusion 230a to extend into a bottom portion of the goods 90a through the middle portion of the storage tray 640a, and when the chain 220a rotates, the protrusion 230a pushes the bottom portion of the goods 90a, so that the goods 90a are pushed to the transport robot 60a, or the protrusion 230a pulls a bottom portion of the goods 90a, so that the goods 90a are pulled from the transport robot 60a to the chain 220a. Optionally, when the transport robot 60a moves to the loading or unloading apparatus 10a and the protrusion 230a blocks the goods 90a, the chain 220a continues to rotate to complete an action of loading or unloading the goods 90a, or the transport robot 60a moves away from the loading or unloading apparatus 10a to complete an unloading process.

Optionally, the storage tray 640a includes a loading or unloading end 643a, the loading or unloading end 643a is one end of the storage tray 640a away from or close to the carrying component 610a along the loading or unloading direction, and the loading or unloading apparatus 10a completes the loading or unloading of the goods 90a through the loading or unloading end 643a of the storage tray 640a. In an embodiment of the present disclosure, one end of the storage tray 640a close to the carrying component 610a includes a loading or unloading end 643a, and when the loading or unloading apparatus 10a loads or unloads the goods 90a with the transport robot 60a, the carrying component 610a ascends to a highest position to avoid the loading or unloading apparatus 10a. In another embodiment of the present disclosure, as shown in FIG. 20 and FIG. 21, one end of the storage tray 640a away from the carrying component 610a includes a loading or unloading end 643a. The transport robot 60a further includes a blocking assembly 650a capable of switching between a blocking position and an avoidance position, and when being located at the blocking position, the blocking assembly 650a protrudes from the loading or unloading end 643a, so as to prevent the goods 90a on the storage tray 640a from sliding out. When being located at the avoidance position, the blocking assembly 650a avoids the loading or unloading end 643a. The carrying component 610a can complete the loading or unloading of the goods 90a of the storage tray 640a through one end of the storage tray 640a which is close thereto. The blocking assembly 650a can effectively prevent the goods 90a from sliding out from the loading or unloading end 643a of the storage tray 640a when the carrying component 610a completes the loading or unloading of the storage tray 640a.

Optionally, blocking assemblies 650a corresponding to a plurality of storage trays 640a may act synchronously or may act separately. In an embodiment of the present disclosure, the blocking assemblies 650a corresponding to the plurality of storage trays 640a act synchronously. Specifically, as shown in FIG. 20 and FIG. 21, the blocking assembly 650a includes a driving rod 651a and a plurality of blocking rods 652a, middle portions of the plurality of blocking rods 652a are separately and rotatably arranged at the loading or unloading end 643a of one storage tray 640a, tail portions of the plurality of blocking rods 652a are separately and rotatably arranged on the driving rod 651a, and when the driving rod 651a drives the tail portions of the plurality of blocking rods 652a to move, head portions of the plurality of blocking rods 652a separately protrude from the loading or unloading end 643a or avoid the loading or unloading end 643a. Only when the blocking assembly 650a moves to the avoidance position, the loading or unloading apparatus 10a can load or unload the goods 90a to the transport robot 60a. In an implementation, when moving upward along the vertical direction, the driving rod 651a drives the plurality of blocking rods 652a to move to the blocking position, when moving downward along the vertical direction, the driving rod 651a drives the plurality of blocking rods 652a to move to the avoidance position, and the driving rod 651a is driven by a linear motor, or is driven by a rotation motor in cooperation with the protrusion 230a.

In an embodiment of the present disclosure, as shown in FIG. 22a, the loading or unloading system further includes a lifting assembly, arranged at one ends of the plurality of goods loading or unloading assemblies 200a away from the transport robot 60a, where the lifting assembly is configured to successively receive the goods 90a unloaded by the plurality of goods loading or unloading assemblies 200a, or successively convey the goods 90a to the plurality of goods loading or unloading assemblies 200a. In an implementation, as shown in FIG. 22, the lifting assembly includes a lifting roller 500a extending along the loading or unloading direction and capable of simultaneously carrying one or more goods 90a. The lifting assembly can receive goods 90a on a temporary storage shelving unit 400a or the goods 90a on the plurality of goods loading or unloading assemblies 200a, and then transfer the goods 90a to a corresponding transport line, thereby implementing the automation of a transport process of the goods 90a. Alternatively, the lifting assembly can convey the goods 90a to a temporary storage shelving unit 400a or the plurality of goods loading or unloading assemblies 200a.

In an embodiment of the present disclosure, as shown in FIG. 22, the loading or unloading system further includes a conveyor line 70a, the lifting assembly transports the goods 90a to the conveyor line 70a or receives the goods 90a on the conveyor line 70a, and the conveyor line 70a can convey the goods 90a to a corresponding destination. Further, the loading or unloading system further includes a stationary shelving unit, where the transport robot 60a carries goods 90a out of the stationary shelving unit, or carries goods 90a to the stationary shelving unit. The stationary shelving unit is a starting point or an end point of the transport of the goods 90a.

In the loading or unloading system of the foregoing embodiments, a transport robot 60a carrying goods 90a on a storage tray 640a moves to a loading or unloading apparatus 10a, a plurality of goods loading or unloading assemblies 200a in the loading or unloading apparatus 10a remove all or some of the goods 90a on the transport robot 60a, then the plurality of goods loading or unloading assemblies 200a sequentially transport the removed goods 90a to a lifting assembly, and the lifting assembly conveys the goods 90a to a conveyor line 70a. The foregoing process may also be implemented in a reverse direction, which still implements the transport of the goods 90a.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the appended claims.

What is claimed is:

1. A loading or unloading apparatus, configured to convey goods to a transport robot or unload goods on the transport robot, the loading or unloading apparatus comprising:
an upright frame, extending along a vertical direction;
a plurality of goods loading or unloading assemblies, arranged on the upright frame at intervals along the vertical direction and capable of separately conveying, at different heights, the goods to the transport robot or unloading the goods on the transport robot; and
a frame driving structure, configured to drive the upright frame to approach or move away from the transport robot along a loading or unloading direction, wherein when the frame driving structure drives the upright frame to approach or move away from the transport robot, the plurality of goods loading or unloading assemblies convey the goods to the transport robot or unload the goods on the transport robot;

wherein each of the plurality of goods loading or unloading assemblies comprises a loading or unloading cross arm and a push-pull structure, one ends of a plurality of loading or unloading cross arms are arranged on the upright frame at intervals along the vertical direction, and the push-pull structure is arranged at other ends corresponding to the plurality of loading or unloading cross arms; and when the plurality of loading or unloading cross arms approach or move away from the transport robot along the loading or unloading direction, the push-pull structure pushes or pulls goods, so as to convey the goods to the transport robot or unload the goods on the transport robot.

2. The loading or unloading apparatus according to claim 1, wherein the loading or unloading apparatus further comprises at least one temporary storage shelving unit, the upright frame is movably arranged on the temporary storage shelving unit along a horizontal direction, and the frame driving structure is configured to drive the upright frame to move relative to the temporary storage shelving unit along the horizontal direction; and the temporary storage shelving unit comprises a shelving unit with a plurality of layers along the vertical direction, and the plurality of goods loading or unloading assemblies are configured to pull goods at different heights on the transport robot to corresponding layers of the shelving unit on the temporary storage shelving unit, or the plurality of goods loading or unloading assemblies are configured to push goods on the plurality of layers of the shelving unit to the transport robot.

3. The loading or unloading apparatus according to claim 2, wherein the temporary storage shelving unit comprises a temporary storage roller with a plurality of layers arranged along the vertical direction, and each layer of the temporary storage roller is capable of individually transporting goods along the loading or unloading direction.

4. The loading or unloading apparatus according to claim 1, further comprising a lifting assembly, arranged at one ends of the plurality of goods loading or unloading assemblies away from the transport robot, wherein the lifting assembly is configured to successively receive goods unloaded by the plurality of goods loading or unloading assemblies, or successively convey goods to the plurality of goods loading or unloading assemblies.

5. The loading or unloading apparatus according to claim 4, wherein the lifting assembly comprises a lifting roller extending along the loading or unloading direction and capable of simultaneously carrying a plurality of goods.

6. The loading or unloading apparatus according to claim 1, wherein the push-pull structure is rotatably arranged at other ends of the plurality of loading or unloading cross arms away from the upright frame, when rotating, the push-pull structure is capable of switching between a push-pull position and an avoidance position, and when rotating to the push-pull position, the push-pull structure conveys the goods to the transport robot or pulls down the goods on the transport robot; and when the push-pull structure rotates to the avoidance position, the push-pull structure avoids the goods.

7. The loading or unloading apparatus according to claim 6, wherein two of the plurality of goods loading or unloading assemblies are arranged at intervals in a same horizontal direction of the upright frame, and two push-pull structures in the same horizontal direction separately and synchronously rotate to the push-pull position or the avoidance position; and the two push-pull structures in the same horizontal direction respectively and synchronously drive two sides of the goods along the loading or unloading direction.

8. The loading or unloading apparatus according to claim 6, wherein the push-pull structure comprises a push-pull rod rotatably arranged at one end of the loading or unloading cross arm away from the upright frame, and when rotating, the push-pull rod comprises the push-pull position or the avoidance position.

9. The loading or unloading apparatus according to claim 8, wherein the push-pull structure further comprises a push-pull motor arranged at the one end of the loading or unloading cross arm away from the upright frame, the push-pull rod is arranged on an output shaft of the push-pull motor, and the push-pull motor is configured to drive the push-pull rod to rotate to the push-pull position or the avoidance position.

10. A loading or unloading system, comprising:
a transport robot, and
a loading or unloading apparatus, comprising:
an upright frame, extending along a vertical direction;
a plurality of goods loading or unloading assemblies, arranged on the upright frame at intervals along the vertical direction and capable of separately conveying, at different heights, the goods to the transport robot or unloading the goods on the transport robot; and
a frame driving structure, configured to drive the upright frame to approach or move away from the transport robot along a loading or unloading direction, wherein when the frame driving structure drives the upright frame to approach or move away from the transport robot, the plurality of goods loading or unloading assemblies convey the goods to the transport robot or unload the goods on the transport robot;
wherein the loading or unloading apparatus further comprises at least one temporary storage shelving unit, the upright frame is movably arranged on the temporary storage shelving unit along a horizontal direction, and the frame driving structure is configured to drive the upright frame to move relative to the temporary storage shelving unit along the horizontal direction; and the temporary storage shelving unit comprises a shelving unit with a plurality of layers along the vertical direction, and the plurality of goods loading or unloading assemblies are configured to pull goods at different heights on the transport robot to corresponding layers of the shelving unit on the temporary storage shelving unit, or the plurality of goods loading or unloading assemblies are configured to push goods on the plurality of layers of the shelving unit to the transport robot.

11. The loading or unloading system according to claim 10, wherein the temporary storage shelving unit comprises a temporary storage roller with a plurality of layers arranged along the vertical direction, and each layer of the temporary storage roller is capable of individually transporting goods along the loading or unloading direction.

12. The loading or unloading system according to claim 10, wherein the transport robot comprises a carrying component, a vertical frame, a movable chassis, a plurality of storage assemblies and a blocking mechanism, the vertical frame is arranged on the movable chassis, the plurality of storage assemblies are separately arranged on one side of the vertical frame at intervals along a vertical direction, the carrying component is arranged on an other side of the vertical frame along the vertical direction, and the carrying component is capable of conveying goods to the plurality of storage assemblies or taking out goods on the plurality of storage assemblies;

the locking mechanism is capable of switching between a blocking position and an avoidance position, when the blocking mechanism is at the blocking position, the blocking mechanism is configured to block goods in the plurality of storage assemblies from sliding out, and when the blocking mechanism is at the avoidance position, the goods are capable of being moved into or moved out of the plurality of storage assemblies.

13. The loading or unloading system according to claim 12, wherein the blocking mechanism comprises a movable blocking connector and a plurality of blocking assemblies separately connected to the blocking connector, and at least one of the plurality of blocking assemblies corresponds to a same storage assembly; the blocking connector is capable of driving the plurality of blocking assemblies to move into a loading or unloading end of each of the plurality of storage assemblies, so as to block the goods in the plurality of storage assemblies;

each of the plurality of blocking assemblies comprises a swing member and a blocking member, one end of the swing member is rotatably connected to the blocking connector, an other end of the swing member is mounted with the blocking member, and a middle portion of the swing member is rotatably mounted at the loading or unloading end of the plurality of storage assemblies; and when ascending or descending, the blocking connector is capable of driving the swing member to swing, so that the swing member drives the blocking member to move into or move out of the loading or unloading end.

14. The loading or unloading system according to claim 10, further comprising a lifting assembly, arranged at one ends of the plurality of goods loading or unloading assemblies away from the transport robot, wherein the lifting assembly is configured to successively receive goods unloaded by the plurality of goods loading or unloading assemblies, or successively convey goods to the plurality of goods loading or unloading assemblies.

15. The loading or unloading system according to claim 14, wherein the lifting assembly comprises a lifting roller extending along the loading or unloading direction and capable of simultaneously carrying a plurality of goods.

16. The loading or unloading system according to claim 15, further comprising a conveyor line, wherein the lifting roller is configured to successively receive goods unloaded by the goods loading or unloading assemblies, or successively convey goods to the goods loading or unloading assemblies; and the lifting roller is configured to transport goods to the conveyor line, or receive goods on the conveyor line.

17. A loading or unloading method, applied to a loading or unloading apparatus the loading or unloading apparatus comprising an upright frame, a plurality of goods loading or unloading assemblies arranged on the upright frame at intervals along the vertical direction, and a frame driving structure; the frame driving structure being configured to drive the upright frame to approach or move away from the transport robot along a loading or unloading direction, wherein when the frame driving structure drives the upright frame to approach or move away from the transport robot, the plurality of goods loading or unloading assemblies convey the goods to the transport robot or unload the goods on the transport robot; the loading or unloading method comprising:

receiving a loading or unloading instruction; and
controlling, according to the second loading or unloading instruction, the frame driving structure to drive the upright frame to approach or move away from the transport robot along a loading or unloading direction, and controlling the plurality of goods loading or unloading assemblies to convey the goods to the transport robot or unload the goods on the transport robot;
wherein the loading or unloading apparatus further comprises at least one temporary storage shelving unit, the upright frame is movably arranged on the temporary storage shelving unit along a horizontal direction, and the frame driving structure is configured to drive the upright frame to move relative to the temporary storage shelving unit along the horizontal direction; the temporary storage shelving unit comprises a shelving unit with a plurality of layers along the vertical direction; and
in the controlling, according to the loading or unloading instruction, the frame driving structure to drive the upright frame to approach or move away from the transport robot along a loading or unloading direction, and controlling the plurality of goods loading or unloading assemblies to convey the goods to the transport robot or unload the goods on the transport robot, controlling the at least some goods loading or unloading assemblies to pull goods at different heights on the transport robot to corresponding layers of the shelving unit on the temporary storage shelving unit, or controlling the at least some goods loading or unloading assemblies to push goods on the plurality of layers of the shelving unit to the transport robot.

* * * * *